United States Patent
Akiyama

(10) Patent No.: US 7,821,216 B2
(45) Date of Patent: Oct. 26, 2010

(54) MOTOR CONTROL METHOD AND CONTROL DEVICE

(75) Inventor: Shigeki Akiyama, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1399 days.

(21) Appl. No.: 10/937,314

(22) Filed: Sep. 10, 2004

(65) Prior Publication Data

US 2005/0057200 A1 Mar. 17, 2005

(30) Foreign Application Priority Data

Sep. 12, 2003 (JP) ............................. 2003-322013
Jul. 6, 2004 (JP) ............................. 2004-199720
Aug. 3, 2004 (JP) ............................. 2004-226984

(51) Int. Cl.
*H02P 7/00* (2006.01)

(52) U.S. Cl. ........................ 318/432; 318/685; 318/696

(58) Field of Classification Search .................. 318/59, 318/64, 66, 101, 268, 432–434, 599, 685, 318/696, 461

See application file for complete search history.

(56) References Cited

U.S. PATENT DOCUMENTS

| | | | | |
|---|---|---|---|---|
| 3,944,150 | A * | 3/1976 | Jennerjahn | 242/525.7 |
| 5,664,636 | A * | 9/1997 | Ikuma et al. | 180/206 |
| 6,211,640 | B1 * | 4/2001 | Fujisaki et al. | 318/636 |
| 6,418,274 | B2 | 7/2002 | Tanaka | |
| 6,538,407 | B2 | 3/2003 | Tanaka | |
| 6,600,286 | B2 | 7/2003 | Tanaka et al. | |
| 6,667,591 | B2 * | 12/2003 | Mullet et al. | 318/445 |
| 6,897,630 | B2 * | 5/2005 | Murray et al. | 318/434 |
| 7,339,336 | B2 * | 3/2008 | Gregori | 318/282 |
| 2002/0172510 | A1 | 11/2002 | Kobayashi et al. | |
| 2003/0137273 | A1 * | 7/2003 | Davidov | 318/685 |
| 2003/0184002 | A1 * | 10/2003 | Akiyama et al. | 271/110 |
| 2003/0205982 | A1 | 11/2003 | Tanaka et al. | |

FOREIGN PATENT DOCUMENTS

| | | |
|---|---|---|
| JP | 09-065511 | 3/1997 |
| JP | A-2001-186785 | 7/2001 |
| JP | A 2001-224189 | 8/2001 |
| JP | A 2001-251878 | 9/2001 |
| JP | A 2002-345277 | 11/2002 |
| JP | A 2003-079189 | 3/2003 |
| JP | 2003-348878 A | 12/2003 |

* cited by examiner

*Primary Examiner*—Rina I Duda
(74) *Attorney, Agent, or Firm*—Oliff & Berridge, PLC

(57) ABSTRACT

When motor drive is initiated, firstly a PWM value at time of driving initiation is set to an initial setting value start_pwm1, and gradually increased by a specified amount in specified period. When an encoder edge is detected, the PWM value is reset to the initial setting value, and increased again in the same manner. From second edge detection, next PWM initial value is set corresponding to a PWM value at the time of edge detection. If the PWM value at the time of edge detection is larger than det_pwm_max owing to load on the motor becoming large and thereby driving velocity becoming slower, a PWM value which is larger than previous PWM initial value is set as a new PWM initial value. The driving target can be driven stably irrelevant to fluctuation of the load on the motor.

69 Claims, 72 Drawing Sheets

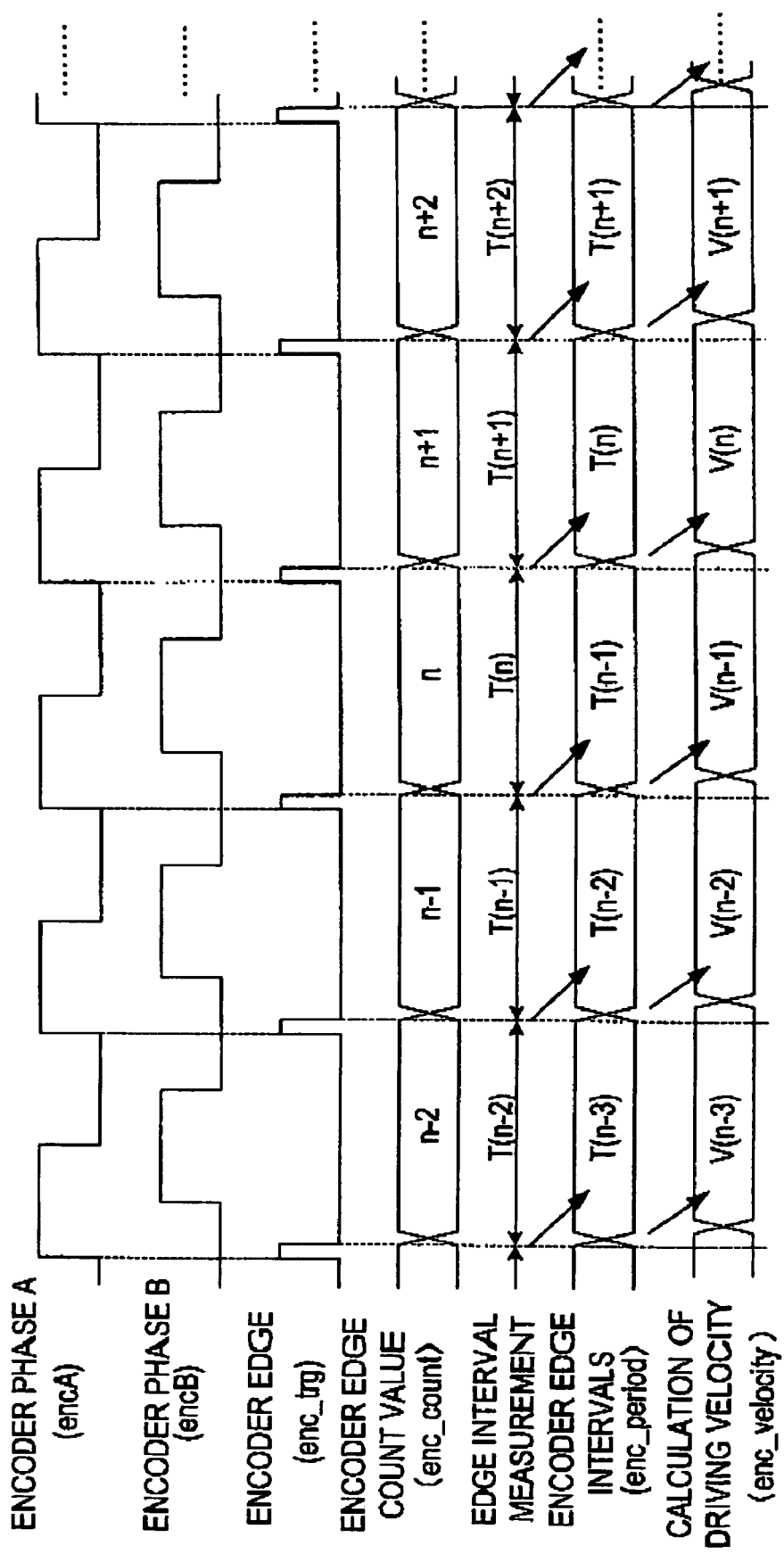

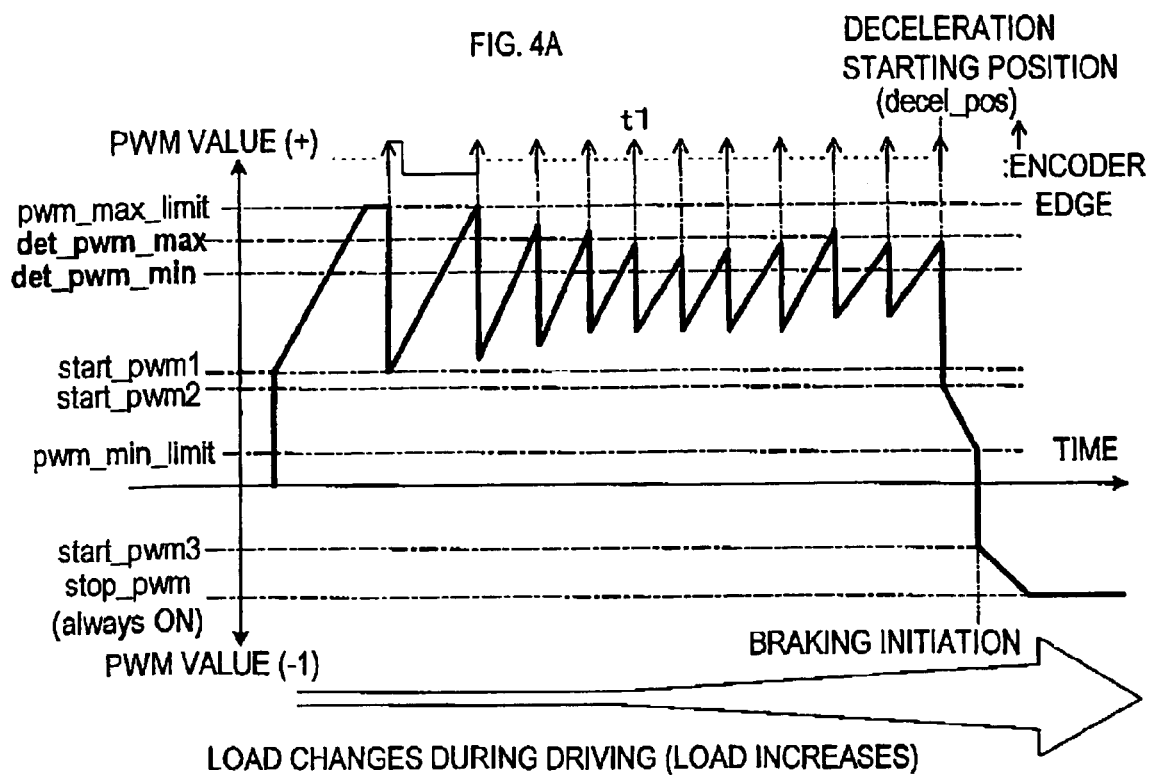
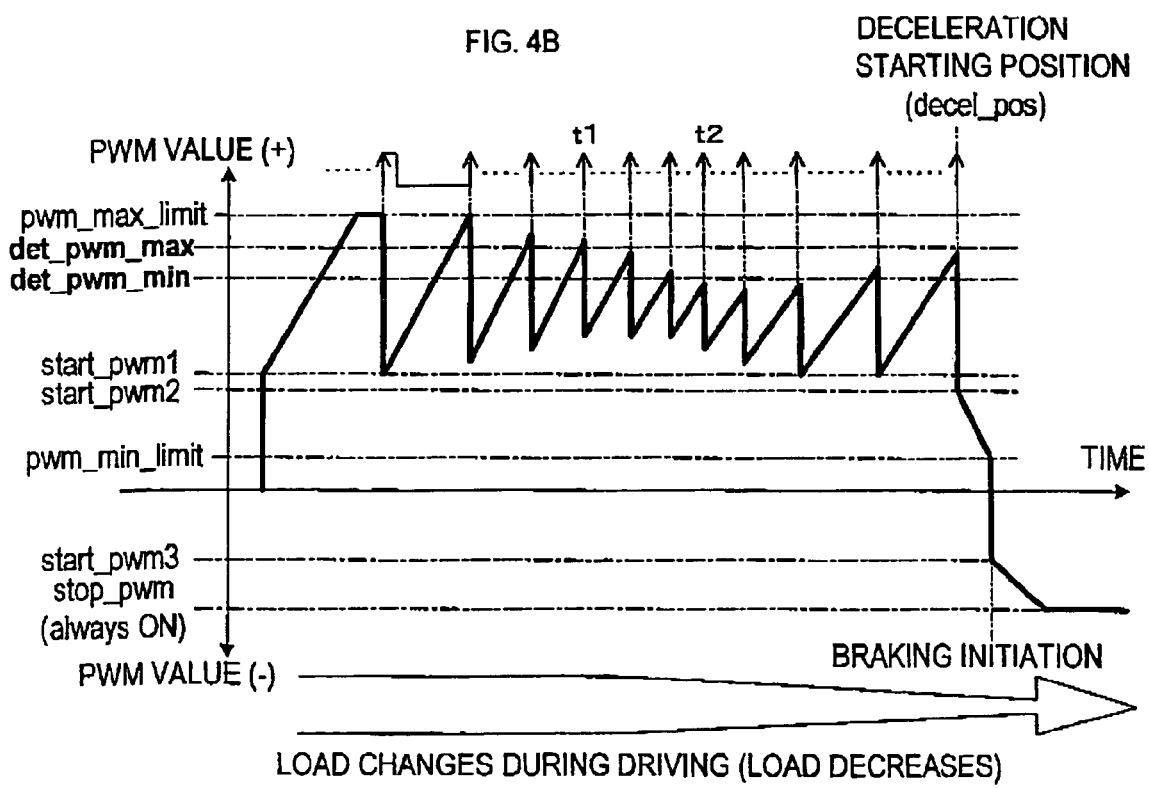

PWM RATE INITIAL STATUS

PWM RATE INCREASES (INCREMENTAL VALUE a_param INCREASES)

PWM RATE DECREASES (INCREMENTAL VALUE a_param DECREASES)

FIG. 30 ASIC PROCESS (FROM START-UP TO DECELERATION)

FIG. 34 ASIC PROCESS (FROM START-UP TO DECELERATION)

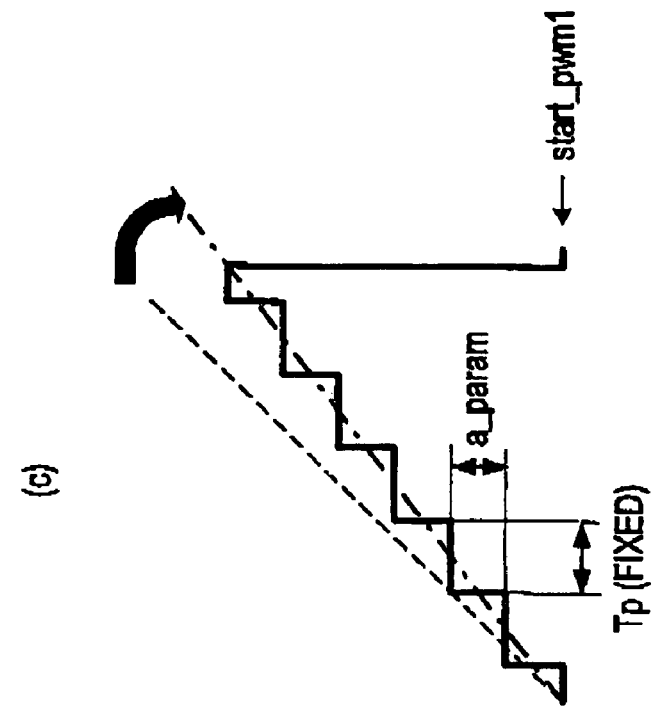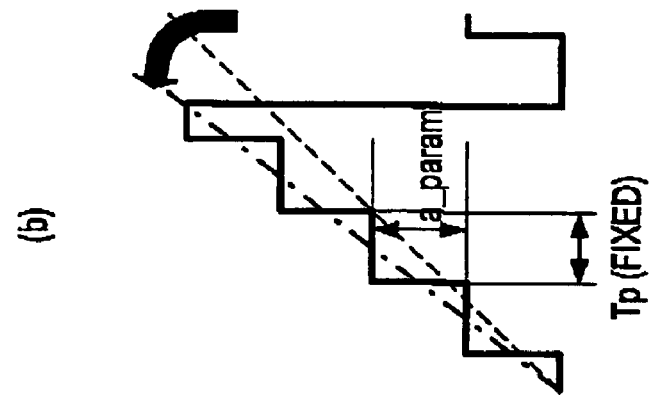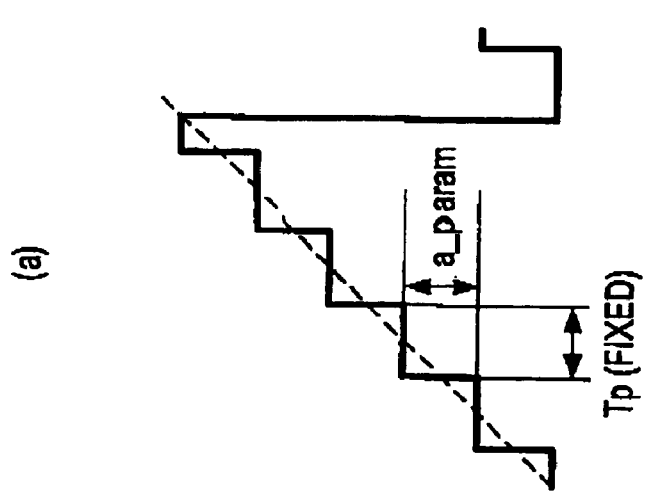

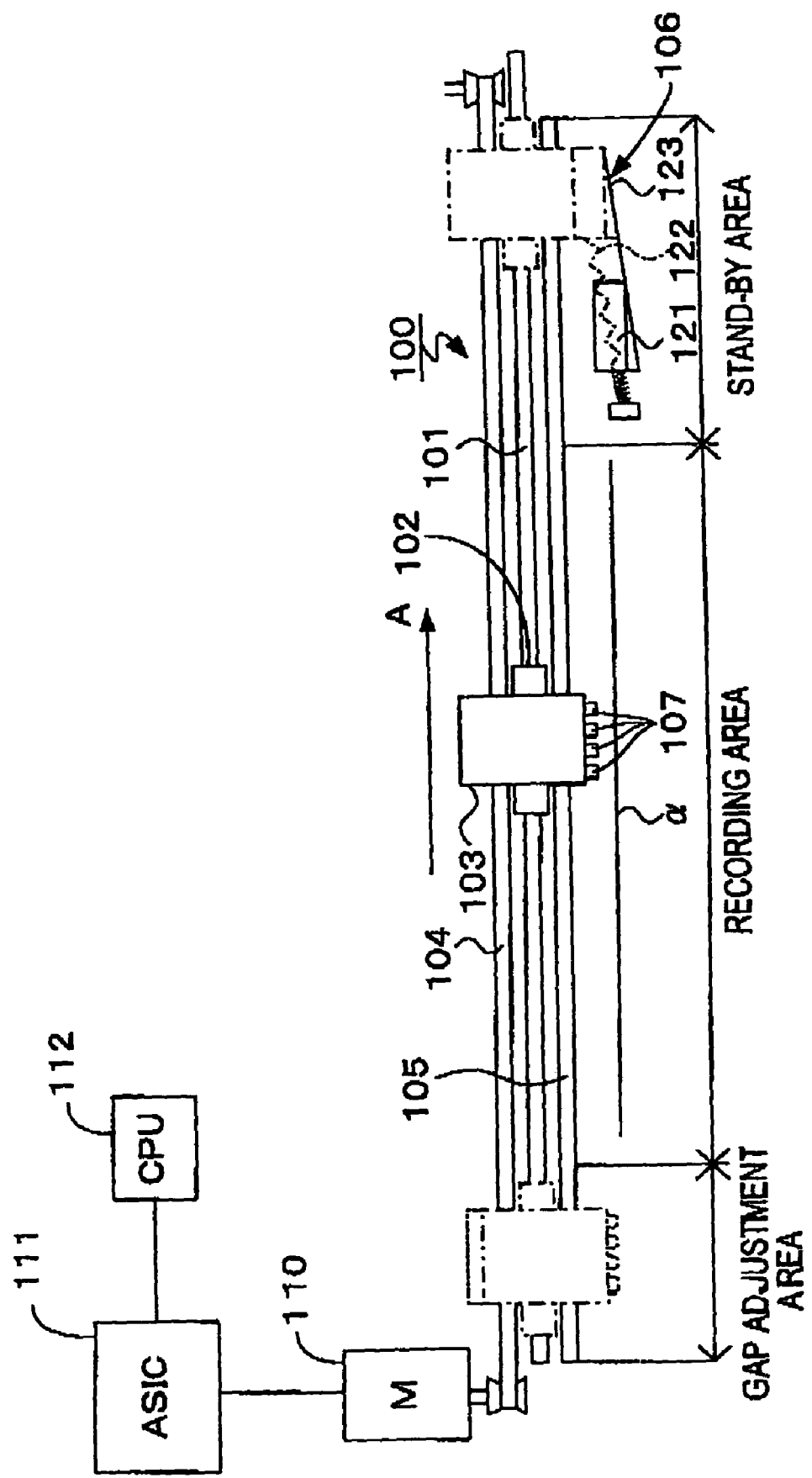

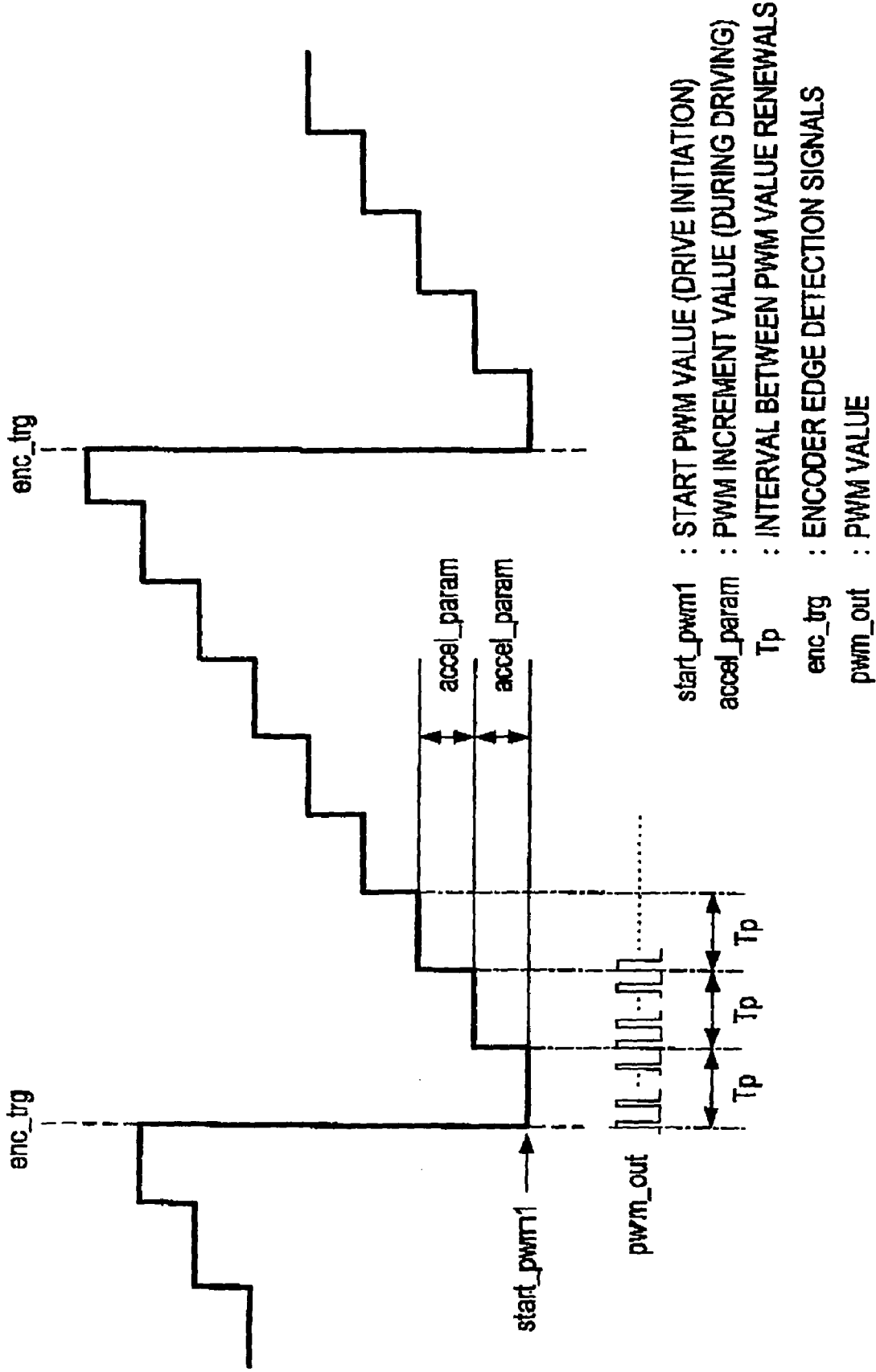

MOTOR CONTROL METHOD AND CONTROL DEVICE

(1) FIELD OF THE INVENTION

This invention relates to a control method of a motor and a control device, especially to motor control wherein driving force of a motor is increased from an initial value by a specified amount in a specified period while a driving target is driven for a specified amount.

(2) BACKGROUND ART

Conventionally, a closed loop control method, such as speed feed back control or position feed back control, is well known as one of control methods of DC and AC motors. Generally, the above mentioned closed loop control is conducted by using an encoder or the like, in order to detect rotational amount of a motor, or driving amount of the driving target. Based on information from the encoder, respective feed back controls mentioned above are conducted.

However, when these feed back controls with an encoder are applied to a case wherein a driving target is driven at minimal velocity (that is, in case a motor is rotated at minimal velocity), it is possible to cause stoppage of the driving target. If the velocity of the driving target is beyond a target value in the time of calculation, a feed back process, wherein a control device makes control output small so that motion of the driving target is decelerated, is conducted. But when the driving target is driven at minimal velocity, the motion of the driving target is controlled with very small amount of control, and the driving target completely stops in an area wherein the feed back control is conducted. Thus, once the driving target stops, a change is not caused in signals from the encoder, and there is no operation generated to increase the control output in order to accelerate the velocity. In other words, controllability cannot be maintained unless the target velocity is set to be faster than the specified velocity. Therefore, it is difficult to apply the feed back control to controlling a driving target at minimal velocity.

A case wherein a carriage in an inkjet printer loading a recording head is moved to an initial position and stopped at the time of recording initiation, or a case wherein the carriage is returned to a home position to cap the recording head (nozzles) after recording is over, these cases can be specific examples of driving a driving target at minimal velocity. Among these two cases, the following describes the case of capping after recording, based on FIG. 70.

FIG. 70 is an explanatory view showing a schematic structure of a recording mechanism of an inkjet printer.

As shown in FIG. 70, a recording mechanism 100 of the inkjet printer comprises a guide shaft 101; a carriage 102 capable of reciprocating along the guide shaft 101; a recording head 103 loaded on the carriage 102; a transfer belt 104 which transmits driving force from a motor 110 to the carriage 102; and an encoder 105 which detects transfer amount/position of the carriage 102.

The motor (DC motor) 110 is rotated by an ASIC 111 outputting driving signals according to various commands from a CPU 112, and drives the transfer belt 104 which is endless and disposed parallel to the guide shaft 101. This driving force is transmitted to the carriage 102, and the carriage 102 and the recording head 103 are reciprocated along the guide shaft 101. On the carriage 102, ink tanks of respective colors are loaded (not shown). Ink of respective colors reserved in the ink tanks is respectively jetted out to a recording paper a from nozzles 107 of the recording head 103.

The encoder 105 is a known linear encoder which outputs two types of pulse signals having different phases corresponding to movement of a transfer detection target (the carriage 102 in this case). Although the detail is not shown in the drawing, an encoder strip wherein plural slits are formed with specified intervals therebetween is disposed along the guide shaft 101. Two types of pulse signals generated corresponding to the movement of the carriage 102 are inputted to the ASIC 111, and these signals are used as position/velocity information for controlling the motor 110.

This recording mechanism 100 furthermore comprises a capping device 106 which is to inhibit the ink from getting dried by covering all the nozzles 107 of the recording head 103. This capping device 106 is disposed in an stand-by area which is outside of a recording area where recording (printing) on the recording paper a is conducted. The capping device 106 comprises a slope 123 which is formed so as to become upward toward the outside (the right side in the drawing); a cap 121 movable on the slope 123; and a spring 122 which pulls the cap 121 toward one side of the slope 123 declining downward.

The carriage 102 comprises a hook (not shown). When the carriage 102 moves in the stand-by area toward direction A shown with an arrow, firstly the hook is hooked on the cap 121. Subsequently when the carriage 102 furthermore moves toward the right end of the stand-by area, corresponding to this movement, the cap 121 is pulled to the right side along the slope 123, and the nozzles 107 are gradually covered by the cap 121. When the carriage 102 reaches the home position on the right end, the cap 121 completely covers the nozzles 107.

Capping, wherein the cap 121 covers the nozzles 107 as described above, is generally conducted when recording operation on the recording paper a is completed and the recording head 103 is going to be returned to the home position. If the nozzles 107 are not covered completely by the cap 121, the ink gets dried. In order to conduct a steady capping, the carriage 102 is stopped once when entering the stand-by area from the recording area after recording operation, and moved to the home position at minimal velocity.

Meanwhile, when recording operation is initiated, the carriage 102 is moved from the home position to a gap adjustment area so as to abut on the left end thereof, subsequently the carriage 102 is moved (returned) for predetermined distance toward the direction A and stopped. Thereby the carriage 102 is set on the initial position for recording initiation. When recording operation is initiated, in the gap adjustment area, the carriage 102 is moved at minimal velocity in order to control the force of the carriage 102 to abut on the left side of the gap adjustment area, and in order to set the carriage 102 on the initial position for recording initiation.

It is to be noted that the gap adjustment area is an area wherein a gap adjustment device (not shown) can be operated. By operating this gap adjustment device, a gap between the nozzles 107 of the recording head 103 and the recording paper α can be adjusted.

As described above, if the feed back control is applied to a case wherein a motor drives a driving target at minimal velocity, such as driving the carriage 102 at minimal velocity in the above-described inkjet printer, various problems can be caused.

Consequently, in order to drive a DC motor, for example, at minimal velocity, there is a known control method. In this method, every time an edge of pulse signals from an encoder (to be referred to as an encoder edge) is detected, driving force given to the DC motor is increased from an initial value by a specified amount in a specified period. Specifically, in this control method, distribution of electric current to the DC motor is controlled by PWM control, and a PWM duty value (to be referred to as PWM value) is increased from the initial value by the specified amount in the specified period at the time of every encoder edge detection (e.g. disclosed in Unexamined Japanese Publication No. 2003-79189 (FIG. 3)).

An example of controlling a DC motor by using this control method is going to be described based on FIGS. 71A and 71B. FIG. 71A shows an example of control from a step of decelerating a driving target driven by a DC motor while the driving target is driven at minimal velocity, to a step of stopping the target after initiating braking. When this motor control is initiated, a PWM value is set to a preset PWM value for driving initiation (start_pmw1), and increased by the specified amount in the specified period.

The way of this increase is shown in FIG. 72. Every time an encoder edge is detected, that is, every time encoder edge detection signals are outputted, a PWM value (pwm_out) is reset to start_pwm1, and increased by a specified incremental value (accel_param) in specified period Tp. To be more specific, the specified period Tp, in which a PWM value is renewed. i.e. PWM value renewal period Tp is shown as Tp=pwm_period‡(pwm reload_count+1). Pwm period indicates the period of PWM signals, and pwm_reload_count indicates timing for constant addition, which shows the number of PWM pulses outputted between reset of a PWM value and a next renewal.

Referring to FIG. 71A again, the PWM value is increased from start_pwm1 by the specified amount (accel_param) in the specified period Tp, as described above. In this example, the maximum value of the PWM value (pwm_limit) is set, and a PWM value does not go beyond the maximum. Hence, when a PWM value reaches pwm_limit, the PWM value is maintained to be pwm_limit. When an encoder edge is detected, the PWM value is reset to start_pwm1, and once again increased by the specified amount (accel_param) in the specified period Tp.

If a position of the driving target at the time of encoder edge detection is at a deceleration starting position (decel_pos), the PWM value is not set to start_pwm1, but to start_pwm2, which is a PWM value for deceleration initiation. Thereafter, in the same manner as shown in FIG. 72 (nevertheless, the PWM value is not increased, but decreased in the specified period), the PWM value is decreased. When a predetermined condition for braking initiation is met, braking is initiated.

When braking is initiated, the PWM value is set to start_pwm3, which is a PWM value for braking initiation. Subsequently, the PWM value is decreased by the specified amount in the specified period. When the PWM value reaches stop_pwm, which is a PWM output value during braking, the PWM value is maintained.

In this status, if the PWM value is a plus (+) value, such as during normal drive or deceleration, electric current distributed to the DC motor is switched on/off according to duty ratio corresponding to the PWM value. On the other hand, if the PWM value is a minus (−) value, a short circuit is formed, and blocking and conduction of the short circuit is conducted according to the duty ratio corresponding to the PWM value. That is, as the PWM value becomes smaller in the minus area, the ratio of conductivity in the DC motor short circuit becomes larger, and braking force increases. When the PWM value becomes stop_pwm, the short circuit becomes constantly shorted and the braking force becomes the maximum.

According to the above-described DC motor control method, when the driving velocity of the driving target increases, the intervals in encoder edge detection becomes short, and a PWM value is reset again to the initial value start_pwm1 while the driving force (PWM value) is not increased sufficiently. In other words, in this control method, when velocity increases, driving force of a motor consequently decreases. Hence, it is an open control, on the whole, nevertheless, stable control is achieved to certain extent.

Therefore, for the motor 110 of the recording mechanism 100 of the inkjet printer described in FIG. 70, when the carriage 102 is driven/controlled at minimal velocity for capping operation, this control method, wherein a PWM value is increased from an initial value by a specified amount in a specified period at every encoder edge detection as described above, is adopted.

SUMMARY OF THE INVENTION

However, with a control method as described in FIG. 71A wherein a PWM value is set to a specified initial value (start_pwm1) at the time of every encoder edge detection, stable operation (driving) may not be achieved when load on a DC motor fluctuates.

In other words, when the load on the DC motor become large, for example, as shown in FIG. 71B, time required for a driving target to reach a deceleration starting position may become longer. FIG. 71B shows a case wherein the load on the DC motor starts increasing at time t1. As shown therein, encoder edge detection interval becomes longer after time t1. That is, although the load is increasing, the PWM value is reset to the initial value (start_pwm1) at the time of every encoder edge detection. Thereby, time for generation of necessary torque becomes longer, and consequently the driving velocity of the driving target becomes slow.

When the load becomes furthermore larger, the driving target might start repeating motions of stop→drive, and these motions can cause vibration or noise.

An example of the above-described case wherein load on a DC motor changes (increases) is the capping operation in the recording mechanism 100 of the ink-jet printer described in FIG. 70. As described above, capping in the recording mechanism 100 is conducted by pulling the cap 121 toward the right side along the slope 128 when the carriage 102 is returning to the home position. That is, as the carriage 102 going back to the home position, the load on the DC motor increases because of the spring 122. Thereby, time between when recording is over and when capping operation is completed becomes longer, or vibration or noise is generated while capping is conducted. Furthermore, in some cases, the carriage 102 might stop before reaching the home position and capping might be incomplete.

Contrary to FIG. 71B, there are cases wherein the load on the DC motor becomes smaller. In this case, a PWM value does not increase excessively because the detection interval off encoder edges becomes shorter. Nevertheless, the DC motor is controlled always by the PWM value larger than start_pwm1 in spite of the small load, the driving target might not be able to be controlled at slower velocity than specified velocity. Moreover, if the load is too small, the driving target might pass the stop target position, and accuracy in stoppage might go down.

The present invention was made in view of above-described and other objects, and one of its purposes is to provide a motor control method and control device which can drive a driving target stably in spite of fluctuation of load on a motor, such as increasing or decreasing, in motor control wherein driving force of the motor is increased by a specified amount from predetermined initial driving force in a specified period every time the driving target is driven by the motor for a specified amount.

In motor control wherein driving force of a motor is set to initial driving force, and the driving force is gradually increased from the initial driving force every time a driving target is driven by the motor for a specified amount, according to the present invention, setting of next driving force is changed so that the driving target can be driven at target driving velocity corresponding to status of motor drive when the driving target is driven for the specified amount.

That is, as the driving force of the motor (driving force given to the motor in order to drive the driving target) is gradually increased from the initial driving force, obviously the driving force of the motor is increased from the initial driving force. Accordingly, every time when the driving target is driven for a specified amount, the driving force at the time is again set to the initial driving force, and this control is repeated.

In one aspect of the present invention, the setting of next driving force is changed corresponding to the status of motor drive when the driving target is driven for the specified amount. The status of motor drive here includes the driving force, driving time and driving velocity. For example, if the driving velocity of the driving target is slow because the load on the motor is large, time which is necessary to drive the driving target for the specified amount becomes long, and during driving, the driving force is increased by specified amount in the specified period. In other words, slower the driving velocity is, the larger the driving force of the motor becomes when the motor drives the driving target for the specified amount. On the other hand, if the driving velocity of the driving target is fast because the load on the motor is small, the time necessary to drive the driving target for the specified amount becomes short. That is, faster the driving velocity is, the smaller the driving force of the motor becomes when the motor drives the driving target.

Hence, the setting of the driving force is changed in a manner wherein the driving force is set to be larger when the driving force of the motor to drive the driving target for the specified amount is large (the velocity is slow, or the time necessary to drive the driving target for the specified amount is long) so that the driving target can be driven at the target driving velocity.

According to the motor control method of the present invention, every time when the driving target is driven for the specified amount, the setting of the driving force is changed corresponding to the status of motor drive at the time. Therefore, it is possible to drive the driving target stably even when fluctuation (increasing/decreasing) of the load on the motor is caused.

It is to be noted that "the motor" in the present invention can be, for example, a DC or AC motor. Various motors can be included except for motors driven by rectangular pulses in step-by-step manner, such as a step motor.

In another aspect of the present invention, the motor control device comprises: a drive detector which outputs drive detection signals indicating that the driving target is driven by the motor for a specified amount every time the driving target is driven by the motor for a specified period; a controller which outputs driving force control signals to increase the driving force of the motor by a specified amount from predetermined initial driving force in the specified period; and a motor driver which rotates and drive the motor based on the driving force control signals from the controller. Every time when drive detection signals are outputted from the drive detector, that is every time the driving target is driven for the specified amount, driving force changer changes the setting of next driving force corresponding to the status of motor drive at the time of the output so that the driving target is driven at the target driving velocity.

The driving force the drive force changer changes is preferably initial driving force, According to the motor control device of the present invention constituted as above, the driving target can be driven stably even when fluctuation, such as increasing or decreasing, of the load on the motor is caused.

The drive detector is not limited only to a detector which is constituted to output drive detection signals by direct detection in the driving target being driven for a specified amount. The drive detector can be a detector which is constituted to determine whether or not the driving target is driven for the specified amount based on, for example, rotational amount of the motor, or drive amount of an object directly or indirectly driven by rotation of the motor, and to output the drive detection signals. The drive detector can be constituted in anyhow as long as the drive detector can eventually output drive detection signals every time the driving target is driven for the specified amount.

Instead of increasing rate of the driving force by the same increment amount in the same period every time the driving target is driven for the specified amount (that is, the rate of change in the driving force is constant), it is also possible to change the rate of the driving force corresponding to the time required to drive the driving target for the specified amount.

Moreover, in the present invention, the initial driving force and the rate of change do not have to be fixed values. It is also possible to set profiles of one of the initial driving force or the rate of change corresponding to a position of the driving target based on fluctuation of the load predicted to be caused when the motor drives the driving target. For example, if the load on the motor is predicted to be increased gradually between time when driving of the driving target is initiated and when the driving is terminated (stopped), profiles wherein either of the initial driving force or the Tate of change is gradually increased every time the driving target is driven for a specified amount can be set so that the driving target is driven at the target driving velocity (e.g. always at constant velocity) even when the load on the motor increases. Every time the driving target is driven for the specified amount, the initial driving force or the rate of change in next driving for the specified amount is changed according to data already set as profiles corresponding to current position of the driving target (e.g. the initial driving force or the rate of change corresponding to that position).

BRIEF DESCRIPTION OF THE DRAWINGS

The invention will now be described below, by way of example, with reference to the accompanying drawings.

FIG. 3 is a time chart showing the relationships of pulse signals from an encoder with encoder edge detection signals, encoder edge count value, edge interval, and driving velocity;

FIG. 4A shows an example of motor control of the first embodiment, wherein load on the motor increases, and FIG. 4B shows an example of motor control, wherein the load on the motor decreases;

FIGS. 13A and 18B are explanatory views showing variations in the flowcharts of the normal driving process in the first embodiment;

FIG. 89 is a flowchart showing a normal drive process executed in an ASIC of further variation;

FIGS. 44A-44C are explanatory views explaining that a rate of change in a PWM value is increased/decreased by changing a PWM increment value;

FIG. 68 is an explanatory view showing a variation of a interrupt;

FIG. 70 is a schematic diagram of a recording mechanism of an inkjet printer;

FIG. 72 is an explanatory view showing that PWM value is increased when the PWM value is reset at a time of every encoder edge detection and in every constant period.

DETAILED DESCRIPTION OF THE PREFERRED EMBODIMENT

First Embodiment

Figure 1:
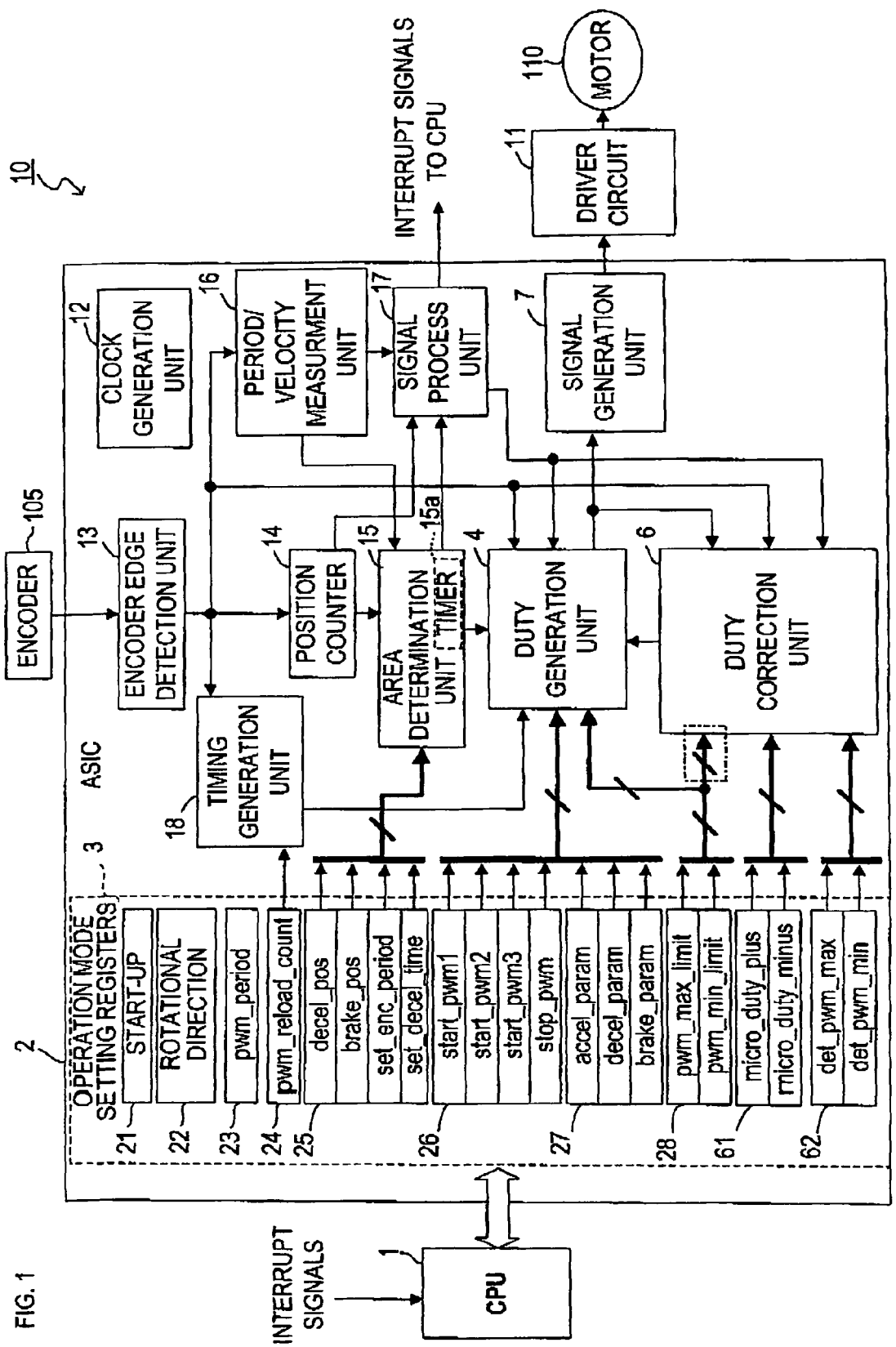
FIG. 1 is a block diagram showing a schematic structure of a motor control device of a first embodiment of the present invention.

A motor control device 10 in FIG. 1 is installed in an inkjet printer, for example, described in FIG. 70 in order to control a (DC) motor 110 which drives a carriage 102. Amongst all types of control on the motor 110, minimal velocity control, which is conducted when the carriage 102 moves to a right side and capping of the carriage 102 is conducted in a standby area after recording is completed, will be described in the present embodiment.

Figure 71A:
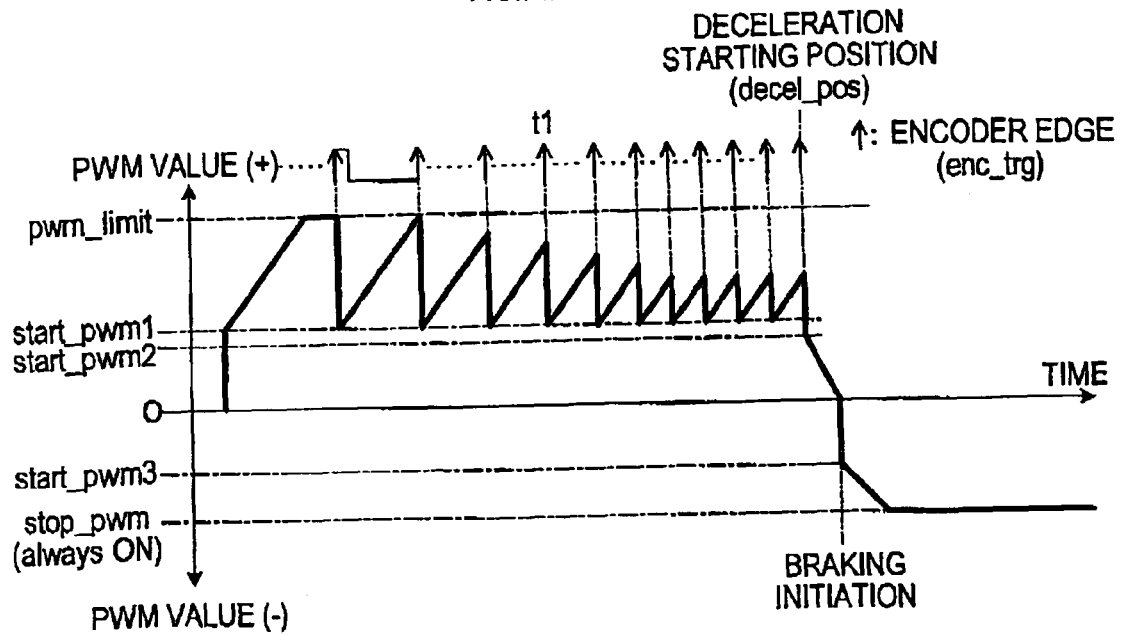
FIG. 71A shows an example of a conventional control method of DC motor wherein motor load is constant, and 71B shows an example of a conventional control methods of DOC motors, wherein motor load is increased.
Figure 71B:
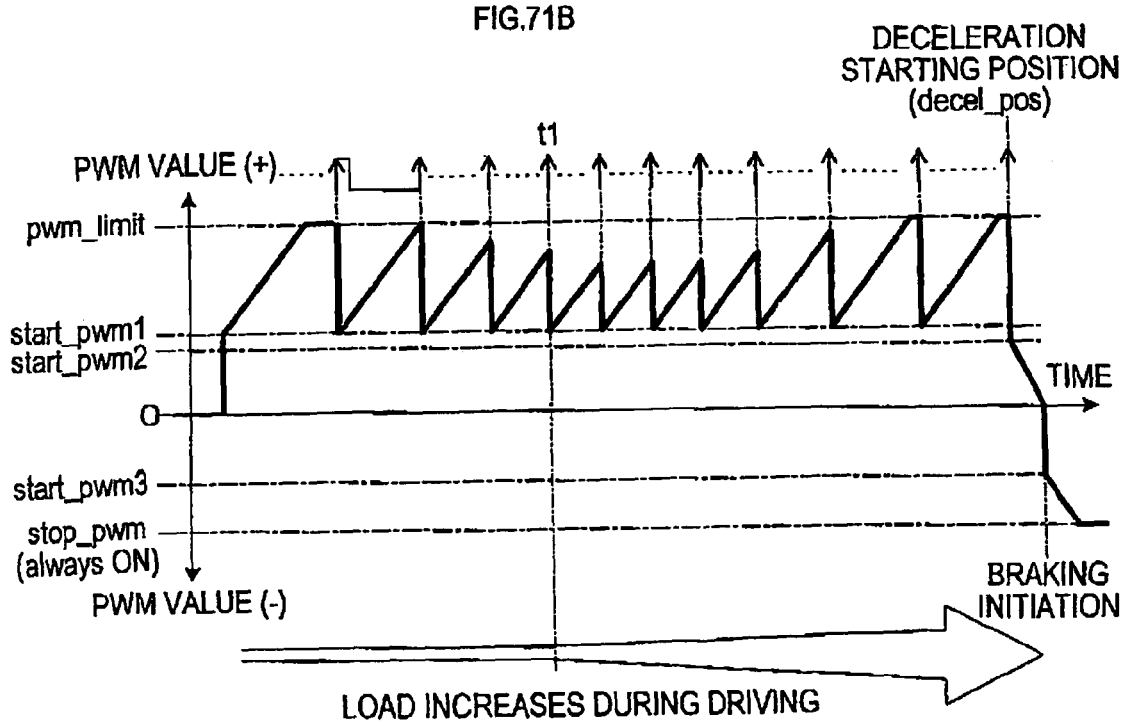

The minimal velocity control of the motor 110 conducted by the motor control device 10 of the present embodiment is basically the same as the control method described in FIGS. 71A and 71B. When driving is initiated, a PWM value is set to a predetermined start PWM value (start_pwm1) at a time of driving initiation, subsequently the PWM value is increased by a constant PWM increment value (accel_param) during driving in every constant period Tp. When an encoder edge is detected and encoder edge signals (enc_trg) are outputted, the PWM value is reset again to the predetermined initial value. Thereafter, the PWM value is increased by the constant value (accel_param) in every constant period Tp in the same manner. The distinct difference of the motor control device 10 of the present embodiment from a conventional skill is that the PWM value after reset at the time of encoder edge detection does not always become the constant value, i.e. start_pwm1, but the setting is changed depending on the PWM value at the time of edge detection. The following describes this changing a setting in detail.

As shown in FIG. 1, the motor control device 10 of the present embodiment comprises a CPU 1 which controls an entire inkjet printer, an ASIC 2 which generates PWM signals to control rotational velocity and direction of the motor 110, and a driver circuit 11 for driving the motor 110 based on PWM signals generated in the ASIC 2.

Figure 2:
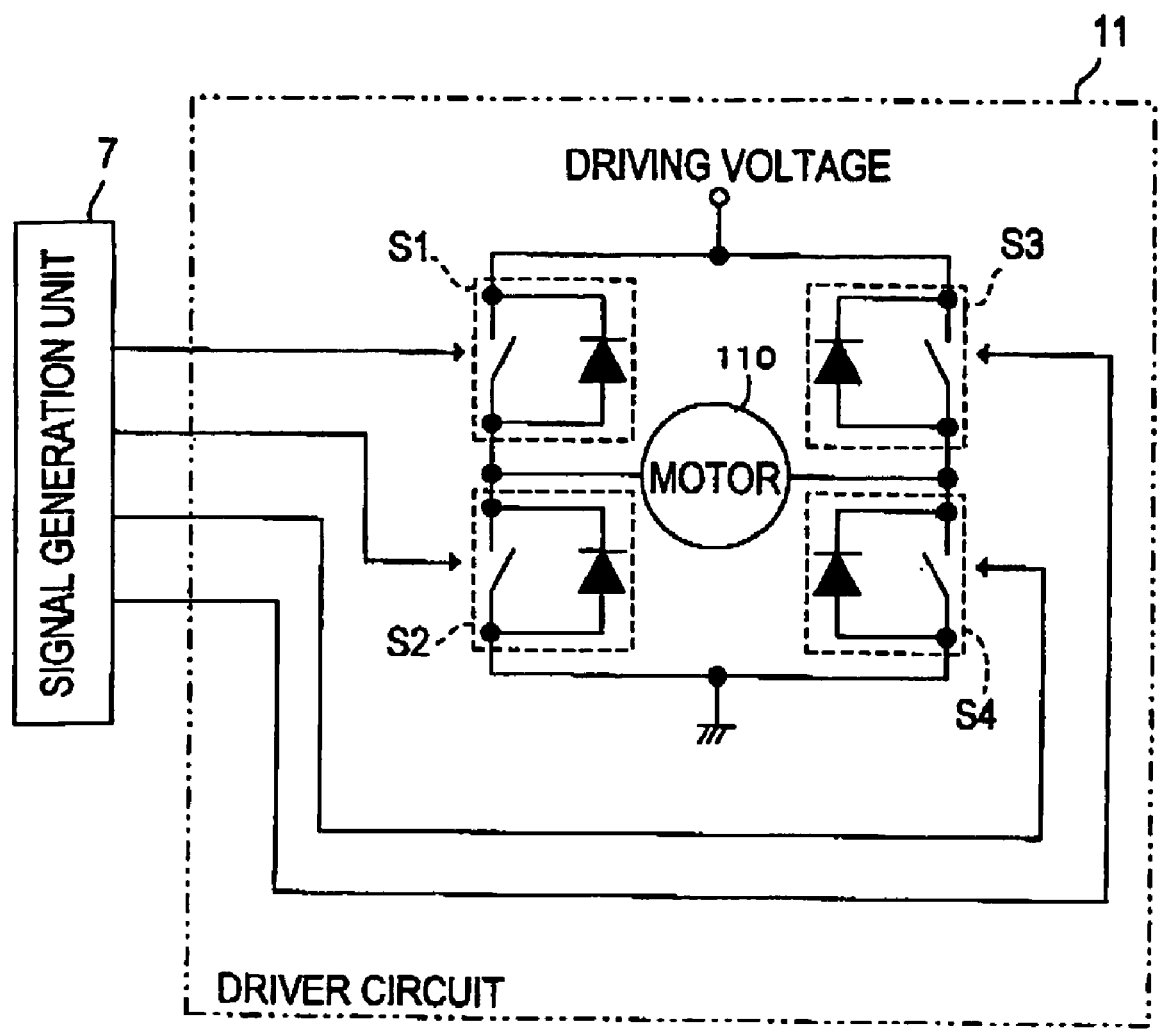
FIG. 2 is an explanatory view showing a schematic structure of a drive circuit shown in FIG. 1.

Detail of the driver circuit 11 is shown in FIG. 2. Four switching elements S1 to S4 constitute a H bridge circuit in the driver circuit 11. The motor 110 is driven by controlling (switching on/off) these switching elements S1 to S4 based on PWM signals generated in a signal generation unit 7 in the ASIC 2. For the switching elements S1 to S4, semiconductor switching elements, such as FET, are used.

Inside the ASIC 2, a group of operation mode setting registers 3 are provided. These operation mode setting registers 3 comprise the following registers: a start-up setting register 21 for starting up the motor 110; a rotational direction setting register 22 for setting a rotational direction of the motor 110; a PWM frequency setting register 23 for setting a frequency of PWM signals (pwm_period) to conduct PWM control on the motor 110; a timing setting register 24 to set timing for above-described constant addition, which is necessary to determine the period: Tp to increase a PWM value; position setting registers 25 for setting various data, which are necessary to set a deceleration starting position and a braking starting position; PWM value setting registers 26 for setting various PWM values when the motor 110 is driven; increment/decrement value setting registers 27 for setting various PWM values to increase or decrease in every period Tp; PWM limiter setting registers 28 for setting various data to limit PWM values; PWM correction value setting registers 61 wherein data are set to correct a PWM initial value when an encoder edge is detected and a PWM value is reset to the initial value; and PWM threshold setting registers 62 for setting respective thresholds used level determination of PWM value at the time of edge detection.

In the position setting registers 25, a deceleration starting position (decel_pos), and three setting values used to determine the braking starting position: a braking starting position (brake_pos), an encoder period for starting braking (set_enc_period), and a maximum deceleration time (set_decel_time), are respectively set. In the present embodiment, braking is initiated when one of three conditions below is met: it is determined that the carriage 102 has reached the braking starting position based on position/period information obtained from the encoder 105; the length of the period between encoder edges has become equal to or longer than the length of the encoder period for starting braking (set_enc_period); or elapse time after deceleration initiation has become equal to or longer than the maximum deceleration time (set_decel_time). These conditions will be described later.

In the PWM value setting registers 26, a start PWM value (start_pwm1) at the time of driving initiation, a start PWM value (start_pwm2) at the time of deceleration initiation, a start PWM value (start_pwm3) at the time of braking initiation, and a PWM value (stop_pwm) during braking are set. In the increment/decrement value setting registers 27, a PWM increment value (accel_param) during driving, a PWM decrement value (decel_param) during deceleration, and a PWM increment value (brake_param) during braking are set. In the PWM limiter setting registers 28, a maximum PWM output value (pwm_max_limit) indicating the upper limit of a PWM value, and a minimum PWM output value (pwm_min_limit) indicating the lower limit of a PWM value are set.

In the PWM correction value setting registers 61, an initial PWM correction value (+) (micro_duty_plus) indicating how much a PWM initial value after reset should be increased from a PWM initial value at the time of previous reset, and an initial PWM correction value (−) (micro_duty_minus) indicating how much a PWM initial value should be decreased are set therein.

In PWM threshold setting registers 62, a high PWM duty detection threshold (det_pwm_max) which is a criterion to determine whether or not a PWM initial value after reset should be increased from the PWM initial value at the time of previous reset, and a low PWM duty detection threshold (det_pwm_min) which is a criterion to determine whether or not a PWM initial value should be decreased are set.

An encoder edge detection unit 13 takes in pulse signals from the encoder 105, and detects an edge of the pulse signals (for example, either of a leading edge or a trailing edge, or both of leading and trailing edges) to output encoder edge detection signals (enc_trg). By counting the detected edges, a position counter 14 detects the position of the carriage 102 as an edge number count value (enc_count), which is a count value of the position counter 14.

A period/velocity measurement unit 16 calculates the edge interval (enc_period), which is the period between previous generation of encoder edge detection signals and current signal generation, and the driving velocity of the carriage 102 (enc_velocity) based on the above-mentioned count number (enc_count) from the encoder edge detection unit 18, and then outputs the information.

Meanwhile, the relationships of pulse signals from the encoder 105 with encoder edge detection signals, an encoder edge count value, the edge period, and the driving velocity will be described based on FIG. 3. As shown in the drawing, the encoder 105 is constituted to output two types of pulse signals with different phases. When an edge of one of the two types of pulse signals (Phase A) rises, encoder edge detection signals (enc_trg) are outputted from the encoder edge detection unit 13.

Subsequently based on the encoder edge detection signals, an encoder edge count value (enc_count) is counted in the position counter 14. In the period/velocity measurement unit 16, the edge interval (enc_period) is obtained, as shown in the drawing, based on the encoder edge detection signals. Based on the obtained period and intervals of slits (not shown) of the Encoder Phase A, the driving velocity (enc_velocity) is obtained.

A timing generation unit 18 generates timing information to increase a PWM value in the above-mentioned period Tp based on the constant addition timing (pwm_reload_count) from the timing setting register 24 and encoder edge detection signals (enc_trg) from the encoder edge detection unit 13, and outputs the information to a duty generation unit 4.

An area determination unit 15 determines whether or not the carriage 102 is in an area to be driven normally, in an area to be decelerated, or in an area to brake the carriage 102, based on the above-mentioned count number (enc_count) from the position counter 14, period/velocity signals from the period/velocity measurement unit 16, and respective setting values set in the position setting registers 25. A timer 15a is provided in the area determination unit 15 to measure deceleration time. The timer 15a is started when deceleration is initiated. If braking has not yet been caused when the measured deceleration time reaches the maximum deceleration time (set_decel_time), braking is initiated.

A duty correction unit 6 corrects a PWM initial value which is obtained after resetting a PWM value caused by encoder edge detection. In the present embodiment, a PWM initial value is basically set to be the same value as a PWM initial value at the time of a previous reset. However, when a PWM value at the time of encoder edge detection is larger than the high PWM duty detection threshold (det_pwm_max), the PWM initial value is increased by the initial PWM correction value (+). Contrary, when a PWM value at the time of encoder detection is smaller than the low PWM duty detection threshold (det_pwm_min), the PWM initial value is decreased by the initial PWM correction value (−). Based on the value for increase or decrease, a PWM initial value outputted from the duty generation unit 4 at the time of previous encoder edge detection is corrected (increased, decreased, or maintained). Subsequently, the corrected PWM initial value is outputted to the duty generation unit 4 as a new PWM initial value.

The duty generation unit 4 outputs data indicating a PWM value of PWM signals which is necessary to drive the motor 110. The duty generation unit 4 generates respective PWM values, at the time of normal driving, deceleration, braking, and stoppage, based on: respective setting values in the PWM value setting registers 26, the increment/decrement value setting registers 27, and the PWM limiter setting registers 28; timing information from the timing generation unit 18; encoder edge detection signals (enc_trg) from the encoder edge detection unit 18; and area information from the area determination unit 15. Furthermore, in the present embodiment, a PWM initial value which is reset at the time of encoder detection is obtained from the duty correction unit 6, and a PWM value obtained from the duty correction unit 6 at the time of every edge detection is outputted as a PWM initial value.

A signal generation unit 7 generates PWM signals corresponding to a PWM value from the duty generation unit 4 and the rotational direction set in the rotational direction setting register 22, and outputs the signals to the driver circuit 11. Thereby the driver circuit 11 drives the motor 110. The motor 110 is driven with desired driving force corresponding to a preset PWM value. A signal process unit 17 conducts error handling and outputs interrupt signals to the CPU 1. The interrupt signals will be described later.

A clock generation unit 12 generates clock signals having adequately shorter period than the period of pulse signals from the encoder 105, and supplies the clock signals to respective units in the ASIC 2.

Controlling the motor 110 in the motor control device 10 of the present embodiment constituted as above will be described below based on FIGS. 4A and 4B. FIG. 4A shows an example of motor control of the present embodiment, wherein load on the motor 110 increases. FIG. 4B shows an example of motor control, wherein the load on the motor 110 decreases.

As shown in FIG. 4A, start_pwm1 is set as a PWM initial value at the time of drive initiation. The PWM value is increased by accel_param in a constant period Tp as shown in FIG. 72. If the PWM value reaches pwm_max_limit before an encoder edge is detected, the PWM value is maintained to be pwm_max_limit until an encoder edge is detected. The PWM value is usually reset when an encoder edge is detected, however in the present embodiment, when an ender edge is detected for the first time since drive initiation, the PWM value is reset to be start_pwm1, and from second edge detection, the PWM initial value is set based on the PWM value when an edge is detected after a reset.

Specifically, when an encoder edge is detected for the second time since drive initiation in FIG. 4A, the PWM value is already over det_pwm_max. Thus, the PWM initial value after reset is a value in which micro_duty_plus is added to start_pwm1. Thereafter, in the same manner, if a PWM value at the time of an encoder edge detection is over det_pwm_max, a new PWM initial value is set by adding micro_duty_plus to the PWM initial value which is reset when the previous encoder edge is detected.

On the other hand, even when load on the motor 110 become large, driving velocity slows down, and consequently the PWM value at the time of encoder edge detection becomes smaller than det_pwm_max (at time t1), if the PWM value is over det_pwm_min, the previous PWM initial value is set, without a change, for the next PWM initial value. Therefore, driving velocity does not drop suddenly, and desired driving velocity can be maintained.

When the carriage 102 reaches the deceleration starting position (decel_pos), the PWM initial value is set to be start_pwm2, and subsequently decreased by the PWM decrement value of during deceleration in every constant period Tp (decel_param). Then, when one of the three braking initiation conditions described earlier is met, the PWM value is set to be start_pwm3 and braking is initiated. The PWM value is increased by the PWM increment value of during braking (toward the minus direction) in every constant period Tp (brake_param).

To be specific, the operation of the driver circuit 11 when a PWM value is in the minus region is conducted by switching on/off simultaneously the switching elements S2 and S4 which are connected to ground amongst the four switching elements S1 to S4 (FIG. 2) constituting the H bridge circuit. That is, when the both switching elements S2 and S4 are on at the same time, braking becomes effective. Braking force can be controlled according to the on-duty ratio. Obviously, switching operation when a PWM value is in the minus region is conducted not only by the switching elements 52 and S4, but desired control operation can be conducted by switching on/off the switching elements S1 and S3.

Accordingly, after braking is initiated, the on ratios of both switching elements S2 and S4 gradually rise. When a PWM value reaches stop_pwm, the switching elements S2 and S4 enter an always-on status. That is, the motor 110 becomes constantly shorted via both of the switching elements S2 and S4, and a drive target (herein the carriage 102) stops.

Referring now to FIG. 4B, motor control when the load on the motor 110 decreases is going to be described. Motor control is conducted exactly in the same manner as the motor control described in FIG. 4A up to the stage immediately before encoder edge detection at time t1, therefore, detailed description is not repeated here.

When the load is gradually decreased at around time t1, driving velocity becomes faster, and consequently the PWM value at the time of encoder edge detection becomes smaller. By the time of encoder edge detection at time t1, the PWM value has become smaller than det_pwm_min. In this case, in the present embodiment, the PWM initial value after reset is set to be a new PWM initial value by subtracting the initial PWM correction value (−) (micro_duty_minus) from the PWM initial value set at the time of encoder edge detection prior to t1. To prevent over-speed, which could be caused by too small load, driving velocity is controlled by decreasing the PWM initial value.

While the PWM value at the time of edge detection is smaller than det_pwm_min, the same process is executed and the PWM initial value is decreased by micro_duty_minus at the time of every edge detection. Driving velocity is controlled as above, the PWM value at the time of edge detection is going to be raised again.

Figure 5:
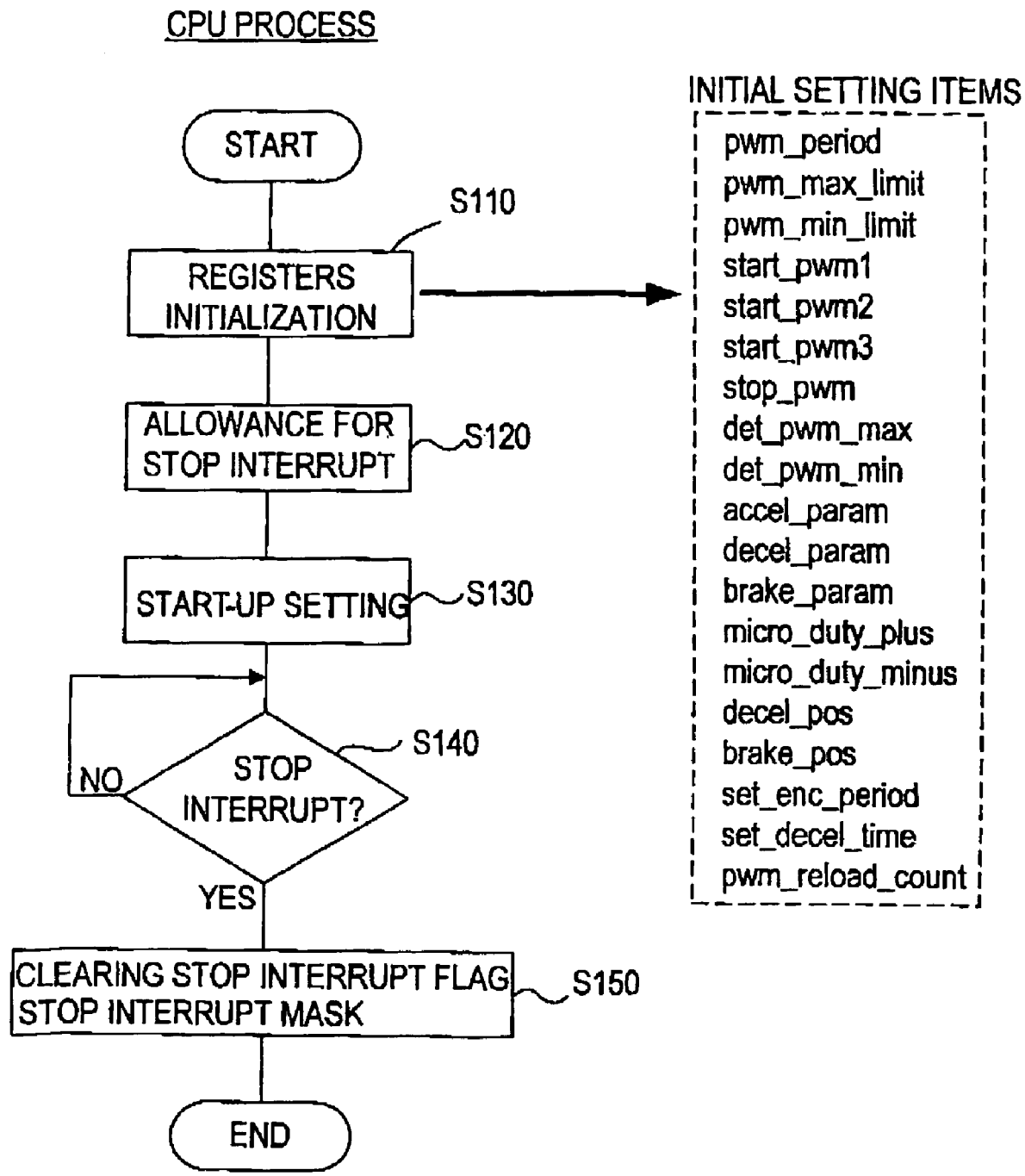
FIG. 5 is a flowchart showing ASIC setting process of the first embodiment

The following describes a process executed by the CPU 1 and the ASIC 2 in the motor control device 10 of the present embodiment based on FIGS. 5 to 9. FIG. 5 is a flowchart showing an ASIC setting process executed by the CPU 1. When recording operation is completed in an inkjet printer, and the carriage 102 once stops in a standby area, this process (FIGS. 5 to 9) is executed in order to return the carriage 102 to a home position.

When this ASIC setting process is initiated, firstly in step (to be abbreviated as "S" hereinafter) 110, respective registers in the operation mode setting registers 3 are set. Specific setting items are listed in FIG. 5. Subsequently in S120, allowance signals for stop interrupt are outputted to the ASIC 2. Correspondingly, the ASIC 2 becomes capable of outputting interrupt signals for stoppage while in an interrupt signals generation process in FIG. 9, which is to be described later.

By setting the star-up setting register 21 in S130, driving of the motor 110 and furthermore driving of the carriage 102 are initiated. Subsequent driving of the motor 110 is conducted by the ASIC 2. Thus, the CPU 1 stands by for interrupt signals for stoppage in S140. When interrupt signals for stoppage are outputted (S140:YES) by the process of S790 in FIG. 9, which is to be described later, the process proceeds to S150 to clear a stop interrupt flag and to conduct an interrupt mask process so that interrupt signals do not come into the CPU 1 thereafter.

Figure 6:
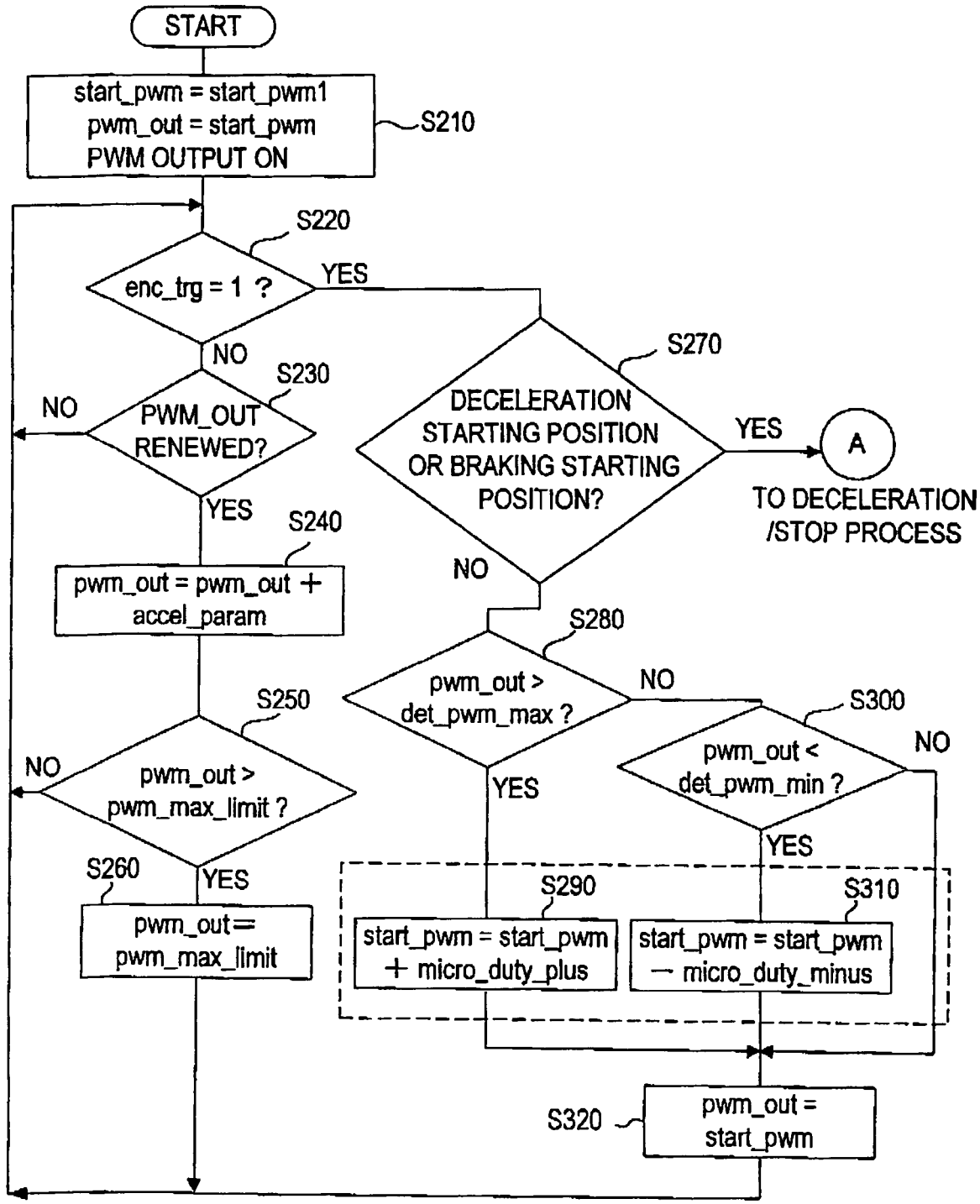
FIG. 6 is a flowchart showing a normal driving process, from a step of motor start-up to a step of deceleration initiation, in the first embodiment.

Next, control of the motor 110 executed by the ASIC 2 is going to be described. This motor control by the ASIC 2 is actually conducted as a part of hardware operations. To make it more comprehensive, this hardware operation is described in the form of a flowchart. FIG. 6 shows a normal driving process from a step of staring up the motor 110 up to a step of initiation of deceleration. When the start-up setting register 21 is set by the CPU 1, firstly in S210, the variable start_pwm indicating a PWM initial value is set to start_pwm1, and the same start_pwm (i.e. start_pwm1) is set as a PWM value (pwm_out) which is actually outputted from the duty generation unit 4. Then, output of the PWM value is initiated.

In subsequent S220, it is determined whether or not enc_trg is 1, that is whether or not an encoder edge is detected. If an encoder edge is not yet detected (S220:NO), and until an encoder edge is detected, the process proceeds to S230 wherein it is determined whether or not renewal timing to renew pwm_out has come. That is, it is determined, in S230, whether or not timing to renew the PWM value in the constant period Tp, based on timing information from the timing generation unit 18. If Tp has not yet passed (S230:NO) since a previous renewal (that is, the PWM value (pwm_out) is increased only by accel_param), the process goes back to S220. To the contrary, if Tp has passed and a renewal timing of the PWM value comes, the process proceeds to S240.

In S240, a new pwm_out is set by adding accel_param to the present pwm_out. In S200, it is determined whether or not the new pwm_out is larger than pwm_max_limit. If the new pwm_out is equal to or smaller than pwm_max_limit (S250: NO), the process goes back to S220. If the new pwm_out is larger than pwm_max_limit (S250:YES), the process proceeds to S260 to set pwm_max_limit as the present pwm_out. In other words, pwm_out is limited to pwm_max_limit at maximum.

When an encoder edge is detected (S220:YES), the process proceeds to S270 to determined whether or not the carriage 102 has reached the deceleration starting position (decel_pos) or the braking starting position (brake_pos).

Figure 8:
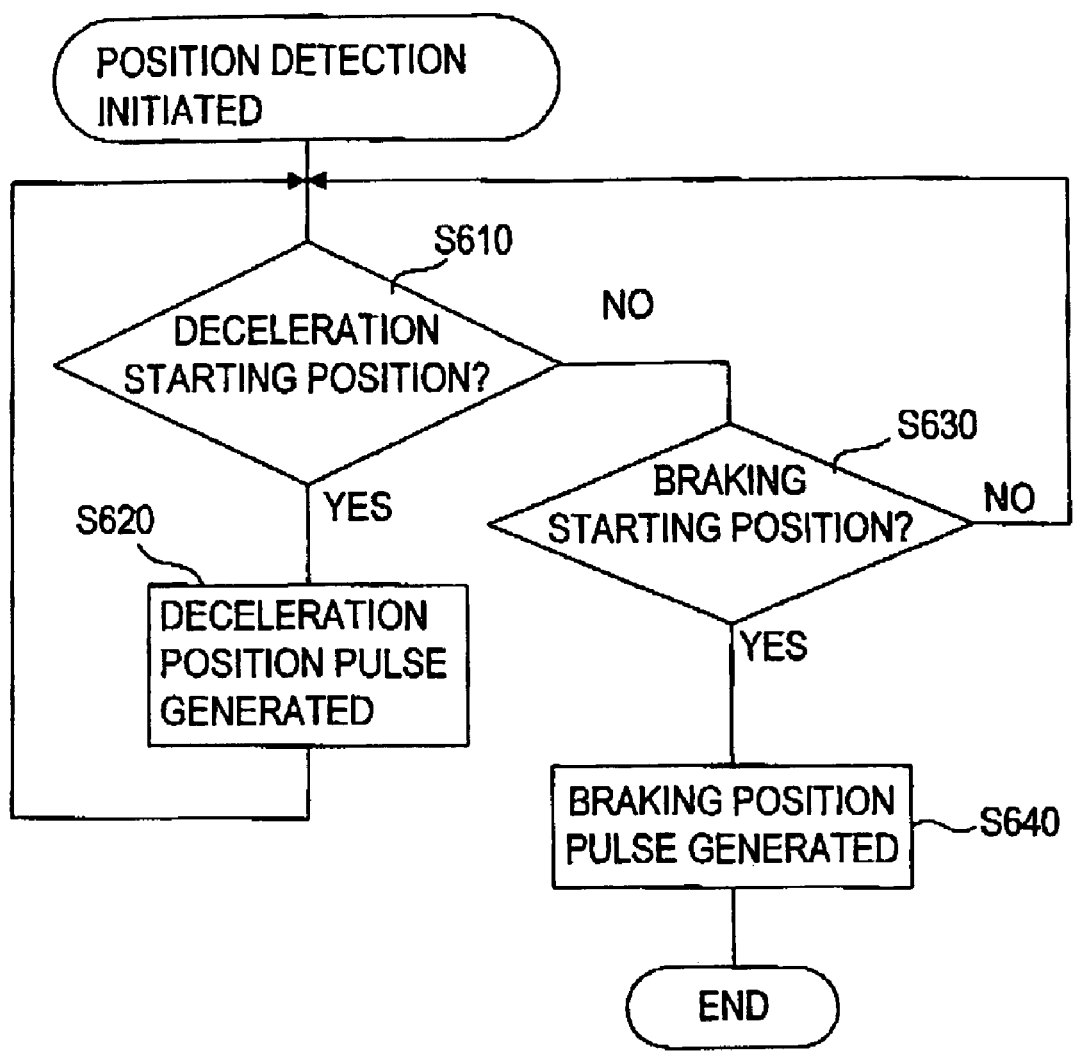
FIG. 8 is a flowchart showing a position detection pulse generation process of the first embodiment.

This determination in S270 is made, specifically based on the presence/absence of a position pulse from an area determination unit 15. FIG. 8 is a flowchart showing a position detection pulse generation process executed in the area determination unit 15. When this process is initiated by an input of a count value from the position counter 14, in S610, it is determined whether or not the carriage 102 has reached the deceleration starting position (decel_pos) based on the count value. If the carriage 102 has not reached the deceleration starting position (S610:NO), the process goes to S630 to determine whether or not the carriage 102 has reached the braking starting position (brake_pos).

The carriage 102, being determined to be at the braking starting position although not being determined to have reached the deceleration starting position means that the motor 110 is controlled in a manner so that the control of the motor 110 is shifted from the normal driving status to a braking directly without having a deceleration period. Hence, in case a deceleration period is included such as in the present embodiment, a determination in S630 becomes always negative (S630:NO). When the carriage 102 reaches the deceleration starting position (S610:YES), the process proceeds to S620 for generating a deceleration position pulse.

Figure 7:
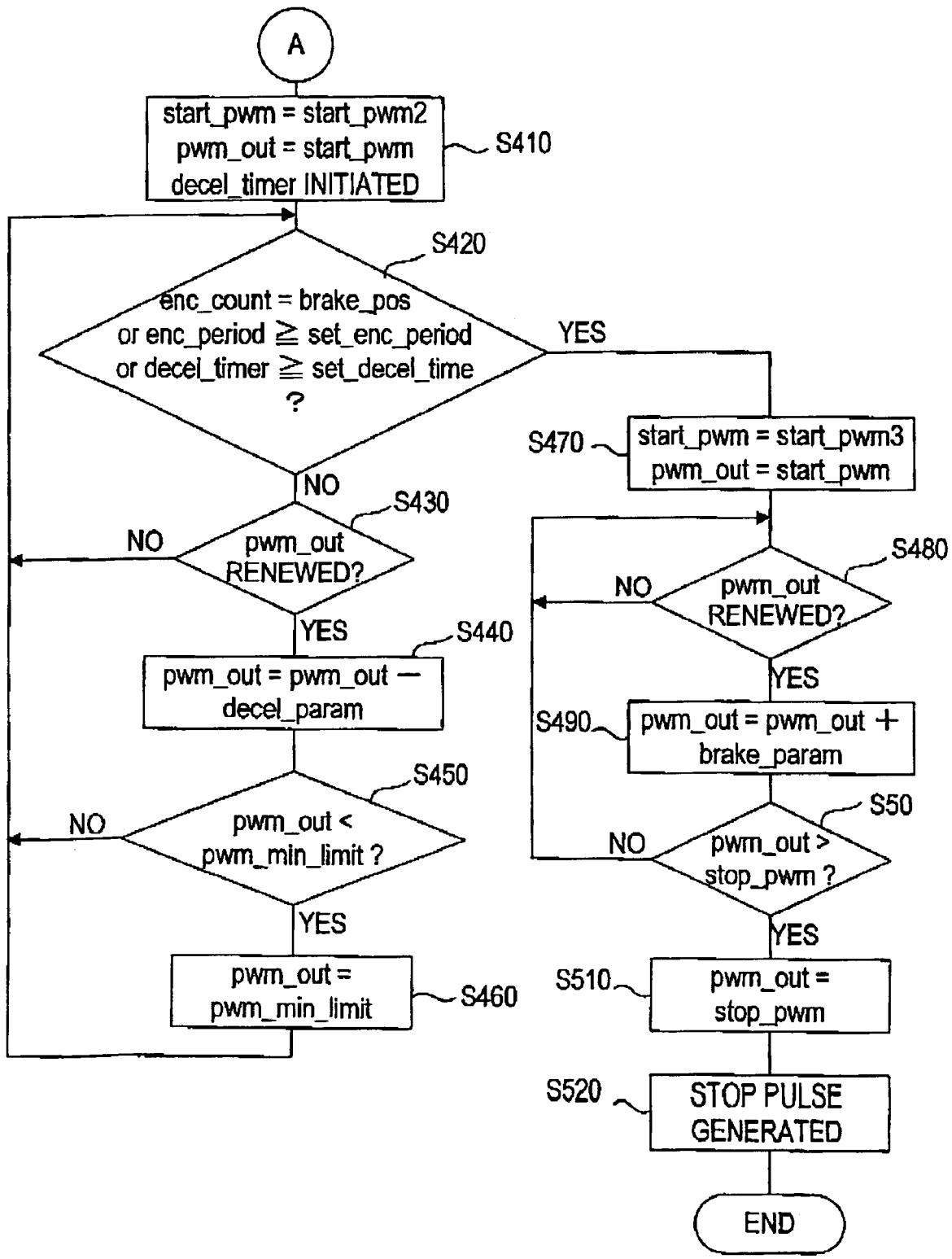
FIG. 7 is a flowchart showing a deceleration/stop process of the first embodiment.

In S270, if the carriage 102 has reached the deceleration position (decel_pos) (S270:YES), the process proceeds to the deceleration/stop process in FIG. 7. On the other hand, while the carriage 102 has not reached the deceleration position (decel_pos) (S270:NO), the process proceeds to S280, and it is determined whether or not the current PWM value (pwm_out) is larger than det_pwm_max. If the PWM value (pwm_out) is larger than det_pwm_max (S280:YES), the process proceeds to S290 to reset the PWM initial value. Specifically, a new PWM initial value (start_pwm) is set by adding micro_duty_plus to the current PWM initial value (start_pwm), that is, to the PWM initial value after reset at the time of previous edge detection.

To the contrary, if the PWM value (pwm_out) at the time of encoder edge detection is equal to or smaller than det_pwm_max (S290:NO), the process proceeds to S300, and it is determined whether or not pwm_out is smaller than det_pwm_min. If pwm_out is smaller than det_pwm_min (S300: YES), the process proceeds to S310 to reset the PWM initial value. In this reset, a new PWM initial value (start_pwm) is set by subtracting micro_duty_minus from the current PWM initial value (start_pwm). If a negative determination is made in S300 (S300:NO), that is, the current PWM initial value (start_pwm) is equal to or larger than det_pwm_min, and equal to or smaller than det_pwm_max, the process proceeds directly to S320.

In S320, pwm_out is set to the current PWM initial value (start_pwm), (that is, corrected PWM initial value in either in S290 or S310, or the same value as start_pwm at the time of previous edge detection).

The deceleration/stop process will be described below based on FIG. 7. FIG. 7 is a flowchart showing this deceleration/stop process. The deceleration/stop process is executed in case the carriage 102 has reached the deceleration starting position and a positive determination is made in S270. When a positive determination is made in S270 in FIG. 6, and the deceleration/stop process is initiated, firstly in S410, start_pwm is set to start_pwm2, which is a PWM value when deceleration is initiated, and a PWM initial value after this setting is set as pwm_out. Simultaneously, the timer 15a (decel_timer) is started.

In S420, it is determined whether any one of the three conditions described above is met: enc_count is equal to brake_pos (i.e. the carriage has reached the braking starting position), enc_period is equal to or larger than set_enc_period (i.e. the period between encoder edges is longer than the braking initiation encoder period), or the count value of the timer 11a is larger than the maximum deceleration time (set_decel_time). If any one of the conditions is met (S420: YES), the process proceeds to S470, and braking is initiated. Specifically, start_pwm is set to start_pwm3, which is the PWM value when braking is initiated, and the PWM initial value after this setting is set to be a new pwm_out.

If none of the conditions is met (S420:NO), the process proceeds to S430, and it is determined, same as in S230 in FIG. 6, whether or not it is renewal timing for pwm_out. If it is determined to be renewal timing (S430:YES), the process proceeds to S440, and a new pwm_out is set by subtracting decel_param from the current pwm_out. That is, the PWM value is decreased. Subsequently, in S450, it is determined whether or not the new pwm_out is smaller than pwm_min_limit. If the new pwm_out is not smaller than pwm_min_limit (S450:NO), the process goes back to S420. If the new pwm_out is smaller than pwm_min_limit (S450:YES), the process proceeds to S460, and the new pwm_out is set to pwm_min_limit.

When the process of S470 is completed, in subsequent S480, it is determined, same as in S430, whether or not it is renewal timing for pwm_out. If it is determined to be renewal timing (S480:YES), the process proceeds to S490 and a new pwm_out is set by adding brake_param to the current pwm_out. In S500, it is determined whether or not the new pwm_out is larger than stop_pwm. If the new pwm_out is not larger than stop_pwm (S500:NO), the process goes back to S480. If the new pwm_out is larger than stop_pwm (S500: YES), the process proceeds to S510 and the new pwm_out is set as stop_pwm. In S520, a stop pulse is generated. Thereby, the motor 110 stops completely.

An interrupt signal generation process executed by the signals process unit 17 in the ASIC 2 is going to be described below based on FIG. 9. When this process is initiated, firstly in S710, it is determined whether or not position pulse is generated. This is to determine whether or not pulses are respectively generated corresponding to S620, S640 (FIG. 8), and S520 (FIG. 7). If any of the position pulses is generated, the process proceeds to S720 to determine the type of the position pulse.

If it is a deceleration position pulse, the process proceeds to S730, and a deceleration position interrupt flag is set. Subsequently, in S740, it is determined whether or not allowance for deceleration position interrupt is obtained from the CPU 1. Since allowance for deceleration position interrupt is not obtained in the present embodiment, the process goes back to S710. If the pulse is determined to be a braking position pulse, a braking position interrupt flag is set in S750, and then it is determined whether or not allowance for braking position interrupt is obtained from the CPU 1 in S760. Also in this case, allowance is not obtained in the present embodiment, the process goes back to S710.

If the position pulse is determined to be a stop position pulse, a stop interrupt flag is set in S770, and it is determined whether or not allowance for stop interrupt is obtained from the CPU 1 in S780. By the ASIC setting process described in FIG. 5, allowance for stop interrupt is obtained. Thus, the process proceeds to S790, and interrupt signals are outputted to the CPU 1.

According to the above-described motor control device 10 of the present embodiment, every time an encoder edge is detected, a next PWM initial value is determined (either to maintain the current value, to add micro_duty_plus, or subtracting micro_duty_minus) corresponding to the current PWM value (pwm_out). Therefore, even when a change in load on the motor 110 is caused a driving target (the carriage 102 in the present embodiment) can be driven stably.

Moreover, when the first encoder edge is detected since driving initiation, because the PWM initial value is not corrected but set to start_pwm1, which is the same value as the value at the time of driving initiation, torque during driving can be sufficiently retained. Therefore driving velocity of the carriage 102 can reach desired target driving velocity promptly.

In addition, because the type of motor control is not closed-loop control, such as speed feed back control or position feedback control, but, on the whole, open-loop control, motor control at minimal velocity can be more preferably achieved, while it is difficult in the closed-loop control.

If this type of motor control is applied specially to carriage driving of an inkjet printer for moving the carriage to a home position at minimal velocity, such as the present embodiment, influence from a change in load on a motor during capping operation can be inhibited, and capping can be steadily conducted.

[First Variation]

In the above embodiment, if the PWM value at the time of encoder edge detection is larger than det_pwm_max, next PWM initial value is set by adding micro_duty_plus to the previous PWM initial value, and on the other hand, if the PWM value at the time of encoder edge detection is smaller than det_pwm_min, next PWM initial value is set by subtracting micro_duty_minus from the previous PWM initial value. In the present variation, the amount of above addition and subtraction is variable.

Figure 10:
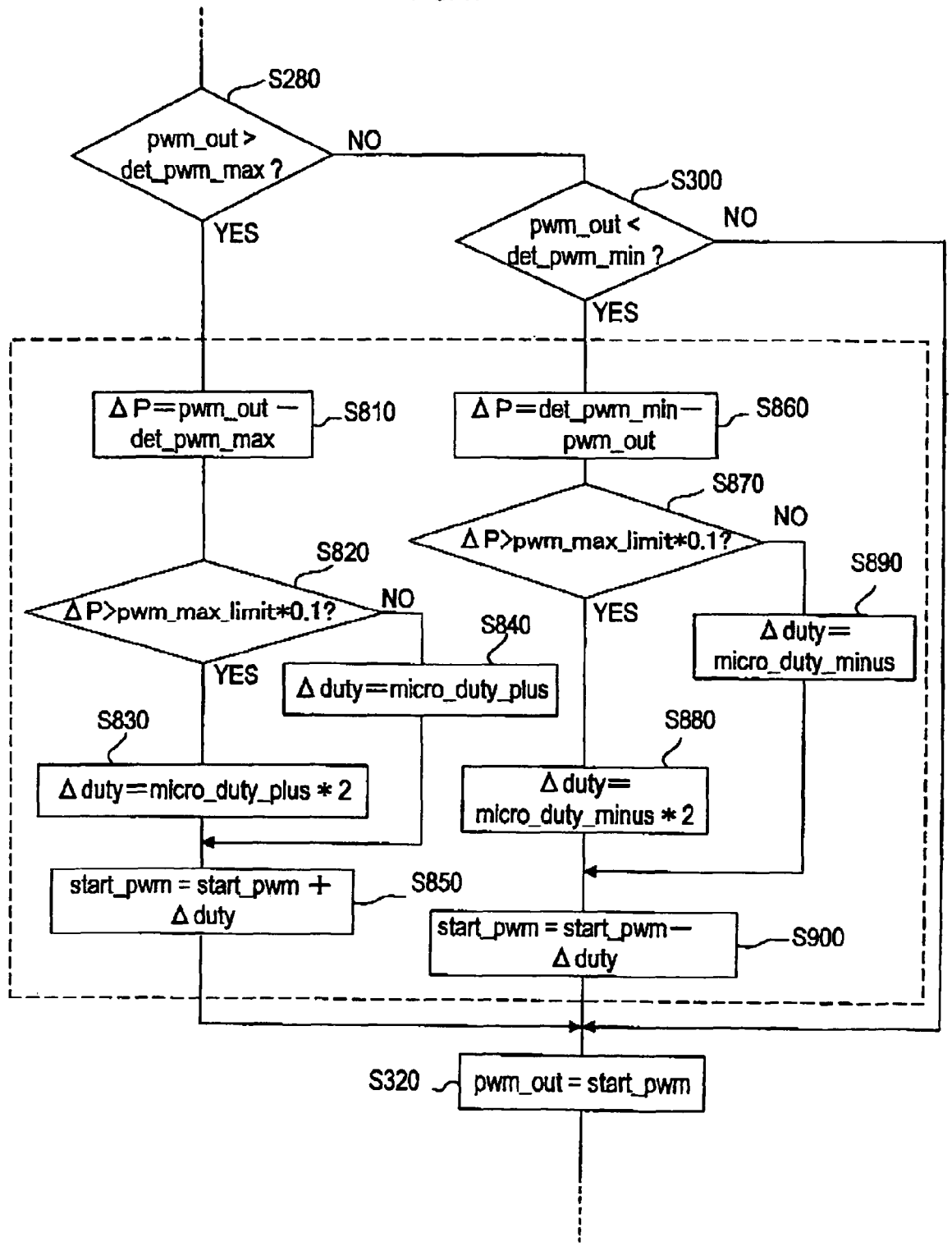
FIG. 10 is a flowchart showing a method to change a setting of PWM initial value at a time of encoder edge detection in the normal driving process in a first variation of the first embodiment.

More specifically, the processes in S290 to S310 of the normal driving process in FIG. 6, which are enclosed with a dotted line and described in the above embodiment, can be replaced with the processes shown in FIG. 10. The following describes a changing method of PWM initial value setting of the present variation based on FIG. 10.

As shown in FIG. 10, a PWM value when an encoder edge is detected (pwm_out) is larger than det_pwm_max (S280: YES), in S810, ΔP, which is a difference between pwm_out and det_pwm_max, is calculated. Subsequently, in S820, it is determined whether or not ΔP is larger than 10% of pwm_max_limit. If ΔP is larger than 10% of pwm_max_limit (S820:YES), the process proceeds to S830 to set Δduty by doubling micro_duty_plus. Then in S850, a new start_pwm is set by adding above Δduty to the current start_pwm.

To the contrary, if a negative determination is made in S820 (S820:NO), it means that the PWM value is smaller and the driving velocity is faster compared to the case wherein a positive determination is made is S820. In this case, the process proceeds to S840 and micro_duty_plus, as it is, is set to be Δduty. Then the calculation is conducted in S860, and a new start_pwm is obtained. That is to say, if a positive determination is made in S820, the increment from a previous PWM initial value become larger compared to a case wherein a negative determination is made in S820.

If the PWM value when an encoder edge is detected (pwm_out) is smaller than det_pwm_min (S300:YES), in S860, ΔP, which is a difference between det_pwm_min and pwm_out, is calculated. Subsequently in S6870, it is determined whether or not AP is larger than 10% of pwm_min_limit. If AP is larger than 10% of pwm_min_limit (S870: YES), the process proceeds to S880 and Δduty is set by doubling micro_duty_minus. Then in S900, a new start_pwm is set by subtracting above-mentioned Δduty from the current start_pwm.

If Δduty is smaller than 10% of pwm_min_limit (S870: NO), it means that the PWM value is larger and the driving velocity is slower than the case wherein Δduty is larger than 10% of pwm_min_limit. In this case, the process proceeds to S890 and micro_duty_minus, as it is, is set to be Δduty. Subsequently, the calculation is conducted in S900, and a new start_pwm is obtained. In other words, the decrement from the previous PWM initial value is larger when a positive determination is made in S870, compared to a case when a negative determination is made in S870.

Figure 11:
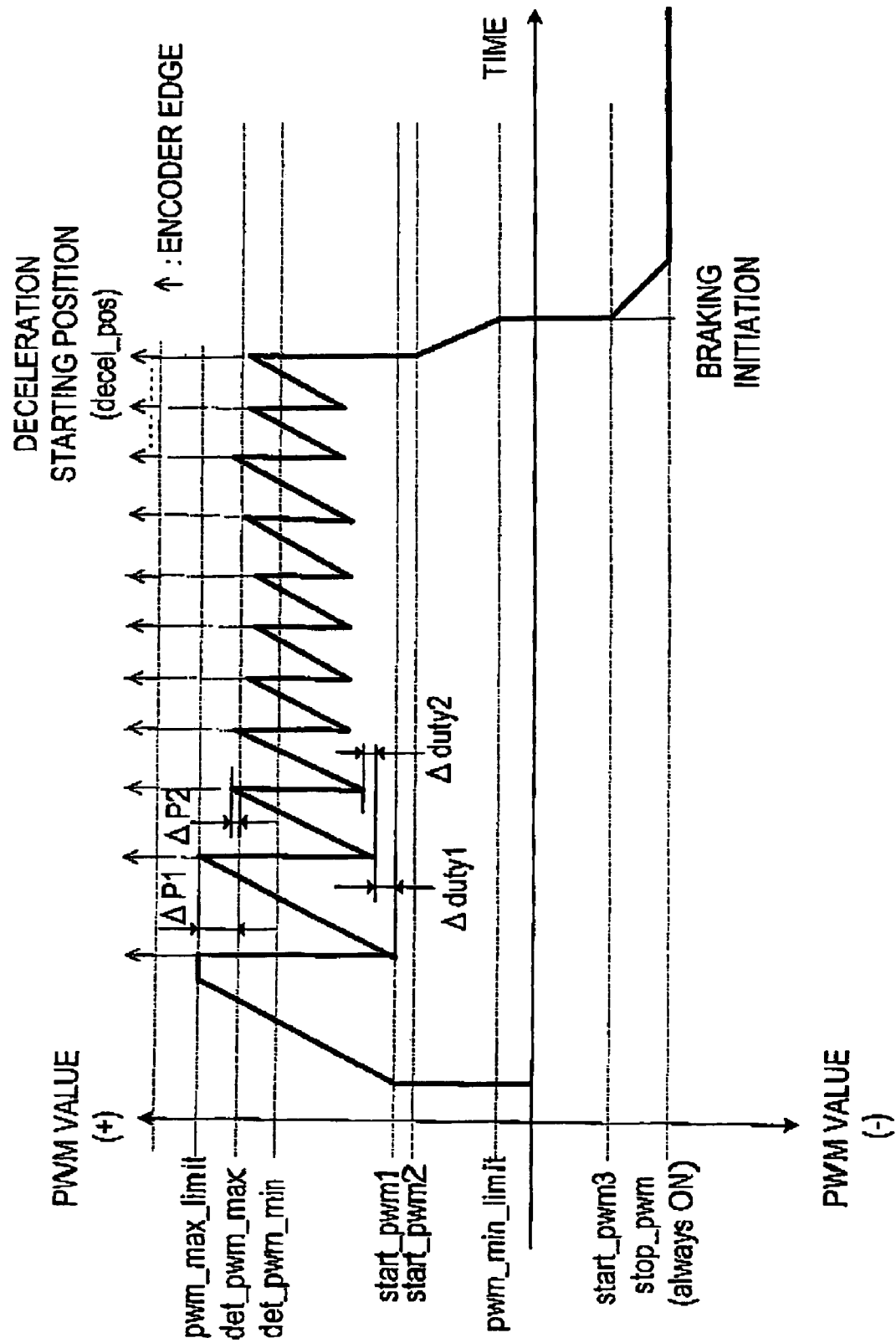
FIG. 11 is an explanatory view showing an example of motor control in the first variation of the first embodiment.

An specific example is shown in FIG. 11 wherein motor control is conducted as described above. As shown in FIG. 11, when an encoder edge is detected for the first time after driving initiation, the PWM initial value is set to start_pwm1, which is the same as the previous PWM initial value. However, at the time of next encoder edge detection, ΔP1, which is the difference between the current PWM value at the time of next encoder edge (pwm_out) and det_pwm_max, is calculated. This process corresponds to S810 in FIG. 10. Subsequently, in S820, it is determined whether or not ΔP1 is larger than 10% of pwm_max_limit. A positive determination is made here, and then Δduty1=micro_duty_plus‡2 is set (S830). Thereby the PWM initial value becomes a value wherein Δduty1 is added to the previous start_pwm1 (S840).

Furthermore, when a next encoder edge is detected, ΔP2, which is the difference between pwm_out and det_pwm_max, is calculated in the same manner. In FIG. 11, this ΔP2 is smaller than 10% of pwm_max_limit. Thus, micro_duty_plus, as it is, is set as Δduty2. The value wherein the previous PWM initial value (start_pwm1+Δduty1) is added to this Δduty2 becomes a new PWM initial value.

Even when the PWM value at the time of edge detection is smaller than det_pwm_min, by executing the calculations according to the processes of S860 to 900 in FIG. 10, the PWM value at the time of edge detection can be fit in between det_pwm_max and det_pwm_min.

According to the present variation, increment values (or decrement values) to previous PWM initial values are set at two levels depending on the degree of difference between the PWM value at the time of edge detection and det_pwm_max or det_pwm_min (i.e. how large/small the PWM value at the time of edge detection compared to det_pwm_max or det_pwm_min) Therefore, it is possible to change a setting of a PWM initial value appropriately corresponding to current motor driving velocity.

Thereby, a driving target (the carriage 102 in the present embodiment) can be stably driven at minimal velocity. It is to be noted that setting 10% of pwm_max_limit and pwm_min_limit as determination thresholds is only an example. These thresholds can be set arbitrarily. Moreover, setting increment values (or decrement values) at two levels is also an example. These values can be set at more levels.

[Second Variation]

In the above-described first variation, the amount of change in a PWM initial value setting (increment value or decrement value) is variable depending on whether or not the difference between a PWM value and det_pwm_max is larger than 10% of pwm_max_limit, or whether or not the difference between det_pwm_min and PWM value is larger than 10% of pwm_mim_limit. In the present variation, the above mentioned increment value or decrement value are set in proportion to the difference between the PWM value at the time of edge detection and respective thresholds mentioned above.

Figure 12:
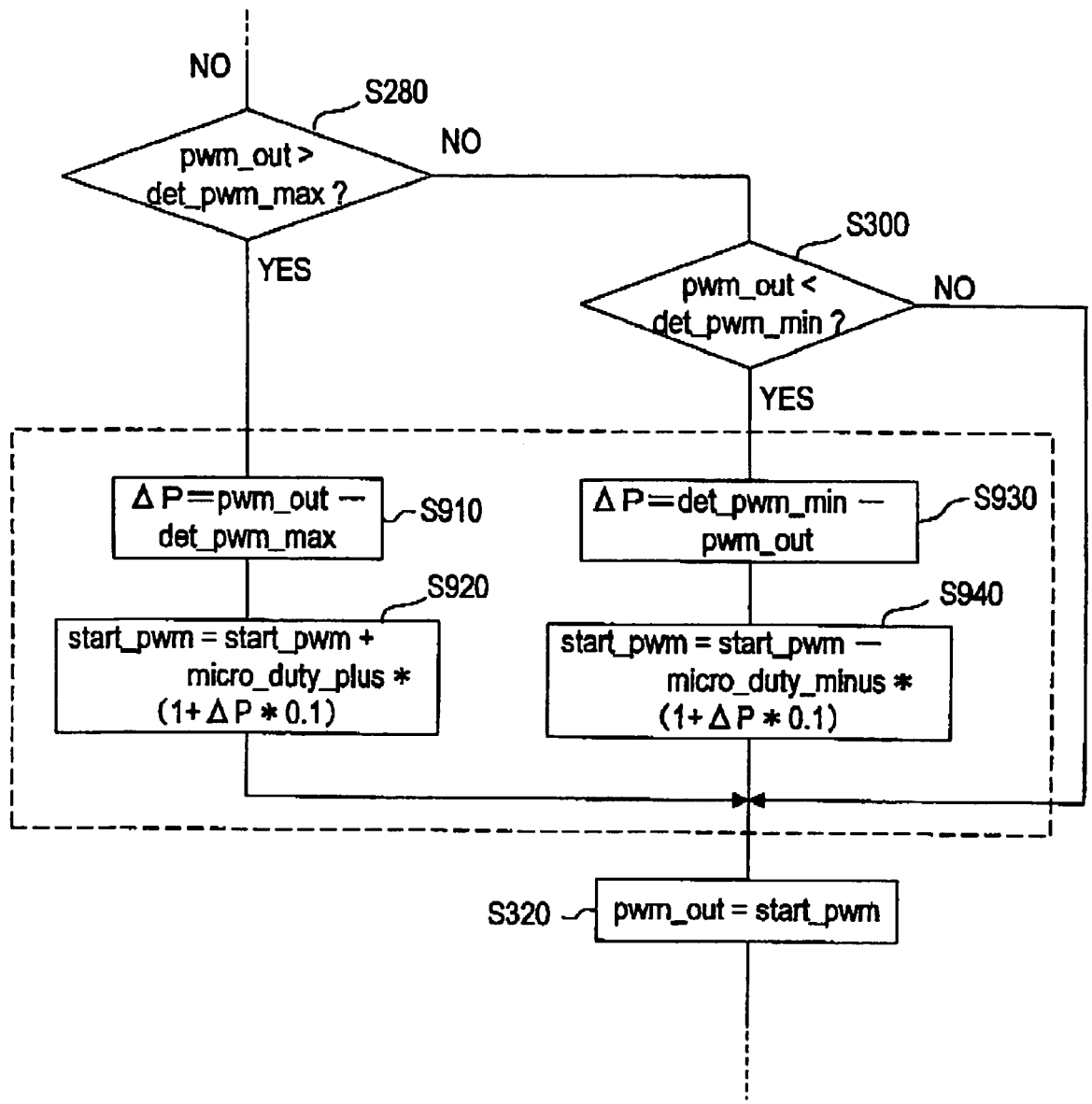
FIG. 12 is a flowchart showing a method to change a setting of PWM initial value at a time of encoder edge detection in the normal driving process in a second variation of the first embodiment.

In the present variation, the processes in S290 to S310 of the normal driving process in FIG. 6, which are enclosed in a dotted line and described in the first embodiment, are replaced with the processes shown in FIG. 12. The following describes a changing method in PWM initial value setting of the present variation based on FIG. 12.

As shown in FIG. 12, if the PWM value when an encoder edge is detected (pwm_out) is larger than det_pwm_max (S280:YES), in S910, ΔP, which is the difference between pwm_out and det_pwm_max, is calculated. Subsequently with the arithmetic expression in S920, a PWM initial value is calculated. That is, an increment added to the previous PWM initial value becomes micro_duty_plus‡(1+ΔP‡1) times more. In other words, the increment changes in proportion to ΔP.

If the PWM value when an encoder edge is detected (pwm_out) is smaller than det_pwm_min (S300:YES), In S930, ΔP, which is the difference between det_pwm_min and pwm_out, is calculated. Subsequently with the arithmetic expression in S940, a PWM initial value is calculated. That is, a decrement subtracted from the previous PWM initial value becomes micro_duty_minus‡(1+ΔP‡1) times less. In other words, the decrement changes in proportion to ΔP.

According to the present variation, an increment value (or a decrement value) is changed consecutively, while an increment value (or a decrement value) is changed step by step and discretely in the first variation.

Therefore, it is possible to change PWM initial value setting more appropriately corresponding to current motor driving velocity.

In the above-described embodiment and variations, a setting of PWM initial value is changed based on the PWM value at the time of encoder edge detection. It is possible to change the setting corresponding to the driving velocity (enc_velocity) at the time of encoder edge detection. It is also possible to change the setting corresponding to the period (enc_period) from previous encoder edge detection till the next detection.

Figure 13A:
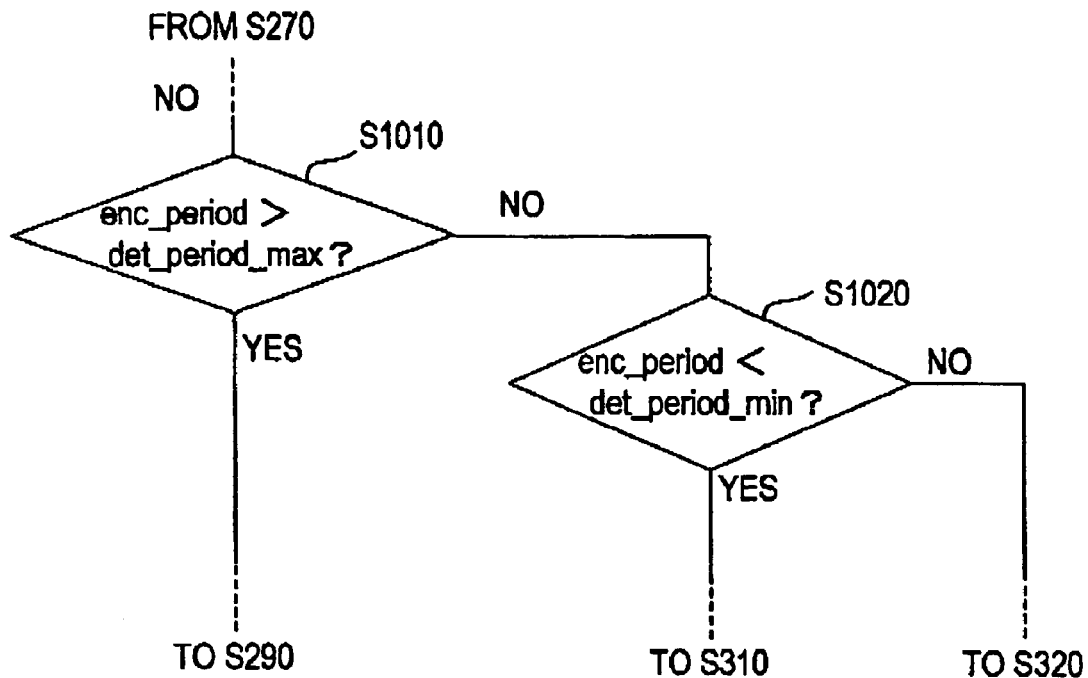
Figure 13B:
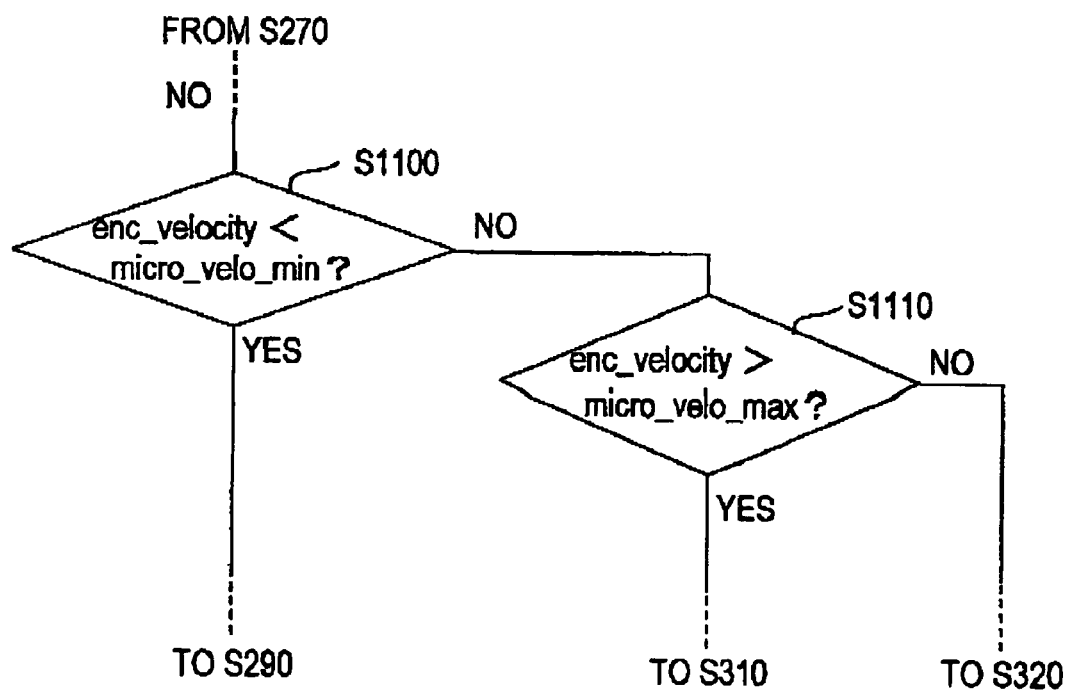

In case the setting is changed corresponding to the driving velocity (enc_velocity) at the time of encoder edge detection, or the edge interval (enc_period), for example, the processes in S280 to S300 of the normal driving process in FIG. 6 can be respectively replaced as shown in FIGS. 18A and 13B.

The processes shown in FIG. 13A are conducted in case the setting is changed corresponding to the edge interval (enc_period) since previous encoder edge detection till next encoder edge detection. When an encoder edge is detected and the process proceeds to S1010, it is determined whether or not the current enc_period is larger than det_period_max. This det_period_max can be determined +10%, for instance, of a target period. If enc_period is larger than det_period_max (S1010:YES), the process proceeds to S290 and the setting is changed so that the next PWM initial value becomes larger than the previous PWM initial value.

If enc_period is smaller than det_period_max (S1010: NO), the process proceeds to S1020, and it is determined whether or not enc_period is smaller than det_period_min. This det_period_min can be determined −10%, for example, of a target period. If enc_period is smaller than det_period_min (S1020:YES), the process proceeds to s310 and the setting is changed so that the next PWM initial value becomes smaller than the previous PWM initial value.

The processes shown in FIG. 18B are conducted in case the setting is changed corresponding to the driving velocity (enc_velocity) at the time of encoder edge detection. When an encoder edge is detected and the process proceeds to S1100, it is determined whether or not the current enc_velocity is smaller than micro_velo_min. This micro_velo_min can be determined −10%, for instance, of target velocity. If enc_velocity is smaller than micro_velo_min (S1100:YES), the process proceeds to S290, and the setting can be change so that the next PWM initial value becomes larger than the previous PWM initial value.

If enc_velocity is larger than micro_velo_min (S1100: NO), the process proceeds to S1110 and it is determined whether or not enc_velocity is larger than micro_velo_max. This micro_velo_max can be determined +10%, for example, of target velocity. If enc_velocity is larger than micro_velo_max (S1110:YES), the process proceeds to S310 and the setting is changed so that the next PWM initial value becomes smaller than the previous PWM initial value.

As described above, by changing a setting of a PWM initial value corresponding to the edge interval or driving velocity at the time of edge detection, the same effect as the first embodiment described above can be achieved. Obviously, these changing methods can be applied to the first and second variations.

Second Embodiment

Figure 14:
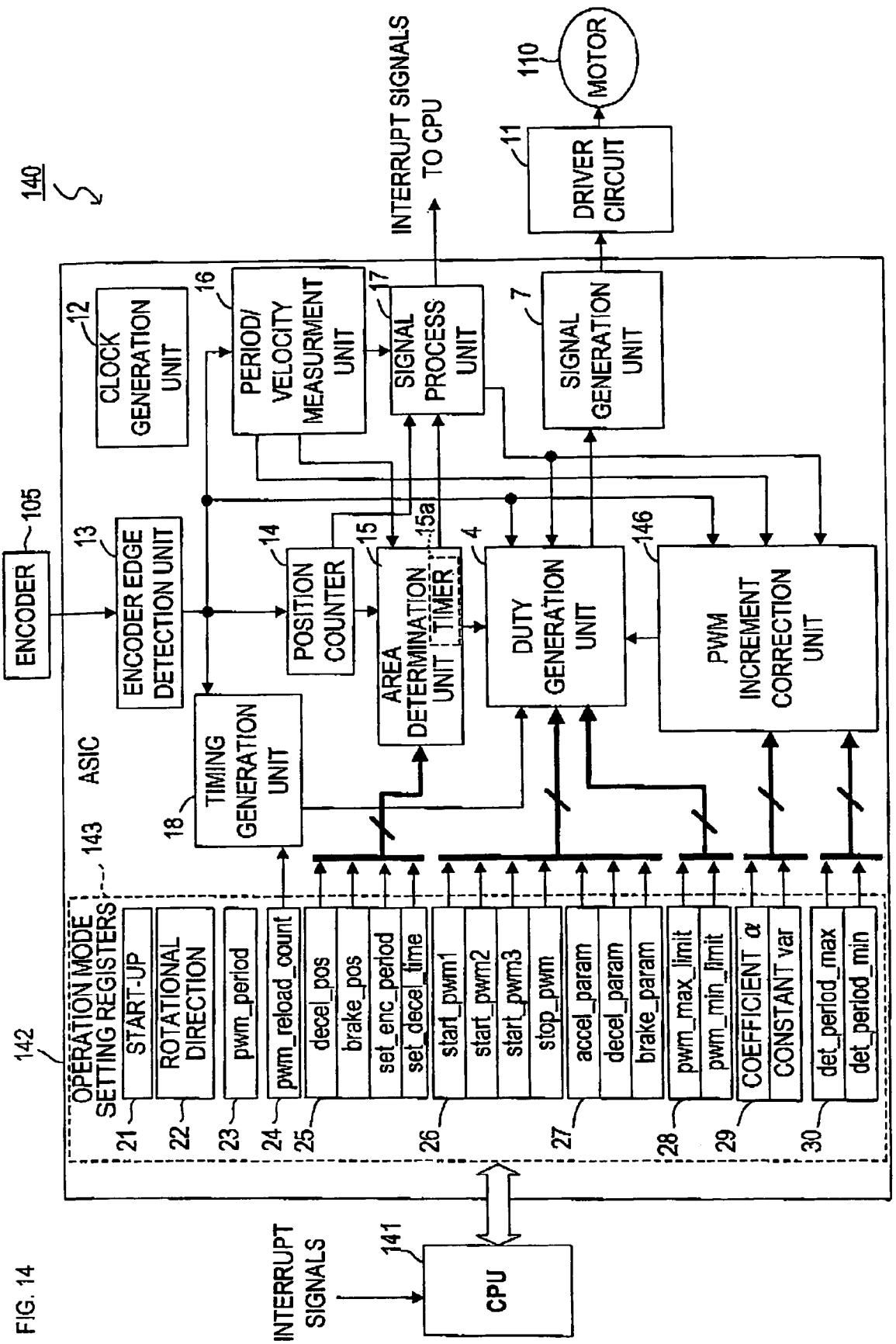
FIG. 14 is a block diagram showing a schematic structure of a motor control device of a second embodiment.

FIG. 14 is a block diagram showing a schematic structure of a motor control device 140 of the second embodiment. In the aforementioned first embodiment, the initial PWM value after reset at the time of encoder edge detection is not constantly set to start_pwm1, but changed corresponding to the PWM value when the edge is detected. The distinct difference of the second embodiment from the first embodiment is that a rate of change to increase a PWM value in constant period Tp is not fixed at accel_param/Tp, but the rate is changed at the time of every encoder edge detection corresponding to an edge interval (enc_period), which is time between a previous edge detection and a current edge detection.

Specifically, in the present embodiment, a PWM increment value (a_param) during driving is not fixed at the initial value of the PWM increment value (accel_param) during driving, but changed corresponding to an edge interval (enc_period). The following describes mainly this specific method.

As shown in FIG. 14, an operation mode setting registers 143 of a motor control device 140 comprises: increment correction value setting registers 29, wherein correction data are set for correcting a PWM increment value (a_param; the initial value thereof is accel_param described above), which is an increment value of a PWM value from current encoder edge detection till next edge detection; and edge interval threshold setting registers 30, wherein respective thresholds used for determining whether the edge intervals are long or short at the time of edge detection are set.

In the increment/decrement value setting registers 27, a PWM initial increment value (accel_param), which is an initial value of a PWM increment value (a_param) during normal drive: (from start-up to deceleration initiation), a PWM decrement value (decel_param), which is a PWM decrement value during deceleration, and a PWM increment value (brake_param), which is a PWM increment during braking are set therein.

In the increment correction value setting registers 29, a coefficient α for the rate of change and a correction constant var, which are both necessary for calculating a PWM increment value (a_param) between current encoder edge detection and next edge detection, are set therein.

In the edge interval threshold setting registers 30, a long interval detection threshold (det_period_max), which is a criterion to determine whether or not a PWM increment value (a_param) between current encoder edge detection and next edge detection should be increased from a_param which is calculated at the time of previous encoder edge detection, and a short interval detection threshold (det_period_min), which is a criterion to determine whether or not a PWM increment value should be decreased are set therein.

The timing generation unit 18 generates timing information for increasing a PWM value in the above-described period Tp based on the PWM period (pwm_period) from the PWM period setting register 23, the timing for constant addition (pwm_reload_count) from the timing setting register 24, and the encoder edge detection signals (enc_trg) from the encoder detect detection unit 13. Subsequently, the timing generation unit 18 outputs the timing information to the duty generation unit 4.

A PWM increment correction unit 146 generates either information whether or not a PWM increment value (a_param) should be corrected (changed), or correction data which indicate specific degree of correction in case a correction should be conducted. Other constitution of the motor control unit 140 of the present embodiment is basically the same as the constitution of the motor control unit 10 in the first embodiment. Hence, the same reference numbers are given to the same components, and the description thereof is not repeated here.

In the present embodiment, a PWM increment value (a_param) is basically set to a PWM initial increment value (accel_param). However, if the edge interval (enc_period), that is the time between previous edge detection and current edge detection detected at the time of encoder edge detection, is longer than the long interval detection threshold (det_period_max), the PWM increment value (a_param) is increased by predetermined amount from a previous value. Moreover, if the edge interval detected at the time of encoder edge detection is shorter than the short interval detection threshold (det_period_min), the PWM increment value (a_param) is decreased by predetermined amount from a previous value.

Furthermore, in the present embodiment, the information whether or not a PWM increment value (a_param) should be corrected, or correction data which indicate the degree of the correction in case a correction is needed are obtained from the PWM increment correction unit 146 at every encoder edge detection, and depending on need, calculation for correcting a PWM increment value (a_param) is conducted. The detail of this calculation will be described later.

Figure 15:
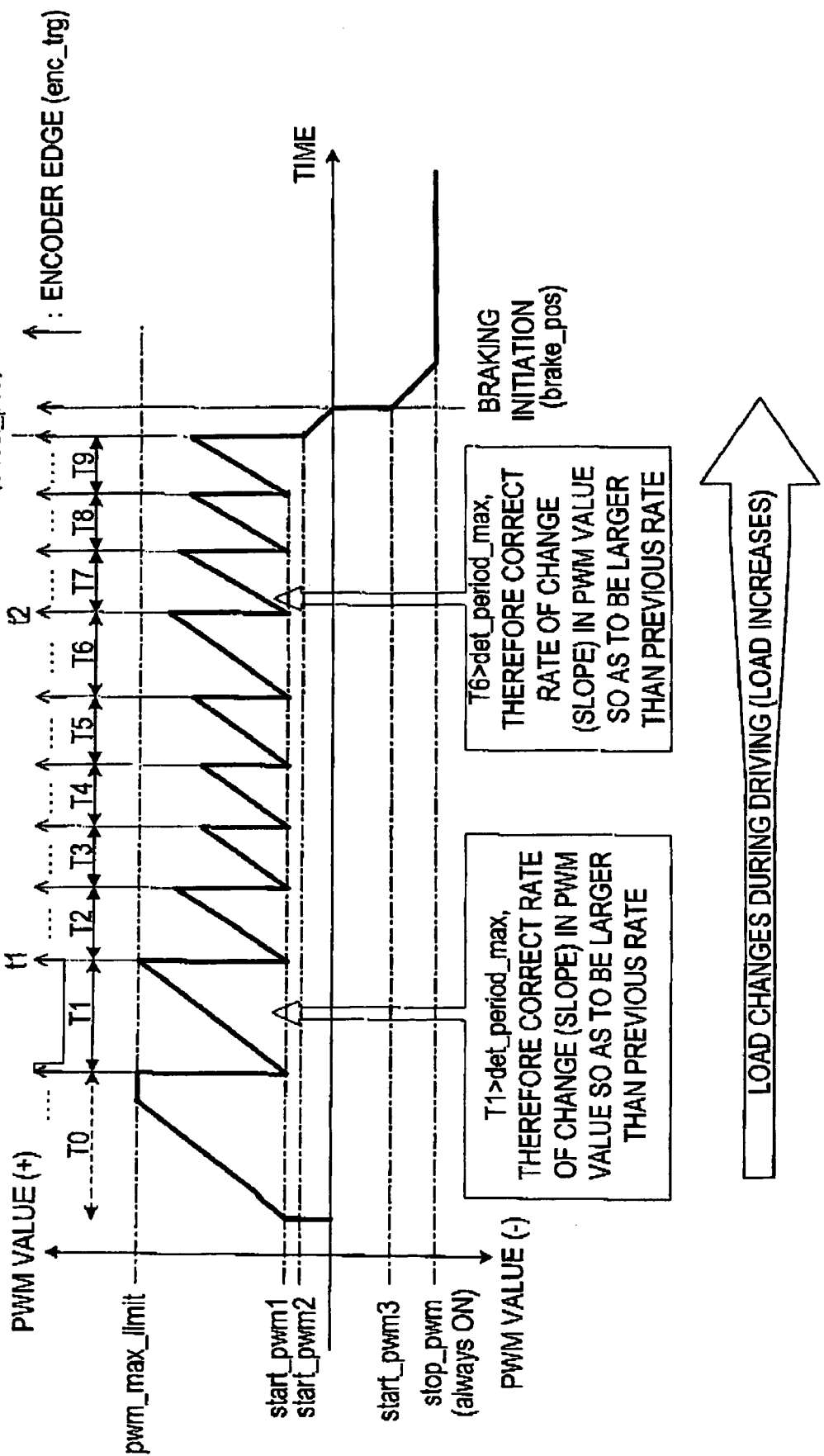
FIG. 15 is a time chart showing an example of control in the motor control device of the second embodiment wherein load on a motor increases.
Figure 16:
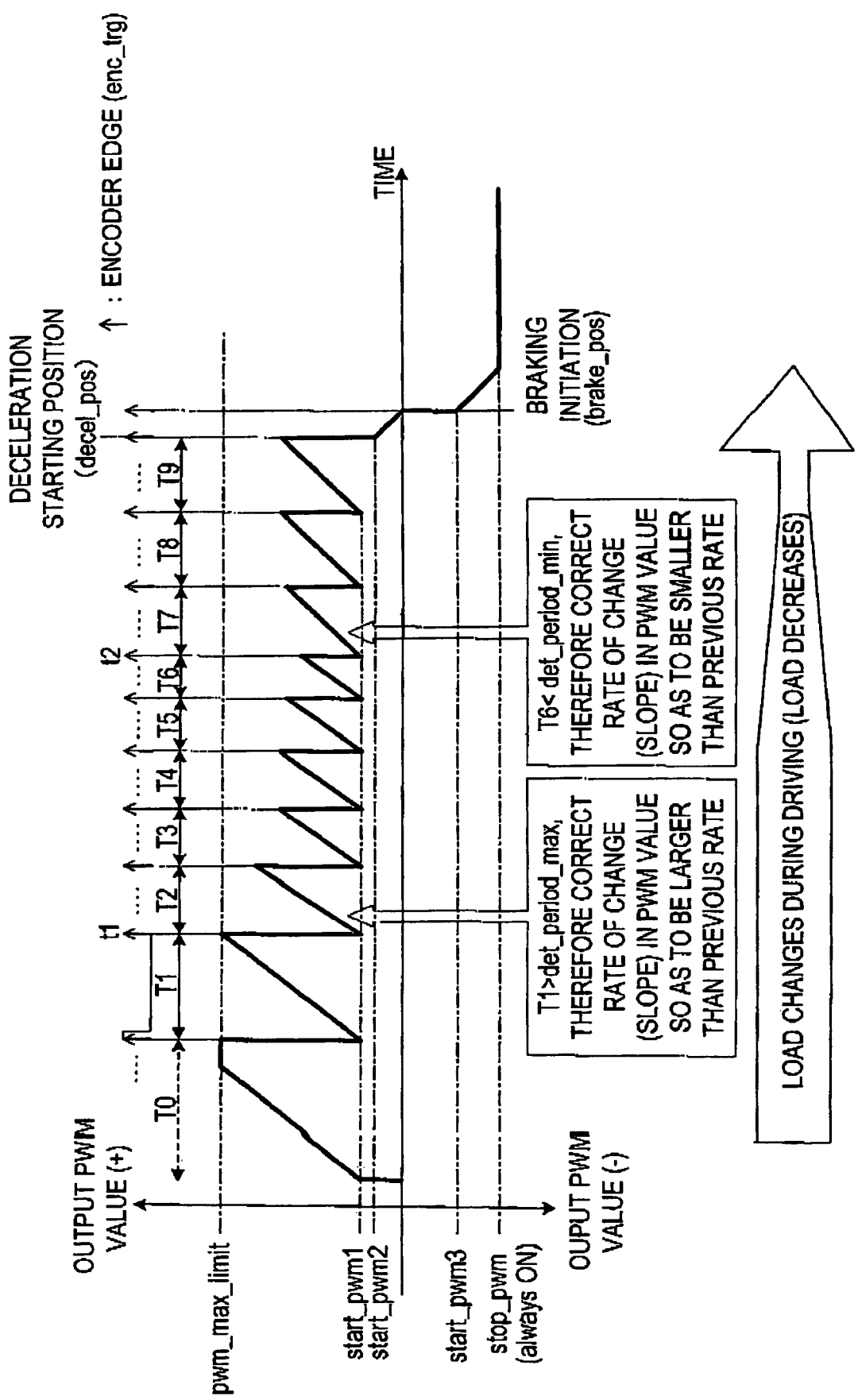
FIG. 16 is a time chart showing an example of control in the motor control device of the second embodiment wherein the load on a motor decrease.

Referring now to FIGS. 15 and 16, controlling of the motor 110 in the motor control 140 of the present embodiment constituted as above will be described below. FIGS. 15 and 16 are both time charts showing examples of motor control of the present embodiment. FIG. 15 shows an example wherein load on the motor 110 increases, and FIG. 16 shows an example wherein the load on the motor 110 decreases.

As shown in FIG. 15, the PWM initial value at the time of driving initiation is set to start_pwm1, and increased by a_param (accel_param at the time of driving initiation) in constant period Tp as shown in FIG. 72. If the PWM value reaches pwm_max_limit before an encoder edge is detected, the PWM value is maintained to be pwm_max_limit.

When an encoder edge is detected, the PWM value is reset, and start_pwm1 is supposed to be set again. However, in the present embodiment, when the first encoder edge is detected after initiation of diving, the PWM increment value (a_param) is not changed. That is, the PWM initial increment value (accel_param) is maintained. Subsequently, from second edge detection, a PWM increment value (a_param) is set based on the edge interval at the time of edge detection.

Specifically, at the time of the second encoder edge detection after driving initiation (time t1) in FIG. 16, the edge interval T1 immediately before the detection is longer than the long interval detection threshold (det_period_max). Thus, a calculation for correction is conducted to increase the PWM incremental value (a_param) obtained after reset by predetermined amount from the initial value (accel_param). Thereby, the rate of change in a PWM value is increased.

Thereafter, as long as the edge interval detected at the time of encoder edge detection is longer than the long interval detection threshold (det_period_min), even if the edge interval becomes shorter than det_period_max, previous a_param is maintained. Therefore, the driving velocity of the carriage 102 does not drop suddenly, and desired driving velocity can be retained.

On the other hand, if the driving velocity decreases because the load on the motor 110 becomes large, and the edge interval T6 detected at time t2 becomes longer than long interval detection threshold (det_period_max) again, the PWM increment value (a_param) at that time is furthermore increased from the previous a_param. Thereby, the rate of change in the PWM value is also furthermore increased.

When the carriage 102 reaches the deceleration starting position (decel_pos), the PWM initial value is set to start_pwm2, and the PWM value is decreased by the PWM decrement value (decel_param) during deceleration in every constant period Tp. When any one of above-described conditions for braking initiation is met, the PWM value is set to start_pwm3 and braking is initiated. The PWM value is increased (toward the minus direction) by the PWM increment value (brake_param) during braking in every constant period Tp. When the PWM value reaches stop_pwm, the driving target (the carriage 102) stops.

The example in FIG. 16, wherein the load on the motor 110 decreases, is going to be described below. In this case, the same control described in FIG. 15 is conducted up to the step wherein the rate of change in the PWM value is increased (i.e. the PWM increment value (a_param) is increased) at time t1.

After time t1 passes, the load on the motor 110 gradually decreases. Consequently, the driving velocity of the motor 110 becomes faster and the edge interval (enc_period) detected at the time of encoder edge detection becomes shorter. When an encoder edge is detected at time t1, the edge interval T6 is shorter than the short interval detection threshold (det_period_min).

In the present embodiment, the rate of change in a PWM value is decreased by correcting the PWM increment value (a_param) after time t2 to be smaller than a_param before time t1. In other words, since there is a fear that the velocity gets extremely high due to the light load, the rate of change in the PWM value is made small to control the velocity.

Figure 17A:
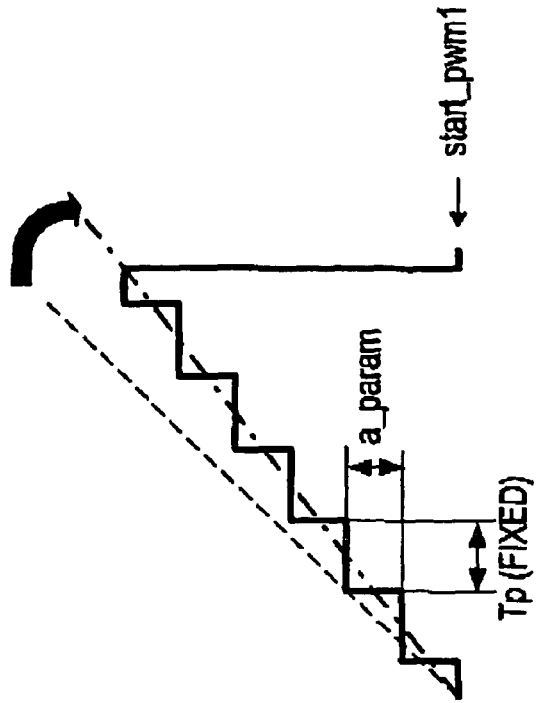
FIGS. 17A to 17C are explanatory views to describe that a rate of change in a PWM value is increased/decreased by changing a PWM increment value during driving.

Further description of this control, wherein the rate of change in a PWM value is increased/decreased by changing the PWM increment value (a_param), is going to be given below based on FIGS. 17A to 17C. FIG. 17A shows the initial status. The PWM increment vale (a_param) is set to the initial value (accel_param). The dotted line shows the rate of change (slope) in a PWM value in the initial status.

Figure 17B:
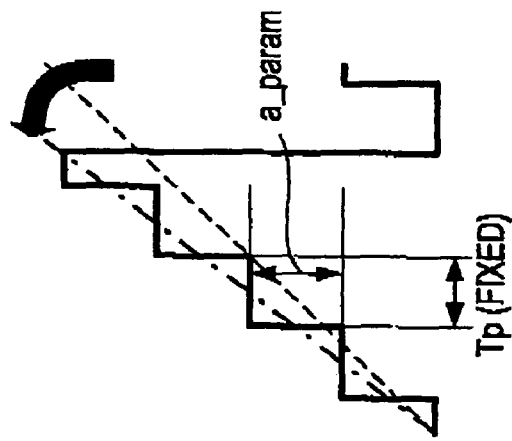
Figure 17C:
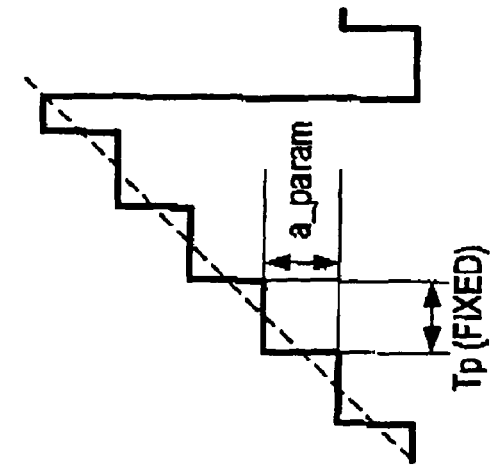

From this status, when a_param is increased to be a_param>accel_param, as shown in FIG. 17B, the rate of change (slope) in a PWM value is increased as shown with the chain line. To the contrary, when a_param is decreased to be a_param<accel_param, as shown in FIG. 17C, the rate of change (slope) in a PWM value is decreased as shown with the chain line.

A formula (1) below shows the calculation for correction in order to increase or decrease a PWM increment value (a_param).

$$a\_param = a\_param \ddagger (1 \pm \alpha \ddagger var)$$

In the left side of the above formula (1), "a_param" shows a PWM increment value during driving after a change, and "a_param" in the right side shows a PWM increment value during driving before a change. The coefficient $\alpha=1$, and the constant var is an arbitrary constant. For the addition/subtraction part in the bracket, addition is conducted for increasing the rate of change in a PWM value, on the other hand, subtraction is conducted for decreasing the rate of change.

The calculation of the above formula (1) is conducted in the duty generation 4. The result of the part "$\pm \alpha \ddagger var$" in the calculation is obtained in the PWM increment correction unit 146 and inputted into the duty generation unit 4.

Figure 18:
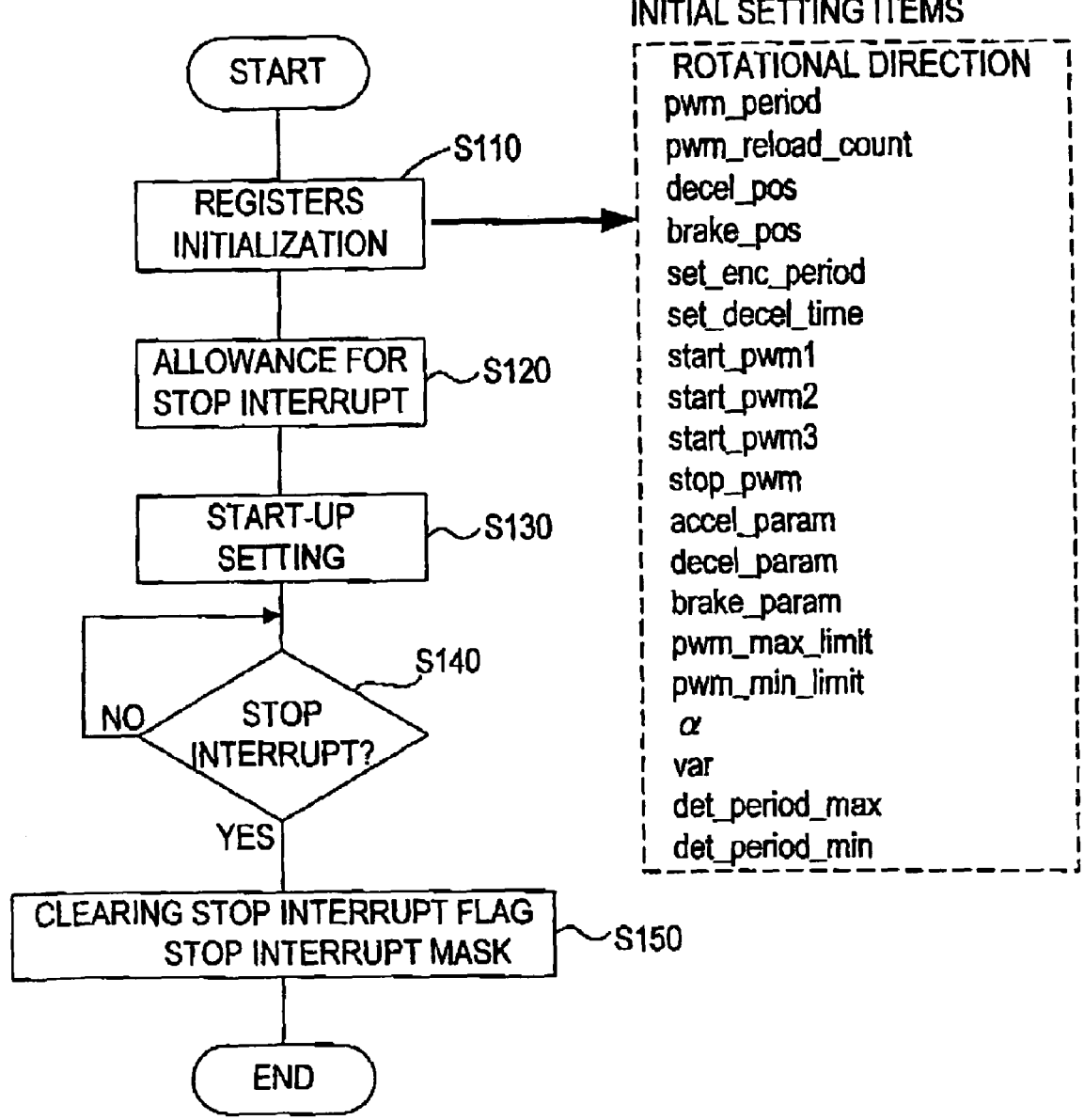
FIG. 18 is a flowchart showing an ASIC setting process executed by a CPU in the second embodiment.

A process executed by the CPU 141, and a process executed by the ASIC 142 in the motor control device 140 of the present embodiment are described below based on FIGS. 18 and 19. FIG. 18 is a flowchart showing an ASIC setting process executed by the CPU 141.

Setting items in the respective registers in the operation mode setting registers 143 in S110 are listed in FIG. 18.

The following describes a control of the motor 110 executed in the ASIC 142.

Figure 19:
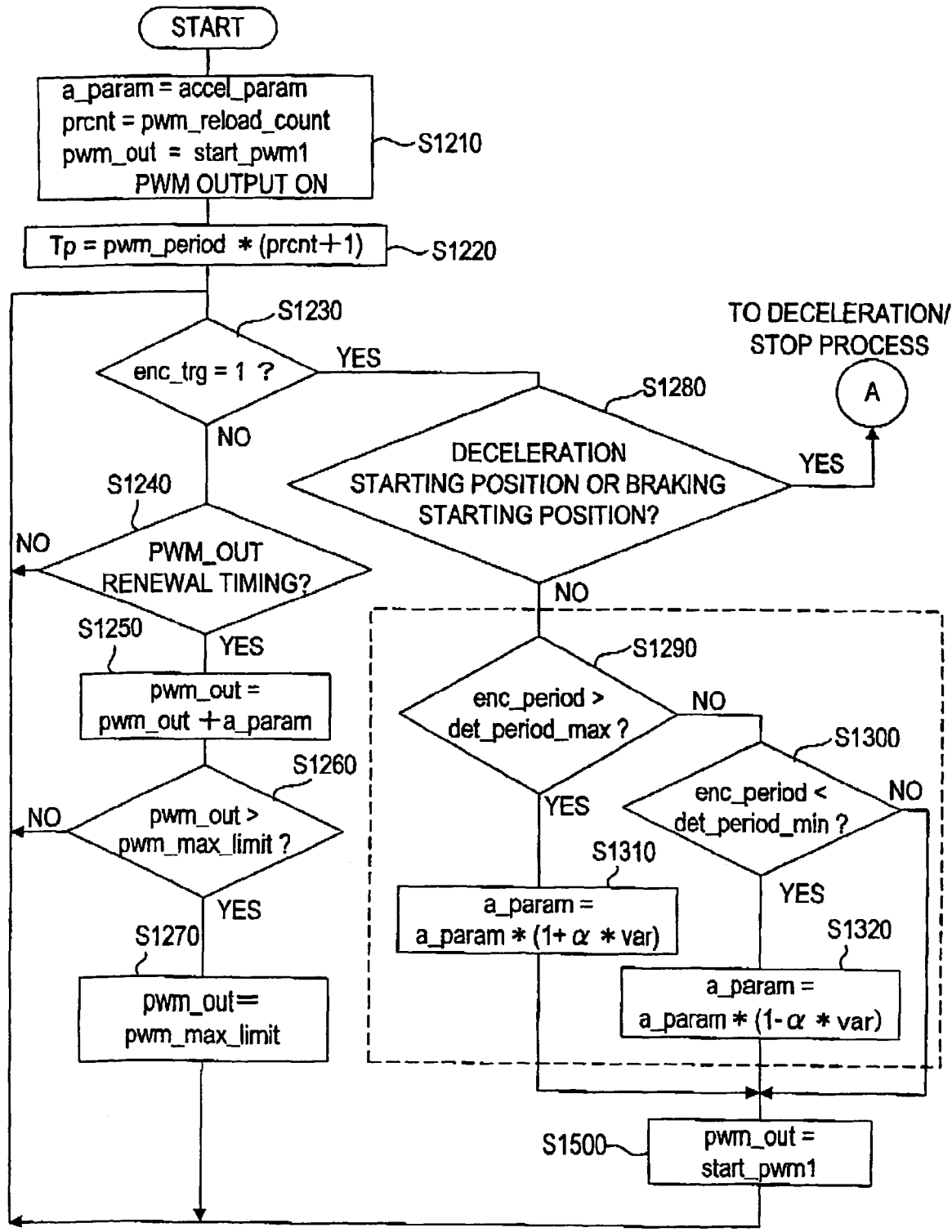
FIG. 19 is a flowchart showing a normal drive process executed in an ASIC of the second embodiment from a step of start-up of a motor to a step of deceleration initiation.

Firstly, the normal drive process from the step of start-up of the motor 110 to the step of deceleration initiation is shown in FIG. 19. When the start-up setting register 21 is set, in S1210, the variable a_param is set to the PWM initial increment value (accel_param), which is the initial value of the variable a_param, and the variable prcnt indicating constant addition timing is set to pwm_reload_count, which is the initial value of the variable prcnt. Furthermore, pwm_out, which is a PWM value actually outputted from the duty generation unit 4 is set to start_pwm1, and then output of PWM values from the duty generation unit 4 is initiated.

In S1220, based on the constant addition timing prcnt set in S1210, a calculation is conducted with the following formula: Tp=pwm_period‡(prcnt+1), and a PWM value renewal interval Tp is obtained. This calculation is conducted by the timing generation unit 18.

Subsequently, in S1230, it is determined whether or not enc_trg=1, that is whether or not an encoder edge is detected. Until an encoder edge is detected, the process proceeds to S1240. In S1240, it is determined whether or not timing to renew (pwm_out) has come. This is to determine whether or not timing to renew a PWM value in constant period Tp has come, and determined based on the timing information from the timing generation unit 18. Until Tp passes since the PWM value is renewed (i.e. increased by accel_param) last time, a negative determination is made and the process goes back to S1230. When the timing for renewing the PWM value comes after Tp passes, the process proceeds to S1250.

In S1250, a_param (accel_param in the initial status) is added to the current pwm_out, and the result of this calculation becomes a new pwm_out. In S1260, it is determined whether or not the new pwm_out is larger than the maximum PWM output value (pwm_max_limit). If the new pwm_out is determined to be equal to or smaller than pwm_max_limit, the process goes back to S1230. If the new pwm_out is determined to larger than pwm_max_limit, the process proceeds to S1270, and the current pwm_out is set to pwm_max_limit. That is, pwm_out is limited to pwm_max_limit at maximum.

When an encoder edge is detected (S1230:YES), the process proceeds to S1280, and it is determined whether or not the carriage 102 has reached the deceleration starting position (decel_pos) or the braking starting position (brake_pos).

Specifically, this determination in S1280 is made based on the presence/absence of position pulse from the area determination unit 15. The position detection pulse generation process is the same as the position detection pulse generation process in the first embodiment shown in FIG. 8. Hence, the description of detail is not repeated here.

In S1280, when it is determined that the carriage 102 has reached decel_pos (S1280:YES), the process proceeds to the deceleration/stop process, however until the carriage 102 reaches decel_pos, the process proceeds to S1290. In S1290, it is determined whether or not the edge interval (enc_period) between the current encoder edge detection and the previous edge detection is longer than the long interval detection threshold (det_period_max). If enc_period is longer than det_period_max (S1290:YES), the process proceeds to S1810, a calculation for correction in order to increase the PWM increment value (a_param) based on the above-described formula (1) is conducted to increase the rate of change in the PWM value.

On the other hand, if the edge interval (enc_period) detected at the time of encoder edge detection is equal to or shorter than the long interval detection threshold (det_period_max) (S1290:NO), the process proceeds to S1300, and it is determined whether or not the edge interval (enc_period) is shorter than the short interval detection threshold (det_period_min). If enc_period is shorter than det_period_min (S1300:YES), the process proceeds to S1320, and a calculation for correction in order to decrease the PWM increment value (a_param) based on the above-described formula (1) is conducted to decrease the rate of change in the PWM value.

If the determination in S1300 is negative, i.e. the edge interval (enc_period) falls into an area equal to or longer than det_period_min and equal to or shorter than det_period_max, the process directly proceeds to S1500. In S1500, pwm_out is again reset to start_pwm1, which is the PWM value at the time of driving initiation.

Figure 20:
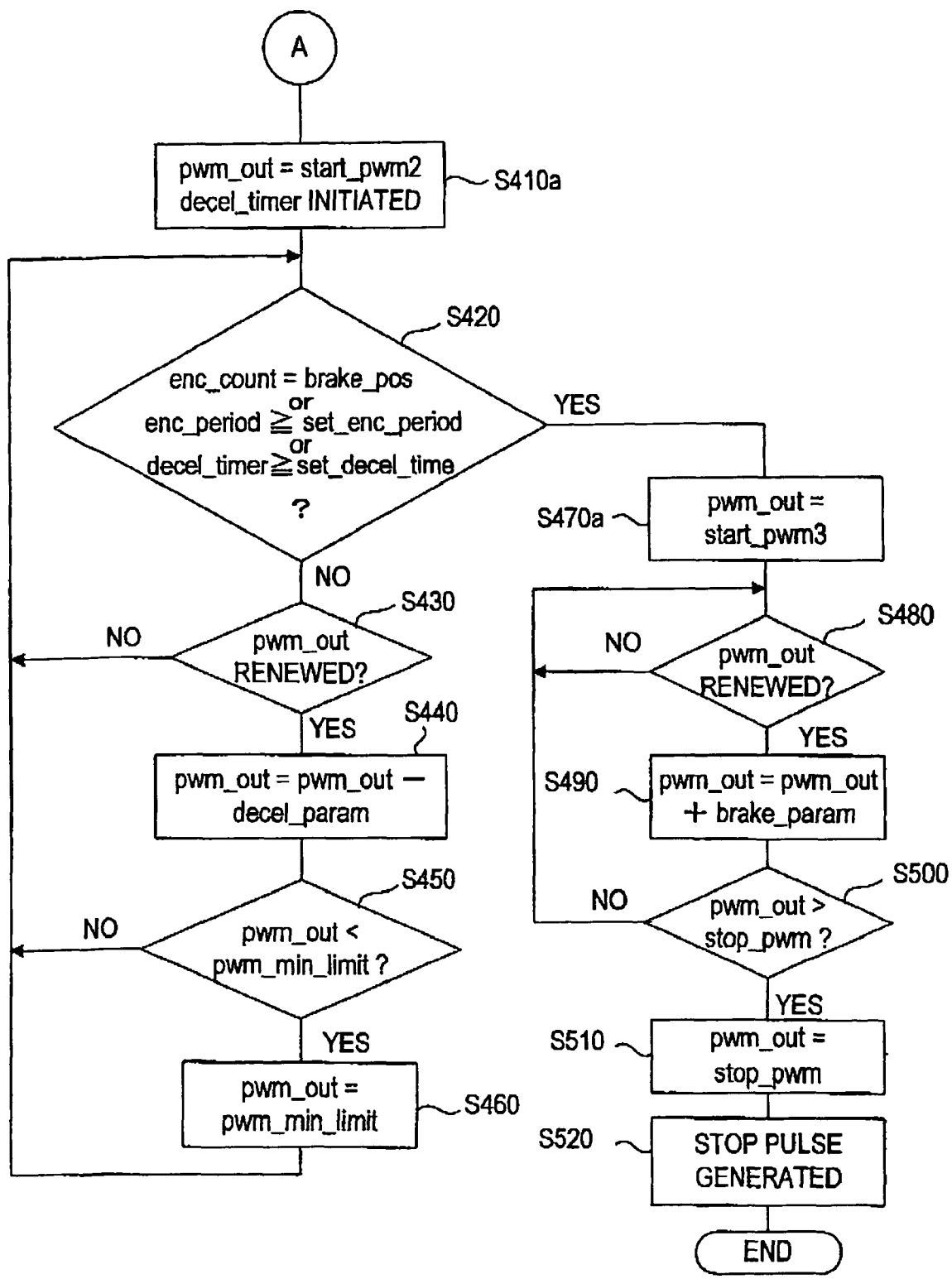
FIG. 20 is a flowchart showing a deceleration/stop process executed in the ASIC of the second embodiment.

The deceleration/stop process, which is conducted if a positive determination is made in S1280, is shown in the flowchart in FIG. 20. The difference of this process shown in FIG. 20 from the process in FIG. 7 is S410a and S470a. In S410 shown in FIG. 7, start_pwm is set to start_pwm2, which is the PWM value at the time of deceleration initiation, and subsequently pwm_out is set to this start_pwm. In S470 shown in FIG. 7, start_pwm is set to start_pwm3, which is the PWM value at the time of braking initiation, and start_pwm after this setting is set as new pwm_out. This is because start_pwm is a variable. In S410a in FIG. 20, pwm_out is set to start_pwm 2, which is the PWM value at the time of deceleration initiation, and in S470a, pwm_out is set to start_pwm3, which is the PWM value at the time of braking initiation. Other steps of this deceleration/stop process are the same as the process of the first embodiment shown in FIG. 7. Thus, the same reference numbers are respectively given to the same steps, and the description thereof is not repeated here.

Figure 9:
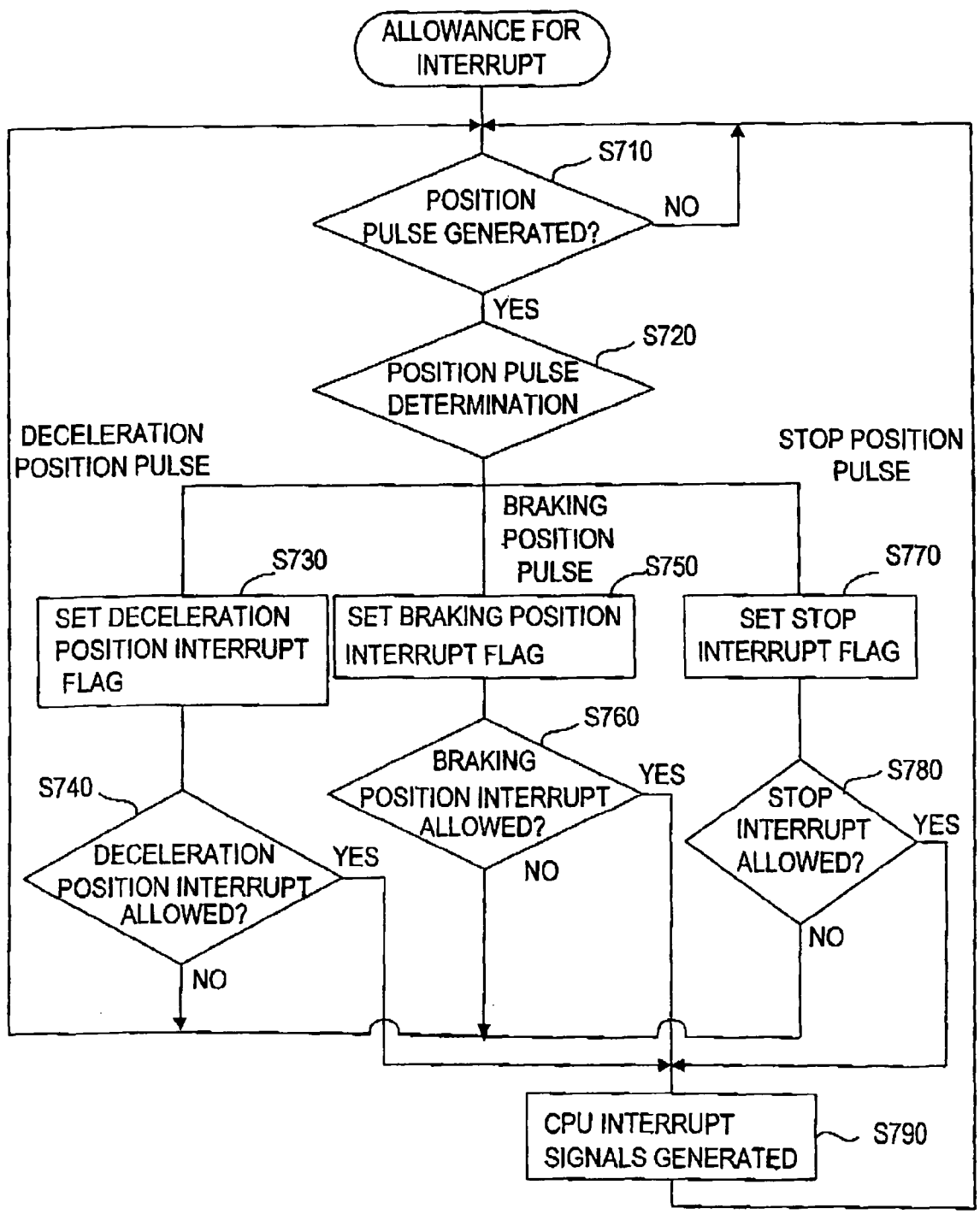
FIG. 9 is a flowchart showing an interrupt signal generation process of the first embodiment.

The interrupt signal generation process executed by the signals process unit 17 in the ASIC 2 is the same as the process of the first embodiment shown in FIG. 9. Hence, the description thereof is not repeated here.

In the above described motor control device 140 of the present embodiment, next rate of change in a PWM value is determined corresponding to the current edge interval (enc_period) every time an encoder edge is detected. Specifically, the PWM increment value (a_param) is maintained, or increased/decreased according to the above formula (1). Therefore, the motor control device 10 constituted as above can drive a driving target (the carriage 102 in the present embodiment) stably even when the load on the motor 110 changes.

Moreover, in the motor control device 140 of the present embodiment, the rate of change in a PWM value (a_param) is not corrected when a first encoder edge is detected after driving initiation. Alternatively, a_param is set as the initial value (accel_param) in the same way as the setting at the time of driving initiation. Therefore, torque at the time of driving initiation can be sufficiently retained, and the driving velocity of the carriage 102 can be reached desired target driving velocity promptly.

Furthermore, this control method is not the closed loop control, such as the speed feed back control or the position feed back control, but, on the whole, the open loop control. Therefore, a motor can be more preferably controlled at minimal velocity, while controlling a motor at minimal velocity is difficult by the closed loop control.

If this control method is applied especially to returning a carriage of an inkjet printer to a home position at minimal velocity, likewise the present embodiment, the influence from a change in load on the motor during capping operation can be inhibited, and capping can be steadily conducted.

[First Variation]

In the above-described second embodiment, the increment value for increasing the PWM increment value during driving, and the decrement value for decreasing thereof are constant by setting $\alpha=1$ and var predetermined constants. Alternatively, in the present variation, the increment value and decrement value are respectively increased/decreased consecutively corresponding to the difference between the edge interval (enc_period) and respective thresholds.

Figure 21:
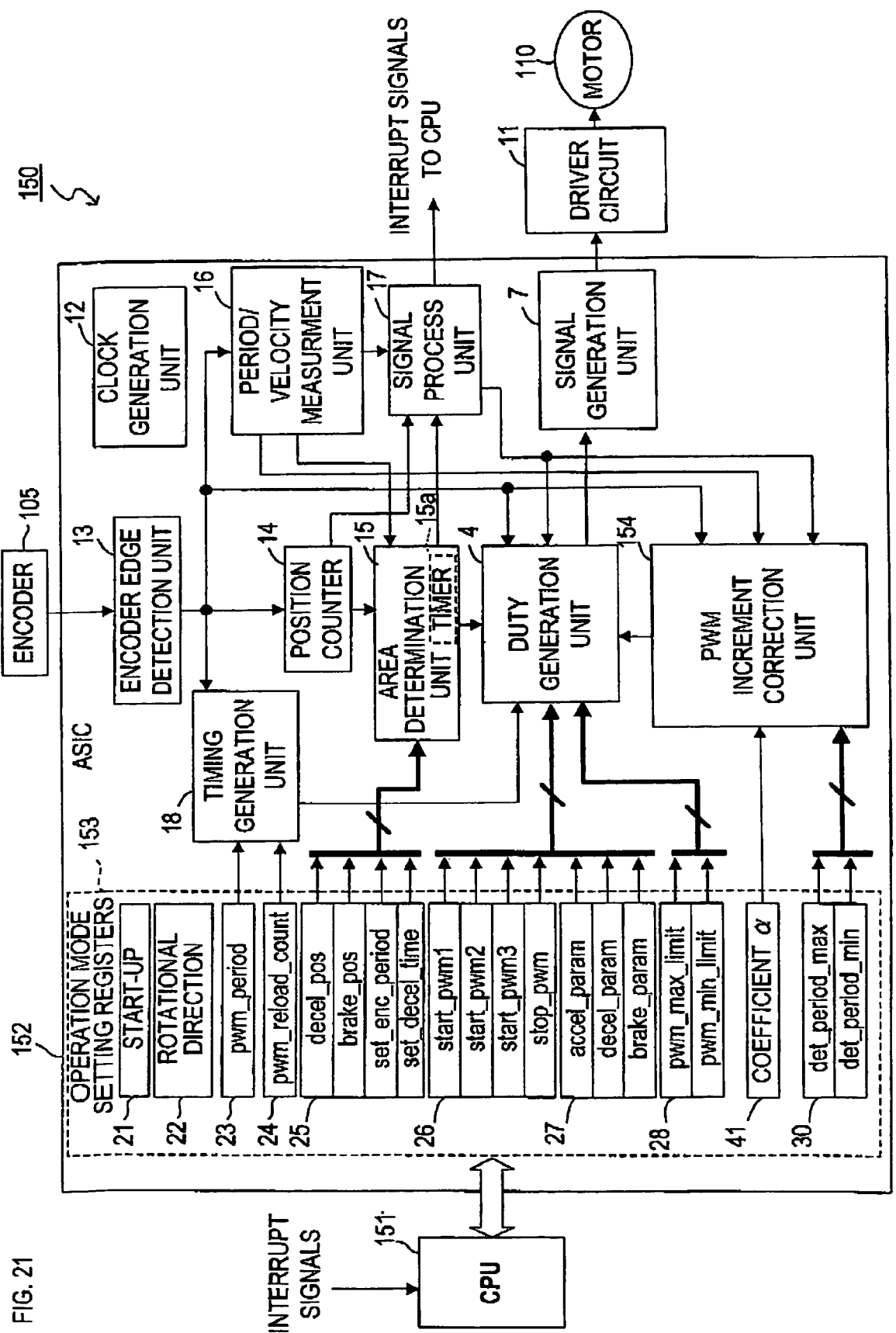
FIG. 21 is a block diagram showing a schematic structure of a motor control device of a first variation of the second embodiment.

In FIG. 21, the schematic structure of a motor control device 150 of the present variation is shown. The distinct differences of the motor control device 150 of the present variation from the motor control device 140 of the second embodiment (FIG. 14) are that the correction constant var is not set in the increment correction value setting registers 41 in the operation mode setting registers 153, but obtained from the calculation executed in the PWM increment correction unit 154, and that the coefficient $\alpha$ is set to a predetermined coefficient so that $\alpha>0$ is maintained. Thereby, the CPU 151 does not set the correction constant var in the increment correction value setting registers 41, which is done in the second embodiment. Other constitution of the motor control device 150 is basically the same as the constitution of the motor control device 140 in the second embodiment. Thus, the same reference numbers are given to the same components as the components of the motor control device 140 of the second embodiment, and the detailed description thereof is not repeated here.

Figure 22:
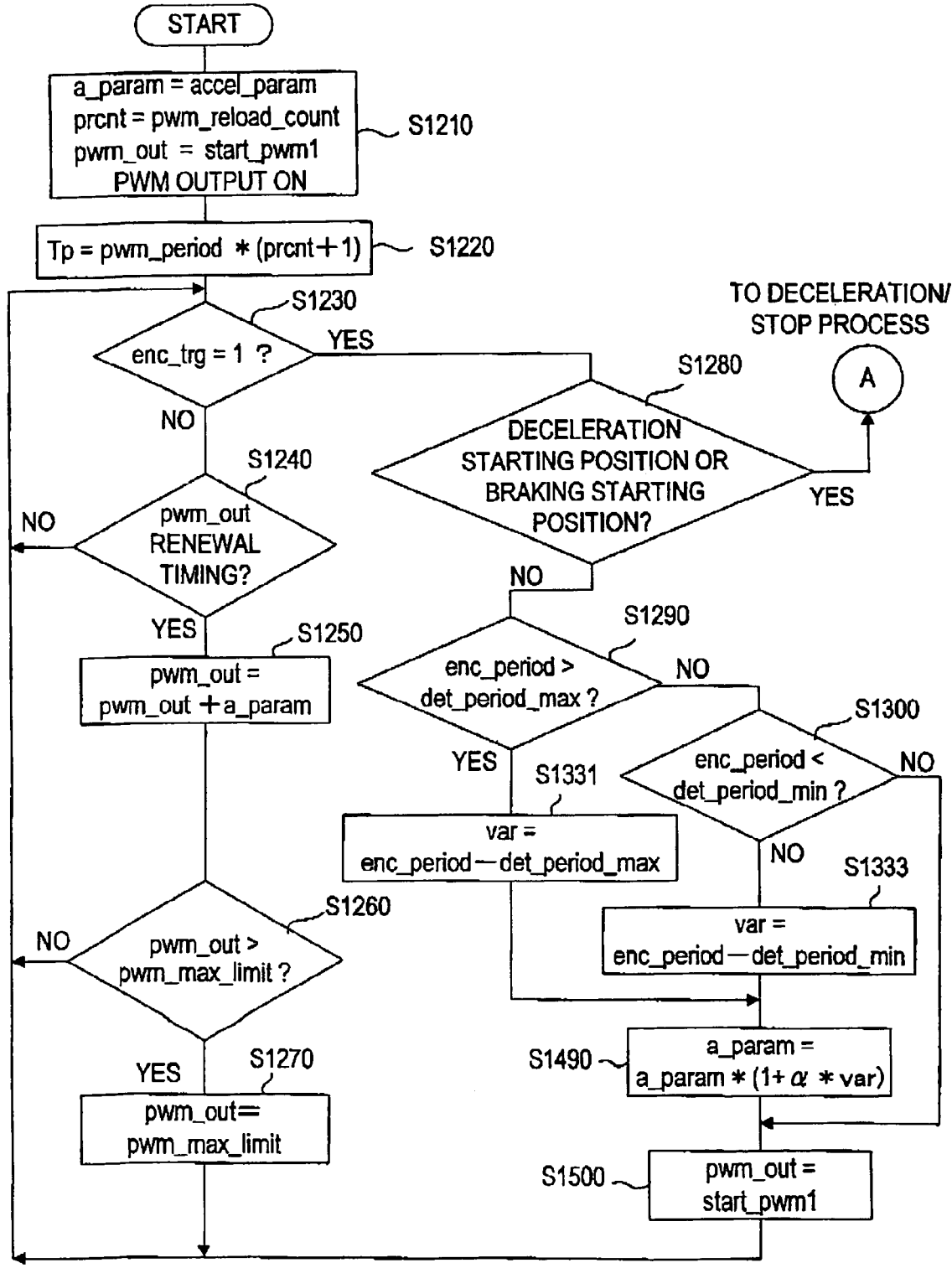
FIG. 22 is a flowchart showing a normal drive process executed in an ASIC of the first variation of the second embodiment from a step of start up of a motor to a step of deceleration initiation.

In FIG. 22, a normal drive process executed in an ASIC 152 of the present variation is shown from the step of start-up of the motor 110 to the step of deceleration initiation. The difference of the normal drive process of the present variation from the normal drive process of the second embodiment (FIG. 19) is the processes executed after positive determinations respectively made in S1290 and S1300, and before S1500, i.e. the processes wherein calculations are conducted to correct a PWM increment value during driving (i.e. S1331, S1333 and S1490). Other processes are the same as the processes in the second embodiment. Thus, the same reference numbers are given to those same steps, and detailed description thereof is not repeated. The following describes only the processes different from the processes in the second embodiment.

When an encoder edge is detected (S1230:YES), nevertheless the carriage 102 has not reached either of the deceleration starting position or the braking starting position (S1280:NO), in S1290, it is determined whether or not the edge interval (enc_period) is longer than the long interval detection threshold (det_period_max). If the edge interval is determined to be longer than the long interval detection threshold (S1290: YES), in S1331, a following calculation (var=enc_period−det_period_max) is conducted. In other words, this is to obtain how much longer the edge interval is than the above threshold (det_period_max).

After the calculation, the process proceeds to S1490, and a new PWM increment value during driving is calculated with the obtained var according to the above described formula (1). As a result, a new a_param, which is larger than the previous a_param, is obtained. It is to be noted that as for the addition/subtraction part in the bracket in the right side of the formula (1), addition is conducted here.

In case a negative determination is made in S1290, and a positive determination is made in S1300, that is the edge interval (enc_period) is shorter than the short interval detection threshold (det_period_min), in S1333, a following calculation (var=enc_period-det_period_min) is conducted. This is to obtain how much shorter the edge interval is than the above threshold (det_period_min). After the calculation, the process proceeds to S1490, and a new a_param is obtained by a calculation to correct previous a_param.

In the motor control device 150 of the present variation constituted as above, the difference between a detected edge interval (enc_period) and the respective thresholds described above is calculated as var, and based on the var, a calculation is conducted to correct a PWM increment value during driving. The longer the edge interval is than det_period_max, the larger the rate of change in a PWM value becomes because a_param is corrected to be a larger value. To the contrary, the shorter the edge interval is than det_period_min, the smaller the rate of change is a PWM value becomes because a_param is corrected to be smaller value.

Thereby, corresponding to the driving status at the time of an encoder edge detection, correction of a PWM increment value (a_param) can be conducted more appropriately, and the driving target (the carriage 102 in the present variation) can be driven more stably.

[Second Variation]

In the second embodiment described above, a PWM increment value (a_param) is changed in order to change the rate of change in a PWM value. In the present variation, a_param is fixed to the PWM initial increment value (accel_param), and the PWM value renewal period Tp, wherein a PWM value is increased by accel_param, is changed.

Figure 23:
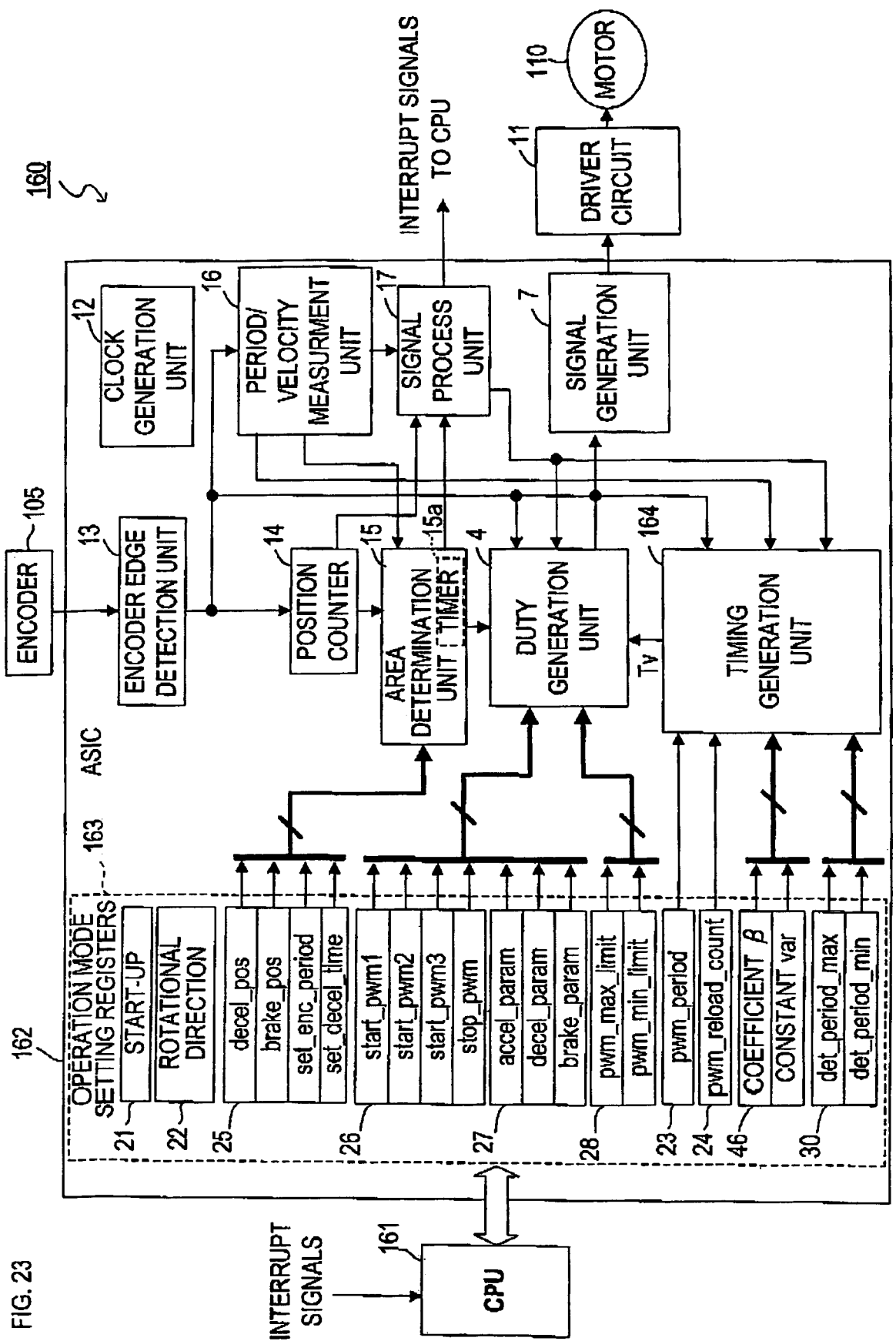
FIG. 23 is a block diagram showing a schematic structure of a motor control device of a second variation of the second embodiment.

In FIG. 23, the schematic structure of a motor control device 160 of the present variation is shown. The distinct differences of the motor control device 160 of the present variation from the motor control device 140 of the second embodiment (FIG. 14) are that a coefficient $\beta$ and correction constant var are set in the increment correction value setting registers 46 in the operation mode setting registers 163, and that based on $\beta$ and var, the timing generation unit 164 calculates a PWM value renewal period Tv (the initial value thereof is above-described Tp), and outputs the timing information to the duty generation unit 165. Other constitution is the same as the constitution of the motor control device 140 of the second embodiment. Thus, the same reference numbers are given to the same components, and detailed description thereof is not repeated here.

Figure 24:
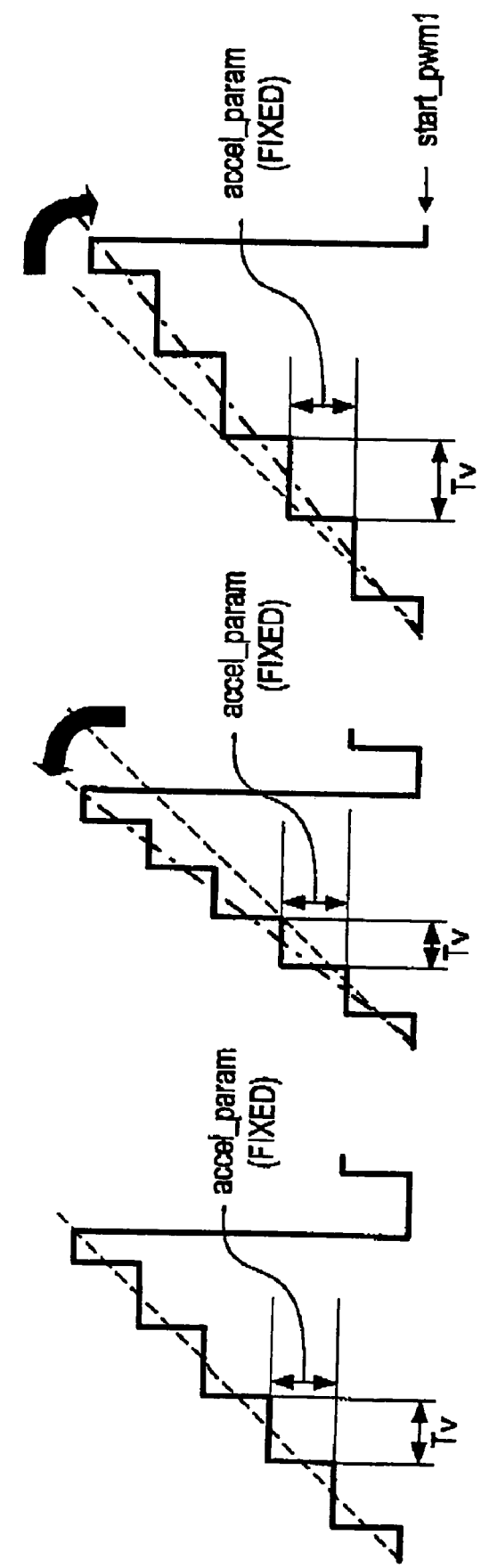
FIGS. 24A to 24C are explanatory views to describe that a rate of change in a PWM value is increased/decreased by changing a PWM increment value during driving.

FIGS. 24A to 24C furthermore describe increasing/decreasing of the rate of change in a PWM value by changing a PWM value renewal period Tv, which is the period wherein accel_param is increased. FIG. 24A shows an initial status. The PWM value renewal period Tv is set to the initial value Tp. The dotted line indicates the rate of change (slope) in a PWM value in the initial status.

When Tv is decreased from the initial statue so as to be Tv<Tp, as shown in FIG. 24B, the rate of change (slope) in the PWM value increases as shown with the chain line. When, to the contrary, Tv is increased so as to be Tv>Tp, as shown in FIG. 24C, the rate of change (slope) in the PWM value decreases as shown with the chain line.

The following formulas (2) and (3) are used for correction calculation: in order to increase/decrease a PWM value renewal period Tv, $$Tv = pwm\_peirod \ddagger (prcnt+1) \qquad (2)$$

$$prcnt = prcnt \pm int(\beta \ddagger var) \qquad (3)$$

It is to be noted that "prcnt" in the left side of the formula (3) is constant addition timing after a change, and "prcnt" in the right side thereof is constant addition timing before a change. The initial value of prcnt is pwm_reload_count as described above. The coefficient β=1, and correction constant var is an arbitrary constant. As for the addition/subtraction part in the right side of the formula (3), subtraction is conducted in order to increase the rate of change in a PWM value, and addition is conducted in order to decrease the rate of change. "Int" in the right side in the formula (3) indicates a function wherein only the integer part is valid. "Int(β‡var)" indicates the integer part of the product of "β‡var". The calculation according to the above formulas (2) and (3) are conducted in the timing generation unit 164.

Figure 25:
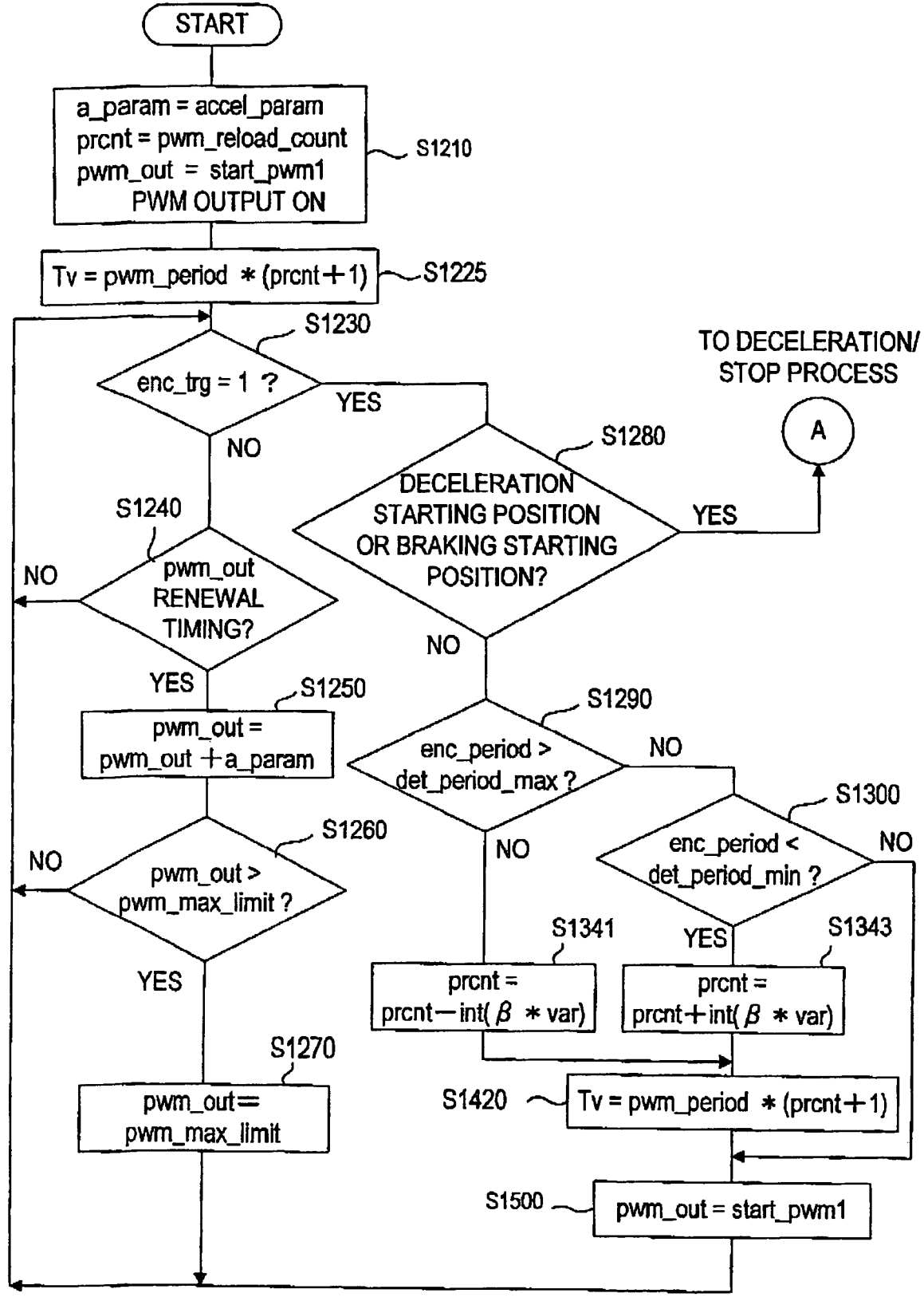
FIG. 25 is a flowchart showing an ASIC setting process executed by a CPU in the second variation of the second embodiment.

FIG. 25 shows a normal drive process executed in an ASIC 162 of the present variation from the step of start-up of the motor 110 to the step of deceleration initiation. The differences of the normal drive process of the present embodiment from the normal drive process of the second embodiment (FIG. 19) are the processes executed after positive determinations are made respectively in S1290 and S1300, and before S1600, that is the processes wherein correction calculation of a PWM value renewal period Tv are conducted (i.e. S1341, S1343 and S1420). The calculation process of S1225 is substantially the same as the process in S1220 of the second embodiment. Other processes are exactly the same as the processes in the second embodiment. The same reference numbers are given to the same processes and detailed description thereof is not repeated here. The following describes only the difference from the second embodiment.

When an encoder edge is detected (S1230:YES), nevertheless the carriage 102 has not reached either of the deceleration starting position or the braking starting position (S1280:NO), in S1290, it is determined whether or not the edge interval (enc_period) is longer than the long interval detection threshold (det_period_max). If the edge interval is determined to be longer (S1290:YES), in S1341, a calculation prcnt=prcnt-int (β‡var) is conducted.

After the calculation, the process proceeds to S1420, and a new PWM value renewal period Tv is obtained by using prcnt obtained as above according to the above-described formula (2). As a result, a new Tv which is smaller than the previous Tv is obtained.

If a negative determination is made in S1290 and a positive determination is made in S1300, that is the edge interval (enc_period) is determined to be shorter than the short interval detection threshold (det_period_min), in S1343, the calculation (prcnt=prcnt+int(β‡var)) is conducted, and the process proceeds to S1420. From this calculation, a new Tv which is larger than the previous Tv is obtained.

In the motor control device 160 of the present variation constituted as above, corresponding to a detected edge interval (enc_period), the PWM value renewal period Tv is either maintained, increased or decreased according to the above-described formulas (2) and (3). Therefore, as well as the second embodiment, the driving target (the carriage 102 in the present embodiment) can be stably driven even when load on the motor 110 changes.

[Third Variation]

In the second variation described above, by setting β=1 and var as predetermined constants, increment/decrement values to increase/decrease a PWM value renewal period Tv are respectively retained to be constant values. In the present variation, Tv is increased/decreased consecutively corresponding to the difference between an edge interval (enc_period) and respective thresholds.

Figure 26:
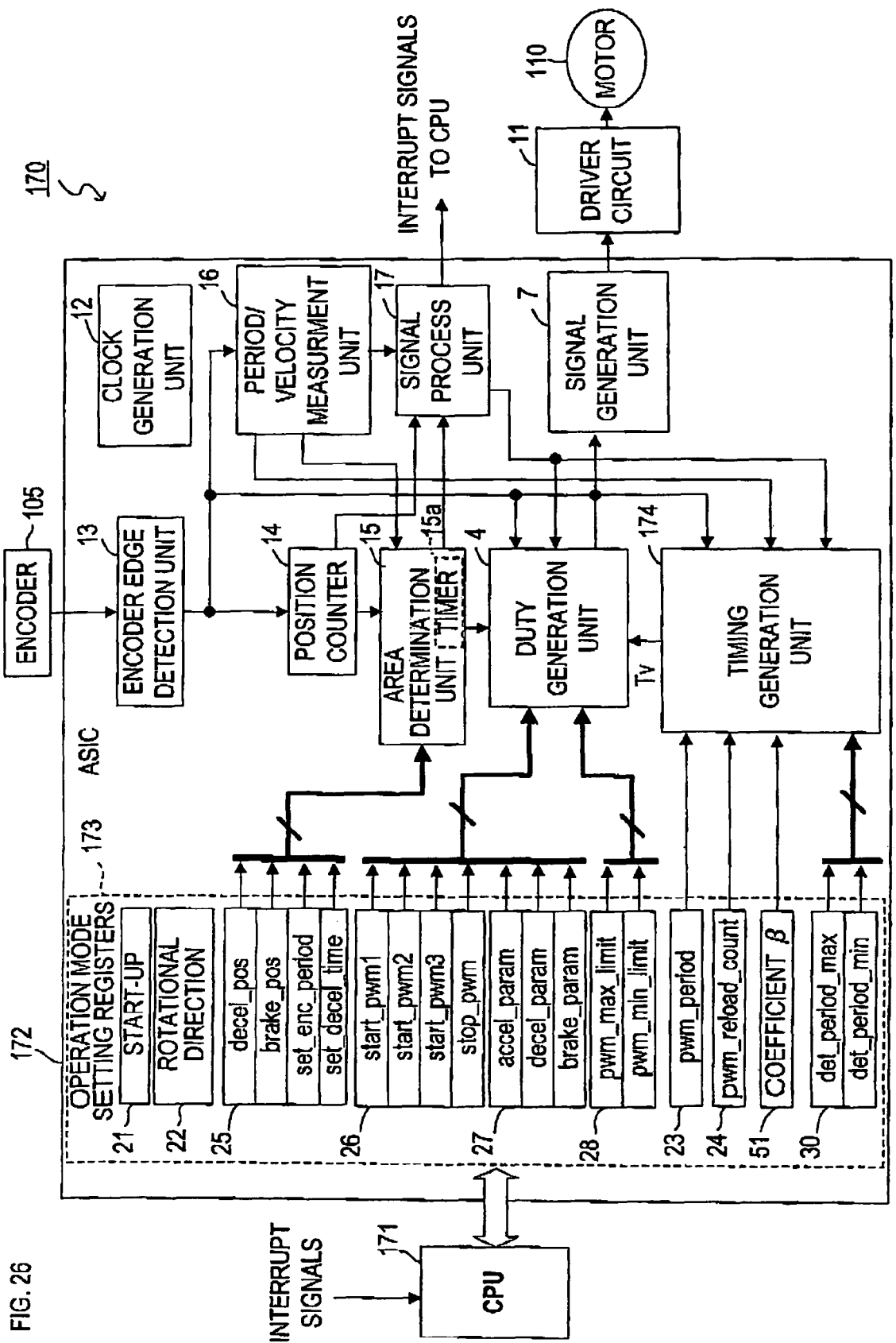
FIG. 26 is a block diagram showing a schematic structure of a motor control device of a third variation of the second embodiment.

FIG. 26 shows the schematic structure of a motor control device 170 of the present variation. The differences of the motor control device 170 of the present variation from the motor control device 160 of the second variation (FIG. 23) are that the correction constant var is not set in the increment correction value setting registers 51, but obtained from a calculation in the timing generation unit 174, and that the coefficient β is set to a predetermined coefficient wherein β>0 is maintained. Hence, a CPU 171 does not set the correction constant var in the increment correction value setting registers 51 while this setting is conducted in the second variation. Other constitution of the motor control device 170 of the present variation are basically the same as the constitution of the motor control device 160 of the second variation. The same reference numbers are given to the same components and detailed description thereof is not repeated here.

Figure 27:
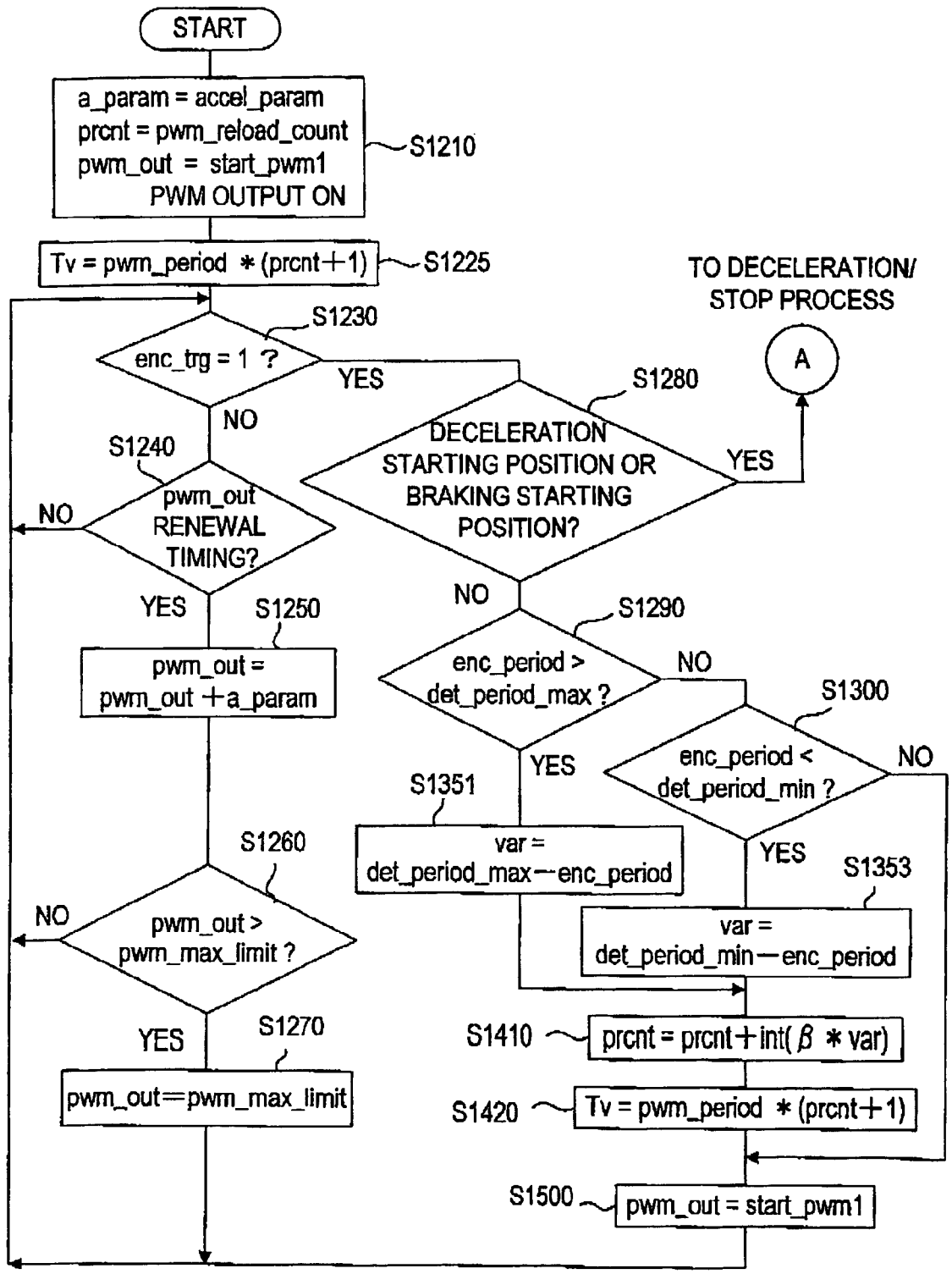
FIG. 27 is a flowchart showing a normal drive process executed in an ASIC of the third variation of the second embodiment from a step of start-up of a motor to a step of deceleration initiation.

FIG. 27 shows a normal drive process executed in the ASIC 172 of the present variation from the step of start-up of the motor 110 to the step of deceleration initiation. The difference of the normal drive process of the present variation from the normal drive process of the second variation (FIG. 25) is the processes executed after positive determinations are made respectively in S1290 and S1300, and before S1420, that is the processes wherein a calculation to correct a constant addition timing prcnt (i.e. S1351, S1353, S1410 and S1420). Other processes are exactly the same as the processes in the second variation. Thus, the same reference numbers are given to the same processes and detailed description thereof is not repeated here. The following describes the difference from the second variation.

When an encoder edge is detected (S1230:YES), nevertheless the carriage 102 has not reached either of the deceleration starting position or the braking starting position (S1280:NO), in S1290, it is determined whether or not the edge interval (enc_period) is longer than the long interval detection threshold (det_period_max). If the edge interval is determined to be longer than the long interval detection threshold (S1290: YES), in S1351, the calculation (var=det_period_max-enc_period) is conducted. In other words, the difference between the above threshold (det_period_max) and the edge interval is obtained.

After the calculation, the process proceeds to S1410, and a new constant addition timing prcnt is calculated with the obtained var according to the above-described formula (3). By conducting the calculation in S1420 with this constant addition timing prcnt, a new Tv, which is smaller than the previous Tv, is obtained. In the present variation, in the addition/subtraction part in the right side of the formula (3), addition is conducted.

If a negative determination is made in S1290 and a positive determination is made in S1300, in S1353, the calculation (var=det_period_min−enc_period). After this calculation, the process proceeds to the calculation process of S1410. Thereby, a new Tv which is larger than the previous Tv is obtained.

In the motor control device 170 of the present variation constituted as above, the difference between a detected edge interval (enc_period) and the respective thresholds described above is calculated as var, and based on the var, the calculation is conducted to correct the PWM value renewal period Tv. The longer the edge interval (enc_period) is than det_period_max, larger the rate of change in a PWM value becomes because Tv is corrected to be a smaller value. On the other hand, smaller the edge interval is than det_period_min, the smaller the rate of change in a PWM value because Tv is corrected to be a lager value.

Therefore, corresponding to the driving status at the time of encoder edge detection, the PWM value renewal period Tv is more appropriately corrected, and the driving target can be more stably driven.

[Fourth Variation]

In the respective variations described above, the rate of change in a PWM value is changed by changing either of the PWM increment value (a_param) or the PWM value renewal period Tv. In the present variation, the rate of change is changed by changing both a_param and Tv.

Figure 28:
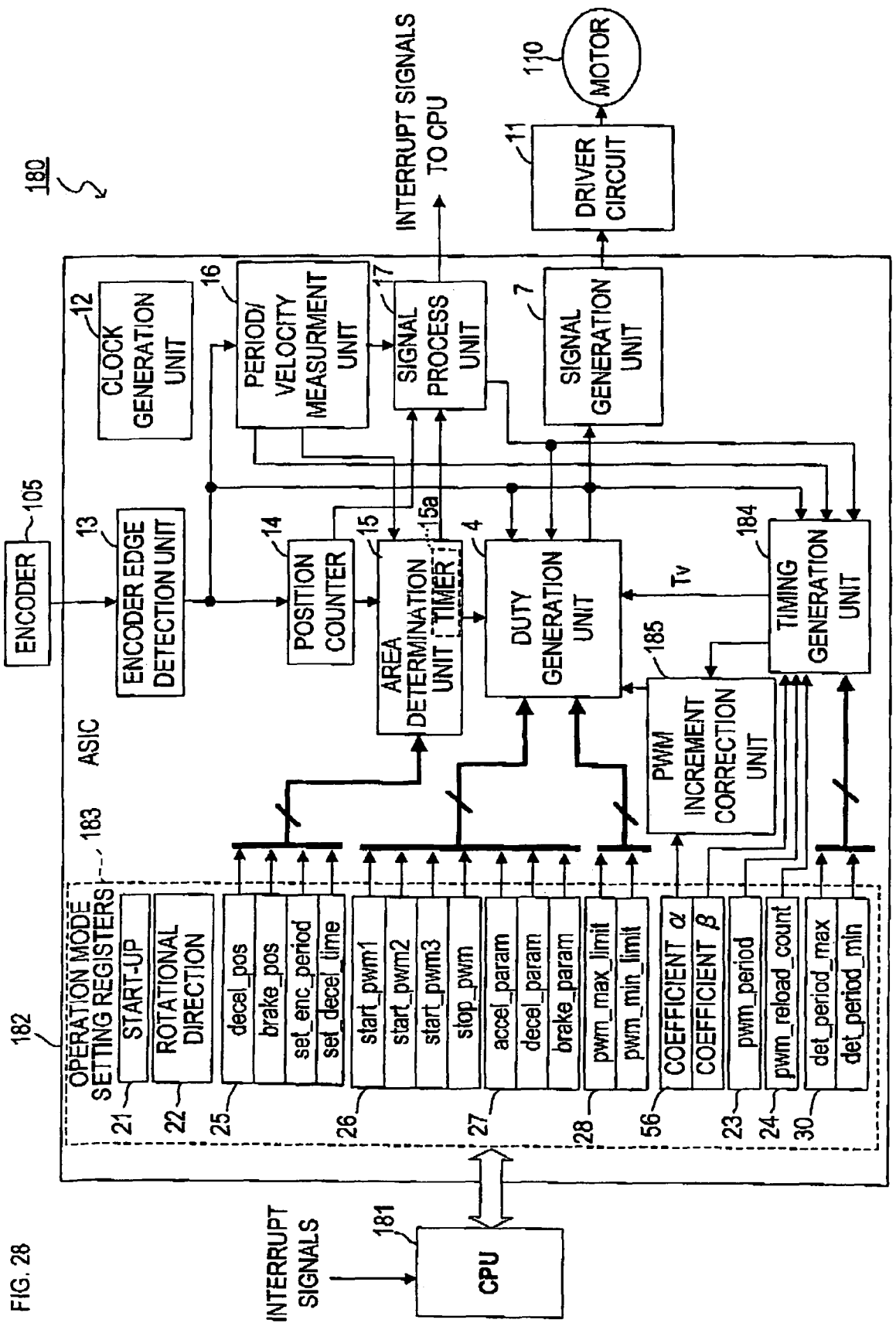
FIG. 28 is a block diagram showing a schematic structure of a motor control device of a fourth variation of the second embodiment.

FIG. 28 shows the schematic structure of a motor control device 180 of the present variation. The differences of the motor control device 180 of the present variation from the motor control device 170 of the third variation (FIG. 26) are that two coefficients α and β (α, β>0) are set in the increment correction value setting registers 56 in the operation mode setting registers 183, that the fractional part obtained from "β‡var" to calculate a PWM value renewal period Tv in the timing generation unit 184 is outputted to the PWM increment correction unit 185 as a fine correction parameter γ, and that the PWM increment correction unit 185 outputs the product of this fine correction parameter γ and the coefficient α to the duty generation unit 4 as correction data. Other constitution is the same as the constitution of the motor control device 170 of the third variation. The same reference numbers are given to the same components and detailed description thereof is not repeated here.

Figure 29:
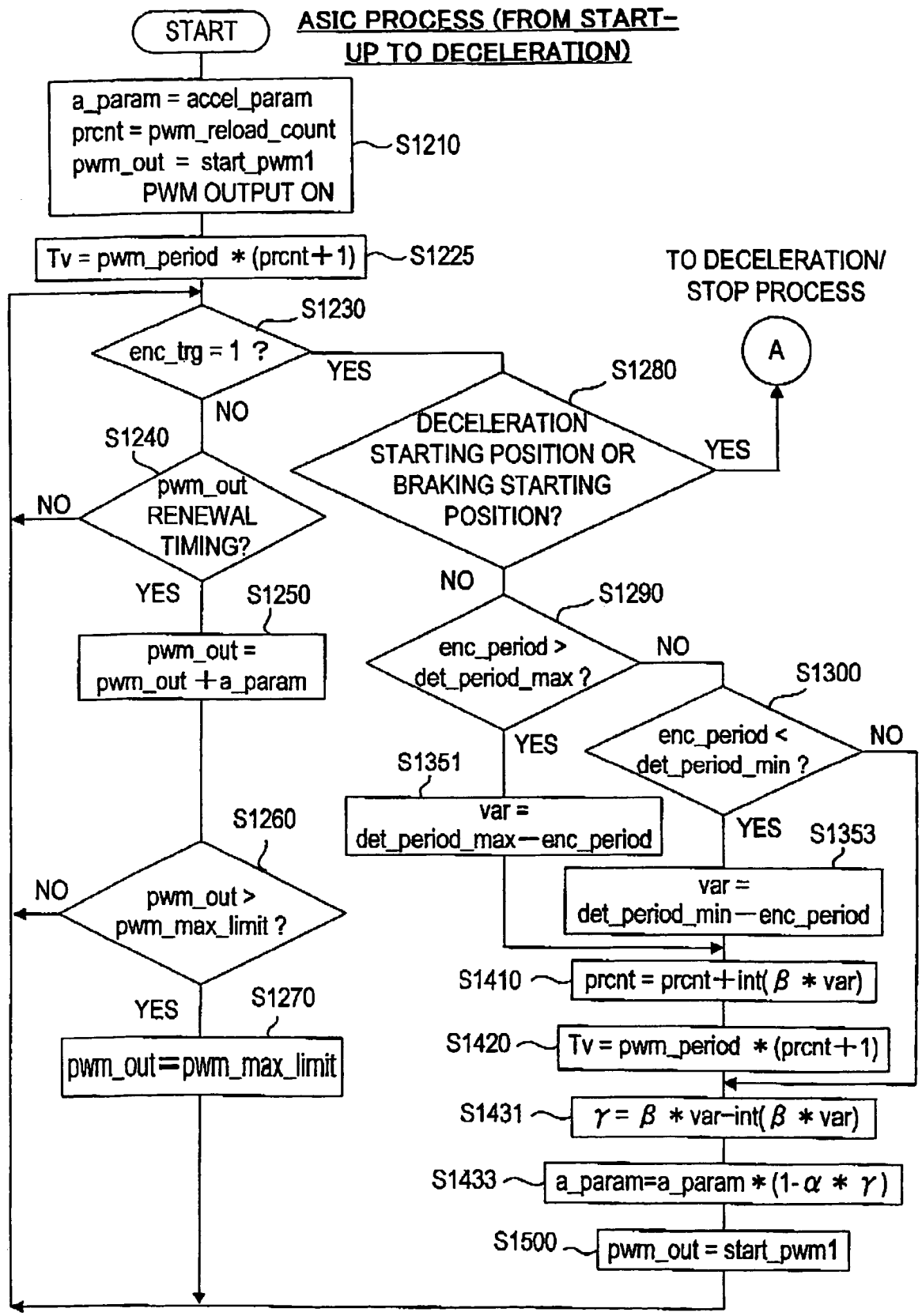
FIG. 29 is a flowchart showing a normal drive process executed in an ASIC of the fourth variation of the second embodiment from a step of start-up of a motor to a step of deceleration initiation.

FIG. 29 shows a normal drive process executed in an ASIC 182 of the present variation from the step of start-up of the motor 110 to the step of deceleration initiation. The difference of the normal drive process of the present variation from the normal drive process of the third variation (FIG. 26) is that the processes of S1431 and S1433 are newly added between the Tv calculation process in S1420 and the PWM value reset process in S1500. Other processes are exactly the same as the processes in the third variation. The same reference numbers are given to the same steps and detailed description is not repeated here. The following describes only the difference.

When a new PWM value renewal period Tv is calculated in S1420, the timing generation unit 184 outputs timing signals to increase a PWM value in the calculated period Tv to the duty generation unit 4. By a calculation (γ=β‡var−int (β‡var)), the fractional part of "β‡var" is obtained as a fine correction parameter γ, and inputted into the PWM increment correction unit 185.

Subsequently, in S1483, a new a_param is obtained from a_param‡(1−α‡γ) with the current a_param. This calculation is conducted in the duty generation unit 4, however, the multiplication of "α‡γ" is conducted in the PWM increment correction unit 185.

A correction result of a PWM value renewal period Tv obtained in the motor control device 180 of the present variation constituted as above seems to be the same as a correction result obtained in the motor control device 170 of the third variation, and the fractional part of "β‡var" is not reflected thereto. However, the fractional part is reflected to the result when the PWM value increment value (a_param) is corrected. That is, insufficient correction in Tv is compensated by the correction of a_param. If a_param and Tv can be both corrected, it is possible to increase a PWM value more smoothly (little by little), compared to a case wherein only one of a_param or Tv is corrected. Therefore, corresponding to the driving status at the time of encoder edge detection, the rate of change in a PWM value can be more appropriately corrected (changed), and the driving target can be more stably driven.

[Fifth Variation]

The above-described fourth variation showed an example wherein the rate of change in a PWM value can be changeable by changing both a PWM increment value (a_param) and a PWM value renewal period Tv. A motor control device (not shown) of the present variation is constituted the same and capable of changing both a_param and Tv.

However, in the present variation, the rate of change in a PWM value is changed basically by changing only the PWM value renewal period Tv. If Tv obtained from correction calculation is shorter than a predetermined time (for example, 1 msec.), Tv is not set to the value obtained from the calculation, alternatively set to the predetermined time 1 msec., and correct a_param to attain generally appropriate change in the rate. The following explains the reason why Tv is not set to a value smaller than a predetermined time.

When a driving target is driven by a motor, generally there is delay in change of operation amount (in the present embodiment, a PWM value) to be reflected to the movement of the driving target, because of influence from time constant of the motor, inertia of the driving target, mechanisms such as a gear and a spring, and others. If the minimum time, necessary for torque corresponding to some operation amount to be transferred to the driving target after the operation amount is outputted, is 1 msec., the PWM value renewal period Tv needs to be equal to or longer than 1 msec. Hence, when a result of correction calculation becomes shorter than 1 msec. due to an increase of load on the motor, if Tv smaller than 1 msec. is used, the driving target cannot be stably controlled.

Therefore in the present variation, when Tv becomes smaller than 1 msec., Tv is set to the minimum permissible value 1 msec., and a_param is corrected to compensate the inadequate correction in Tv.

Figure 30:
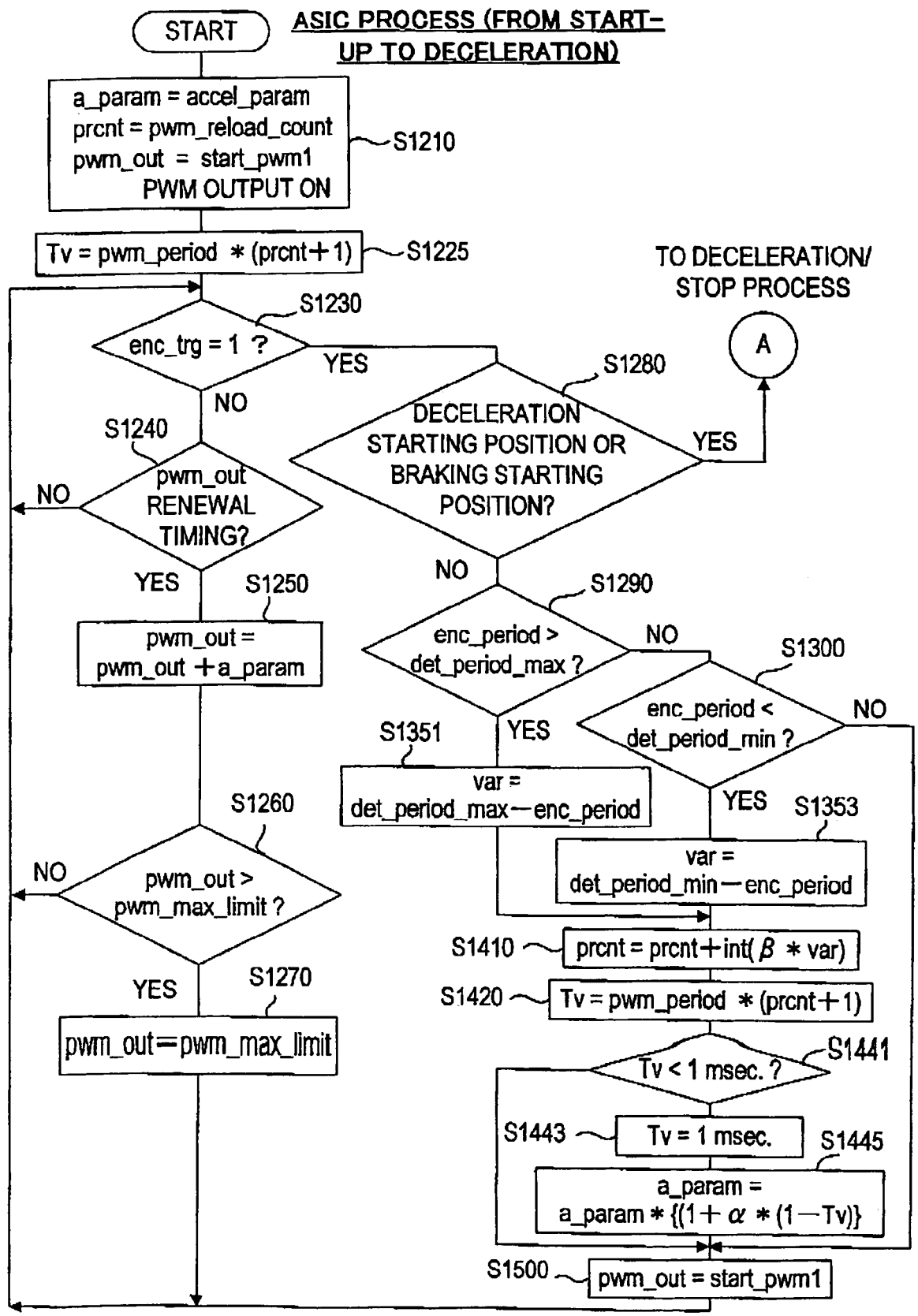
FIG. 30 is a flowchart showing a normal drive process executed in an ASIC of the fifth variation of the second embodiment from a step of start-up of a motor to a step of deceleration initiation

A specific calculation method is shown in a normal drive process in FIG. 30. The difference of the normal drive process in FIG. 30 from the normal drive process of the fourth variation (FIG. 20) is the processes executed after Tv calculation in S1420. In the present variation, after Tv is calculated in S1420, in S1441, it is determined whether or not the calculated Tv is shorter than 1 msec. If Tv is equal to or longer than 1 msec. (S1441:NO), the process proceeds directly to S1500, and a_param is not corrected. If Tv is shorter than 1 msec.

(S1441:YES), in S1443, Tv is set to 1 msec., and a_param is corrected in the subsequent step S1445 according to a following formula (4).

$$a\_param = a\_param_i^* \{1 + \alpha_i^\ddagger (1-Tv)\} \quad (4)$$

If, for example, Tv actually obtained is 0.8 msec., the difference between the obtained Tv (0.8 msec.) and preset Tv (1 msec.) is 0.2 msec. This difference is compensated by correcting a_param according to the above formula (4).

According to the present variation, when correction in Tv reaches the limit, a_param is corrected. Therefore, the rate of change in a PWM value is more appropriately corrected (changed), and the driving target can be more stably driven.

In the present variation, when Tv obtained from correction calculation is equal to or longer than 1 msec., a_param is not changed but only Tv is changed. However, it is also possible to conduct a fine correction in a_param with the fractional part of "β‡var", such as in the above described fourth variation, even when Tv is equal to or longer than 1 msec.

[Sixth Variation]

In the respective variations described above, the rate of change in a PWM value is changed, that is a_param or Tv is corrected, corresponding to an edge interval (enc_period). In the present variation, a_param is corrected based on the PWM value at the time of encoder edge detection, and thereby the rate of change is changed.

Figure 31:
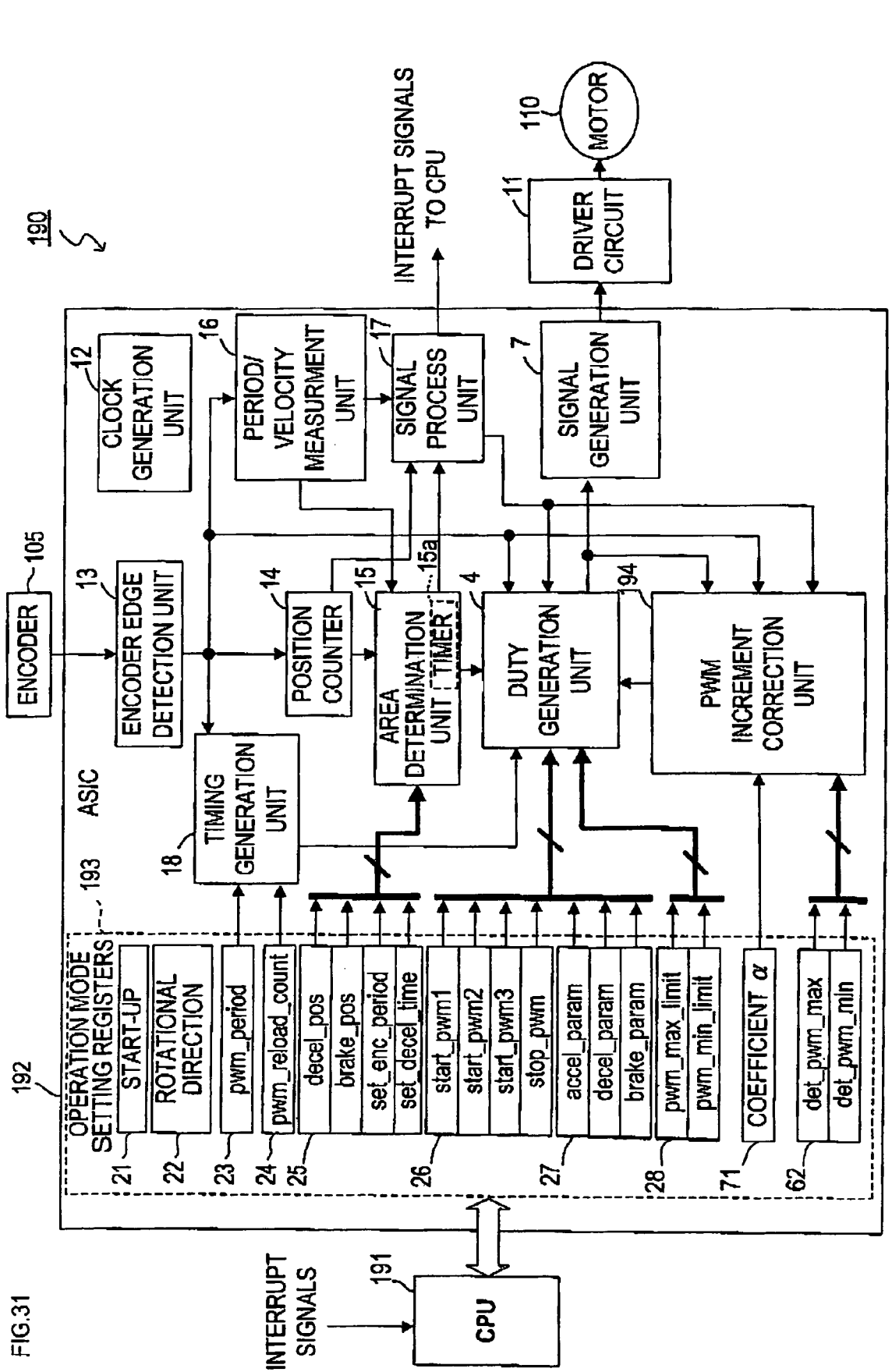
FIG. 31 is a block diagram showing a schematic structure of a motor control device of a sixth variation of the second embodiment.

FIG. 31 shows the schematic structure of a motor control device 190 of the present variation. The differences of the motor control device 190 of the present variation from the motor control device 150 of the first variation (FIG. 21) are that a duty threshold setting register 62 is provided in the operation mode setting registers 193, and a high PWM duty detection threshold (det_pwm_max) and a low PWM duty detection threshold (det_pwm_min) are respectively set therein, and that a PWM value (pwm_out) inputted from the duty generation unit 4 into the signal generation unit 7 is also inputted into the PWM increment correction unit 194. Other constitution is basically the same as the constitution of the motor control device 150 of the first variation. The same reference numbers are given to the same components and detail description thereof is not repeated here.

Controlling the motor 110 in the motor control device 190 of the present variation is going to be described below based on FIGS. 32 and 38. FIG. 82 shows an example of control wherein load on the motor 110 increases. FIG. 33 shows an example of control wherein the load on the motor 110 decreases.

Figure 32:
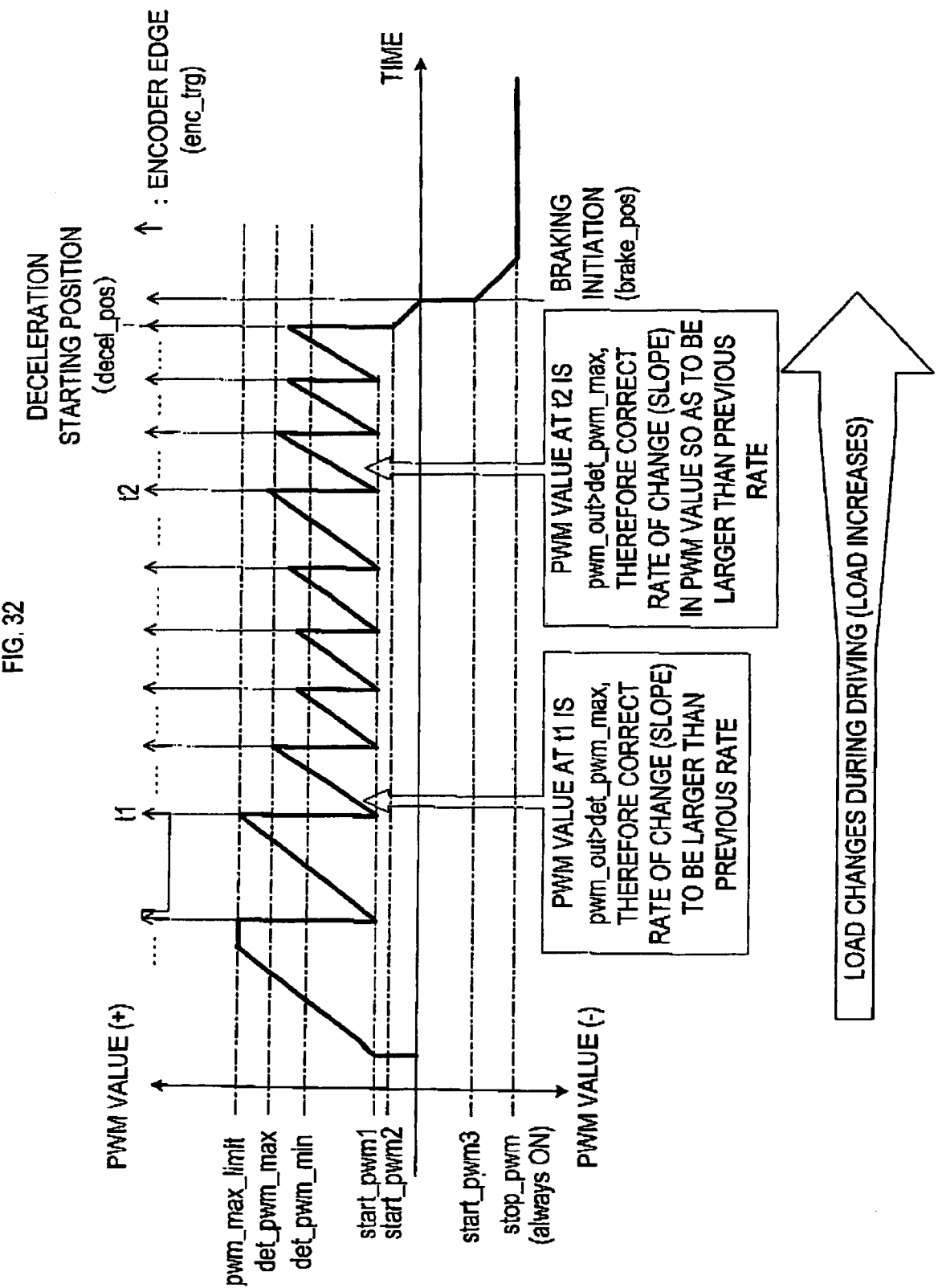
FIG. 32 is a time chart showing an example of control in the motor control device of the sixth variation of the second embodiment wherein load on a motor increases.
Figure 33:
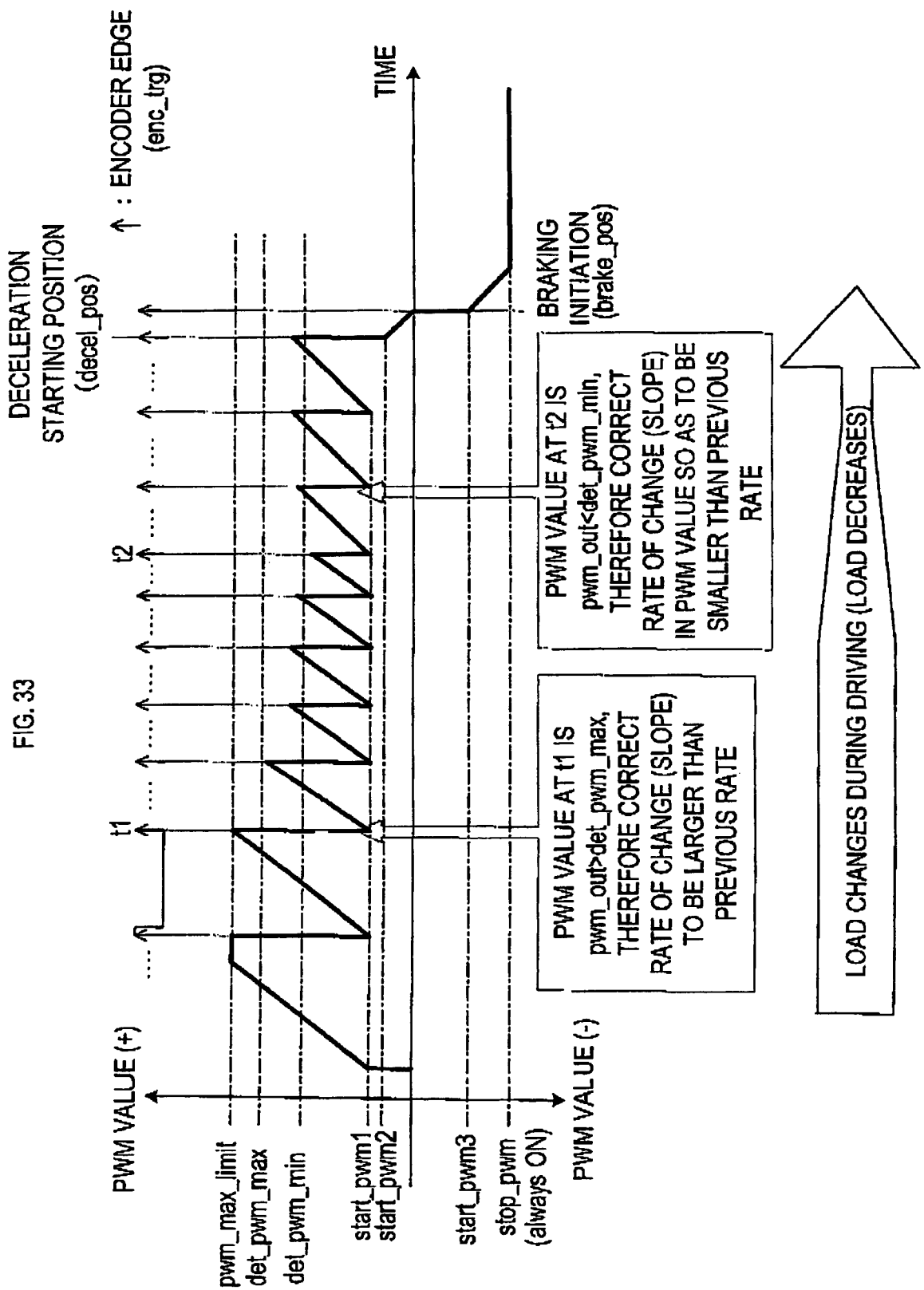
FIG. 33 is a time chart showing an example of control in the motor control device of the sixth variation of the second embodiment wherein the load on a motor decrease.

In the control example of FIG. 32, correction calculation is conducted in a_param from second edge detection after driving initiation. A determination whether or not previous a_param should be corrected is made based on the PWM value (pwm_out) at the time of the edge detection.

Specifically, at the time of the second encoder edge detection after drive initiation (time t1) in FIG. 32, the PWM value (pwm_out) is larger than the high PWM duty detection threshold (det_pwm_max). The rate of change in the PWM value is increased by increasing a_param. After time t1, the PWM value is maintained the level lower than det_pwm_max at the time of edge detection for a while. When the PWM value becomes larger than det_pwm_max at time t2 due to increase in the load on the motor 110, a_param is furthermore increased to increase the rate of change in the PWM value.

Another control example wherein the load on the motor 110 decreases is going to be described based on FIG. 33. In this example, motor control until the encoder edge is detected immediately before time t2 is the same as the motor control described in FIG. 32, and detailed description thereof is not repeated here.

At around time t1, the load is gradually decreased. Consequently, the driving velocity becomes faster and the PWM value at the time of encoder edge detection becomes smaller. At the time of encoder edge detection at time t1, the PWM value is smaller than det_pwm_min. The rate of change in the PWM value is decreased by decreasing a_param.

Figure 34:
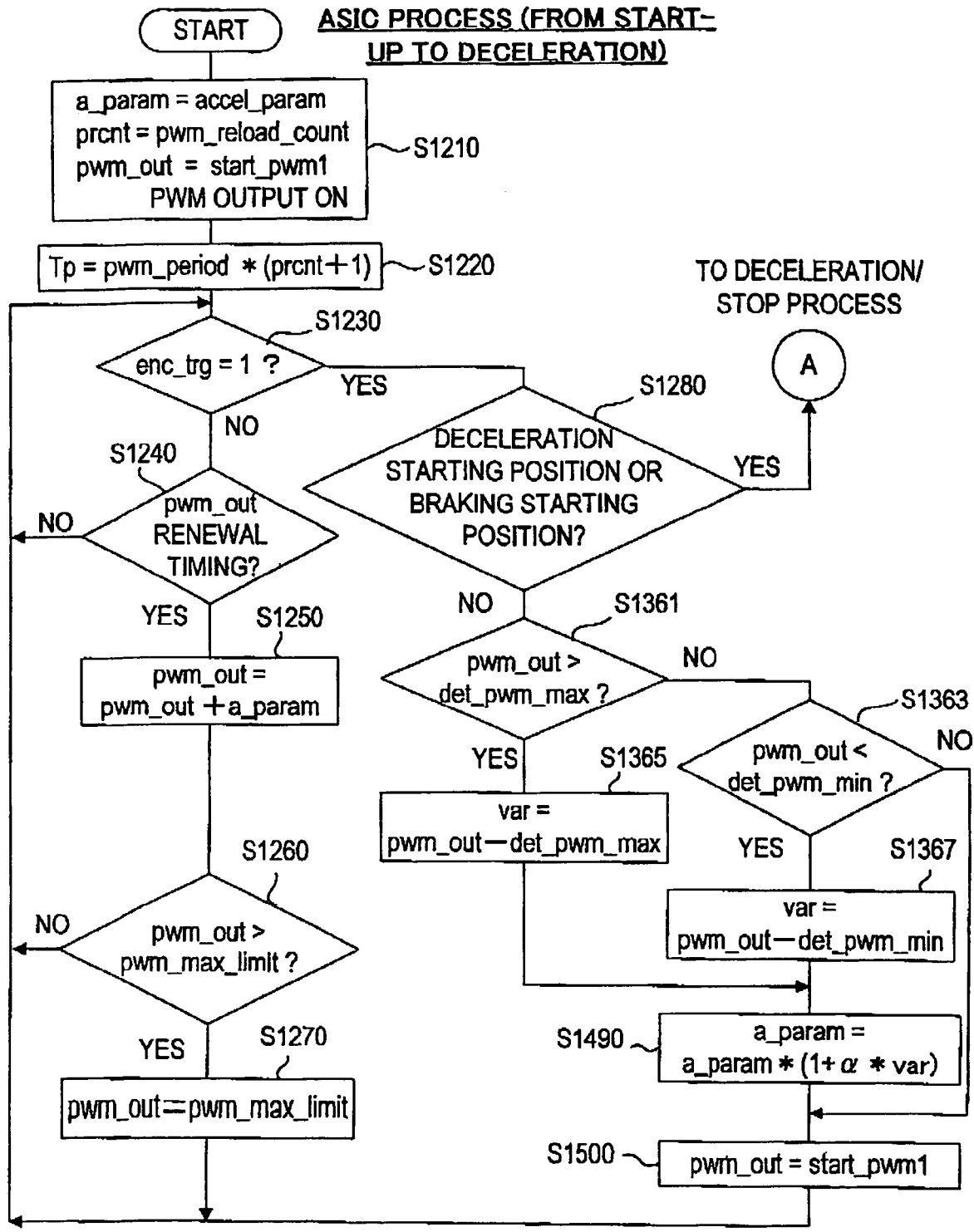
FIG. 34 is a flowchart showing a normal drive process executed in an ASIC of the sixth variation of the second embodiment from a step of start-up of a motor to a step of deceleration initiation.

FIG. 34 shows a normal drive process executed in an ASIC 192 of the present variation. The difference of the normal drive process of the present variation from the normal drive process of the first variation (FIG. 22) is the processes executed after a negative determination is made in S1280 and before the process in S1490 wherein correction calculation of a_param is conducted. Other processes are the same as the processes in the first variation. The same reference numbers are given to the same steps and detailed description thereof is not repeated here.

As shown in FIG. 84, after a negative determination is made in S1280, in S1361, it is determined whether or not the PWM value (pwm_out) at the time of edge detection is larger than det_pwm_max. If the PWM value is larger (S1361:YES), the process proceeds to S1366 and the difference between pwm_out and det_pwm_max is calculated as var.

If pwm_out is equal to or smaller than det_pwm_max (Sl361:NO), the process proceeds to S1363 and it is determined whether or not pwm_out is smaller than det_pwm_min. If pwm_out is equal to or larger than det_pwm_min (S1363:NO), the process proceeds directly to S1500. If pwm_out is smaller (Sl363:YES), the process proceeds to Sl367 and the difference between pwm_out and det_pwm_min is calculated as var.

In the correction calculation of a_param in S1490, new a_param is calculated by using var obtained either from S1365 or Sl367 described above.

According to the motor control device 190 of the present variation constituted as above, a_param is changed, and furthermore the rate of change in a PWM value is changed, corresponding to the PWM value at the time of edge detection. Therefore, even when load on the motor 110 changes, the driving target can be stably driven.

[Seventh Variation]

In the second embodiment and the first to fifth variations described above, the rate of change in a PWM value is changed based on an edge interval (enc_period), and in the above-described sixth variation, the rate of change in a PWM value is changed based on the PWM value at the time of edge detection. In the present variation, the rate of change in a PWM value is changed based on the velocity of the driving target (enc_velocity) at the time of edge detection.

FIG. 85 shows the schematic structure of a motor control device 200 of the present variation. The differences of the motor control device 200 of the present variation from the motor control device 150 of the first variation (FIG. 21) are that a velocity threshold setting register 67 is provided in the operation mode setting registers 203, and a high driving velocity detection threshold (micro_velo_max) and a low driving velocity detection threshold (micro_velo_min) are respectively set therein, and that the driving velocity (enc_velocity) obtained from the period/velocity measurement unit 16 and the respective thresholds described above are compared, and correction data corresponding to a result of the comparison is outputted to the duty generation unit 4. Other constitution is basically the same as the constitution of the motor control device 150 of the first variation. The same reference numbers are given to the same components and detailed description thereof is not repeated here.

Figure 36:
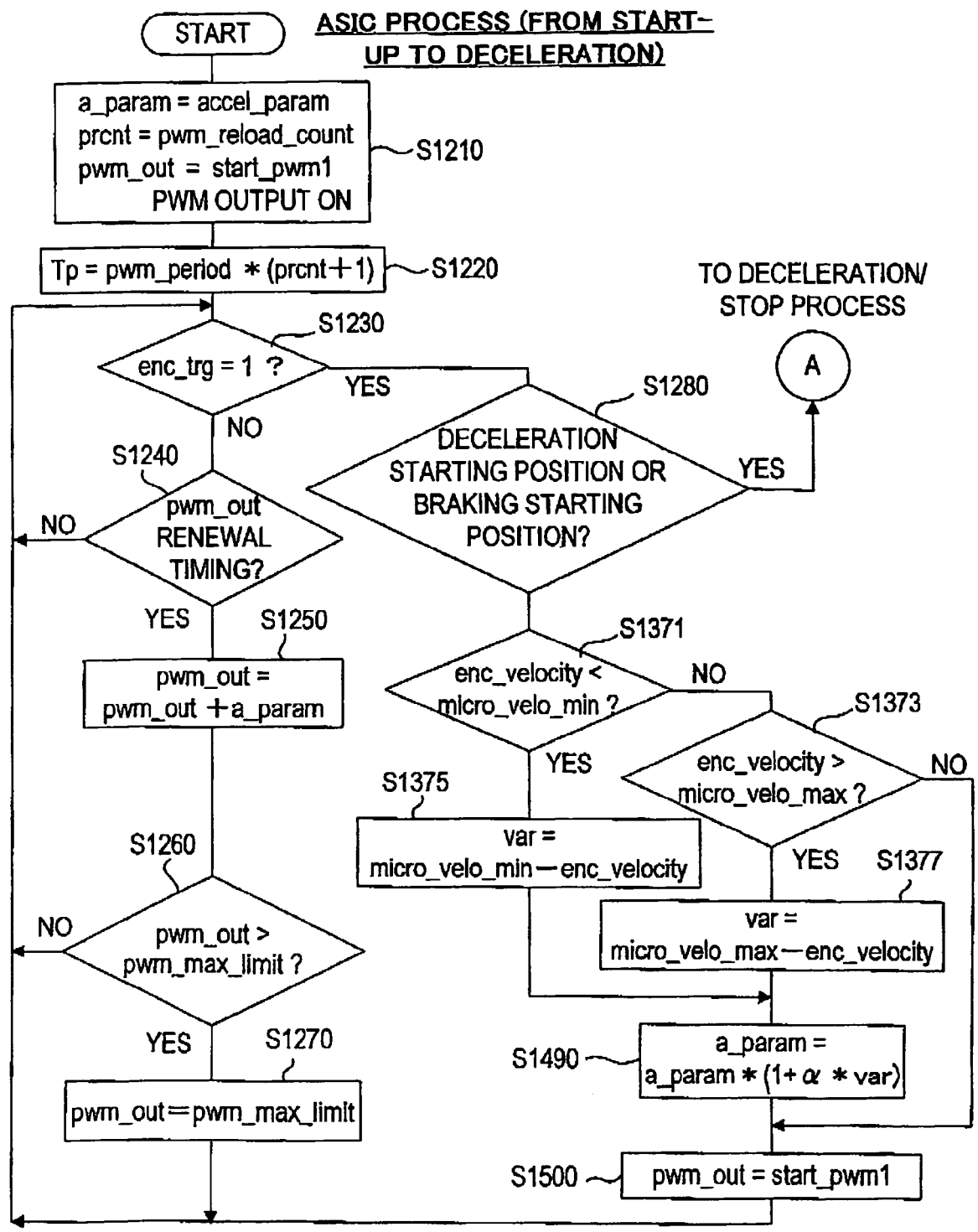
FIG. 36 is a flowchart showing a normal drive process executed in an ASIC of the seventh variation of the second embodiment from a step of start-up of a motor to a step of deceleration initiation.

FIG. 36 shows a normal drive process executed in an ASIC 202 of the present variation. The difference of the normal drive process of the present variation from the normal drive process of the first variation (FIG. 22) is the processes executed after a negative determination is made in S1280 and before the process wherein correction calculation of a_param is conducted in S1490. Other processes are the same as the processes of the first variation. The same reference numbers are given to the same steps and detailed description thereof is not repeated here.

Figure 35:
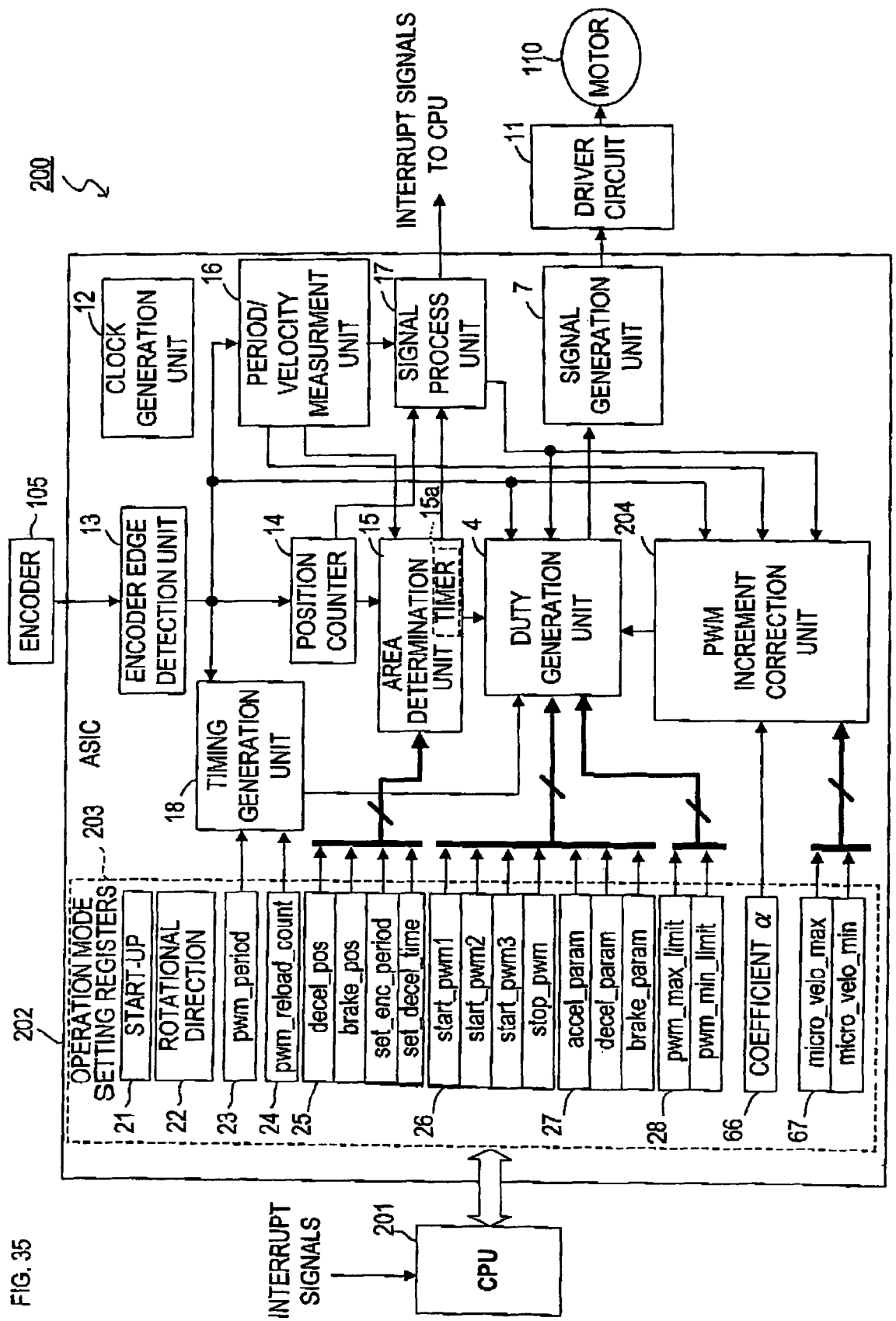
FIG. 35 is a block diagram showing a schematic structure of a motor control device of a seventh variation of the second embodiment.

As shown in FIG. 35, when a negative determination is made in S1280, in S1371, it is determined whether or not the driving velocity at the time of edge detection (enc_velocity) is smaller than micro_velo_min. If enc_velocity is determined to be smaller than micro_velo_min (S1371:YES), the process proceeds to S1375, and the difference between micro_velo_min and enc_velocity is calculated as var.

If enc_velocity is determined to be equal to or larger than micro_velo_min (S1371:NO), the process proceeds to S1373 and it is determined whether or not enc_velocity is larger than micro_velo_max. If enc_velocity is determined to be equal to or smaller than micro_velo_max (S1373:NO), the process proceeds directly to S1500. If enc_velocity is determined to be larger than micro_velo_max (S173:YES), in S1377, the difference between micro_velo_max and enc_velocity is calculated as var.

Subsequently, in S1490, new a_param is obtained by correction calculation with var obtained either from S1375 or S1377.

According to the motor control device 200 of the present variation constituted as above, a_param is changed and furthermore the rate of change in a PWM value is changed corresponding to the driving velocity at the time of edge detection. Therefore, even when the load on the motor 110 changes, the driving target can be stably driven.

[Other Variations]

Figure 37:
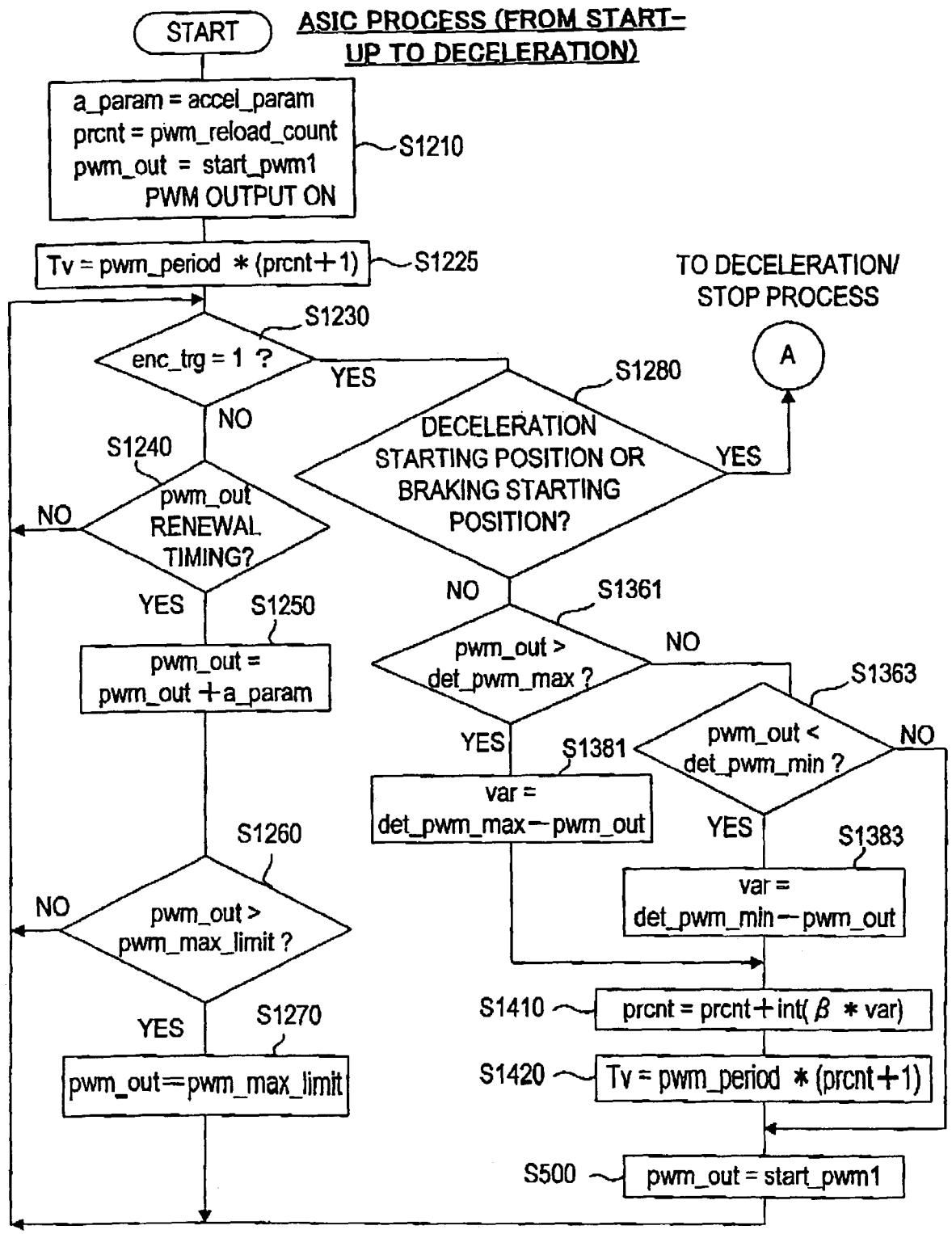
FIG. 37 is a flowchart showing a normal drive process executed in an ASIC of another variation.

In the above-described third variation, the rate of change in a PWM value is changed by changing a PWM value renewal period Tv based on an edge interval (enc_period) at the time of encoder edge detection. It is also possible, as shown in FIG. 37, to change Tv based on the PWM value (pwm_out) at the time of encoder edge detection. Moreover, it is also possible, as shown in FIG. 38, to change Tv based on the driving velocity (enc_velocity) at the time of encoder edge detection.

FIG. 37 shows a normal drive process wherein Tv is changed based on the PWM value (pwm_out) at the time of encoder edge detection. S1290, S1300, S1351 and S1353 of the normal drive process of the third variation (FIG. 27) are replaced with S1361, S1363, S1381 and S1383.

In other words, if pwm_out is larger than det_pwm_max at the time of an edge detection (S1361:YES), in S1381, the difference between det_pwm_max and pwm_out is set as var. If pwm_out is smaller than det_pwm mix (S1363:YES), in S1388, var is set to the difference between det_pwm_min and pwm_out.

Figure 38:
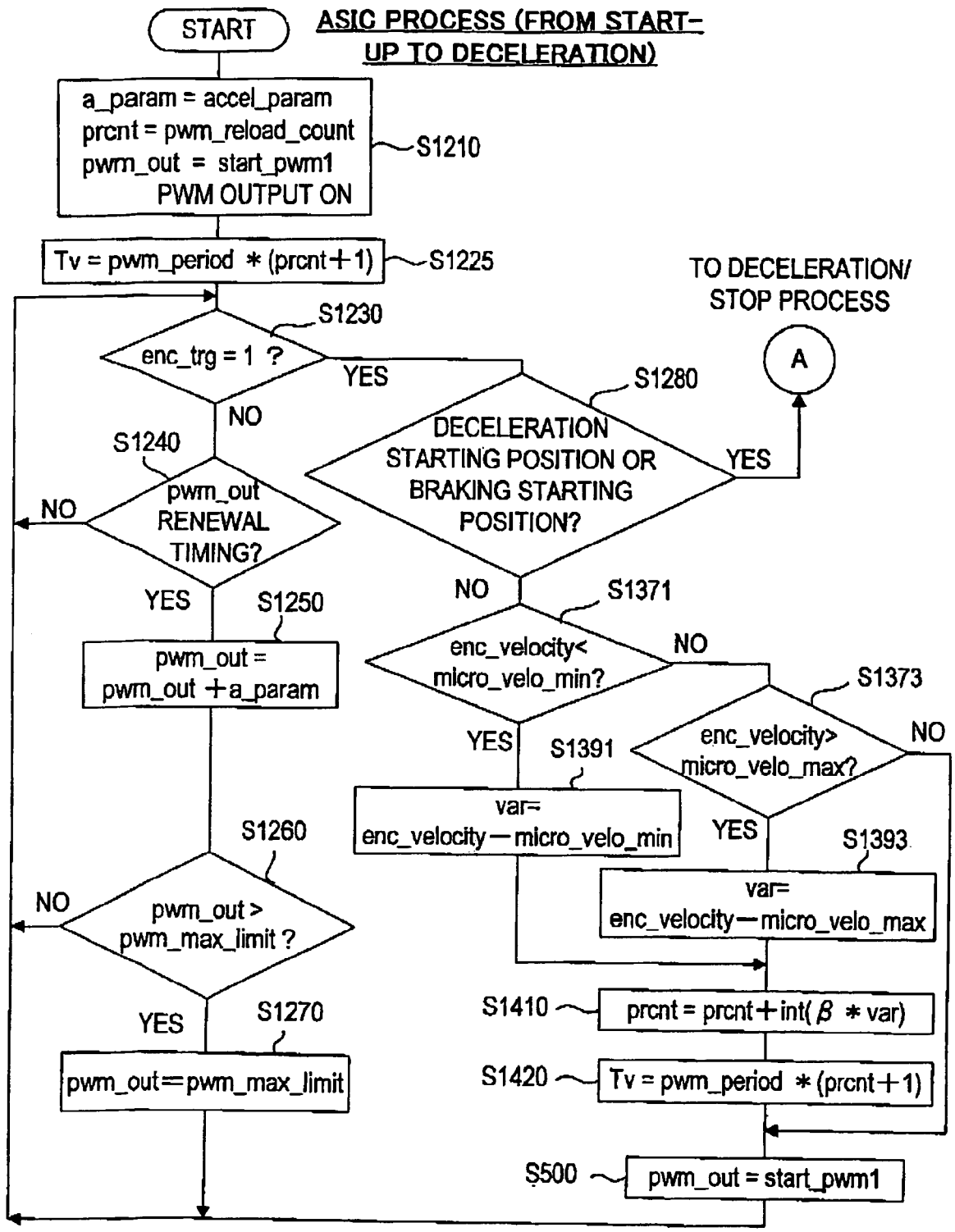
FIG. 38 is a flowchart showing a normal drive process executed in an ASIC of some other variation.

FIG. 38 shows a normal drive process wherein Tv is changed based on the driving velocity (enc_velocity) at the time of an encoder edge detection. S1290, S1300, S1351 and S1353 of the normal drive process of the third variation (FIG. 26) are respectively replaced with S1371, S1373, S1391 and S1398.

That is, if enc_velocity is smaller than micro_velo_min (S1371:YES), in S1391, var is set to the difference between enc_velocity and micro_velo_min. If enc_velocity is larger than micro_velo_max (S1373:YES), in S1393, var is set to the difference between enc_velocity and micro_velo_max.

As described above, a PWM value renewal period Tv can be changed based on the PWM value (pwm_out) or the driving velocity (enc_velocity) at the time of an encoder edge detection.

Moreover, in the above-described second embodiment, previous a_param is increased/decreased in order to change (increase/decrease) a_param by certain amount based on an edge interval (enc_period). It is also possible, for example, to simply predetermine three types of PWM increment values (accel_param, accel_param1, and accel_param2) during driving, and to switch to one of the increment values corresponding to an edge interval (enc_period). A specific example of this process is shown in FIG. 89. The steps shown in FIG. 39 correspond to the steps of the normal drive process in FIG. 19 enclosed in the dotted line. By replacing the part enclosed in the dotted line in FIG. 19 with the part enclosed in the dotted line in FIG. 39, the above-described process wherein the three types of PWM increment values are switched can be achieved. Meanwhile, in the present variation, the relation accel_param1<accel_param<accel_param2 is maintained.

Specifically as shown in FIG. 89, if enc_period is longer than det_period_max (S1290:YES), in S1401, accel_param2 is set as a_param. If enc_period is shorter than det_period_min (S1300:YES), in S1402, a_param is set to accel_param. In other cases (S1300:NO), in S1403, a_param is set to accel_param (i.e. the initial value described above).

In the second variation described above, a PWM value renewal period Tv is changed by increasing/decreasing previous constant addition timing prcnt. It is also possible, as shown in FIG. 40, simply to predetermine three types of constant addition timing (pwm_reload_count, pwm_reload_count1, and pwm_reload_count2) and Tv is switched to one of these timing.

Figure 39:
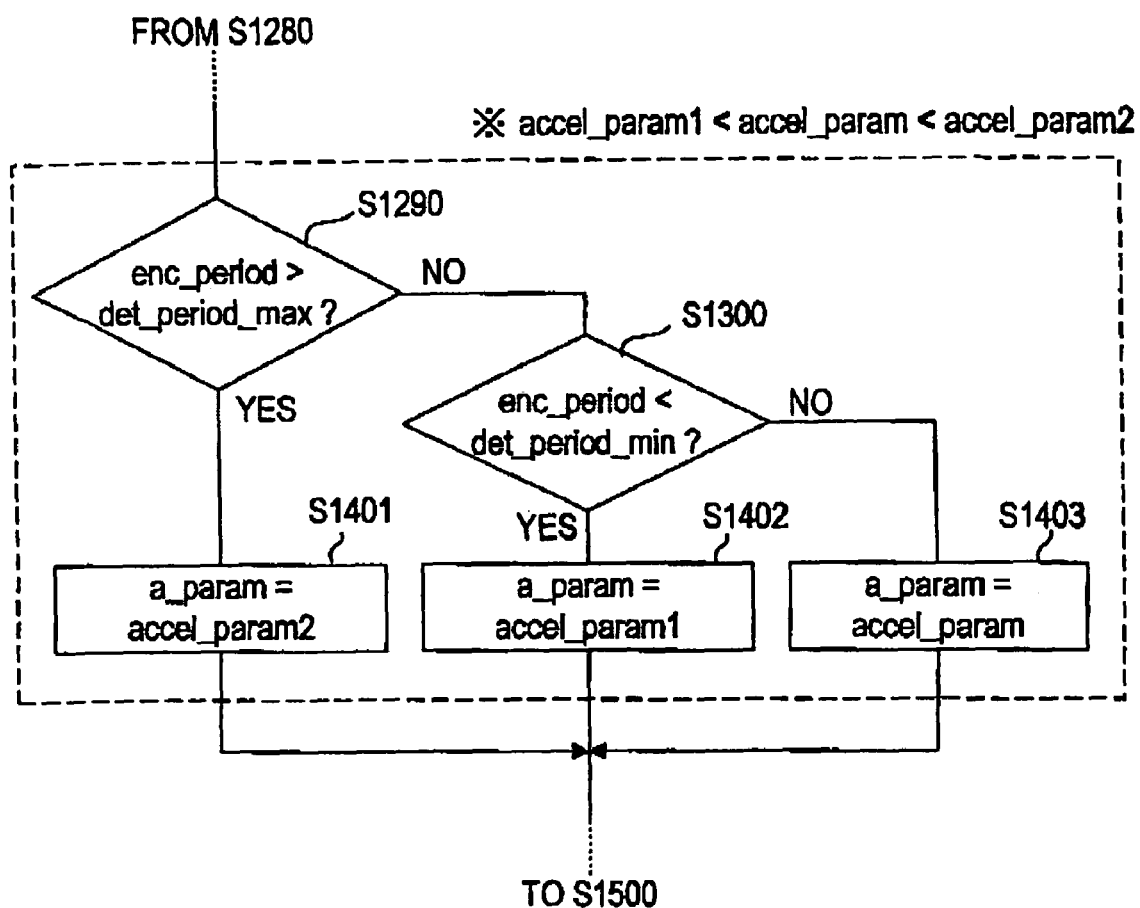
Figure 40:
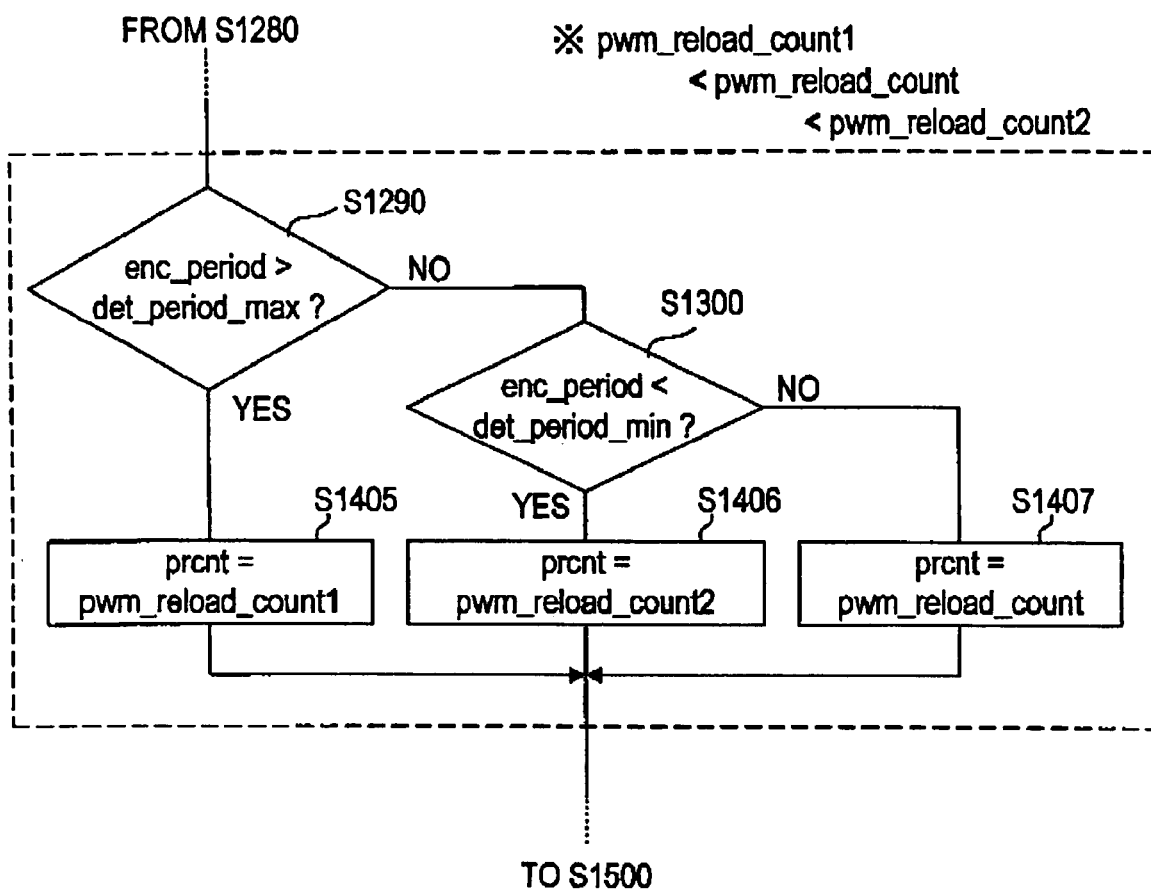
FIG. 40 is a flowchart showing a normal drive process executed in an ASIC of other further variation.

As well as in FIG. 39, the steps shown in FIG. 40 correspond to the steps of the normal drive process in FIG. 19 enclosed in the dotted line. By replacing the part enclosed in the dotted line in FIG. 19 to the part enclosed in the dotted line in FIG. 40, the above-described process wherein constant addition timing is switched to one of the above-described three types of constant addition timing can be achieved. In the present variation, the relation pwm_reload_count1<pwm_reload_count1<pwm_reload_count2 is maintained.

Both of the variations wherein the three types of a_param are switched (FIG. 39) and wherein the three types of prcnt are switched (FIG. 40) can be obviously applied to a control method wherein the rate of change is changed based on the PWM value (pwm_out) at the time of an encoder edge detection, or a control method wherein the rate of change is changed based on the driving velocity (enc_velocity) at the time of an encoder edge detection.

Moreover, the control method, described in the fourth and fifth variations, wherein the rate of change in a PWM value is changed by changing both a_param and Tv, can also be applied to control methods wherein the rate of change is changed based on the PWM value at the time of an encoder edge detection, or wherein the rate of change is changed based on the driving velocity (enc_velocity) at the time of an encoder edge detection.

Furthermore, in the respective variations described above, the rate of change in a PWM value is changed by increasing/decreasing the rate by constant amount, or by changing the rate consecutively corresponding the driving status (enc_period or pwm_out etc.) at the time of encoder edge detection. It is also possible to change the rate gradually corresponding to the driving status at the time of encoder edge detection.

Third Embodiment

Figure 41:
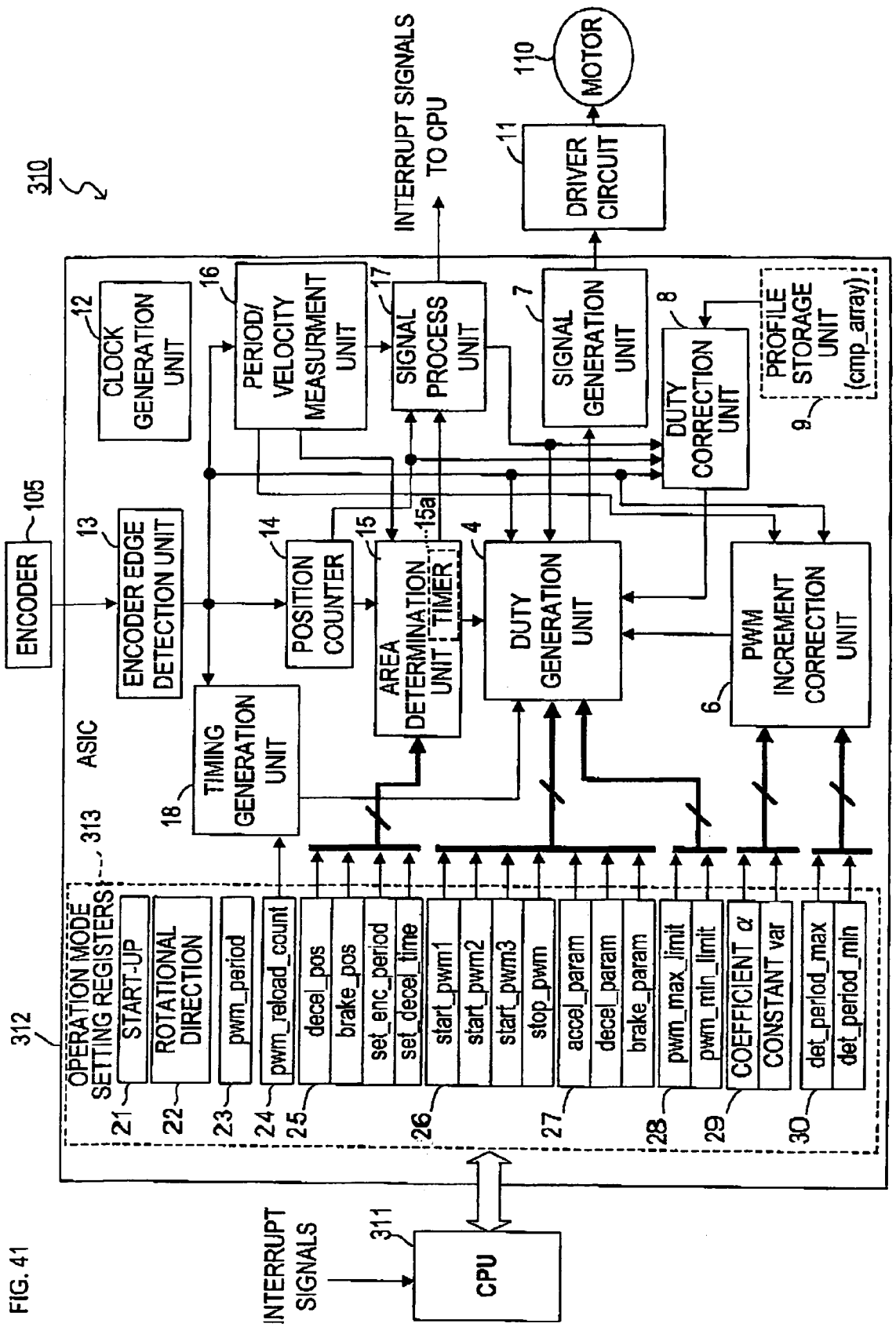
FIG. 41 is a block diagram showing a schematic structure of a motor control device according to a third embodiment.

FIG. 41 shows a schematic structure of a motor control device 810 of the present embodiment. In the present embodiment, in order to control the motor 110 (and further controlling the carriage 102) upon capping, correction data (hereinafter, referred to as "initial PWM value") for changing the start PWM value (start_pwm1) into a proper value is set in advance in accordance with the position of the carriage 102 (more particularly, based on the load of the motor 110 at the position), based on the assumed fluctuation in the motor 110 load during the drive of the carriage 102. Furthermore, the initial PWM correction value for each position is stored in the profile storage unit 9 as an initial PWM correction value profile (cmp_array). This "position" is a position where an encoder edge is detected. In other words, an arrangement of the respective initial PWM correction values corresponding to the respective positions where encoder edges are detected is profiled.

While the carriage 102 is being driven, every time an encoder edge is detected, the initial PWM correction value (cmp_micr_duty) corresponding to the position of the carriage 102 at the time is obtained from the initial PWM correction value profile (cmp_array) stored in the profile storage unit 9. Then, according to the initial PWM correction value, the start PWM value (start_pwm1) is corrected. The value after the correction becomes the initial PWM value (start_pwm) which is the first PWM value after the reset caused by the encoder edge detection.

Furthermore in the present embodiment, the rate of change when the PWM value is increased by the constant period Tp is not fixed to accel_param/Tp. The rate of change is modified, at every encoder edge detection, according to the edge interval (enc_period) which is the time between the previous edge detection and the present edge detection.

Particularly in the present embodiment, the PWM increment value (a_param) is not fixed to the PWM initial increment value (accel_param) which is the initial value for the PWM increment value. The PWM increment value (a_param) is changed in accordance with the edge interval (enc_period).

Accordingly hereafter, methods of correcting the initial PWM value (start_pwm) at each encoder edge detection according to the initial PWM correction value profile (cmp_array), without fixing start_pwm to the predetermined start PWM value (start_pwm1), and changing the PWM increment value (a_param) at each encoder edge detection according to the edge interval (enc_period), are mainly described.

In FIG. 41, the initial PWM duty correction unit 8 obtains, from the profile storage unit 9 at each encoder edge detection, the initial PWM correction value (cmp_micr_duty) corresponding to the encoder edge count value (enc_count) which indicates the position of the carriage 102 at the time. The initial PWM duty correction unit 8 outputs cmp_micr_duty to the duty generation unit 4.

The profile storage unit 9 stores the initial PWM correction value profile (emp_array), which is an array of the initial PWM correction values (cmp_micr_duty) for the respective positions where encoder edges are detected, in association with the respective encoder edge count values (enc_count). In the minimal velocity control of the present embodiment, the load of the motor 110 maintains a constant state for a while after drive initiation. Capping operation is initiated when a hook of the carriage 102 is caught by the cap 121. The load gradually increases from the start of the capping operation to the completion of covering the nozzle unit 107 by the cap 121.

Thus, the initial PWM correction value (cmp_micr_duty) is set in such a manner that even if there is a fluctuation in the load of the motor 110 by the capping operation, the carriage 102 is driven at a given target driving velocity (e.g., a constant velocity).

Particularly, for the position before the capping operation is initiated, the initial PWM value (start_pwm) which is reset at each encoder edge detection continues to hold the start PWM value (start_pwm1) set in the PWM value setting registers 29. In other words, the correction data is set as the data which increments the start PWM value (start_pwm1) by "0" for example. Also, for the position after the capping operation is initiated, the initial PWM value. (start_pwm) at each encoder edge detection is increased in accordance with the increase of the load. In other words, the correction data is set as the data which represents an increment value in the start PWM initial value (start_pwm1) and the increment value gradually ascends, for example. Each initial PWM correction value (start_pwm) is a value obtained by experiment or prior measurement.

The profile storage unit 9 may comprise the registers similar to the operation mode setting registers 313, for example, or may be an area inside a not-shown main memory (RAM). Furthermore, the profile storage unit 9 may be an area provided in a ROM or a flash memory which permits electrical reading/writing of data. In the present embodiment, it is assumed that the profile storage unit 9 is provided in a part of the memory area inside a not-shown ROM or flash memory and the initial PWM correction value profile (cmp_array) is stored in the profile storage unit 9, as an example.

Moreover in the present embodiment, the initial PWM value (start_pwm) after reset is set at each encoder edge detection, based on the initial PWM correction value (cmp_micr_duty) obtained from the initial PWM duty correction unit 8. Simultaneously, the correction data including information on whether the PWM increment value (a_param) should be corrected, or, in case of correction, how far the PWM increment value should be actually corrected, is obtained from the PWM increment value correction unit 6 so as to perform calculation for correcting the PWM increment value as required. The particular setting methods and calculation methods thereof will be described later. Other constitution of the motor control device 310 in the present embodiment is basically the same as the configuration of the motor control device 140 in the second embodiment. Therefore, the same reference numbers are given to the components identical to those of the motor control device 140 and descriptions thereof are not repeated.

Figure 42:
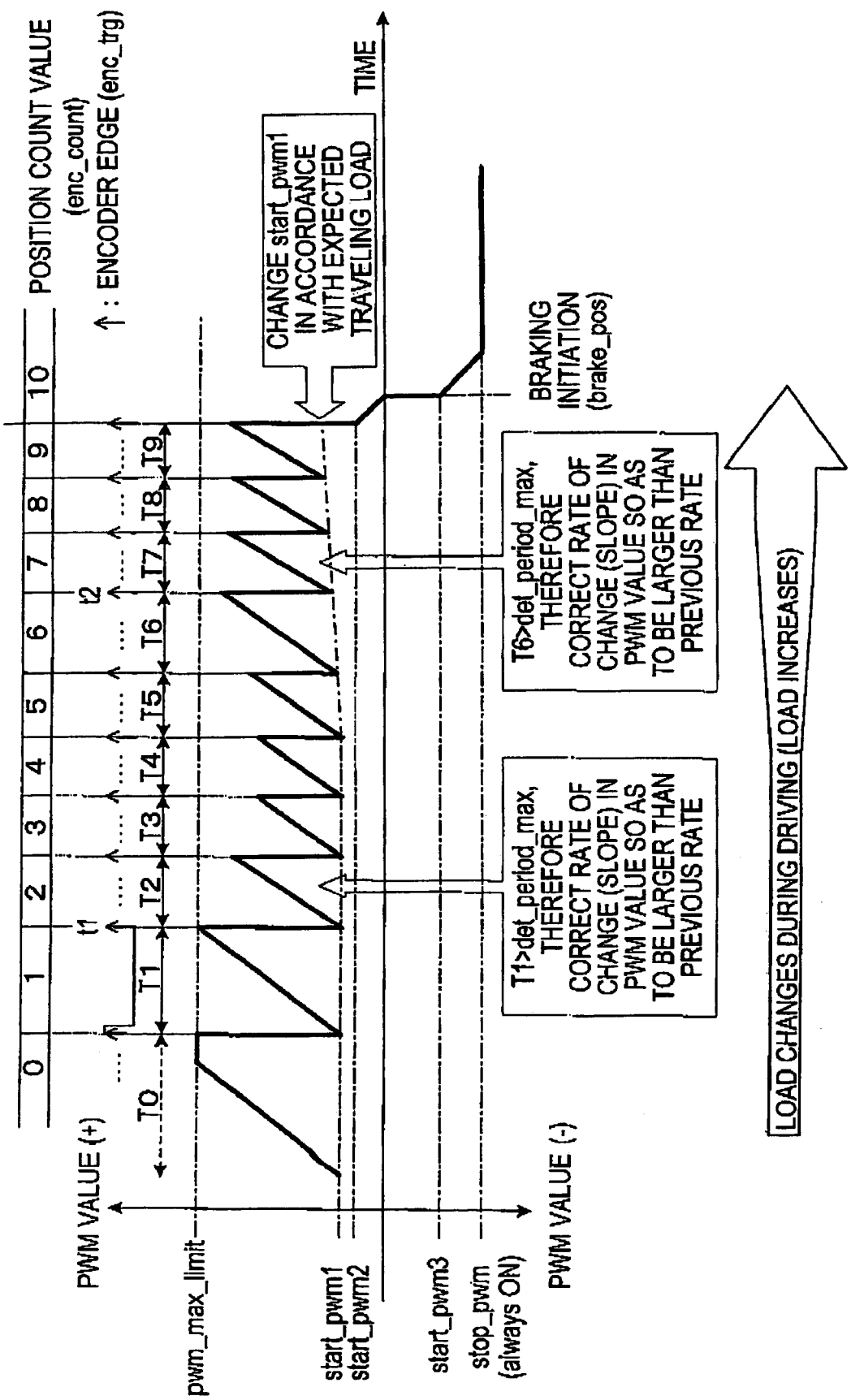
FIG. 42 is a time chart showing an example of control when a motor load in the motor control device of the third embodiment is on the increase.

Referring to FIG. 42, control of the motor 110 in the motor control device 310 of the present embodiment will be described. FIG. 42 is an explanatory view showing an example of motor control in the present embodiment, in case of the load of the motor 110 being on the increase.

As shown in FIG. 42, the PWM initial value at drive initiation is set to start_pwm1. Thereafter, as shown in FIG. 72, the PWM initial value is increased by a_param (accel_param at drive initiation) at the constant period Tp. If the PWM value reaches pwm_max_limit before an encoder edge is detected, the PWM value continues to hold pwm_max_limit until the next edge detection.

Every time an encoder edge is detected, that is, as the encoder edge count value-(end_count) increases from the initial value 0 to 1, 2, 3, . . ., for example, the PWM value is reset to the initial PWM value (start_pwm) corresponding to the encoder edge count value (enc_count) at the time. More particularly, the initial PWM correction value (cmp_micr_duty) obtained by the initial PWM duty correction unit 8 from the initial PWM correction value profile (cmp_array) stored in the profile storage unit 9 is added to the start PWM value (start_pwm1) by the duty generation unit 4 so as to produce a new PWM value (start_pwm) after the reset.

In the present embodiment, the initial PWM correction value (cmp_micr_duty) is set to zero so that the PWM value (start_pwm) does not change while enc_count≦=4, that is a range in which the load is assumed to be in a constant state. While enc_count≧5, that is a range in which the motor load is expected to increase, the initial PWM correction value (cmp_micr_duty) is set to a value obtained from the calculation, $var_p \ddagger (enc\_count-4)$, for example, so that the initial PWM value (start_pwm) may gradually increase as well.

In other words, the initial PWM value (start_pwm) at each encoder edge detection is obtained from the formula "start_pwm=start_pwm1" while enc_count≦4, and "start_pwm=$var_p\ddagger$(enc_count−4)" while enc_count≧5 ($var_p$>0). Therefore, while enc_count 5, the initial PWM value (start_pwm) increases as enc_count is counted up, as can be seen in the figure.

Moreover in the present embodiment, the PWM increment value (a_param) is corrected at each encoder edge correction. However, when an encoder edge is detected at the first time after drive initiation, the PWM increment value (a_param) is not changed. That is, the PWM increment value continues to hold the PWM initial increment value (accel_param). After the second edge detection, the PWM increment value is set in accordance with the edge interval at the time of the edge detection.

Particularly, at the second encoder edge detection (time t1) after drive initiation in FIG. 42, the edge interval T1 prior to the edge detection exceeds the long interval detection threshold (det_period_max). Therefore, calculation for correction is performed which increases the PWM increment value (a_param) after reset by a predetermined amount from the initial value accel_param. As a result, the rate of change in the PWM value is increased.

Even if the driving velocity goes up and the edge interval at the encoder edge detection becomes smaller than det_period_max thereafter, as long as the edge interval T1 exceeds the short interval detection threshold (det_period_min), the previous a_param is held continuously. Accordingly, the driving velocity of the carriage 102 does not suddenly go down. A desired driving velocity can be maintained.

On the other hand, if the motor load becomes large and the driving velocity goes down, and thus the edge interval T6 at the time t2 again exceeds the long interval detection threshold (det_period_max), the subsequent PWM increment value (a_param) is further increased by a predetermined amount from the previous a_param. Thereby, the rate of change in the PWM value is further increased.

When the carriage 102 reaches the deceleration starting position (decel_pos), the PWM initial position is set to start_pwm2. Then, the PWM value decreases by the deceleration time PWM decrement value (decel_param) at every constant period Tp. Later when one of the aforementioned three braking starting conditions is fulfilled, the PWM value is set to start_pwm3 to initiate braking and the PWM value increases (to the minus direction) by the braking PWM increment value (brake_param) at every constant period Tp.

In this manner in the present embodiment, the load of the motor 110 is assumed to gradually increase in the course of the capping operation. Therefore, as shown in FIG. 42, the initial PWM value (start_pwm) is corrected to gradually increase from start_pwm1. However, such control is merely an example. How and how far the initial PWM value (start_pwm) is increased or decreased from the initial value start_pwm1 may be set, as required, in accordance with the anticipated fluctuation in the motor load.

Figure 43:
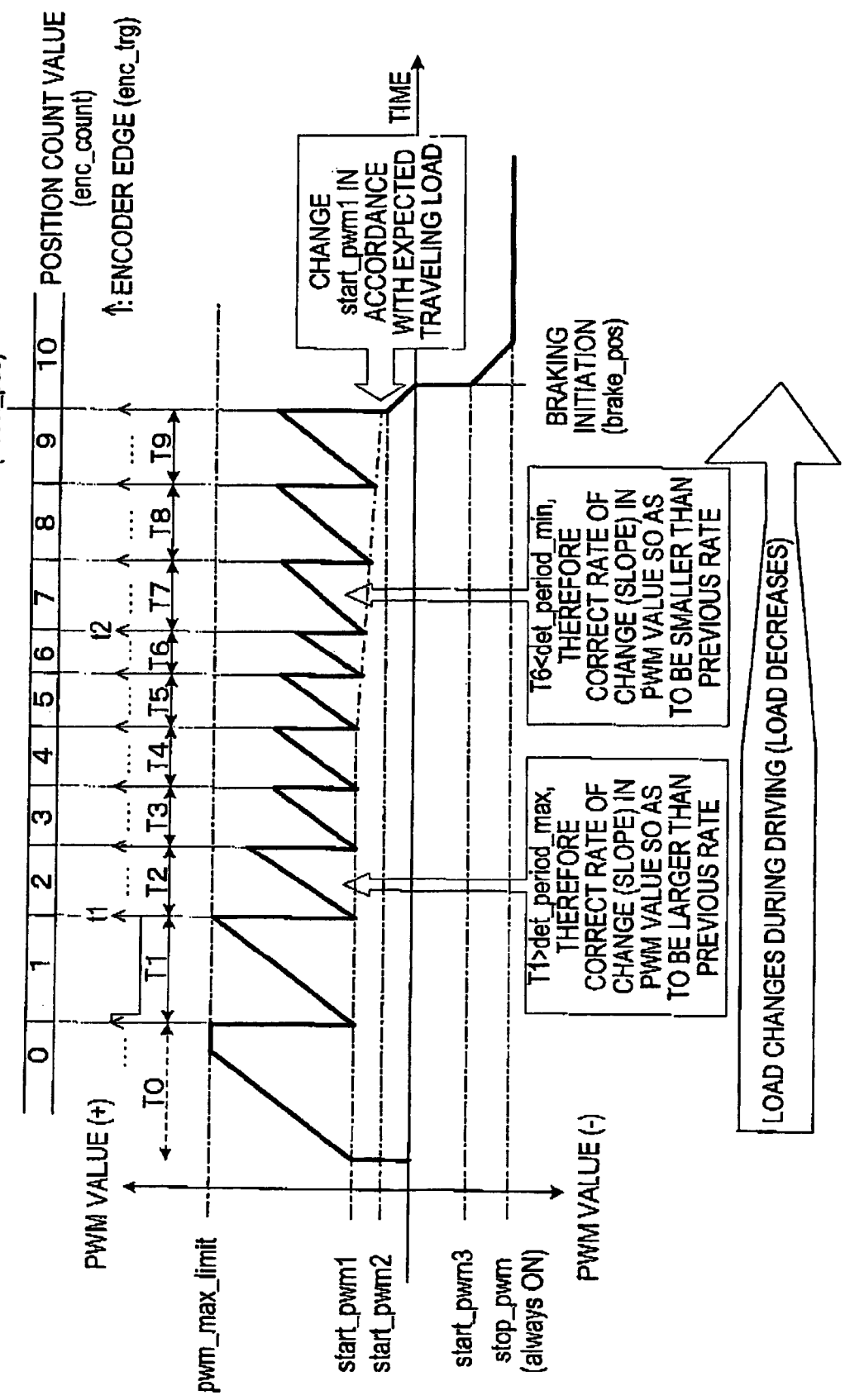
FIG. 43 is a time chart showing an example of control when the motor load in the motor control device of the third embodiment is on the decrease.

FIG. 43 shows a particular example. FIG. 43 is an example of the carriage 102 control in case that the load of the motor 110 is expected to gradually decrease from around the middle of the whole traveling section of the carriage 102.

In this case, while enc_count≦4, there is no fluctuation in the load regarding the initial PWM value (start_pwm) at each encoder edge detection and thus, "start_pwm=start_pwm1". While enc_count≧5, the load is gradually decreased and thus, the initial PWM value (start_pwm) is a value obtained from the formula "start_pwm=$var_p\ddagger$(enc_count−4)" ($var_p$<0). Accordingly, while enc_count≧5, the initial PWM value (start_pwm) decreases as enc_count is counted up, as can be seen in the figure.

Additionally, based on the edge interval (enc_period) at encoder edge detection, the PWM increment value (a_param) is also corrected. In this case, the control is the same as the control described in FIG. 42 until the rate of change in the PWM value is increased at the time t1 (i.e., the PWM increment value is increased).

After the time t1 and when the motor load gradually decreases, the driving velocity of the motor 110 is getting high. As a result, the edge interval (enc_period) at encoder edge detection is getting short. At the encoder edge detection at the time t2, the edge interval T6 becomes shorter than the short interval detection threshold (det_period_min).

Therefore, the PWM increment value (a_param) at the time t2 and afterwards is corrected to be smaller than a_param before the time t2 so that the rate of change in the PWM value is lowered. In other words, since there is a fear that the velocity gets extremely high due to the light load, the rate of change in the PWM value is made small to control the velocity.

Supplemental explanation is given, referring to FIGS. 44A-44C, regarding the increase/decrease of the rate of change in the PWM value by changing the PWM increment value. FIG. 44A indicates an initial state. The PWM increment value (a_param) is accel_param, the initial value. A dotted line indicates the rate of change (slope) in the PWM value in the initial state.

From that state, a_param is increased so that a_param>accel_param. As shown in FIG. 44I, the rate of change (slope) in the PWM value increases, as indicated by a dashed line. To the contrary, a_param is decreased so that a_param<accel_param. As shown in FIG. 44C, the rate of change (slope) in the PWM value decreases, as indicated by a dashed line.

Calculation for correction which increases or decreases the PWM increment value (a_param) is performed using the formula (1) explained in the second embodiment.

The calculation for correction by way of the formula (1) is performed in the duty generation unit 4. The calculation of the part "±α‡var" is performed in the PWM increment value correction unit 6 and the result of the calculation is inputted to the duty generation unit 4.

Next, explanation for a process performed by a CPU 311 and a process performed by ASIC 312 in the motor control device 310 of the present embodiment is given. The ASIC setting process performed by the CPU 311 is identical to the process shown in FIG. 18 according to the second embodiment. Therefore, description thereof is not repeated.

Figure 45:
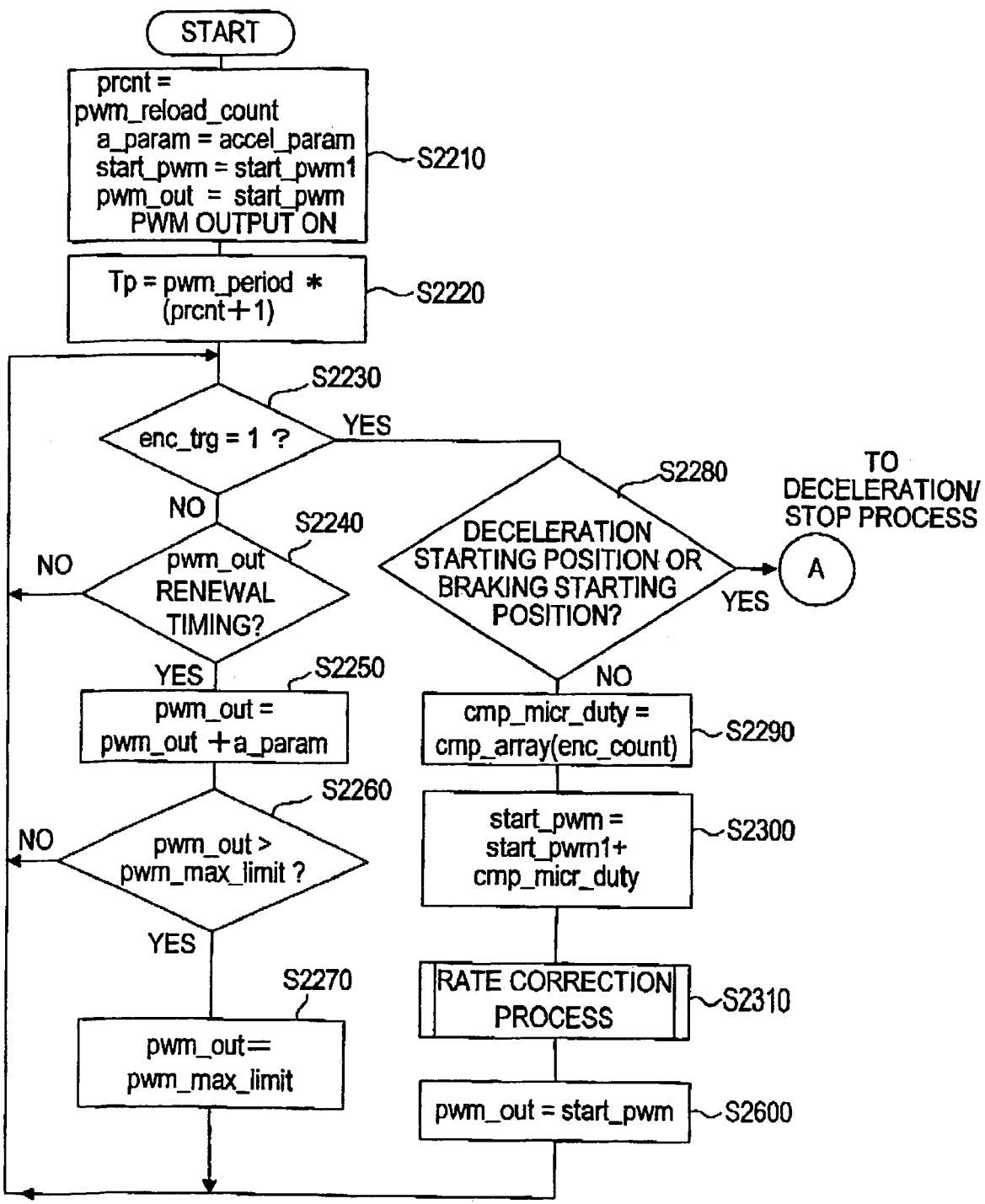
FIG. 45 is a flowchart showing a normal drive process from a start of the motor to a start of deceleration, which is executed in ASIC of the third embodiment.

FIG. 45 shows the normal drive process from the start of the motor 110 till the start of deceleration. When the start-up setting register 21 is set in the CPU 311, the variable prcnt, which indicates the timing for constant addition, is set to the initial value pwm_reload_count in S2210. Also, the variable a_param which indicates the PWM increment value is set to the PWM initial increment value (accel_param), which is the initial value of the variable a_param. Furthermore, the variable start_pwm which indicates the initial PWM value is set to the start PWM value start_pwm1. The PWM value pwm_out, which is actually outputted from the duty generation unit 4, is set to start_pwm (=start_pwm1). The output of the PWM value is initiated.

In S2220, in accordance with the constant addition timing prcnt set in S2210, the PWM value update interval Tp is calculated by the subsequent formula Tp=pwm_period‡ (prcnt+1). This calculation is performed by the timing generation unit 18.

In S2230, it is determined whether enc_trg is 1, that is, whether an encoder edge is detected. Until an encoder edge is detected, the process proceeds to S2240. In S2240, it is determined whether it is the update timing of pwm_out. This is a determination on whether it is time to update the PWM value at the constant period Tp. It is determined based on the timing information from the timing generation unit 18. The result of the determination is negative while Tp has not passed since the previous update of the PWM value (i.e., since the PWM value is increased by accel_param). The process returns to S2230. When Tp has passed and it is time to update the PWM value, the process proceeds to S2250.

In S2250, a_param (accel_param at the initial state) is added to the current pwm_out. The result of this calculation produces new pwm_out. In S2260, it is determined whether the new pwm_out is larger than the maximum PWM output value (pwm_max_limit). At this time, if pwm_out is equal to or less than pwm_max_limit, the process returns to S2230. If pwm_out exceeds pwm_max_limit, the process moves to S2270 and the current pwm_out is set to pwm_max_limit. In other words, pwm_out is limited to pwm_max_limit at the maximum.

When the encoder edge is detected, the process moves from S2230 to S2280. It is determined whether the carriage 102 has reached the deceleration starting position (decel_pos) or the braking starting position (brake_pos).

This determination in S2280 is made based on the presence of the position pulse received from the area determination unit 15. The position detection pulse generation process is identical to the process shown in FIG. 8 according to the first embodiment. Therefore, description thereof is not repeated.

In S2280, when it is determined that the carriage 102 has reached decel_pos, the process moves to the deceleration/stoppage process. On the other hand, while the carriage 102 has not reached decel_pos, the process proceeds to S2290. The initial PWM correction value (cmp_micr_duty) corresponding to the encoder edge count value (enc_count) at the time is obtained from the initial PWM correction value profile (cmp_arraty) stored in the profile storage unit 9. Particularly, cmp_array (enc_count) which is the value obtained by referring to the initial PWM correction value profile cmp_array by the argument enc_count is set as the initial PWM correction value cmp_micr_duty. This operation is performed by the initial PWM duty correction unit 8.

In S2800, the initial PWM correction value (cmp_micr_duty) set (obtained) in S2290 is added to the start PWM value start_pwm1 to set a new initial PWM value (start_pwm). This operation is performed by the duty generation unit 4.

Figure 46:
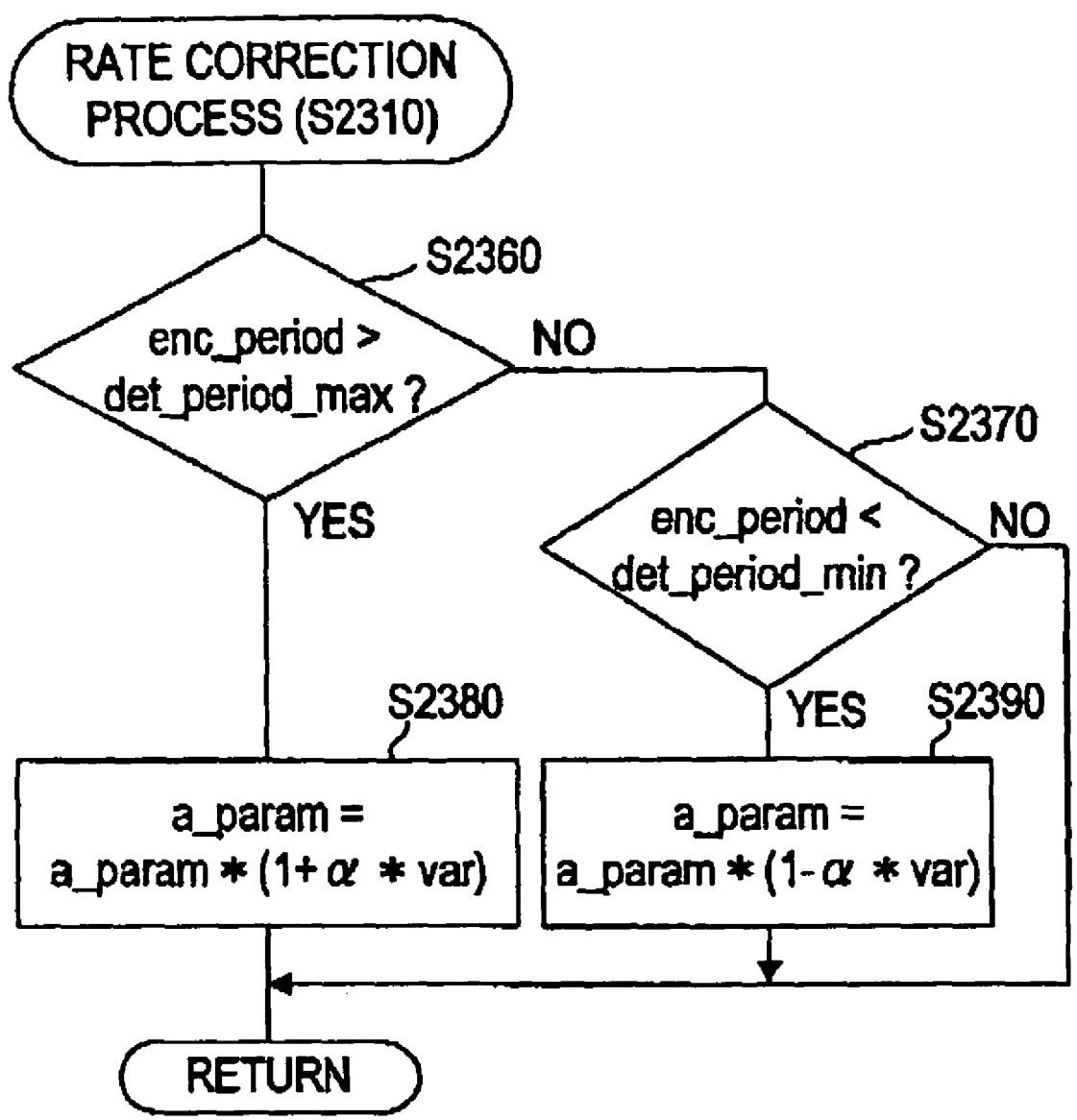
FIG. 46 is a flowchart showing particulars of a rate correction process of S310 in the normal drive process in FIG. 45.

In S2310, a rate correction process, that is, a process for correcting the PWM increment value (a_param), is performed. The detail of this process is shown in FIG. 46. Firstly in S2360, it is determined whether the edge interval (enc_period) between the encoder edge detection and the last encoder edge detection is longer than the long interval detection threshold (det_period_max). If enc_period is longer than det_period_max, the process moves to S2380. In order to increase the rate of change in the PWM value, calculation for correction which increases the PWM increment value (a_param) is performed in accordance with the aforementioned formula (1).

On the other hand, if the edge interval (enc_period) at the time of encoder edge detection is equal to or less than the long interval detection threshold (det_period_max), the process moves to S2370. It is further determined whether enc_period is shorter than the short interval detection threshold (det_period_min). If enc_period is shorter than det_period_min, the process moves to S2890. In order to decrease the rate of change in the PWM value, calculation for correction which decreases the PWM increment value (a_param) is performed in accordance with the aforementioned formula (1).

When the determination result in S2370 is negative, that is, when the edge interval (enc_period) is equal to or more than det_period_min and is equal to or less than det_period_max, this rate correction process ends without performing further steps.

In this manner, after the initial PWM value (start_pwm) is set in S2300 and the calculation for correcting the PWM increment value (a_param) is performed in S2310, pwm_out is reset in S2600. The value reset at this time is the initial PWM value (start_pwm) set in S2300.

The process executed when the determination result in S2280 is affirmative, that is, the deceleration/stoppage process when the carriage 102 reaches the deceleration starting position, is identical to the process shown in FIG. 20 according to the second embodiment. Therefore, description thereof is not repeated.

The interrupt signal generation process executed by the signal process unit 17 inside the ASIC 312 is identical to the process shown in FIG. 9 according to the first embodiment. Therefore, description thereof is not repeated.

In the motor control device 310 according to the above-described present embodiment, the initial PWM correction value (cmp_micr_duty) corresponding to the encoder edge count value (enc_count) is profiled in order to drive the carriage 102 at a target driving velocity based on the assumed fluctuation in the motor 110 load obtained when the carriage 102 is driven. Every time an encoder edge is detected, the initial PWM value (start_pwm) after reset is set according to the corresponding initial PWM correction value (cmp_micr_duty). Since the so-called feed forward control is performed, stable driving of the carriage 102 can be attained regardless of the anticipated load fluctuation.

Moreover, in addition to the above feed forward control, the rate of change in the next PWM value is determined based on the edge interval (enc_period) at the time of encoder edge detection. Particularly, the PWM increment value (a_param) is maintained as it is, or increased or decreased by the aforementioned formula (1). Accordingly, even if the unexpected load fluctuation due to disturbance or error occurs, deterioration of controllability caused by the fluctuation in the load can be inhibited.

In other words, by operating the initial PWM value (start_pwm) dynamically based on the profile, follow-up ability to the anticipated load fluctuation is improved. Furthermore, by adjusting the rate of change in the PWM value based on the driving state at the time of encoder edge detection (i.e., the encoder interval period enc_period, in the present embodiment), dealing with the unanticipated load fluctuation is possible and more stable velocity control is achieved.

Also, at the time of the first encoder edge detection after drive initiation, correction of the rate of change in the PWM value (i.e., correction of a_param) is not performed and a_param keeps the initial value accel_param. Therefore, the torque at drive initiation can be sufficiently secured and it is possible to quickly change the driving velocity of the carriage 102 to a desired target driving velocity.

Additionally, the motor control of the present invention is open loop control as a whole and not so-called closed loop control such as velocity feedback control and position feed back control. Accordingly, the minimal velocity motor control which is difficult in the closed loop control can be realized well.

Specifically as in the present embodiment, if the open loop control is applied to the minimal velocity travel to the home position in the carriage drive of the ink jet printer, the influence of the fluctuation in the motor load at the capping operation is restrained and thus the capping can be performed securely.

[First Variation]

In the above third embodiment, by setting $\alpha=1$ and var a constant, both the increment value and the decrement value when increasing and decreasing the PWM increment value (a_param) are set to constant values. However, in the present variation, depending on the difference between the edge interval (enc_period) and the respective thresholds, the PWM increment value (a_param) is increased or decreased continuously.

Figure 47:
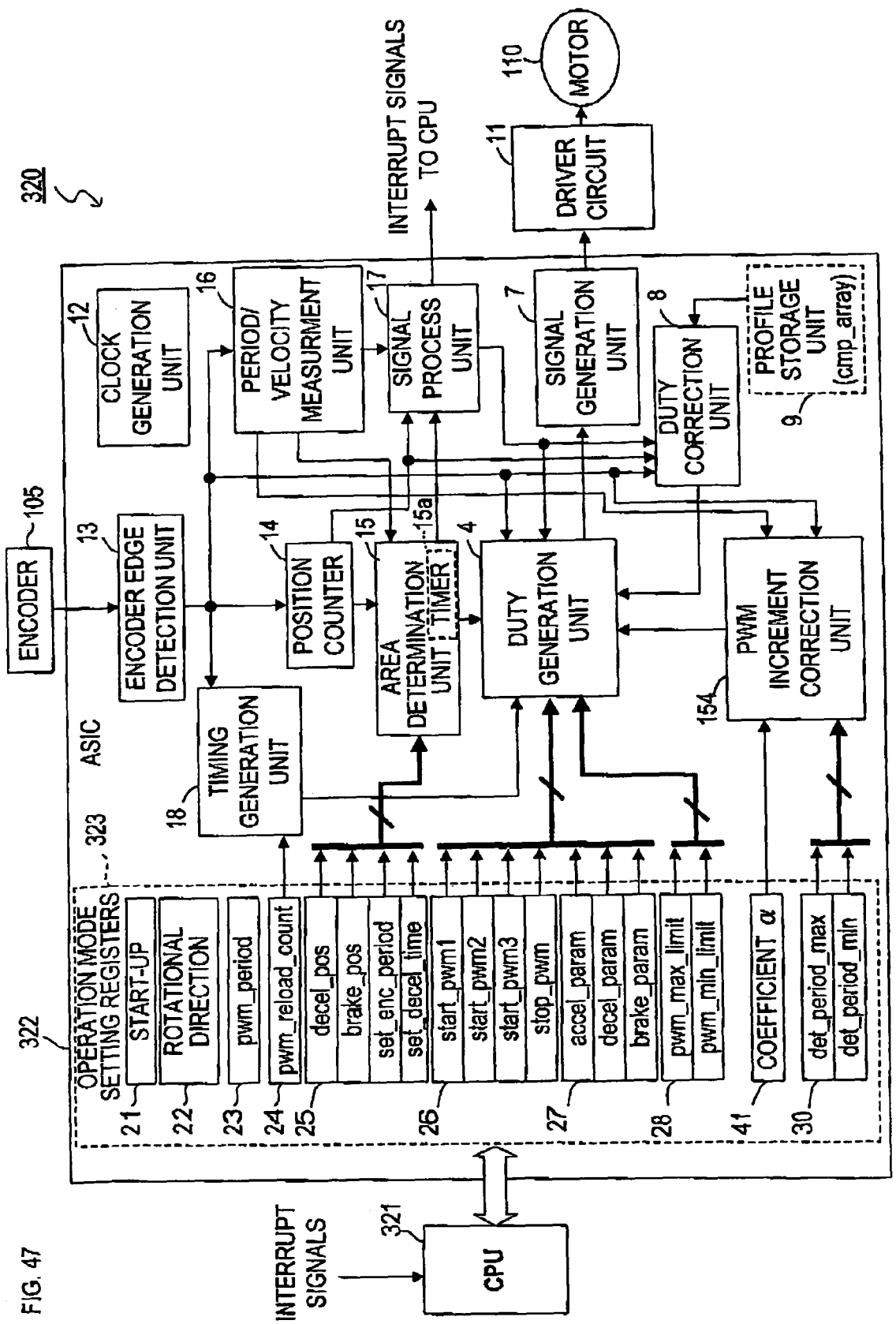
FIG. 47 is a block diagram showing a schematic structure of a motor control device according to a first variation of the third embodiment.

FIG. 47 shows a schematic structure of a motor control device 320 of the present variation. The motor drive device 320 of the present variation is largely different from the motor control device 310 of the third embodiment (see FIG. 41) in that the correction constant var is not set in the increment correction value setting registers 41 inside the operation mode setting registers 323. The correction constant var is obtained by the calculation in the PWM increment value correction unit 154 and the coefficient $\alpha$ where $\alpha>0$ is set to a predetermined value. Accordingly, a CPU 321 does not set the correction constant var in the increment correction value setting registers 41 as in the third embodiment. Other constitution of the motor control unit 320 is basically the same as the constitution of the motor control unit 310 of the third embodiment. Accordingly, the same reference numbers are given to the components identical to those of the motor control device 310 of the third embodiment, and the detailed descriptions thereof are not repeated.

Figure 48:
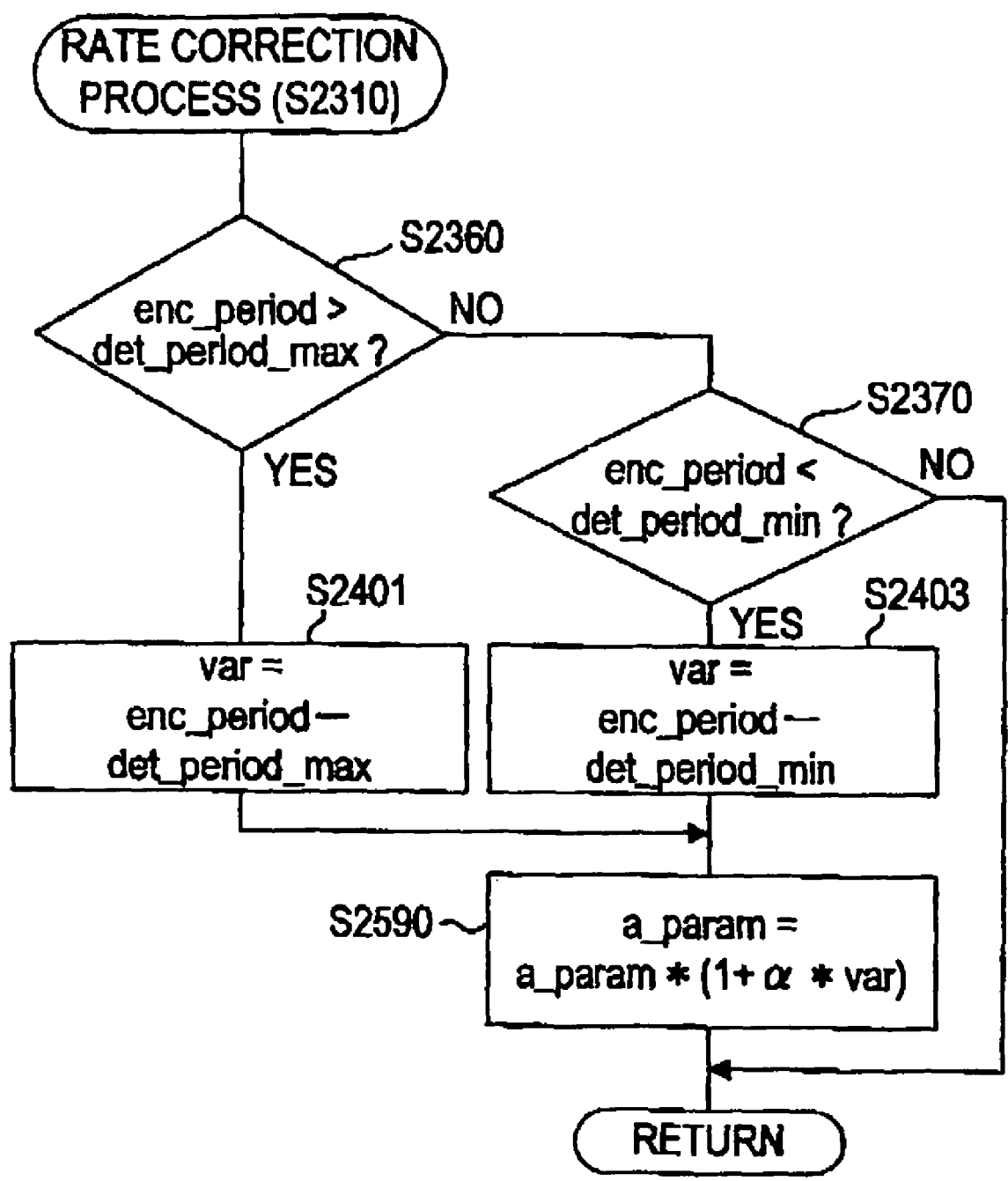
FIG. 48 is a flowchart showing particulars of the rate correction process executed in ASIC of the first variation of the third embodiment.

FIG. 48 shows a rate correction process according to the present variation. In ASIC 322 of the present variation as well, the normal driving process (see FIG. 45) is performed as in the third embodiment. In the present variation, however, the rate correction process (see FIG. 46 for detail) in S2310 of the normal driving process in FIG. 45 is different from the process according to the third embodiment. Particularly, the steps executed between from the affirmative determination in S2360 and 82370 in the process flow of FIG. 46 till the end of this rate correction process, that is, the steps in which the calculation of correcting the PWM increment value is performed, are different. Therefore, the same step numbers are given to the steps identical to those in the rate correction process according to the third embodiment, and the detailed descriptions thereof are not repeated. The following mainly describes the steps different from the steps in the third embodiment.

When this process begins, it is firstly determined in S2360 whether the edge interval (enc_period) is longer than the long interval detection threshold (det_period_max). When it is determined that the edge interval (enc_period) is longer, the calculation of var=enc_period-det_period_max is performed in S2401. In other words, how much longer the edge interval is than the above threshold (det_period_max) is calculated.

After the calculation of var, the process moves to S2590. Applying the obtained var to the aforementioned formula (1), a new PWM increment value is calculated.

As a result, new a_param which is larger than the previous a_param is obtained. In case of the present variation, addition is performed in the addition/subtraction part inside the right side bracket of the formula (1).

When the determination result in S2360 is negative and the determination result in S2370 is affirmative, that is, the edge interval (enc_period) is shorter than the short interval detection threshold (det_period_min), the calculation of var=enc_period-det_period_min is performed in S2408. In other words, how much shorter the edge interval is than the above threshold (det_period_min) is calculated. After the calculation of var, the process moves to S2590. Calculation for correcting the previous a_param is performed to obtain new a_param.

In the motor control device 320 constituted as above according to the present variation, the difference between the detected edge interval (enc_period) and the above respective thresholds is calculated as var. Based on the var, calculation for correcting the PWM increment value is performed. As a result, the longer the edge interval (enc_period) is than det_period_max, the larger the a_param becomes to make the rate of change in the PWM value large. To the contrary, the shorter the edge interval (enc_period) is than det_period_min, the smaller the a_param becomes to make the rate of change in the PWM value small.

Accordingly, based on the driving state at the time of encoder edge detection, correction of the PWM increment value (a_param) is properly performed. The driving target (the carriage 102 in the present embodiment) can be driven in a more stable manner.

[Second Variation]

In the above first variation, particularly the PWM increment value (a_param) is changed in order to change the rate of change in the PWM value. To the contrary, in the present variation, a_param is fixed to the PWM initial increment value (accel_param). The PWM value update interval Tp, which is the period for increasing the PWM value by accel_param, is changed.

Figure 49:
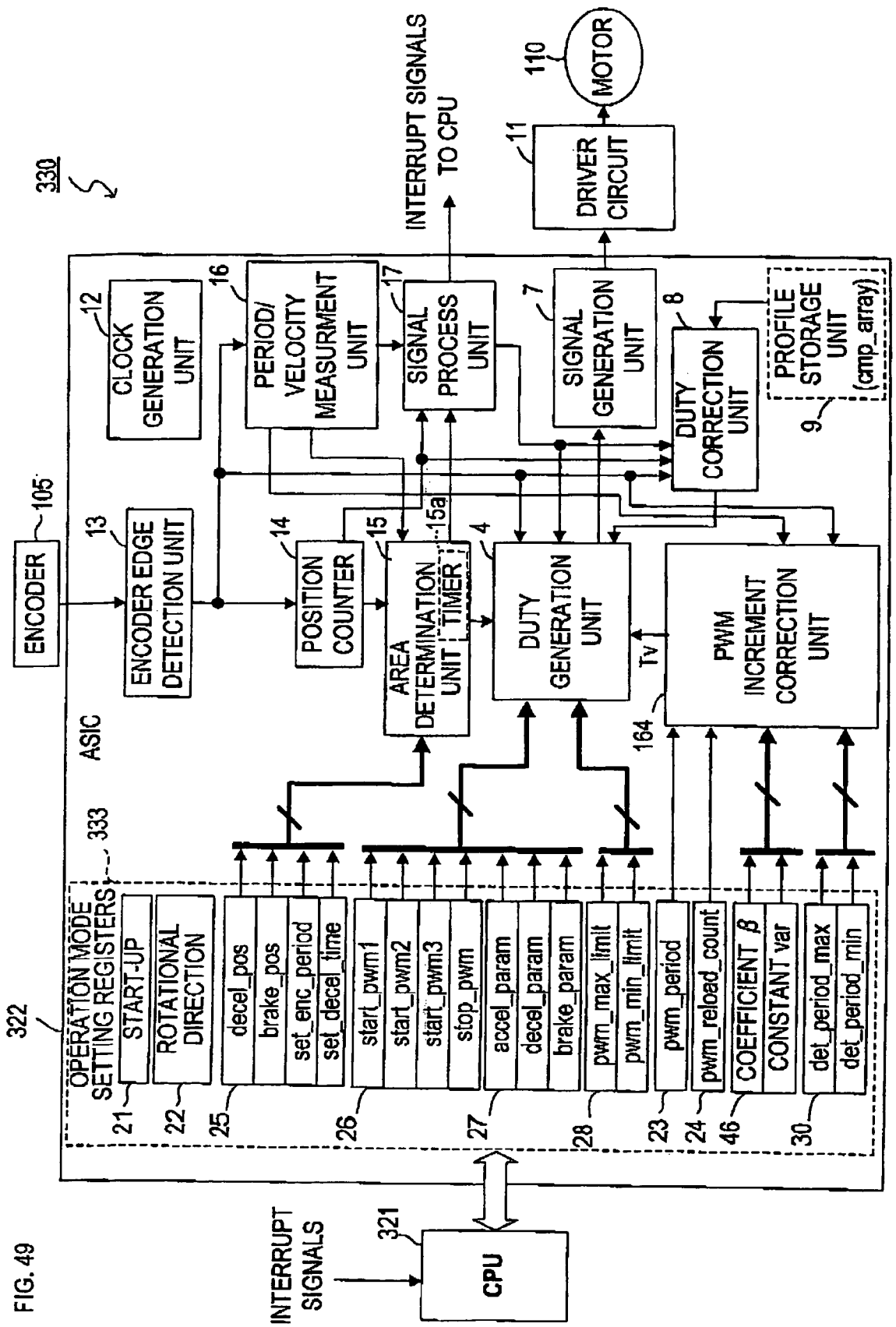
FIG. 49 is a block diagram showing a schematic structure of a motor control device according to a second variation of the third embodiment.

FIG. 49 shows a schematic structure of a motor control device 330 according to the present variation. The motor control device 880 of the present variation is largely different from the motor control device 310 of the third embodiment (see FIG. 41) in that the coefficient $\beta$ and the correction constant var are set in the increment correction value setting registers 46 inside the operation mode setting registers 888, and that the timing generation unit 164 calculates the PWM value update interval Tv (the initial value is the above Tp) based on the $\beta$, var, so as to output the timing information to the duty generation unit 165. Other constitution of the motor control device 330 is basically the same as the constitution of the motor control device 310. Therefore, the same reference numbers are given to the components identical to those of the motor control device 310 of the third embodiment, and detailed descriptions thereof are not repeated.

In the present variation, the rate of change in the PWM value is increased/decreased by changing the PWM value update interval Tv, that is, the period Tv at which accel_param is increased. However, this method is identical to the method according to the second variation of the second embodiment (see FIG. 24). Therefore, the description thereof is not repeated.

Figure 50A:
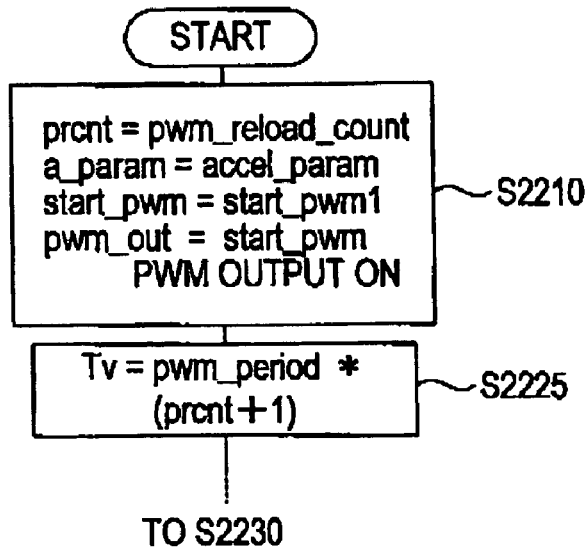
FIGS. 50A-50B are flowcharts showing a part of the normal drive process from a start of the motor to a start of deceleration, which is executed in ASIC according to the second variation of the third embodiment.
Figure 50B:
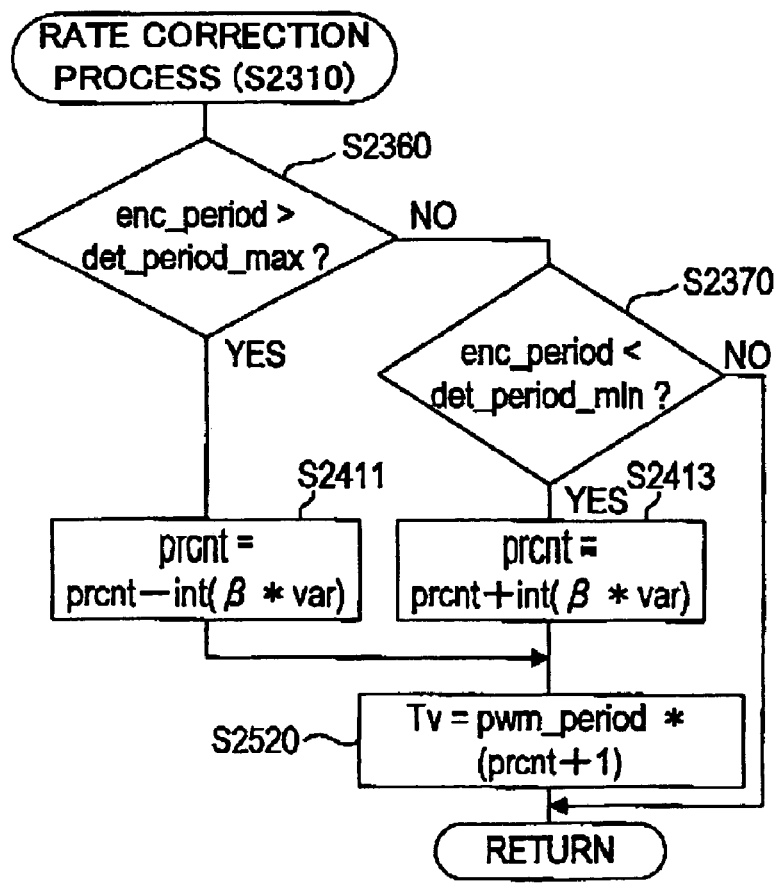

FIGS. 50A and 50B show a part of the normal drive process from the start of the motor 110 to the start of deceleration, executed in ASIC 882 of the present variation. The normal drive process of the present variation is different from the normal drive process of the third embodiment (see FIG. 45) in the calculation step executed after S2210 and the rate correction process in S2310.

The calculation step executed after S2210 is the calculation in S2220 in the third embodiment, which calculates the constant period Tp. However, in the present variation, as shown in FIG. 50A, the calculation step of S2225 is performed instead of S2220. The calculation step of S2225 is substantially the same with the step of S2220 shown in FIG. 45. Only difference is the constant name Tv of the calculation result.

The rate correction process in S2310 is different from the process (see FIG. 46) in the third embodiment in the steps performed from when the determination results in S2360 and S2370 are found affirmative till when the rate correction process ends, that is the process in which the calculation for correcting the PWM value update interval Tv is performed. Accordingly, the same step numbers are given to the steps identical to those in the rate correction process of the third embodiment and descriptions thereof are not repeated. Hereafter, the steps different from those in the third embodiment are described referring to FIG. 50B.

When the process begins, it is determined in S2360 whether the edge interval (enc_period) is longer than the long interval detection threshold (det_period_max). When it is determined that the edge interval (enc_period) is longer, the calculation of prcnt=prcnt−int(β‡var) is performed in S2411.

After the calculation of the constant addition timing prcnt, the process moves to S2520. With the obtained prcnt, a new PWM value update interval Tv is calculated by way of the formula (2) explained in the second embodiment. As a result, the new Tv which is shorter than the previous Tv is obtained.

When the determination result in S2360 is negative and the determination result in S2370 is affirmative, that is, when the edge interval (enc_period) is shorter than the short interval detection threshold (det_period min), the calculation of prcnt=prcnt+int(β‡var) is performed in S2413. The process moves to S2520. As a result, new Tv which is longer than the previous Tv is obtained.

In the motor control device 880 constituted as above according to the present variation, the PWM value update interval Tv is maintained as it is or increased or decreased by the formula (2), (3) (the formula (3) is also explained in the second embodiment) based on the detected edge interval % (enc_period). Therefore, similar to the third embodiment, even if there is fluctuation in the load of the motor 110, the driving target (the carriage 102 in the present embodiment) can be driven in a stable manner.

[Third Variation]

In the above second variation, by setting β=1, var a predetermined constant, both the increment value when the PWM value update interval Tv is increased and the decrement value when the PWM value update interval Tv is decreased are set to fixed values. However, in the present variation, the increment value and the decrement value are increased/decreased continuously according to the difference between the edge interval (enc_period) and the respective thresholds.

Figure 51:
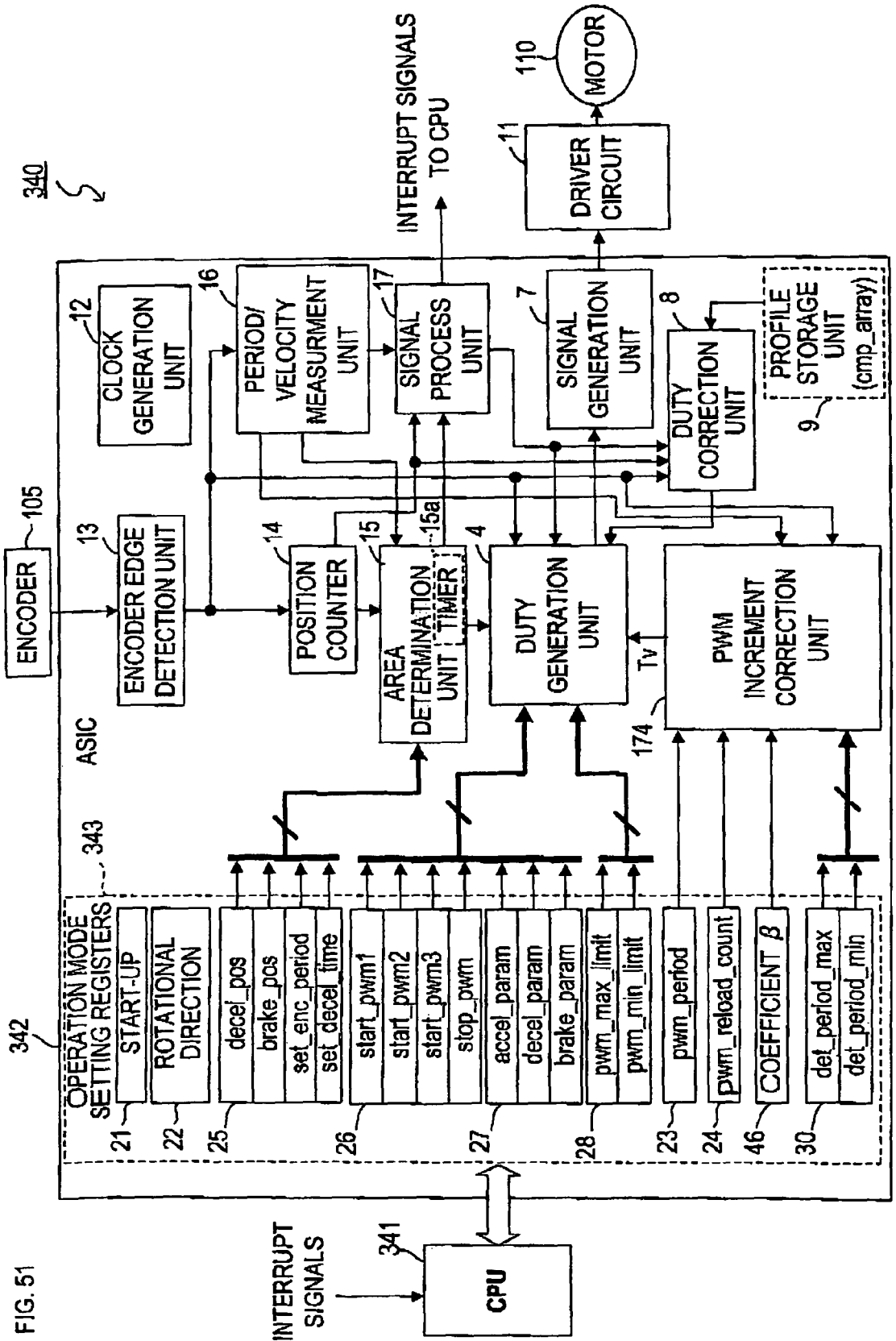
FIG. 51 is a block diagram showing a schematic structure of a motor control device according to a third variation of the third embodiment.

FIG. 51 shows a schematic structure of a motor control device 340 according to the present variation. The motor control device 840 of the present variation is largely different from the motor control device 330 (see FIG. 49) of the second variation in that the correction constant var is not set in the increment correction value setting registers 51 inside the operation mode setting registers 343. The correction constant var is obtained by calculation in the timing generation unit 174, and the coefficient β where β>0 is set to a predetermined coefficient. Accordingly, a CPU 841 does not set the correction constant var in the increment correction value setting registers 51 as in the second variation. Other constitution of the motor control device 340 is basically the same as the constitution of the motor control device 880 of the second variation. Therefore, the same reference numbers are given to the components identical to those of the motor control device 330 of the second variation, and detailed descriptions thereof are not repeated.

Figure 52:
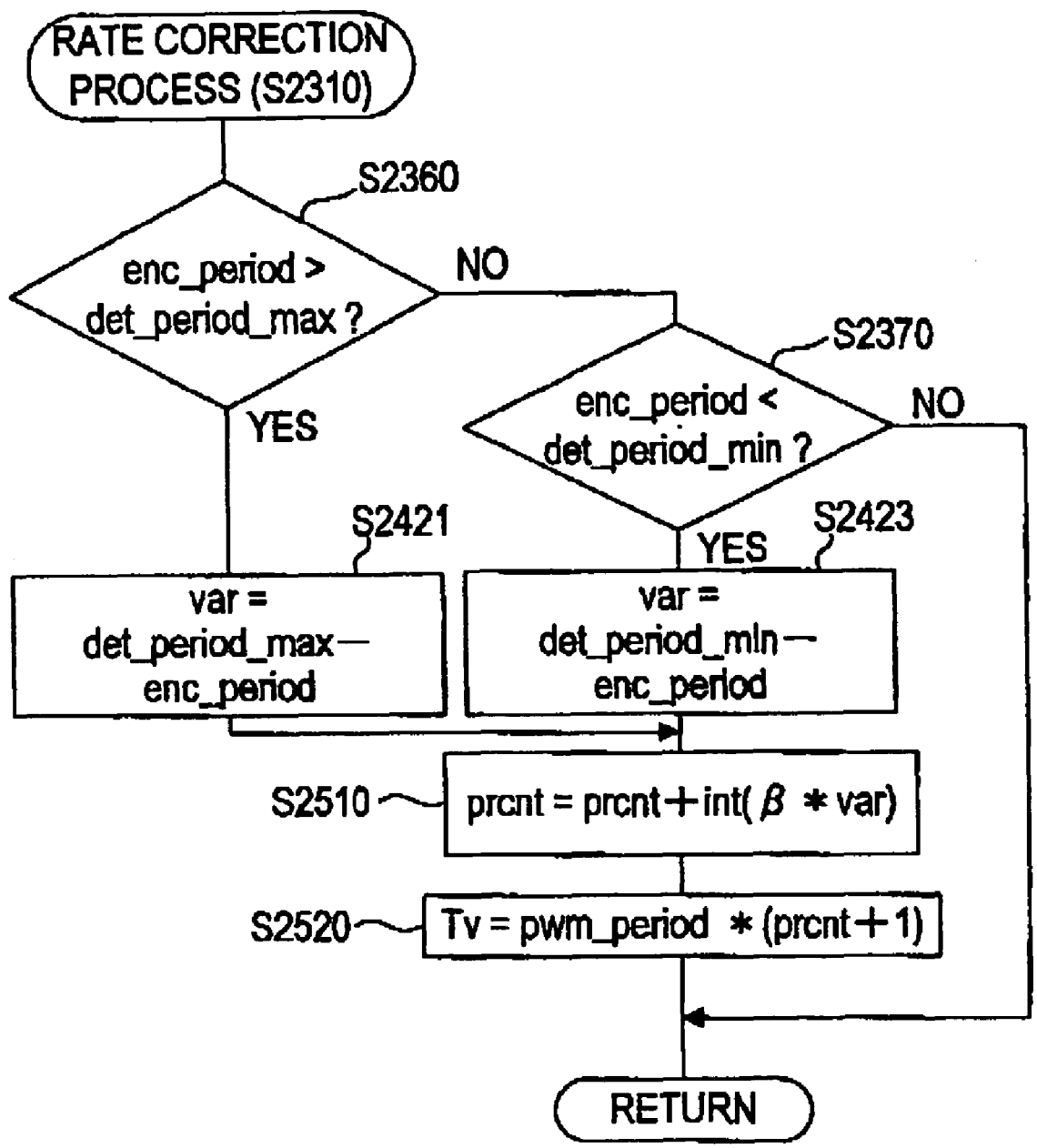
FIG. 52 is a flowchart showing particulars of the rate correction process executed in ASIC of the third variation of the third embodiment.

FIG. 52 has been explained correction process executed in ASIC 342 of the present variation. The rate correction process of the present variation is different from the rate correction process (see FIG. 50B) of the second variation in the steps executed between from the affirmative determination results in S2360 and S2370 till the end of the rate correction process, that is the steps in which calculation for correcting the constant addition timing prcnt is performed. Other steps are totally the same with those in the second variation. Accordingly, the same step numbers are given to the steps identical to those in the normal drive process of the second variation, and detailed descriptions thereof are not repeated. The steps different from those of the second variation are described hereafter.

When the process begins, it is determined in S2360 whether the edge interval (enc_period) is longer than the long interval detection threshold (det_period_max). When it is determined that the edge interval (enc_period) is longer, the calculation of var=det_period_max-enc_period is performed in S2421.

In other words, the difference between the above threshold (det_period_max) and the edge interval is obtained.

After the calculation of var, the process moves to S2510. With the obtained var, new constant addition timing prcnt is calculated by way of the aforementioned formula (3). By performing calculation in the next S2520 using the constant addition timing prcnt, new Tv which is shorter than the previous Tv is obtained. In case of the present variation, addition is performed in the addition/subtraction part in the right bracket of the formula (3).

When the determination result in S2360 is negative and the determination result in S2870 is affirmative, the calculation of var=det_period min-enc_period is performed in S2423. The process moves to S2510 in which the aforementioned calculation is performed. As a result, new Tv which is longer than the previous Tv is obtained.

In the motor control device 340 constituted as above according to the present variation, the difference between the detected edge interval (enc_period) and the above respective thresholds is calculated as var. According to var, calculation for correcting the PWM value update interval Tv is performed. As a result, the longer the edge interval (enc_period) is than det_period_max, the shorter the Tv becomes to make the rate of change in the PWM value large. To the contrary, the shorter the edge interval (enc_period) is than det_period_min, the longer the Tv becomes to make the rate of change in the PWM value small.

Accordingly, based on the driving state at the time of encoder edge detection, correction of the PWM value update interval Tv is properly performed. The driving target can be driven in a more stable manner.

[Fourth Variation]

In the above variations, either the PWM increment value (a_param) or the PWM value update interval Tv is changed in order to change the rate of change in the PWM value. However, in the present variation, both a_param and Tv are changed to modify the rate of change.

Figure 53:
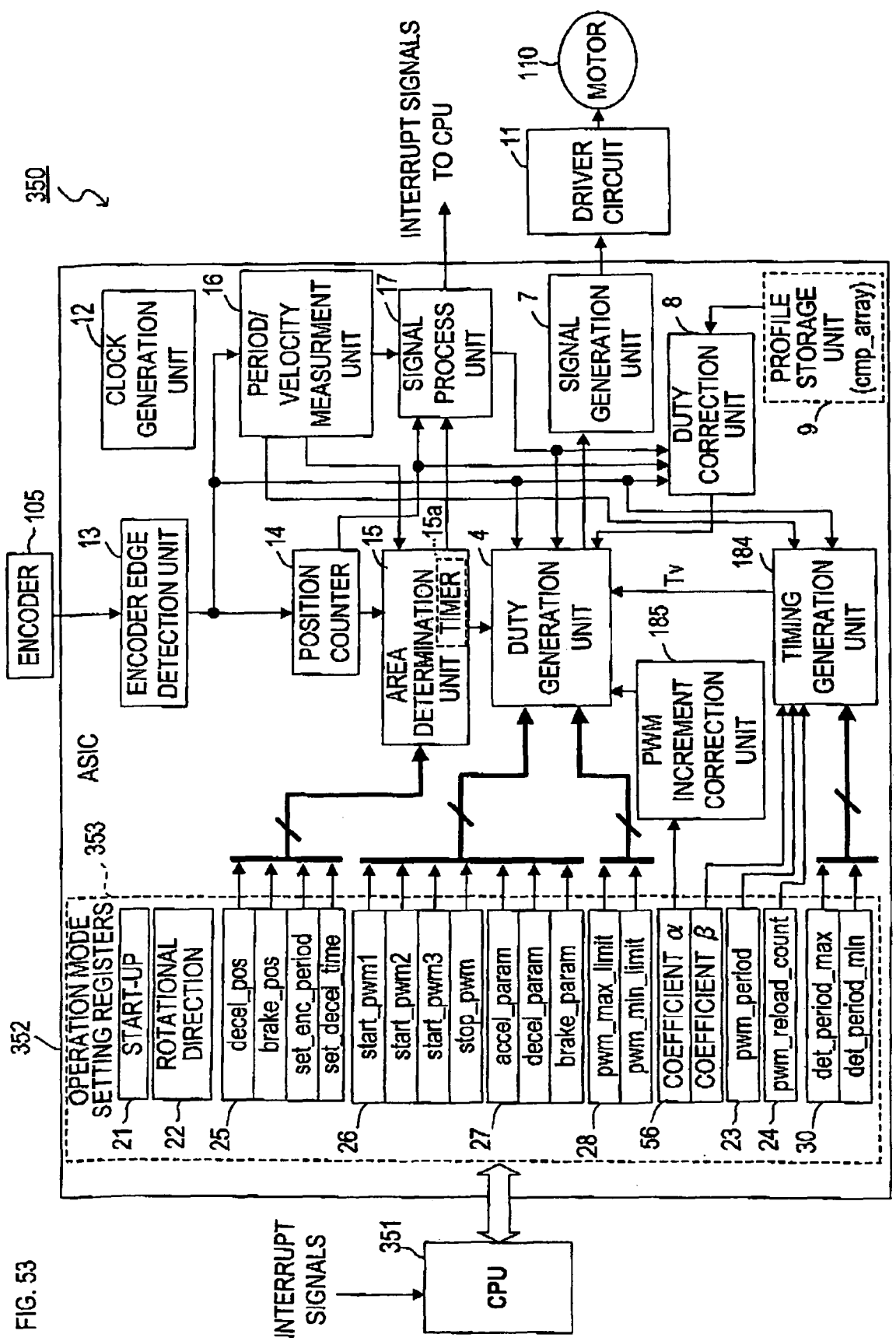
FIG. 53 is a block diagram showing a schematic structure of a motor control device according to a fourth variation of the third embodiment.

FIG. 53 shows a schematic structure of a motor control device 350 according to the present variation. The motor control device 350 of the present variation is largely different from the motor control device 840 of the third variation (see FIG. 51) in that two coefficients α, β (α, β>0) are set in the increment correction value setting registers 56 inside the operation mode setting registers 353, that the fractional part of the calculation β‡var generated in the course of calculating the PWM value update timing Tv in the timing generation unit 184 is outputted to the PWM increment value correction unit 185 as a fine correction parameter γ, and that the PWM increment value correction unit 185 outputs the product of this fine correction parameter γ and the coefficient α to the duty generation unit 4 as correction data. Other constitution of the motor control device 350 is basically the same as the constitution of the motor control device 340. Therefore, the same reference numbers are given to the components identical to those of the motor control device 340 of the third variation, and detailed descriptions thereof are not repeated.

Figure 54:
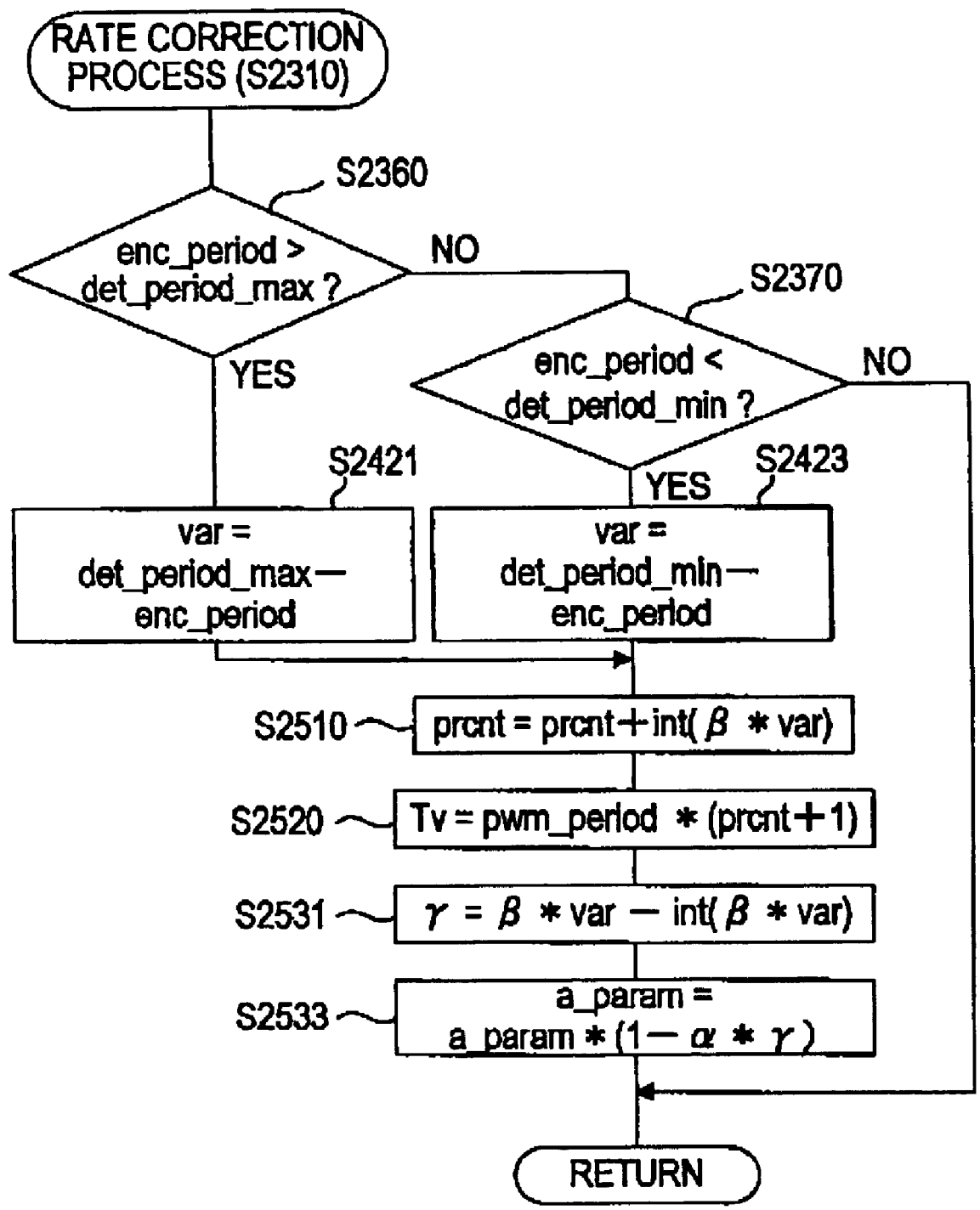
FIG. 54 is a flowchart showing particulars of the rate correction process executed in ASIC of the fourth variation of the third embodiment.

FIG. 54 has been explained correction process executed in ASIC 352 according to the present variation. The rate correction process of the present variation is different from the rate correction process (see FIG. 5.2) according to the third variation in that new steps S2531 and S2533 are added after the step S2520 for Tv calculation. Other steps are completely the same with the steps in the third variation. Therefore, the same step numbers are given to the steps identical to those in the rate correction process according to the third variation, and the detailed descriptions thereof are not repeated. The following describes the steps different from the steps in the third variation.

When the PWM value update interval Tv is newly calculated in S2520, the timing generation unit 184 outputs the timing signal for increasing the PWM value at the calculated period Tv to the output OWM duty generation unit 4. Furthermore, calculation of y=β‡var-int(β‡var) is performed in S2531 to obtain the fractional part of β‡var as the fine correction parameter γ. This γ is inputted to the PWM increment value correction unit 185.

In S2533, calculation of a_param‡(1−α‡γ) is performed to obtain new a_param. This calculation is performed in the duty generation unit 4. However, the multiplication of α‡γ is performed in the PWM increment value correction unit 185.

In the motor control device 350 constituted as above according to the present variation, the result of the correction of the PWM value update interval Tv is the same as the result of the third variation and the fractional part of β‡var is not reflected. However, the fractional part is reflected by the fact that the PWM increment value a_param is corrected. That is, the portion which cannot be corrected by Tv is compensated by the correction of a_param. Moreover, compared to the case of correcting only a_param or only Tv, if both are corrected together, the PWM value can be increased smoothly (little by little). Therefore, correction (change) of the rate of change in the PWM value can be more properly performed based on the driving state at the time of encoder edge detection and the driving target can be driven in a more stable manner.

[Fifth Variation]

The above fourth variation illustrates an example in which the rate of change in the PWM value is modified by changing both the PWM increment value a_param and the PWM value update interval Tv. The motor control device (not shown) of the present variation is also constituted in such a manner that both a_param and Tv can be changed.

However, in the present variation, the rate of change in the PWM value is changed only by changing the PWM value update interval Tv, in principle. When Tv obtained by calculation for correction does not satisfy the predetermined time (1 msec., for example), Tv is set to 1 msec. without being changed to the value less than 1 msec. Instead, by correcting a_param, the rate of change in the PWM value is properly changed as a whole. How not to set Tv to the value less than the predetermined time has been explained in the fifth variation of the second embodiment. Therefore, the explanation thereof is not repeated.

In the present variation, if Tv is less than 1 msec., Tv is set to 1 msec. which is the minimum acceptable value for the time being. The amount which cannot be corrected by Tv is compensated by a_param.

Figure 55:
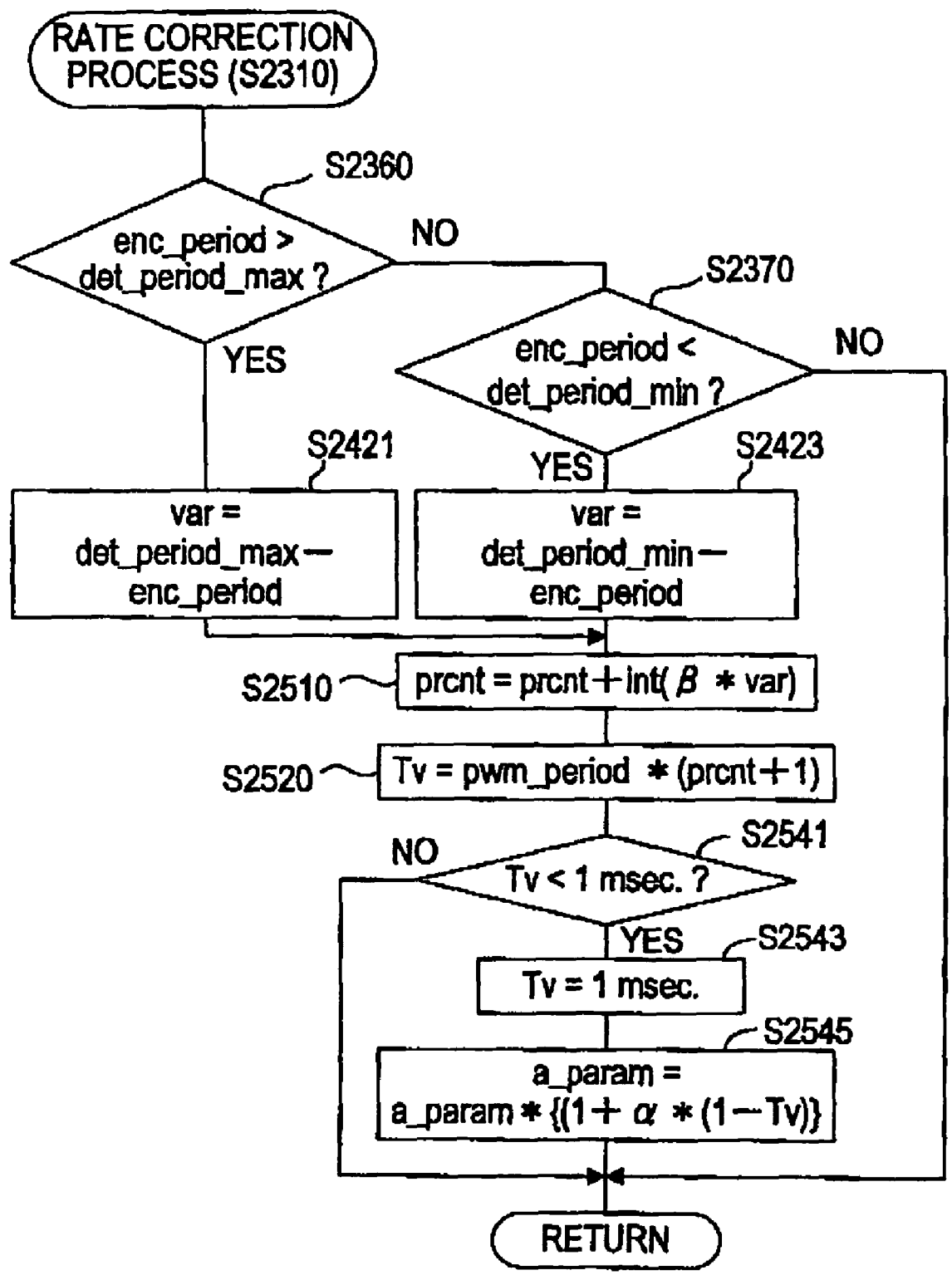
FIG. 55 is a flowchart showing particulars of the rate correction process executed in ASIC of a fifth variation of the third embodiment.

The particular calculation method is shown in the rate correction process in FIG. 55. The rate correction process is different from the rate correction process (see FIG. 54) according to the fourth variation in the step after the Tv calculation in S2520. In the present variation, when Tv is calculated in S2620, it is determined in S2541 whether the calculated Tv is less than 1 msec. Here, if Tv is equal to or more than 1 msec., the process ends without performing further steps and correction of a_param is not performed. If Tv is less than 1 msec., Tv is set to 1 msec. in S2548. In the next step S2545, a_param is corrected by the calculation of the formula (4). The formula (4) has been described in the second embodiment. Thus, description thereof is not repeated.

In this case, even if the calculated Tv is 0.8 msec., for example, Tv is set to 1 msec. The difference of 0.2 msec. is compensated by correction of a_param.

Accordingly in the present variation, when the correction by Tv reaches the limit, a_param is corrected instead. Therefore, the correction (change) of the rate of change in the PWM value is more properly performed. The driving target can be driven in a more stable manner.

In the present variation, if Tv obtained by the calculation for correction is equal to or more than 1 msec., a_param is not changed and only Tv is changed. However, even if Tv is equal to or more than 1 msec., the fractional part of β‡var may reflect the fine correction of a_param, as in the case of the above fourth variation.

[Sixth Variation]

In the above variations, the modification in the rate of change in the PWM value, that is, correction for correcting a_param or Tv, is performed based on the edge interval (enc_period). However, in the present variation, the rate of change is modified by correcting a_param based on the PWM value at the time of encoder edge detection.

Figure 56:
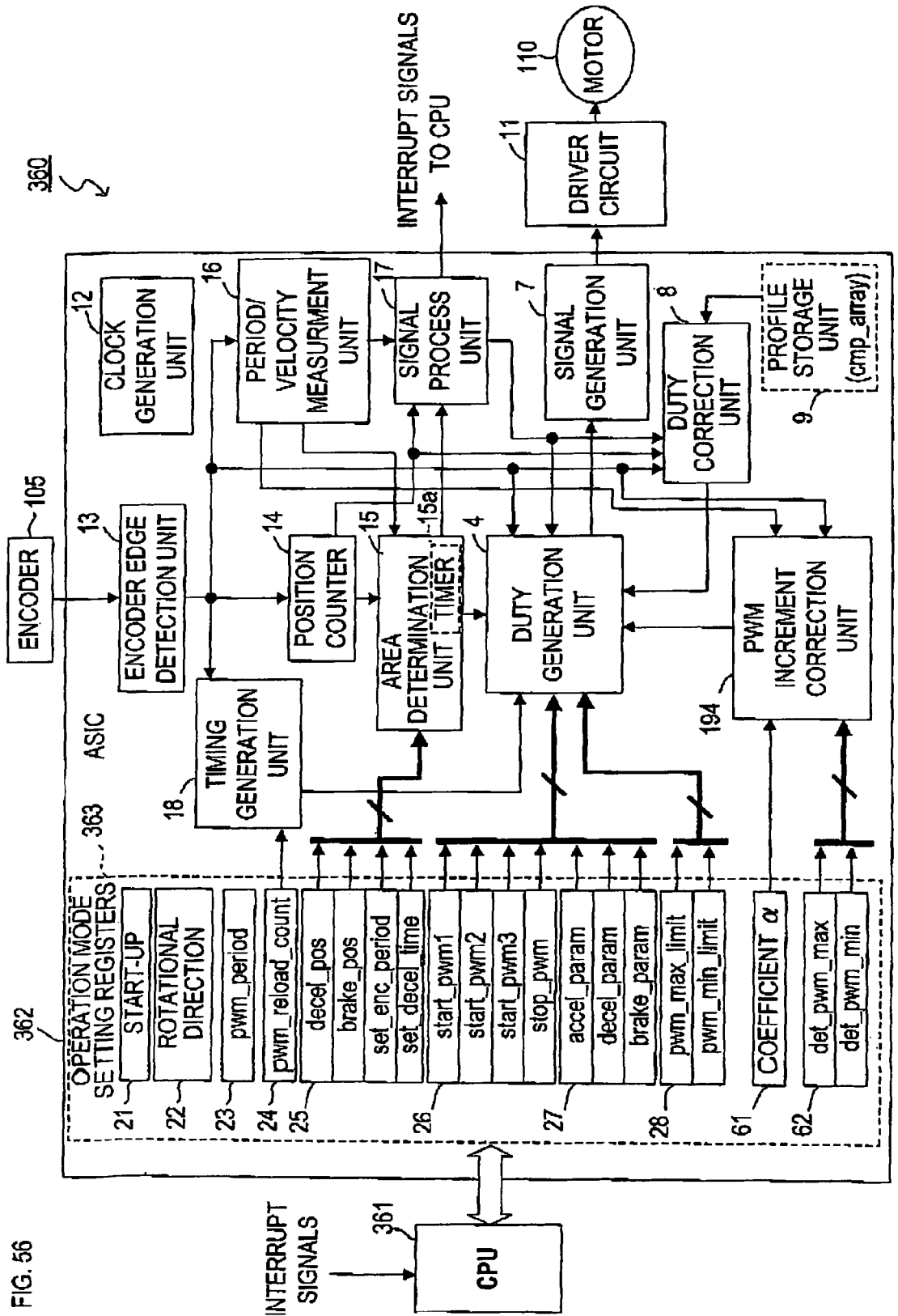
FIG. 56 is a block diagram showing a schematic structure of a motor control device according to a sixth variation of the third embodiment.

FIG. 56 shows a schematic structure of a motor control device 360 according to the present variation. The motor control device 360 of the present variation is largely different from the motor control device 320 (see FIG. 47) of the first variation in that the PWM duty threshold setting register 62 is provided inside the operation mode setting registers 363 and the high PWM duty detection threshold (det_pwm_max) and the low PWM duty detection threshold (det_pwm_min) are respectively set in the PWM duty threshold setting register 62, and that the PWM value (pwm_out) inputted to the signal generation unit 7 from the duty generation unit 4 is also inputted to the PWM increment value correction unit 194. Other constitution of the motor control device 360 is basically the same as the constitution of the motor control device 820 of the first variation. Therefore, the same reference numbers are given to the components identical to those of the motor control device 320 of the first variation, and detailed descriptions thereof are not repeated.

Figure 57:
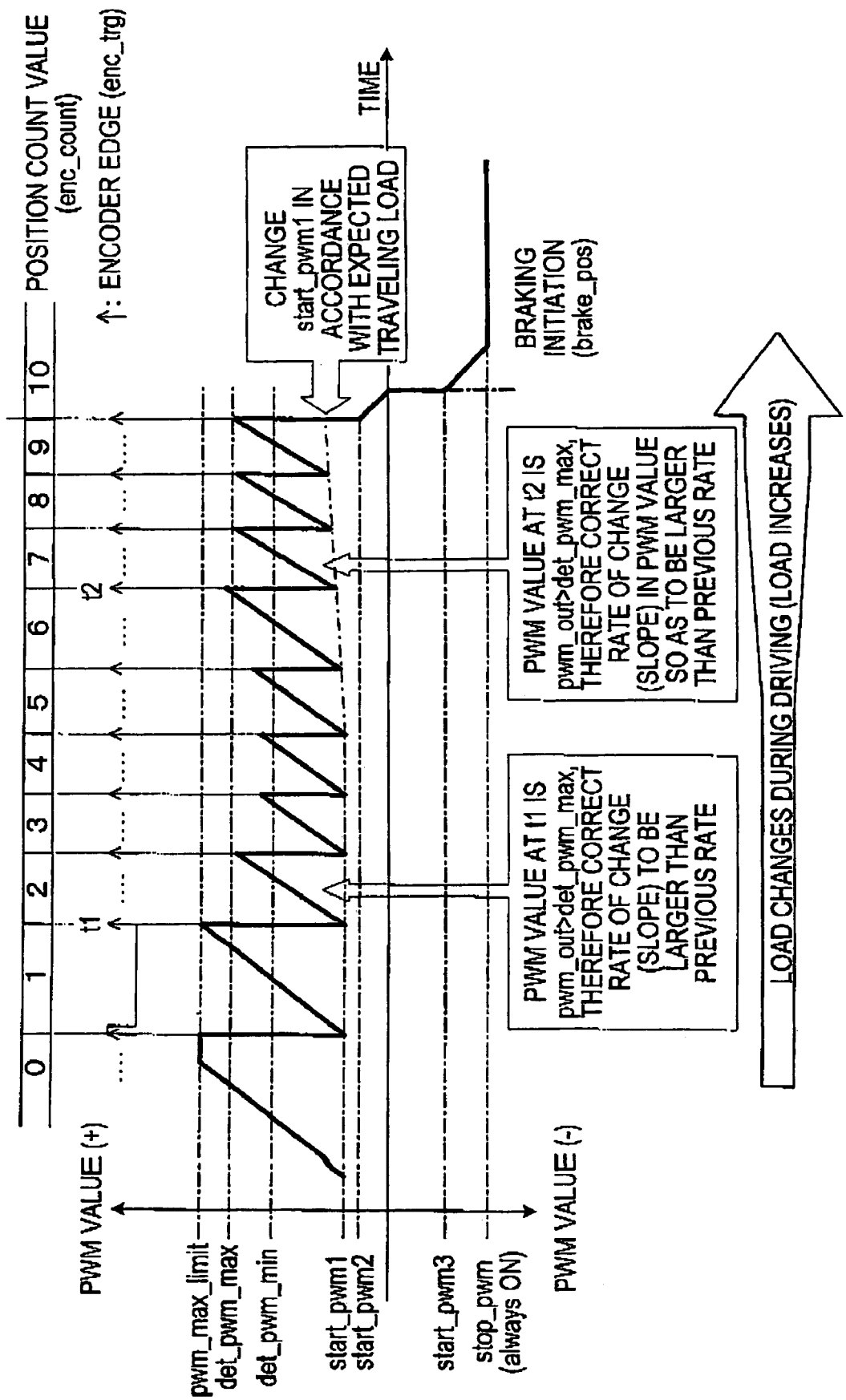
FIG. 57 is a time chart showing an example of control when a motor load in the motor control device of the sixth variation of the third embodiment is on the increase.
Figure 58:
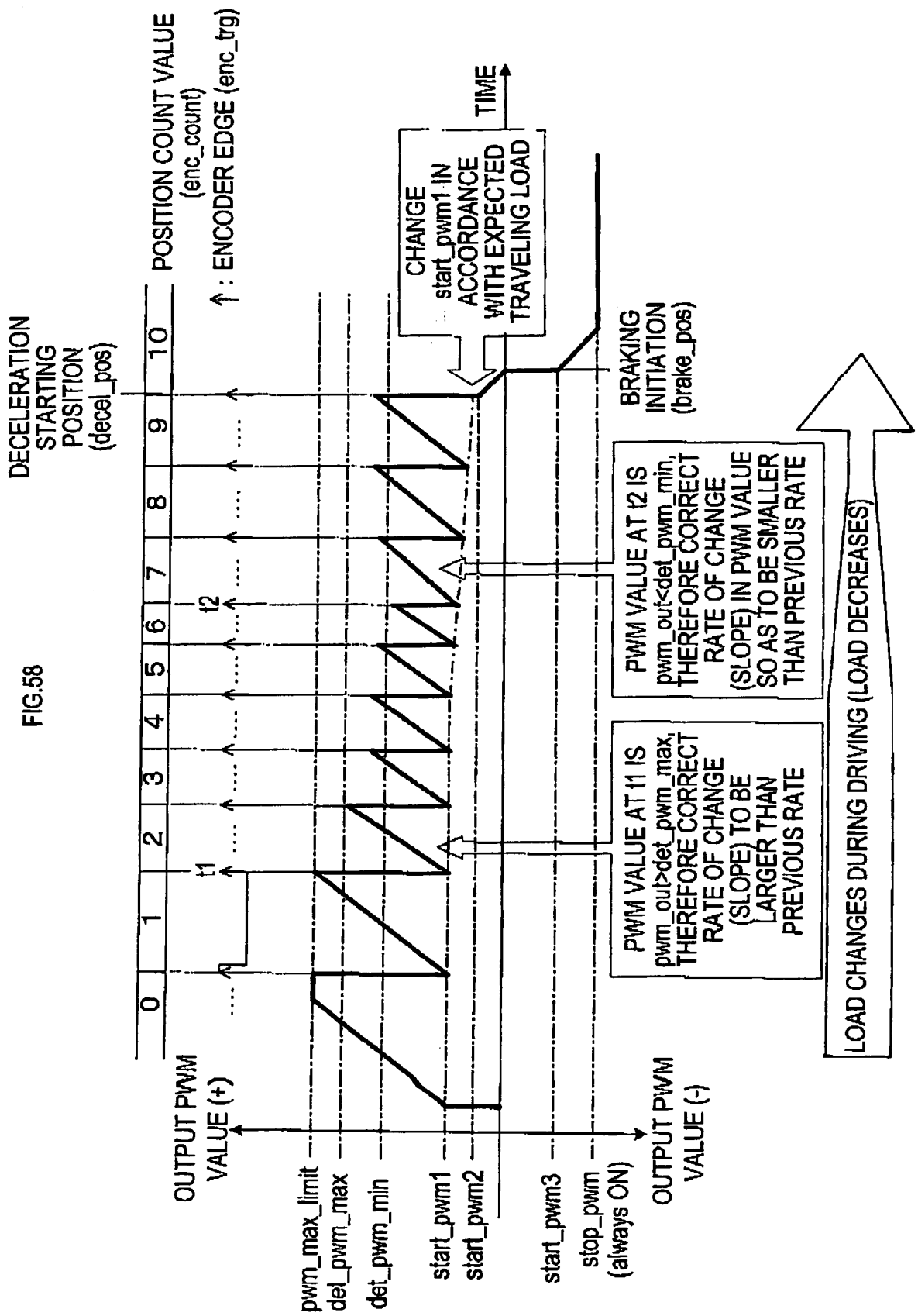

Referring to FIGS. 57 and 58, control of the motor 110 in the motor control device 360 according to the present variation is explained. FIG. 57 is an example of control when the load of the motor 110 is on the increase. FIG. 58 is an example of control when the load of the motor 110 is on the decrease.

In the example of control in FIG. 57, after drive initiation, calculation for correcting a-param is performed at the time of the second edge detection and afterwards. The determination on whether the previous a_param is corrected is performed based on the PWM value (pwm_out) at the time of edge detection.

Particularly, at the time of the second encoder edge detection (time t1) after drive initiation in FIG. 57, the PWM value (pwm_out) exceeds the high PWM duty detection threshold (det_pwm_max). Therefore, by increasing a_param, the rate of change in the PWM value is increased. At the time of edge detection after the time t1, the PWM value (pwm_out) continues to be under det_pwm_max for a while. When the motor load is increased and when the PWM value (pwm_out) exceeds det_pwm_max again at time t2, a_param is further increased so as to increase the rate of change in the PWM value.

Figure 68:
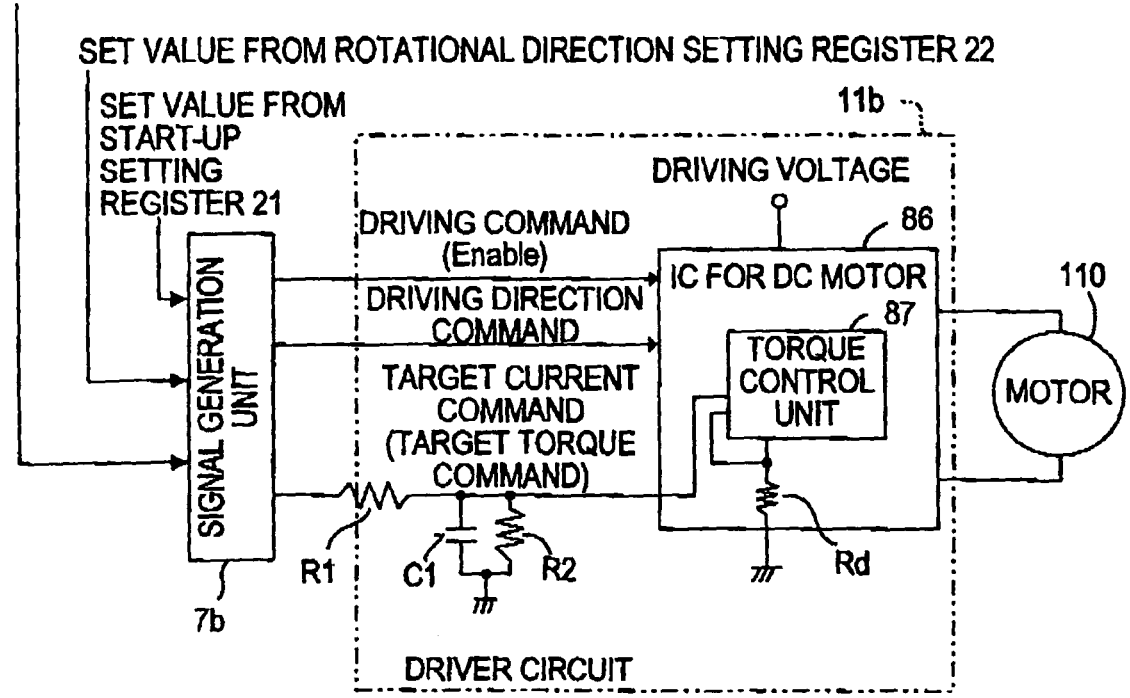
FIG. 68 is a time chart showing an example of control when a motor load in the motor control device of the sixth variation of the third embodiment is on the decrease.

Next, an example of control when the motor load is decreased is explained referring to FIG. 68. In this case, until the encoder edge detection just before the time t2, control is completely the same as the control in FIG. 57.

Accordingly, detailed description thereof is not repeated. When the load is gradually decreased around the time t1, the driving velocity is accelerated. Thus, the PWM value at the time of encoder edge detection is getting small. At the time of encoder edge detection at the time t2, the PWM value gets smaller than det_pwm_min. Therefore, a_param is decreased so as to decrease the rate of change in the PWM value.

In addition to the aforementioned increase/decrease in the rate of change, the initial PWM value (start_pwm) is also changed according to the preset initial PWM correction value profile (cmp_array). These steps are completely the same with those in the example of control (FIGS. 42, 43) according to the third embodiment.

Figure 59:
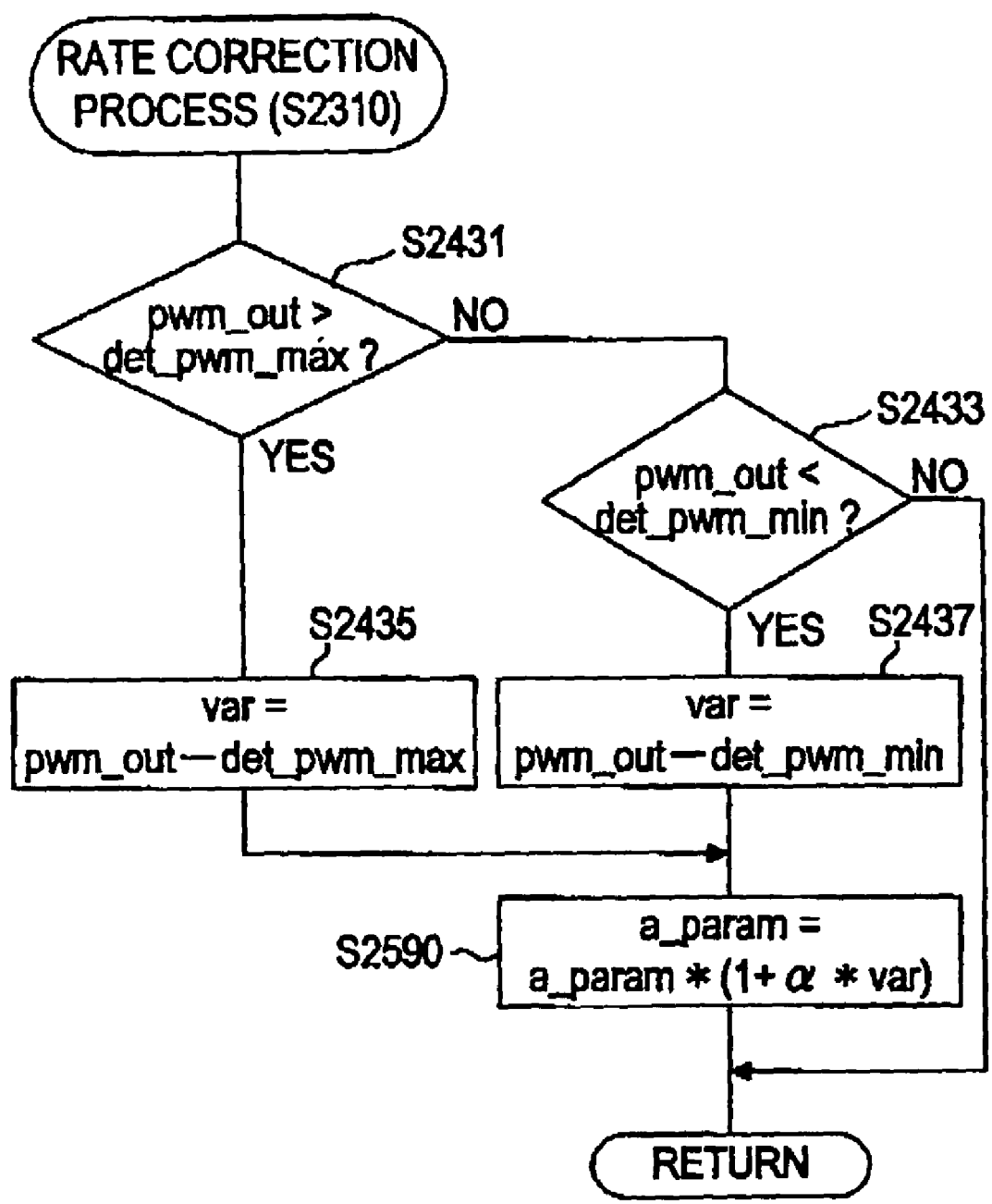
FIG. 59 is a flowchart showing particulars of the rate correction process executed in ASIC of the sixth variation of the third embodiment.

FIG. 59 shows a rate correction process executed in ASIC 362 of the present variation. When this process begins, it is firstly determined in S2431 whether the PWM value (pwm_out) at the time of edge detection is larger than det_pwm_max. When it is determined that the PWM value (pwm_out) is larger, the process moves to S2435 and the difference between pwm_out and det_pwm_max is calculated as var.

When pwm_out is equal to or less than det_pwm_max, the process moves from S2431 to S2438. It is determined whether the PWM value (pwm_out) is smaller than det_pwm min. Here, if pwm_out is equal to or more than det_pwm_min, the process ends without performing further steps. If pwm_out is smaller than det_pwm_min, the difference between pwm_out and det_pwm_min is calculated as var in S2437.

In calculation for correcting a_param in S2590, new a_param is calculated using var obtained in the above S2435 or S2437.

Accordingly, in the motor control device 360 constituted as above according to the present variation, a_param, and further the rate of change in the PWM value, is changed based on the PWM value at the time of edge detection. Therefore, even if fluctuation in the load of the motor 110 occurs, the driving target can be driven in a stable manner.

[Seventh Variation]

In the aforementioned third embodiment and the first to fifth variations, the rate of change in the PWM value is changed based on the edge interval (enc_period). In the above sixth variation, the rate of change in the PWM value is changed based on the PWM value (pwm_out) at the time of edge detection. In the present variation, an example of changing the rate of change in the PWM value based on the velocity of the driving target (enc_velocity) at the time of edge detection is explained.

Figure 60:
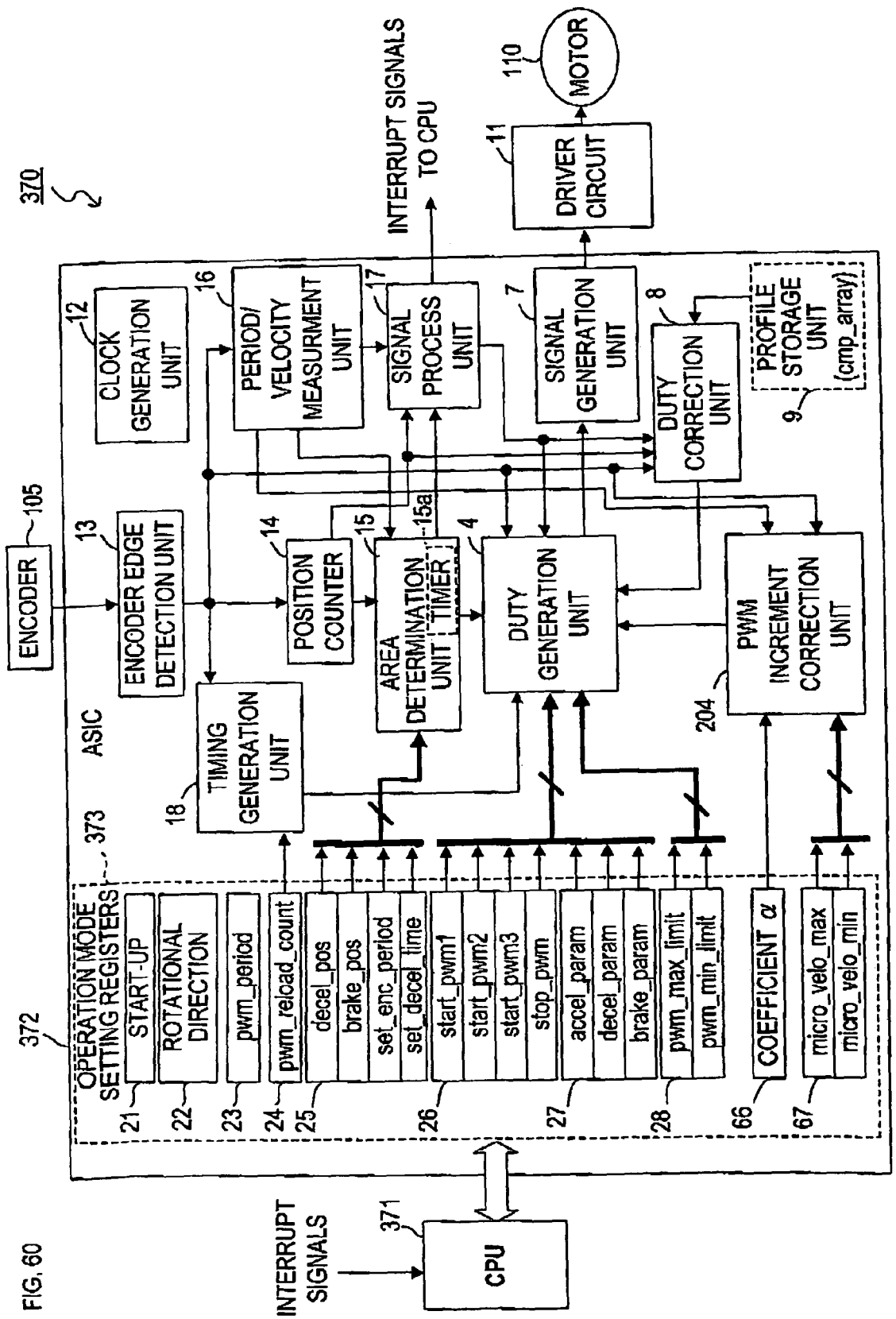
FIG. 60 is a block diagram showing a schematic structure of a motor control device according to a seventh variation of the third embodiment.

FIG. 60 shows a schematic structure of a motor control device 370 according to the present variation. The motor control device 370 of the present variation is largely different from the motor control device 320 (see FIG. 47) of the first variation in that the velocity threshold setting register 67 is provided inside the operation mode setting registers 873 and the high driving velocity detection threshold (micro_velo_max) and the low driving velocity detection threshold (micro_velo_min) are respectively set in the velocity threshold setting register 67, and that the driving velocity (enc_velocity) obtained from the period/velocity measurement unit 16 is compared with the above respective thresholds in the PWM increment value correction unit 204 and correction data corresponding to the comparison results is outputted to the duty generation unit 4. Other constitution of the motor control device 370 is basically the same as the constitution of the motor control device 320 of the first variation. Therefore, the same reference numbers are given to the components identical to those of the motor control device 320 of the first variation, and detailed descriptions thereof are not repeated.

Figure 61:
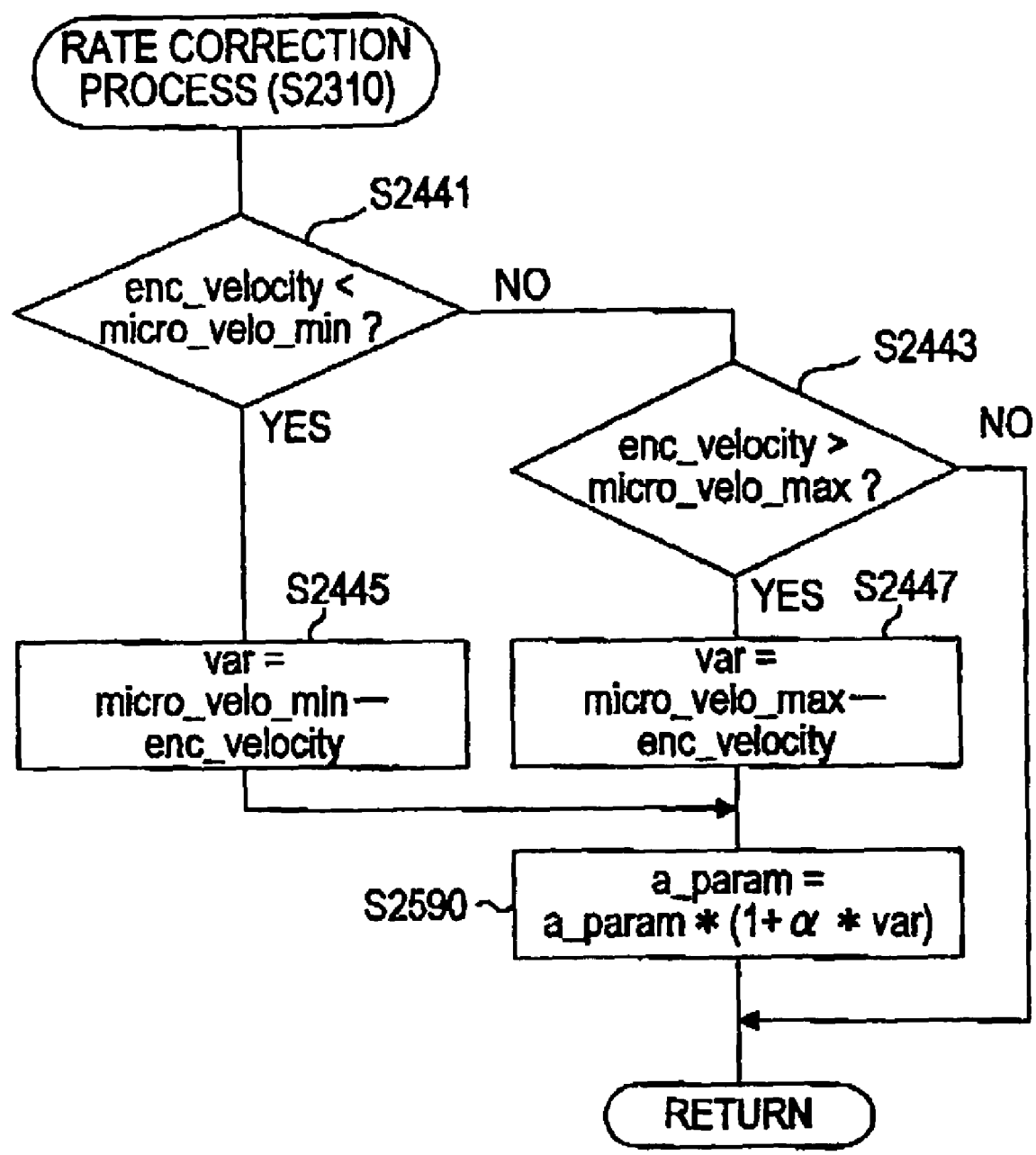
FIG. 61 is a flowchart showing particulars of the rate correction process executed in ASIC of the seventh variation of the third embodiment.

FIG. 61 shows a rate correction process executed in ASIC 372 of the present variation. When this process begins, it is firstly determined in S2441 whether the driving velocity (enc_velocity) at the time of edge detection is smaller than micro_velo_min. When it is determined that the driving velocity (enc_velocity) is smaller, the process moves to S2445 and the difference between micro_velo_min and enc_velocity is calculated as var.

If enc_velocity is equal to or more than micro_velo_min, the process moves from S2441 to S2443. It is determined whether the driving velocity (enc_velocity) is larger than micro_velo_max. If the driving velocity (enc_velocity) is equal to or less than micro_velo_max, the process ends without performing further steps. However, if the driving velocity (enc_velocity) is more than micro_velo_max, the difference between micro_velo_max and enc_velocity is calculated as var in S2447.

In the calculation for correcting a_param in S2590, new a_param is calculated using var obtained in the above S2445 and S2447.

Accordingly, in the motor control device 370 constituted as above according to the present variation, a_param, and further the rate of change in the PWM value, is changed based on the driving velocity at the time of edge detection. Therefore, even if fluctuation in the load of the motor 110 occurs, the driving target can be driven in a stable manner.

[Other Variations]

It is described in the above that the initial PWM correction value profile (cmp_array) in the profile storage unit 9 storing the initial PWM correction values (cmp_micr_duty) for the respective positions is an array of values obtained by experiment Or prior measurement. However, if a tendency of change (correction amount) in the initial PWM correction value (cmp_micr_duty) can be expressed as a positional function, for example, the initial PWM correction value profile (cmp_array) can be the function itself. In this case, the initial PWM correction value (cmp_micr_duty) corresponding to the position at the time at each encoder edge detection is obtained through a function formula stored as the profile.

Profiling of the function formula can be applied not only to the case in which the initial PWM correction value (cmp_micr_duty) can be expressed in one function throughout the traveling section of the carriage 102, but also to the case in which the function can be used only in a part of the traveling section. Or, a function fa can be used in the first part of the whole traveling section and a function fb can be used in the remaining part, or further some different functions can be used in the respective parts of the traveling section.

Moreover, the data stored as a profile may be, except for the initial PWM correction value (cmp_micr_duty) which is the correction data for changing the initial PWM value (a_param) as in the aforementioned embodiment and variations, the initial PWM value itself corresponding to the position, or a function by which the initial PWM value itself is obtained.

In the aforementioned embodiment and variations, the initial PWM value (start_pwm) is corrected (changed) according to the initial PWM correction value profile (cmp_array) at each encoder edge detection. The rate of change in the PWM value is corrected based on the various driving states (encoder time interval enc_period, driving velocity enc_velocity, PWM value pwm_out) at the time of encoder edge detection. However, the correction according to the profile and the correction based on the driving states can be reversed.

Figure 62:
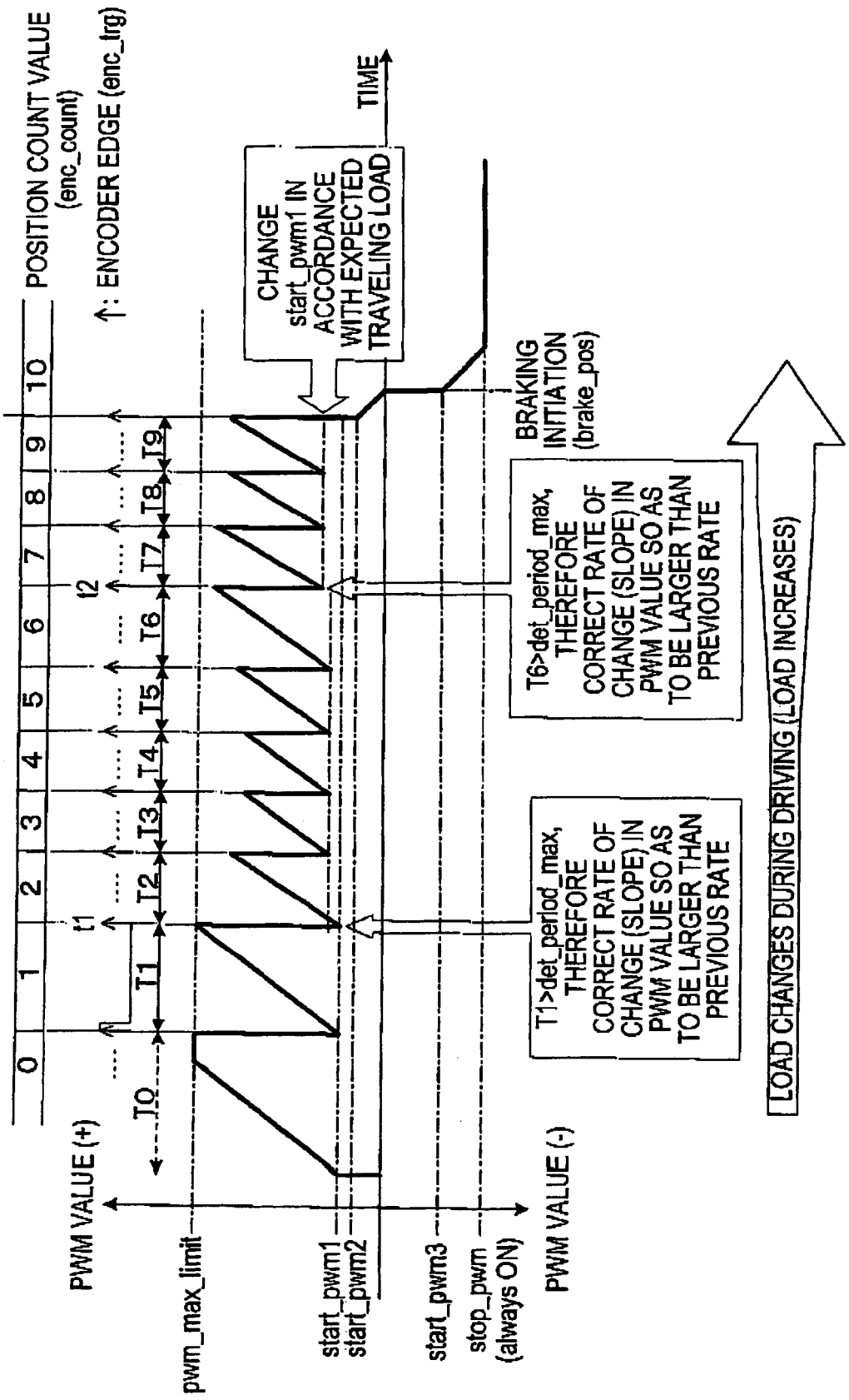
FIG. 62 is a time chart showing a variation of control when a motor load is on the increase.
Figure 63:
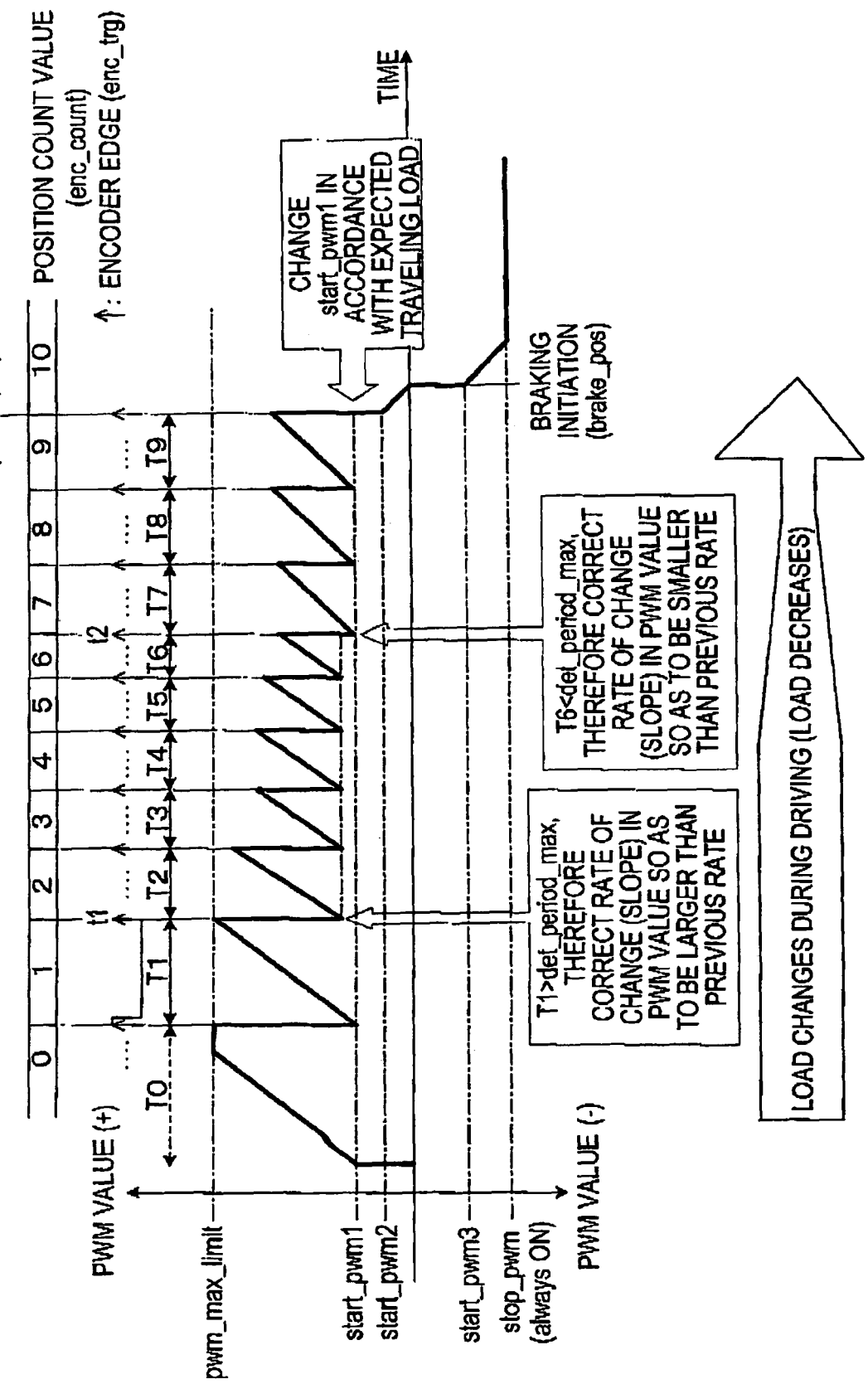
FIG. 63 is a time chart showing a variation of control when a motor load is on the decrease.

That is, the rate of change in the PWM value is set to a proper value at each position where an encoder edge is detected as a profile in advance. Every time the encoder edge is detected, the rate of change in the PWM value is changed according to the position (count value). The initial PWM value (start_pwm) is corrected based on the various driving states at the time of encoder edge detection. FIGS. 62 and 63 show an example of control in case that the motor control device is constituted as such.

FIG. 62 shows the example of control when the motor load is gradually increased (similar to FIG. 42). As can be seen in the figure, the rate of change in the PWM value continues to be constant for a while after drive initiation. As the motor load is gradually increased, the rate of change is also increased according to the profile. This increasing tendency and the increment value are preset according to the anticipated increase in the motor load (traveling load).

On the other hand, it is determined how the initial PWM value (start_pwm) is changed from the previous rate of change based on the driving state (encoder time interval enc_period, for example) at each encoder edge detection. In the example of FIG. 62, the encoder time interval T1 at the time t1 is longer than the long interval detection threshold (det_period_max). Therefore, the initial PWM value (start_pwm) reset at this time t1 is increased by a predetermined amount from the initial value start_pwm1.

Then, the encoder time interval T6 at the time t2 gets again longer than the long interval detection threshold (det_period_max). Therefore, the initial PWM value (start_pwm) reset at this time t2 is further increased by a predetermined amount from the value at the previous encoder edge detection.

FIG. 63 shows the example of control when the motor load is gradually decreased (similar to FIG. 43). As can be seen in the figure, the rate of change in the PWM value continues to be constant for a while after drive initiation As the motor load is gradually decreased, the rate of change is also decreased according to the profile. This decreasing tendency and the decrement value are preset according to the anticipated decrease of the motor load (traveling load).

On the other hand, it is determined how the initial PWM value (start_pwm) is changed from the previous rate of change based on the driving state (encoder time interval enc_period, for example) at each encoder edge detection. In the example shown in FIG. 63, the encoder time interval T1 at the time t1 is longer than the long interval detection threshold (det_period_max). Therefore, the initial PWM value (start_pwm) reset at this time t1 is increased by a predetermined amount from the initial value start_pwm1, as in the case shown in FIG. 62.

Then, the encoder time interval T6 at the time t2 gets shorter than the short interval detection threshold (det_period_min). Therefore, the initial PWM value (start_pwm) reset at this time t2 is decreased by a predetermined amount from the value at the previous encoder edge detection.

In either of the aforementioned variations, as explained in FIGS. 62 and 63, further variation is possible so that the initial PWM value (start_pwm) is corrected based on the driving states at the time of encoder edge detection and the rate of change is corrected according to the profile.

In the above third variation, the example of changing the rate of change in the PWM value by changing the PWM value update interval Tv based on the edge interval (enc_period) at the time of encoder edge detection is explained. However, the rate of change in the PWM value by changing Tv can be modified based on the PWM value (pwm_out) at the time of encoder edge detection as shown in FIG. 64, or based on the driving velocity (enc_velocity) at the time of encoder edge detection as shown in FIG. 65, for example.

Figure 64:
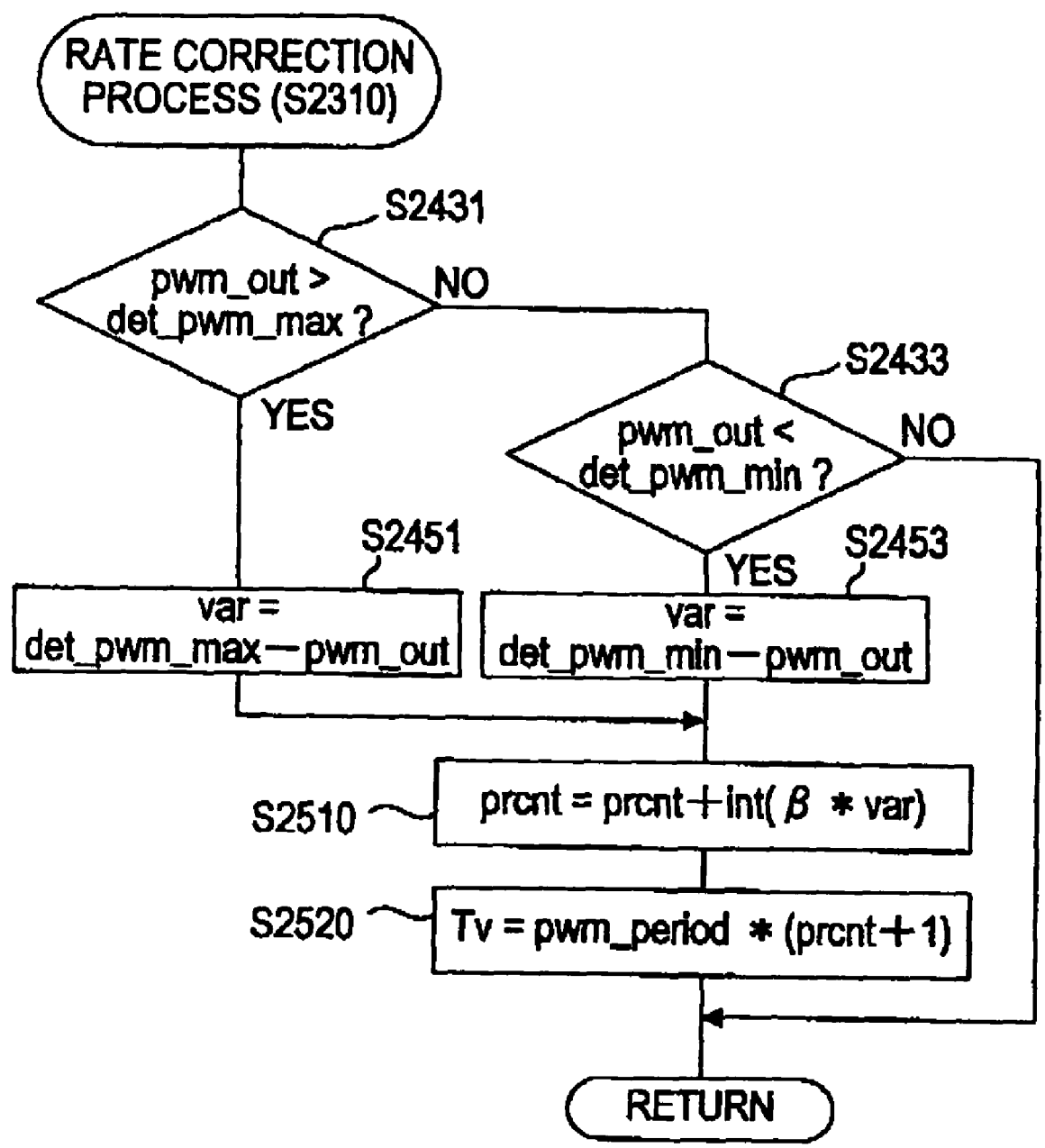
FIG. 64 is a flowchart showing other variation of the rate correction process.

FIG. 64 shows a rate correction process when Tv is changed based on the PWM value (pwm_out) at the time of encoder edge detection. Here, S2360, 2870, S2421, and S2423 in the rate correction process (see FIG. 52) of the third variation are respectively replaced with S2481, S2433, S2461, and S2453.

That is, if pwm_out is larger than det_pwm_max at edge detection, the difference between det_pwm_max and pwm_out is set as var in S2451. If pwm_out is smaller than det_pwm_min, the difference between det_pwm_min and pwm_out is set as var in S2453.

Figure 65:
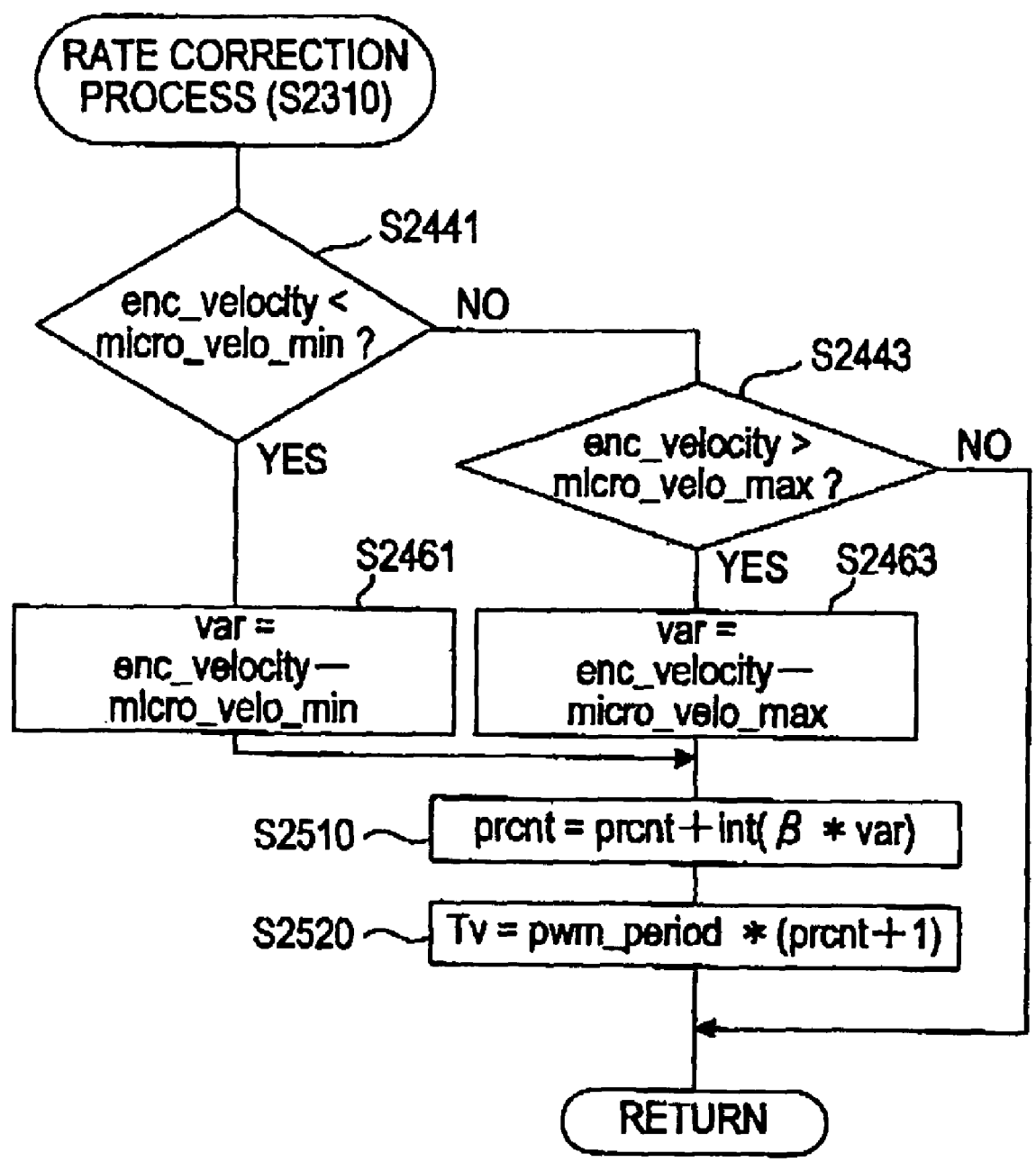
FIG. 65 is a flowchart showing another variation of the rate correction process.

FIG. 65 shows a rate correction process when Tv is changed based on the driving velocity (enc_velocity) at the time of encoder edge detection. Here, S2360, S2870, S2421, and S2423 in the rate correction process (see FIG. 52) of the third variation are respectively replaced with S2441, S2448, S2461, and S2468.

That is, if enc_velocity is smaller than micro_velo_min at edge detection, the difference between micro_velo_min and enc_velocity is set as var in S2451. If enc_velocity is larger than micro_velo_max, the difference between micro_velo_max and enc_velocity is set as var in S2463.

In this manner, the PWM value update interval Tv can be changed according to the PWM value (pwm_out) or the driving velocity (enc_velocity) at the time of encoder edge detection.

In the rate correction process (see FIG. 46) according to the aforementioned third embodiment, when a_param is changed (increased or decreased) by a predetermined amount based on the edge interval (enc_period), the previous a_param is increased or decreased. However, three types of PWM increment value (accel_param, accel_param1, accel_param2) simply provided may be switched according to the edge interval (enc_period). There is a relation of accel_param1<accel_param<accel_param2.

Figure 66:
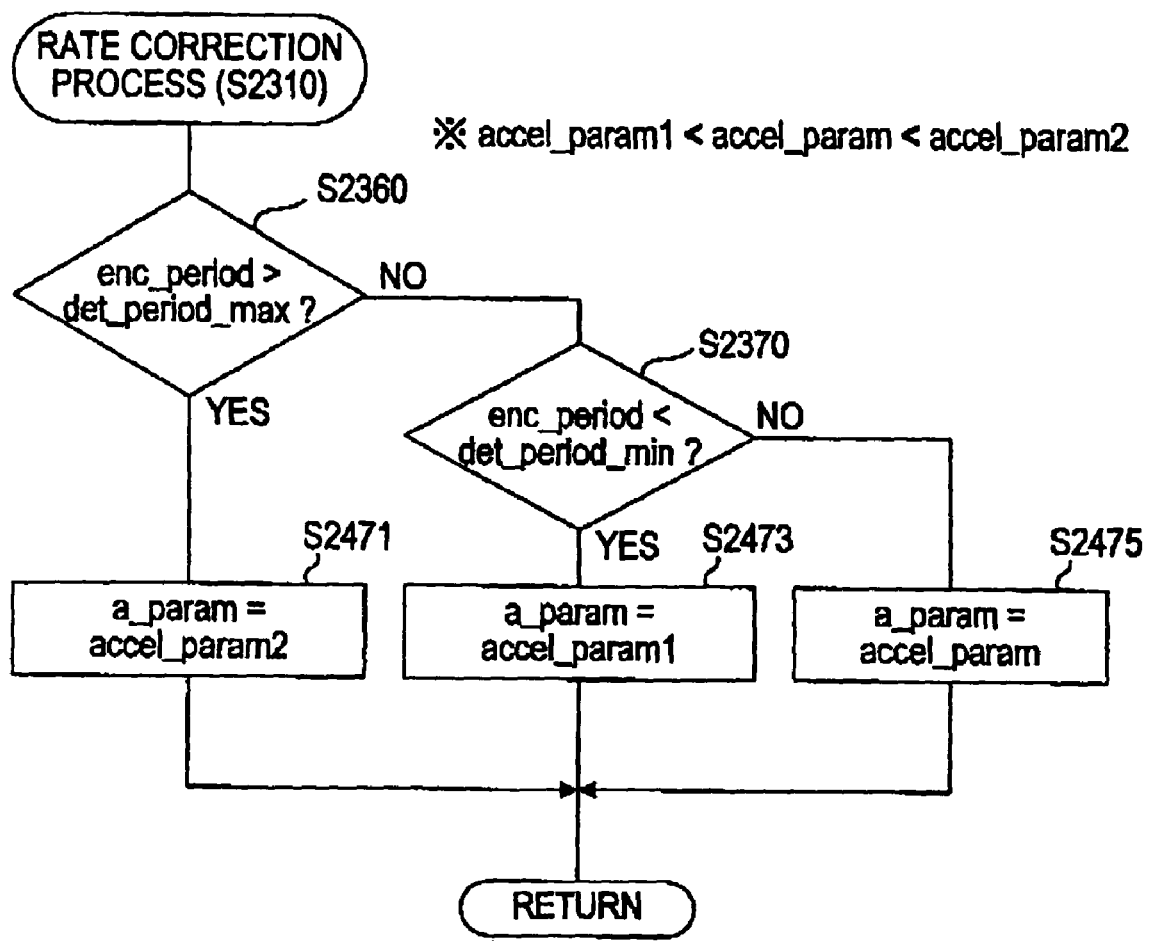
FIG. 66 is a flowchart showing further variation of the rate correction process.

Particularly, as shown in FIG. 66, if enc_period is larger than det_period_max, accel_param2 is set as a_param in S2471. If enc_period is smaller than det_period_min, accel- _param1 is set as a_param in S2473. Otherwise, accel_param (i.e., the existing initial value) is set as a_param in S2475.

Figure 67:
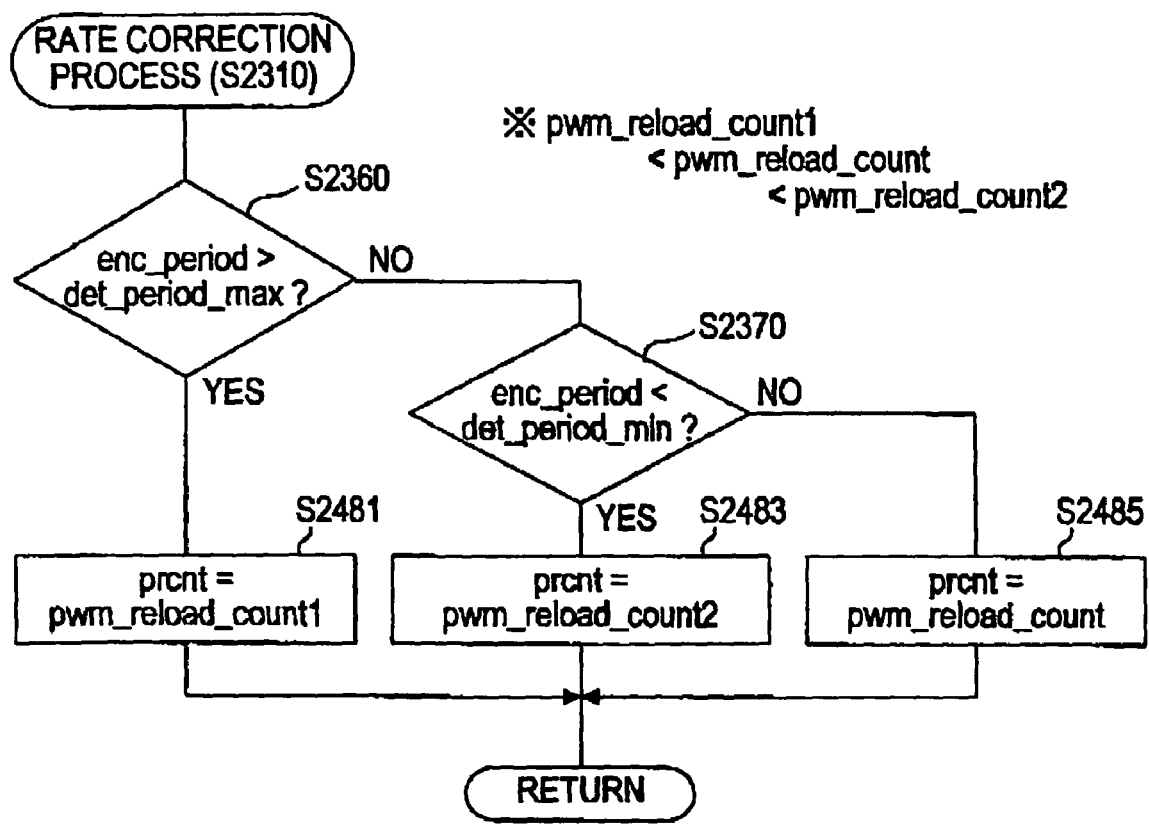
FIG. 67 is a flowchart showing another further variation of the rate correction process.

In the aforementioned second variation, the PWM value update interval Tv is increased or decreased from the previous constant addition timing prcnt. However, as shown in FIG. 67, three types of constant addition timing (pwm_reload_count, pwm_reload_count1, pwm_reload_count2 ) simply provided may be switched according to the edge interval (enc_period). There is a relation of pwm_reload_count1 <pwm_reload_count<pwm_reload_count2.

Both the method of switching three types of a_param shown in FIG. 66 and the method of switching three types of prcnt shown in FIG. 67 can be applied to the control for changing the rate of change based on the PWM value (pwm_out) at the time of encoder edge detection and the control for changing the rate of change in the driving velocity (enc_velocity) at the time of encoder edge detection.

Also, the method of changing the rate of change in the PWM value by changing both a_param and Tv which has been described in the fourth and fifth variations can be also applied to the control for changing the rate of change based on the PWM value (pwm_out) at the time of encoder edge detection and the control for changing the rate of change in the driving velocity (enc_velocity) at the time of encoder edge detection.

Furthermore, as the methods of changing the rate of change in the PWM value, the method of increasing/decreasing the rate of change by a predetermined amount and the method of changing the driving states (enc_period, pwm_out, etc.) at the time of encoder edge detection continuously are explained in the aforementioned embodiment and variations. However, the rate of change may be changed gradually according to the driving states at the time of encoder edge detection.

Figure 69:
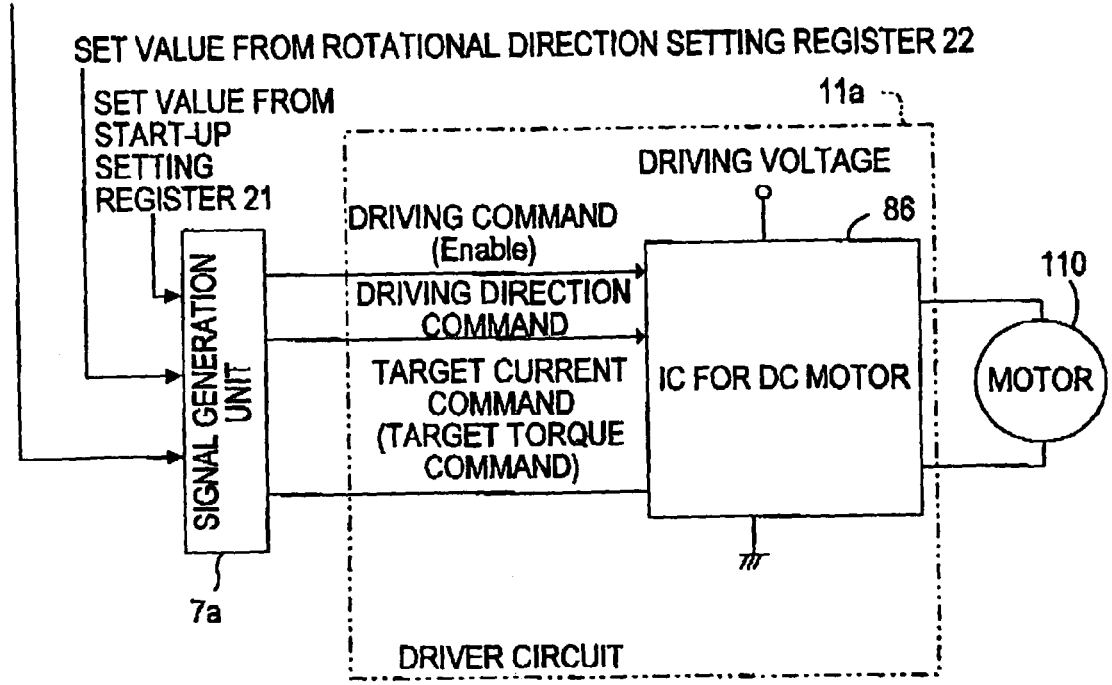
FIG. 69 is an explanatory view showing a variation of a interrupt.

Also in the aforementioned embodiments and variations, the driver circuit 11 is operated by driving signal input to the respective switching elements S1-S4 which constitute the H-bridge to the signal generation unit 7. However, the driver circuit 11 may be designed as a driver circuit 11b shown in FIG. 68 or a driver circuit 11a as shown in FIG. 69.

The driver circuit 11b shown in FIG. 68 detects the energized current of the motor 110 as the voltage of the current detection resistance Rd so as to detect the torque of the motor 110. The torque control unit 87 inside the IC 86 for DC motor generates control signal for controlling conduction of the motor 110 so that the detected torque coincides with a target torque command. The signal generation unit 7b generates PWM signal according the PWM value from the duty generation unit 4. Also, the signal generation unit 7b outputs a drive direction (the direction to which the motor 110 is rotated) command and a driving command indicating whether the motor 110 should be energized, according to the set value in the rotation direction setting register 22 and the set value in the start-up setting register 21.

The target torque (target current command) is obtained by integrating the PWM signal by the integration circuit comprising resistance R1, R2 and a condenser C1. Inside the IC 86 for DC motor as well, a not-shown H-bridge circuit similar to the one shown in FIG. 2 is formed. Eventually, the switching operation of the switching elements which constitute this H-bridge circuit will be controlled based on the control signal from the torque control unit 87.

With the driver circuit 11b constituted as such, compared to the case of driving the driver circuit 11 in FIG. 2 simply according to the PWM signal (switching control), the torque of the motor 110 is controlled to be constant inside the driver circuit 11. Therefore, the carriage 102 can be driven by the stable motor torque.

The driver circuit 11a shown in FIG. 69 does not include the integration circuit comprising resistance R1, R2 and a condenser C1 as the driver circuit 11b described in FIG. 68. However, the driver circuit 11a includes the same IC for DC motor.

The signal generation unit 7a generates and outputs a driving command based on the set value in the start-up setting register 21. Also, based on the set value in the rotation direction setting register 22, the signal generation unit 7a generates and outputs a drive direction command. So far, the signal generation unit 7a is the same as the signal generation unit 7b in FIG. 35. The signal generation unit 7a multiplies the PWM value from the duty generation unit 4 by a predetermined gain so that the PWM value is turned into data indicating a current value. The signal generation unit 7a converts the data into a target current command of an analog value through a not-shown D/A converter and outputs the command to the IC 86 for DC motor.

In the aforementioned embodiments and variations, the minimal velocity control upon capping in the motor 110 which drives the carriage 102 of the ink jet printer (FIG. 70) has been explained as an example. However, application of the present invention is not limited to the minimal velocity control upon capping. The present invention can be widely applied to any motor control, such as minimal velocity control in the aforementioned space adjustment area and minimal velocity control when the nozzle part 107 is wiped, for example, in which the drive power (the PWM value in the aforementioned embodiments and variations) of the motor is increased by a predetermined increment value at a predetermined period at each time the driving target (the carriage 102 in the above examples) is driven by a predetermined amount (at each encoder edge detection in the above embodiment and variations).

Specifically, when the record head 103 is being wiped, the traveling load of the carriage 102 on which the record head 103 is mounted largely fluctuates before, during, and after the contact of the record head 103 against the rubber for wiping (not shown). Thus, the load of the motor 110 is largely fluctuated. In this manner, the present invention can be applied more effectively to the control in which a sudden change in the motor load is anticipated.

Additionally, the motor 110 may not be limited to a DC motor. An AC motor can be also used. This invention can be applied to any motor except for a motor driven by rectangular pulse like a step motor.

The present invention is not limited to the above described embodiments and variations, and can be practiced in various manners without departing from the spirit and scope of the present invention.

What is claimed is:

1. A motor control method, comprising the steps of:
   (a) driving a motor such that the driving force of the motor gradually increases from an initial driving force;
   (b) repeatedly performing the step(a), each time an object to be driven by the motor is driven by a specified amount; and
   (c) changing the driving force of the motor for the next time depending on the state of driving at the end of the driving of the object to be driven by the specified amount, such that the object to be driven is driven at a target driving velocity.

2. A motor control method, comprising the steps of:
   (a) setting an initial driving force of a motor;
   (b) driving the motor such that the driving force of the motor increases by a fixed amount at a specific cycle from the initial driving force set in the step (a);

(c) performing the step(a) and the step (b), each time an object to be driven by the motor is driven by a specified amount; and (d) changing the initial driving force in the step (a) depending on the driving force at the end of the driving of the object to be driven by the specified amount, such that the object to be driven is driven at a target driving velocity.

3. The motor control method as set forth in claim 2, wherein each time the object to be driven is driven by the specified amount, at least one of the processings of:

(e) increasing the initial driving force when the driving force at the end of the driving by the specified amount is larger than a predetermined maximum driving force threshold, and (f) decreasing the initial driving force when the driving force at the end of the driving by the specified amount is smaller than a predetermined minimum driving force threshold is performed.

4. The motor control method as set forth in claim 3, wherein the amount of increase in the case of increasing the initial driving force in the processing of (e) is a predetermined standard fixed amount of increase, and wherein the amount of decrease in the case of decreasing the initial driving force in the processing of (f) is a predetermined standard fixed amount of decrease.

5. The motor control method as set forth in claim 3, wherein the amount of increase in the case of increasing the initial driving force in the processing of (e) is determined so as to continuously or gradually become greater as the difference between the driving force at the end of the driving of the object to be driven by the specified amount and the maximum driving force threshold becomes greater, and wherein the amount of decrease in the case of decreasing the initial driving force in the processing of (f) is determined so as to continuously or gradually become greater as the difference between the minimum driving force threshold and the driving force at the end of the driving of the object to be driven by the specified amount becomes greater.

6. A motor control method, comprising the steps of:
(a) setting an initial driving force of a motor;
(b) driving the motor such that the driving force of the motor increases by a fixed amount at a specific cycle from the initial driving force set in the step (a);
(c) performing the step(a) and the step (b), each time an object to be driven by the motor is driven by a specified amount; and
(d) changing the initial driving force in the step (a) depending on the time taken for the driving of the object to be driven by the specified amount, such that the object to be driven is driven at a target driving velocity.

7. The motor control method as set forth in claim 6, wherein each time the object to be driven by the motor is driven by the specified amount, at least one of the processings of:

(e) increasing the initial driving force when the time taken for the driving by the specified amount is longer than a predetermined maximum elapsed time threshold, and (f) decreasing the initial driving force when the time taken for the driving by the specified amount is shorter than a predetermined minimum elapsed time threshold is performed.

8. The motor control method as set forth in claim 7, wherein the amount of increase in the case of increasing the initial driving force in the processing of (e) is a predetermined standard fixed amount of increase, and wherein the amount of decrease in the case of decreasing the initial driving force in the processing of (f) is a predetermined standard fixed amount of decrease.

9. The motor control method as set forth in claim 7, wherein the amount of increase in the case of increasing the initial driving force in the processing of (e) is determined so as to continuously or gradually become greater as the difference between the time taken for the driving of the object to be driven by the specified amount and the maximum elapsed time threshold becomes greater, and wherein the amount of decrease in the case of decreasing the initial driving force in the processing of (f) is determined so as to continuously or gradually become greater as the difference between the minimum elapsed time threshold and the time taken for the driving of the object to be driven by the specified amount becomes greater.

10. A motor control method, comprising the steps of:
(a) setting an initial driving force of a motor;
(b) driving the motor such that the driving force of the motor increases by a fixed amount at a specific cycle from the initial driving force set in the step (a);
(c) performing the step(a) and the step (b), each time an object to be driven by the motor is driven by a specified amount; and
(d) changing the initial driving force in the step (a) depending on the driving velocity of the object to be driven at the end of the driving of the object to be driven by the specified amount, such that the object to be driven is driven at a target driving velocity.

11. The motor control method as set forth in claim 10, wherein each time the object to be driven by the motor is driven by the specified amount, at least one of the processings of:

(e) increasing the initial driving force when the driving velocity at the end of the driving by the specified amount is lower than a predetermined minimum velocity threshold, and (f) decreasing the initial driving force when the driving velocity at the end of the driving by the specified amount is higher than a predetermined maximum velocity threshold is performed.

12. The motor control method as set forth in claim 11, wherein the amount of increase in the case of increasing the initial driving force in the processing of (e) is a predetermined standard fixed amount of increase, and wherein the amount of decrease in the case of decreasing the initial driving force in the processing of (f) is a predetermined standard fixed amount of decrease.

13. The motor control method as set forth in claim 11, wherein the amount of increase in the case of increasing the initial driving force in the processing of (e) is determined so as to continuously or gradually become greater as the difference between the minimum velocity threshold and the driving velocity at the end of the driving of the object to be driven by the specified amount becomes greater, and wherein the amount of decrease in the case of decreasing the initial driving force in the processing of (b) is determined so as to continuously or gradually become greater as the difference between the driving velocity at the end of the driving of the object to be driven by the specified amount and the maximum velocity threshold becomes greater.

14. A motor control apparatus, comprising:
a driving detection device that outputs a driving detection signal, each time an object to be driven by a motor is driven by a specified amount, indicating completion of the driving by the specified amount;

a control device that outputs a driving force control signal to gradually increase the driving force of the motor from an initial driving force, each time the driving detection signal is output from the driving detection device;

a motor driving device that rotationally drives the motor in accordance with the driving force control signal from the control device; and a driving force changing device that changes the driving force for the next time, each time the driving detection signal is output from the driving detection device, depending on the state of driving at the end of the driving of the object to be driven by the specified amount, such that the object to be driven is driven at a target driving velocity.

15. A motor control apparatus, comprising:

a driving detection device that outputs a driving detection signal, each time an object to be driven by a motor is driven by a specified amount, indicating completion of the driving by the specified amount;

a control device that outputs a driving force control signal to increase the driving force of the motor from a set initial driving force by a fixed amount at a specific cycle, each time the driving detection signal is output from the driving detection device; and a motor driving device that rotationally drives the motor in accordance with the driving force control signal from the control device, wherein the motor control apparatus further includes an initial driving force changing device that changes the set initial driving force, each time the driving detection signal is output from the driving detection device, depending on the driving force at the time of the output, such that the object to be driven is driven at a target driving velocity.

16. The motor control apparatus as set forth in claim 15, further comprising a driving force determination device that determines, each time the driving detection signal is output, whether or not the driving force at the time of the output is larger than a predetermined maximum driving force threshold, wherein the initial driving force changing device increases the initial driving force, when it is determined by the driving force determination device that the driving force at the time of the output is larger than the predetermined maximum driving force threshold.

17. The motor control apparatus as set forth in claim 16, wherein the amount of increase in the case of increasing the initial driving force by the initial driving force changing device is a predetermined standard fixed amount.

18. The motor control apparatus as set forth in claim 16, further comprising:

a first difference value calculating device that calculates a first difference value as a difference between the driving force at the time of output of the driving detection signal and the maximum driving force threshold when it is determined by the driving force determination device that the driving force is larger than the maximum driving force threshold; and an increase amount setting device that sets an amount of increase of the initial driving force in accordance with the first difference value, wherein the initial driving force changing device increases the initial driving force by the amount of increase set by the increase amount setting device in the case of increasing the initial driving force.

19. The motor control apparatus as set forth in claim 18, further comprising:

a first difference determination device that determines whether or not a first difference value calculated by the first difference value calculating device is larger than a predetermined first difference threshold, wherein the increase amount setting device sets the amount of increase such that the amount of increase is larger when it is determined by the first difference determination device that the first difference value is larger than the predetermined first difference threshold compared with when it is not determined that the first difference value is larger.

20. The motor control apparatus as set forth in claim 18, wherein the increase amount setting device sets the amount of increase in accordance with the first difference value such that the amount of increase becomes larger as the first difference value calculated by the first difference value calculating device becomes larger.

21. The motor control apparatus as set forth in claim 15, further comprising a driving force determination device that determines, each time the driving detection signal is output, whether or not the driving force at the time of the output is smaller than a predetermined minimum driving force threshold, wherein the initial driving force changing device decreases the initial driving force, when it is determined by the driving force determination device that the driving force at the time of the output is smaller than the predetermined minimum driving force threshold.

22. The motor control apparatus as set forth in claim 21, wherein the driving force determination device determines whether or not the driving force at the time of the output of the driving detection signal is larger than a predetermined maximum driving force threshold which is at least equal to the predetermined minimum driving force threshold or more, wherein the initial driving force changing device increases the initial driving force, when it is determined by the driving force determination device that the driving force at the time of the output of the driving detection signal is larger than the predetermined maximum driving force threshold.

23. The motor control apparatus as set forth in claim 22, wherein the predetermined minimum driving force threshold and the predetermined maximum driving force threshold are values different from each other, and wherein the initial driving force changing device sets the initial driving force to a set value at the time of the previous output of the driving detection signal, when it is determined by the driving force determination device that the driving force at the time of the output of the driving detection signal more than the minimum driving force threshold and also less than the maximum driving force threshold.

24. The motor control apparatus as set forth in claim 22, wherein the amount of increase in the case of increasing the initial driving force by the initial driving force changing device is a predetermined standard fixed amount.

25. The motor control apparatus as set forth in claim 22, further comprising:

a first difference value calculating device that calculates a first difference value as a difference between the driving force at the time of output of the driving detection signal and the maximum driving force threshold when it is determined by the driving force determination device that the driving force is larger than the maximum driving force threshold; and an increase amount setting device that sets an amount of increase of the initial driving force in accordance with the first difference value,
wherein the initial driving force changing device increases the initial driving force by the amount of increase set by the increase amount setting device in the case of increasing the initial driving force.

26. The motor control apparatus as set forth in claim 21, wherein the amount of decrease in the case of decreasing the initial driving force by the initial driving force changing device is a predetermined standard fixed amount.

27. The motor control apparatus as set forth in claim 21, further comprising:
a second difference value calculating device that calculates a second difference value as a difference between the minimum driving force threshold and the driving force at the time of output of the driving detection signal, when it is determined by the driving force determination device that the driving force is smaller than the minimum driving force threshold; and
a decrease amount setting device that sets an amount of decrease of the initial driving force in accordance with the second difference value,
wherein the initial driving force changing device decreases the initial driving force by the amount of decrease set by the decrease amount setting device in the case of decreasing the initial driving force.

28. The motor control apparatus as set forth in claim 27, further comprising:
a second difference determination device that determines whether or not a second difference value calculated by the second difference value calculating device is larger than a predetermined second difference threshold,
wherein the decrease amount setting device sets the amount of decrease such that the amount of decrease is larger when it is determined by the second difference determination device that the second difference value is larger than the predetermined second difference threshold compared with when it is not determined that the second difference value is larger.

29. The motor control apparatus as set forth in claim 27, wherein the decrease amount setting device sets the amount of decrease in accordance with the second difference value such that the amount of decrease becomes larger as the second difference value calculated by the second difference value calculating device becomes larger.

30. The motor control apparatus as set forth in claim 15, wherein the initial driving force changing device does not change the initial driving force, when the driving detection signal is output from the driving detection device for the first time since the start of the driving of the object to be driven.

31. The motor control apparatus as set forth in claim 15,
wherein the motor driving device rotationally drives the motor by the driving force corresponding to an input PWM signal,
and wherein the control device outputs the PWM signal indicating a PWM duty value as the driving force control signal, and increases the PWM duty value by a fixed amount at a specific cycle from an initial PWM duty value corresponding to the initial driving force, each time the driving detection signal is output.

32. A motor control apparatus, comprising:
a driving detection device that outputs a driving detection signal, each time an object to be driven by a motor is driven by a specified amount, indicating completion of the driving by the specified amount;
a control device that outputs a driving force control signal to increase the driving force of the motor from a set initial driving force by a fixed amount at a specific cycle, each time the driving detection signal is output from the driving detection device; and
a motor driving device that rotationally drives the motor in accordance with the driving force control signal from the control device,
wherein the motor control apparatus further includes an initial driving force changing device that changes the set initial driving force, each time the driving detection signal is output from the driving detection device, depending on the elapsed time from the previous output to the current output of the driving detection signal, such that the object to be driven is driven at a target driving velocity.

33. The motor control apparatus as set forth in claim 32, further comprising an elapsed time determination device that determines, each time the driving detection signal is output, whether or not the elapsed time is longer than a predetermined maximum elapsed time threshold,
wherein the initial driving force changing device increases the initial driving force, when it is determined by the elapsed time determination device that the elapsed time is longer than the predetermined maximum elapsed time threshold.

34. The motor control apparatus as set forth in claim 33, wherein the amount of increase in the case of increasing the initial driving force by the initial driving force changing device is a predetermined standard fixed amount.

35. The motor control apparatus as set forth in claim 33, further comprising:
a first difference value calculating device that calculates a first difference value as a difference between the elapsed time and the maximum elapsed time threshold when it is determined by the elapsed time determination device that the elapsed time is longer than the maximum elapsed time threshold; and
an increase amount setting device that sets an amount of increase of the initial driving force in accordance with the first difference value,
wherein the initial driving force changing device increases the initial driving force by the amount of increase set by the increase amount setting device in the case of increasing the initial driving force.

36. The motor control apparatus as set forth in claim 35, further comprising:
a first difference determination device that determines whether or not the first difference value calculated by the first difference value calculating device is larger than a predetermined first difference threshold,
wherein the increase amount setting device sets the amount of increase such that the amount of increase is larger when it is determined by the first difference determination device that the first difference value is larger than the predetermined first difference threshold compared with when it is not determined that the first difference value is larger.

37. The motor control apparatus as set forth in claim 35, wherein the increase amount setting device sets the amount of increase in accordance with the first difference value such that the amount of increase becomes larger as the first difference value calculated by the first difference value calculating device becomes larger.

38. The motor control apparatus as set forth in claim 32, further comprising an elapsed time determination device that determines, each time the driving detection signal is output, whether or not the elapsed time is shorter than a predetermined minimum elapsed time threshold,
wherein the initial driving force changing device decreases the initial driving force, when it is determined by the elapsed time determination device that the elapsed time is shorter than the predetermined minimum elapsed time threshold.

39. The motor control apparatus as set forth in claim 38, wherein the elapsed time determination device also determines whether or not the elapsed time is longer than a predetermined maximum elapsed time threshold which is at least equal to or longer than the predetermined minimum elapsed time threshold,
and wherein the initial driving force changing device increases the initial driving force, when it is determined by the elapsed time determination device that the elapsed time is longer than the predetermined maximum elapsed time threshold.

40. The motor control apparatus as set forth in claim 39, wherein the predetermined minimum elapsed time threshold and the predetermined maximum elapsed time threshold are values different from each other,
and wherein the initial driving force changing device sets the initial driving force to a set value at the time of the previous output of the driving detection signal, when it is determined by the elapsed time determination device that the elapsed time is longer than the predetermined minimum elapsed time threshold and also less than the predetermined maximum elapsed time threshold.

41. The motor control apparatus as set forth in claim 39, wherein the amount of increase in the case of increasing the initial driving force by the initial driving force changing device is a predetermined standard fixed amount.

42. The motor control apparatus as set forth in claim 39, further comprising:
a first difference value calculating device that calculates a first difference value as a difference between the maximum elapsed time threshold and the elapsed time at the time of the output of the driving detection signal when it is determined by the elapsed time determination device that the elapsed time is longer than the maximum elapsed time threshold; and
an increase amount setting device that sets an amount of increase of the initial driving force in accordance with the first difference value,
wherein the initial driving force changing device increases the initial driving force by the amount of increase set by the increase amount setting device in the case of increasing the initial driving force.

43. The motor control apparatus as set forth in claim 38, wherein the amount of decrease in the case of decreasing the initial driving force by the initial driving force changing device is a predetermined standard fixed amount.

44. The motor control apparatus as set forth in claim 38, further comprising:
a second difference value calculating device that calculates a second difference value as a difference between the minimum elapsed time threshold and the elapsed time, when it is determined by the elapsed time determination device that the elapsed time is shorter than the minimum elapsed time threshold; and
a decrease amount setting device that sets an amount of decrease of the initial driving force in accordance with the second difference value,
wherein the initial driving force changing device decreases the initial driving force by the amount of decrease set by the decrease amount setting device in the case of decreasing the initial driving force.

45. The motor control apparatus as set forth in claim 44, further comprising:
a second difference determination device that determines whether or not a second difference value calculated by the second difference value calculating device is larger than a predetermined second difference threshold,
wherein the decrease amount setting device sets the amount of decrease such that the amount of decrease is larger when it is determined by the second difference determination device that the second difference value is larger than the predetermined second difference threshold compared with when it is not determined that the second difference value is larger.

46. The motor control apparatus as set forth in claim 44, wherein the decrease amount setting device sets the amount of decrease in accordance with the second difference value such that the amount of decrease becomes larger as the second difference value calculated by the second difference value calculating device becomes larger.

47. The motor control apparatus as set forth in claim 32, wherein the initial driving force changing device does not change the initial driving force, when the driving detection signal is output from the driving detection device for the first time since the start of the driving of the object to be driven.

48. The motor control apparatus as set forth in claim 32, wherein the motor driving device rotationally drives the motor by the driving force corresponding to an input PWM signal,
and wherein the control device outputs the PWM signal indicating a PWM duty value as the driving force control signal, and increases the PWM duty value by a fixed amount at a specific cycle from an initial PWM duty value corresponding to the initial driving force, each time the driving detection signal is output.

49. A motor control apparatus, comprising:
a driving detection device that outputs a driving detection signal, each time an object to be driven by a motor is driven by a specified amount, indicating completion of the driving by the specified amount;
a control device that outputs a driving force control signal to increase the driving force of the motor from a set initial driving force by a fixed amount at a specific cycle, each time the driving detection signal is output from the driving detection device; and
a motor driving device that rotationally drives the motor in accordance with the driving force control signal from the control device,
wherein the motor control apparatus further includes an initial driving force changing device that changes the set initial driving force, each time the driving detection signal is output from the driving detection device, depending on the driving velocity of the object to be driven at the time of the output, such that the object to be driven is driven at a target driving velocity.

50. The motor control apparatus as set forth in claim 49, further comprising a velocity determination device that determines, each time the driving detection signal is output, whether or not the driving velocity at the time of the output is lower than a predetermined minimum velocity threshold,
wherein the initial driving force changing device increases the initial driving force, when it is determined by the velocity determination device that the driving velocity at the time of the output is lower than the predetermined minimum elapsed time threshold.

51. The motor control apparatus as set forth in claim 50, wherein the amount of increase in the case of increasing the initial driving force by the initial driving force changing device is a predetermined standard fixed amount.

52. The motor control apparatus as set forth in claim 50, further comprising:
a first difference value calculating device that calculates a first difference value as a difference between the minimum velocity threshold and the driving velocity at the time of the output of the driving detection signal when it is determined by the velocity determination device that the driving velocity is lower than the minimum velocity threshold; and
an increase amount setting device that sets an amount of increase of the initial driving force in accordance with the first difference value,
wherein the initial driving force changing device increases the initial driving force by the amount of increase set by the increase amount setting device in the case of increasing the initial driving force.

53. The motor control apparatus as set forth in claim 52, further comprising:
a first difference determination device that determines whether or not a first difference value calculated by the first difference value calculating device is larger than a predetermined first difference threshold,
wherein the increase amount setting device sets the amount of increase such that the amount of increase is larger when it is determined by the first difference determination device that the first difference value is larger than the predetermined first difference threshold compared with when it is not determined that the first difference value is larger.

54. The motor control apparatus as set forth in claim 52, wherein the decrease amount setting device sets the amount of decrease in accordance with the second difference value such that the amount of decrease becomes larger as the second difference value calculated by the second difference value.

55. The motor control apparatus as set forth in claim 49, further comprising a velocity determination device that determines, each time the driving detection signal is output, whether or not the driving velocity at the time of the output is higher than a predetermined maximum velocity threshold,
wherein the initial driving force changing device decreases the initial driving force, when it is determined by the velocity determination device that the driving velocity at the time of the output is higher than the predetermined maximum velocity threshold.

56. The motor control apparatus as set forth in claim 55, wherein the velocity determination device also determines whether or not the driving velocity at the time of the output of the driving detection signal is lower than a predetermined minimum velocity threshold which is at least equal to or lower than the predetermined maximum velocity threshold,
and wherein the initial driving force changing device increases the initial driving force, when it is determined by the velocity determination device that the driving velocity at the time of the output of the driving detection signal is lower than the predetermined minimum velocity threshold.

57. The motor control apparatus as set forth in claim 56, wherein the predetermined minimum velocity threshold and the predetermined maximum velocity threshold are values different from each other,
and wherein the initial driving force changing device sets the initial driving force to a set value at the time of the previous output of the driving detection signal, when it is determined by the driving velocity determination device that the driving velocity at the time of the output of the driving detection signal is higher than the minimum driving velocity threshold and also lower than the maximum driving velocity threshold.

58. The motor control apparatus as set forth in claim 56, wherein the amount of increase in the case of increasing the initial driving force by the initial driving force changing device is a predetermined standard fixed amount.

59. The motor control apparatus as set forth in claim 56, further comprising:
a first difference value calculating device that calculates a first difference value as a difference between the minimum velocity threshold and the driving velocity at the time of the output of the driving detection signal, when it is determined by the velocity determination device that the driving velocity is lower than the minimum velocity threshold; and
an increase amount setting device that sets an amount of increase of the initial driving force in accordance with the first difference value,
wherein the initial driving force changing device increases the initial driving force by the amount of increase set by the increase amount setting device in the case of increasing the initial driving force.

60. The motor control apparatus as set forth in claim 55, wherein the amount of decrease in the case of decreasing the initial driving force by the initial driving force changing device is a predetermined standard fixed amount.

61. The motor control apparatus as set forth in claim 55, further comprising:
a second difference value calculating device that calculates a second difference value as a difference between the driving velocity at the time of the output of the driving detection signal and the maximum velocity threshold, when it is determined by the velocity determination device that the driving velocity is higher than the maximum velocity threshold; and
a decrease amount setting device that sets an amount of decrease of the initial driving force in accordance with the second difference value,
wherein the initial driving force changing device decreases the initial driving force by the amount of decrease set by the decrease amount setting device in the case of decreasing the initial driving force.

62. The motor control apparatus as set forth in claim 61, further comprising:
a second difference determination device that determines whether or not a second difference value calculated by the second difference value calculating device is larger than a predetermined second difference threshold,
wherein the decrease amount setting device sets the amount of decrease such that the amount of decrease is larger when it is determined by the second difference determination device that the second difference value is larger than the predetermined second difference threshold compared with when it is not determined that the second difference value is larger.

63. The motor control apparatus as set forth in claim 61, wherein the decrease amount setting device sets the amount of decrease in accordance with the second difference value such that the amount of decrease becomes larger as the second difference value calculated by the second difference value calculating device becomes larger.

64. The motor control apparatus as set forth in claim 49, wherein the initial driving force changing device does not change the initial driving force, when the driving detection signal is output from the driving detection device for the first time since the start of the driving of the object to be driven.

65. The motor control apparatus as set forth in claim 49, wherein the motor driving device rotationally drives the motor by the driving force corresponding to an input PWM signal, and wherein the control device outputs the PWM signal indicating a PWM duty value as the driving force control signal, and increases the PWM duty value by a fixed amount at a specific cycle from an initial PWM duty value corresponding to the initial driving force, each time the driving detection signal is output.

66. A motor control apparatus, comprising:

means for driving a motor such that the driving force of the motor gradually increases from an initial driving force;

means for repeatedly driving the motor such that the motor gradually increases from the initial driving force, each time an object to be driven by the motor is driven by a specified amount; and means for changing the driving force of the motor for a next time depending on a state of driving at the end of the driving of the object to be driven by the specified amount, such that the object to be driven is driven at a target driving velocity.

67. A motor control apparatus, comprising:

means for setting an initial driving force of a motor;

means for driving the motor such that the driving force of the motor increases by a fixed amount at a specific cycle from the initial driving force set in the means for setting;

means for performing the means for setting and the means for driving, each time an object to be driven by the motor is driven by a specified amount; and means for changing the initial driving force in the means for setting depending on the driving force at the end of the driving of the object to be driven by the specified amount, such that the object to be driven is driven at a target driving velocity.

68. A motor control apparatus, comprising:

means for setting an initial driving force of a motor;

means for driving the motor such that the driving force of the motor increases by a fixed amount at a specific cycle from the initial driving force set in the means for setting;

means for performing the means for setting and the means for driving, each time an object to be driven by the motor is driven by a specified amount; and means for changing the initial driving force in the means for setting depending on the time taken for the driving of the object to be driven by the specified amount.

69. A motor control apparatus, comprising:

means for setting an initial driving force of a motor;

means for driving the motor such that the driving force of the motor increases by a fixed amount at a specific cycle from the initial driving force set in the means for setting;

means for performing the means for setting and the means for driving, each time an object to be driven by the motor is driven by a specified amount; and means for changing the initial driving force in the means for setting depending on the driving velocity of the object to be driven at the end of the driving of the object to be driven by the specified amount, such that the object to be driven is driven at a target driving velocity.

* * * * *